United States Patent
Sirpal

(10) Patent No.: US 9,426,515 B2
(45) Date of Patent: Aug. 23, 2016

(54) SYSTEMS AND METHODS FOR PROVIDING SOCIAL MEDIA WITH AN INTELLIGENT TELEVISION

(71) Applicant: Flextronics AP, LLC, San Jose, CA (US)

(72) Inventor: Sanjiv Sirpal, Oakville (CA)

(73) Assignee: Flextronics AP, LLC, San Jose, CA (US)

( * ) Notice: Subject to any disclaimer, the term of this patent is extended or adjusted under 35 U.S.C. 154(b) by 155 days.

(21) Appl. No.: 13/969,499

(22) Filed: Aug. 16, 2013

(65) Prior Publication Data
US 2014/0052785 A1    Feb. 20, 2014

Related U.S. Application Data

(60) Provisional application No. 61/684,672, filed on Aug. 17, 2012, provisional application No. 61/702,650, filed on Sep. 18, 2012, provisional application No. 61/697,710, filed on Sep. 6, 2012, provisional
(Continued)

(51) Int. Cl.
*G06F 15/16* (2006.01)
*H04N 21/431* (2011.01)
(Continued)

(52) U.S. Cl.
CPC .......... *H04N 21/4316* (2013.01); *G06F 3/017* (2013.01); *G06F 3/0481* (2013.01); *G06F 3/04883* (2013.01); *H04L 51/32* (2013.01); *H04N 5/44* (2013.01); *H04N 5/4401* (2013.01); *H04N 5/4403* (2013.01); *H04N 5/445* (2013.01); *H04N 5/44591* (2013.01); *H04N 5/45* (2013.01); *H04N 5/50* (2013.01); *H04N 17/04* (2013.01); *H04N 21/2187* (2013.01); *H04N 21/235* (2013.01); *H04N 21/2543* (2013.01);
(Continued)

(58) Field of Classification Search
CPC ........... H04N 21/482; H04N 21/4782; H04N 21/488; H04N 2005/4414; G06F 3/048; H04L 51/32
USPC .................. 725/42, 109; 715/854, 738, 741; 709/206
See application file for complete search history.

(56) References Cited

U.S. PATENT DOCUMENTS 4,284,849 A    8/1981  Anderson et al.
5,539,479 A    7/1996  Bertram
(Continued)

FOREIGN PATENT DOCUMENTS

CN    1832534    9/2006
CN    101472102    7/2009
(Continued)

OTHER PUBLICATIONS

Official Action for U.S. Appl. No. 13/969,846, mailed Aug. 15, 2014 19 pages.
(Continued)

*Primary Examiner* — David Lazaro
(74) *Attorney, Agent, or Firm* — Sheridan Ross P.C.

(57) ABSTRACT

An Intelligent Television provides unique user interfaces and user interface interactions to provide social media. The interfaces and interface are intuitive and allow the user to quickly retrieve and view social media with respect to content displayed on the Intelligent Television. Further, intuitive user interface interactions are provided to allow for the quick and efficient posting of social media from the Intelligent Television to a social media site.

20 Claims, 77 Drawing Sheets

Related U.S. Application Data application No. 61/700,182, filed on Sep. 12, 2012, provisional application No. 61/736,692, filed on Dec. 13, 2012, provisional application No. 61/798,821, filed on Mar. 15, 2013, provisional application No. 61/804,942, filed on Mar. 25, 2013, provisional application No. 61/804,998, filed on Mar. 25, 2013, provisional application No. 61/804,971, filed on Mar. 25, 2013, provisional application No. 61/804,990, filed on Mar. 25, 2013, provisional application No. 61/805,003, filed on Mar. 25, 2013, provisional application No. 61/805,053, filed on Mar. 25, 2013, provisional application No. 61/805,030, filed on Mar. 25, 2013, provisional application No. 61/805,027, filed on Mar. 25, 2013, provisional application No. 61/805,042, filed on Mar. 25, 2013, provisional application No. 61/805,038, filed on Mar. 25, 2013.

(51) Int. Cl.

| | |
|---|---|
| *H04N 21/422* | (2011.01) |
| *H04N 21/462* | (2011.01) |
| *H04N 17/04* | (2006.01) |
| *H04N 5/44* | (2011.01) |
| *H04N 21/482* | (2011.01) |
| *H04N 5/50* | (2006.01) |
| *H04N 21/43* | (2011.01) |
| *H04N 21/262* | (2011.01) |
| *H04N 21/437* | (2011.01) |
| *H04N 21/81* | (2011.01) |
| *H04N 21/442* | (2011.01) |
| *H04N 21/485* | (2011.01) |
| *H04N 21/472* | (2011.01) |
| *H04N 21/4788* | (2011.01) |
| *H04N 21/475* | (2011.01) |
| *H04N 21/84* | (2011.01) |
| *H04N 21/478* | (2011.01) |
| *H04N 21/8358* | (2011.01) |
| *H04N 5/445* | (2011.01) |
| *G06F 3/0481* | (2013.01) |
| *H04N 21/488* | (2011.01) |
| *H04N 21/61* | (2011.01) |
| *H04N 21/439* | (2011.01) |
| *H04N 21/435* | (2011.01) |
| *H04N 21/432* | (2011.01) |
| *H04N 21/47* | (2011.01) |
| *H04L 12/58* | (2006.01) |
| *H04N 21/258* | (2011.01) |
| *H04N 21/45* | (2011.01) |
| *G06F 3/01* | (2006.01) |
| *G06F 3/0488* | (2013.01) |
| *H04N 5/45* | (2011.01) |
| *H04N 21/4782* | (2011.01) |
| *H04N 21/2543* | (2011.01) |
| *H04N 21/441* | (2011.01) |
| *H04N 21/2187* | (2011.01) |
| *H04N 21/4415* | (2011.01) |
| *H04N 21/658* | (2011.01) |
| *H04N 21/235* | (2011.01) |
| *H04N 21/426* | (2011.01) |
| *H04N 21/433* | (2011.01) |

(52) U.S. Cl.
CPC .. *H04N21/25808* (2013.01); *H04N 21/25891* (2013.01); *H04N 21/26291* (2013.01); *H04N 21/4221* (2013.01); *H04N 21/42204* (2013.01); *H04N 21/42207* (2013.01); *H04N 21/42222* (2013.01); *H04N 21/42225* (2013.01); *H04N 21/42684* (2013.01); *H04N 21/432* (2013.01); *H04N 21/433* (2013.01); *H04N 21/435* (2013.01); *H04N 21/437* (2013.01); *H04N 21/4307* (2013.01); *H04N 21/4312* (2013.01); *H04N 21/4396* (2013.01); *H04N 21/441* (2013.01); *H04N 21/442* (2013.01); *H04N 21/4415* (2013.01); *H04N 21/44204* (2013.01); *H04N 21/44213* (2013.01); *H04N 21/44222* (2013.01); *H04N 21/4532* (2013.01); *H04N 21/462* (2013.01); *H04N 21/4622* (2013.01); *H04N 21/47* (2013.01); *H04N 21/472* (2013.01); *H04N 21/475* (2013.01); *H04N 21/478* (2013.01); *H04N 21/4753* (2013.01); *H04N 21/4755* (2013.01); *H04N 21/4756* (2013.01); *H04N 21/4782* (2013.01); *H04N 21/4788* (2013.01); *H04N 21/47202* (2013.01); *H04N 21/482* (2013.01); *H04N 21/485* (2013.01); *H04N 21/488* (2013.01); *H04N 21/4821* (2013.01); *H04N 21/4823* (2013.01); *H04N 21/4826* (2013.01); *H04N 21/4828* (2013.01); *H04N 21/4858* (2013.01); *H04N 21/4882* (2013.01); *H04N 21/6125* (2013.01); *H04N 21/6175* (2013.01); *H04N 21/6582* (2013.01); *H04N 21/8126* (2013.01); *H04N 21/8133* (2013.01); *H04N 21/8166* (2013.01); *H04N 21/8173* (2013.01); *H04N 21/8358* (2013.01); *H04N 21/84* (2013.01); *G06F 2203/04804* (2013.01); *H04N 21/42219* (2013.01); *H04N 21/4332* (2013.01); *H04N 2005/4407* (2013.01); *H04N 2005/4414* (2013.01); *H04N 2005/4432* (2013.01)

(56) References Cited

U.S. PATENT DOCUMENTS

| | | |
|---|---|---|
| 5,701,183 A | 12/1997 | Bellemare et al. |
| 5,734,444 A | 3/1998 | Yoshinobo |
| 5,801,747 A | 9/1998 | Bedard |
| 5,867,227 A | 2/1999 | Yamaguchi |
| 5,933,141 A | 8/1999 | Smith |
| 5,964,839 A | 10/1999 | Johnson et al. |
| 6,008,803 A | 12/1999 | Rowe et al. |
| 6,047,319 A | 4/2000 | Olson |
| 6,111,614 A | 8/2000 | Mugura et al. |
| 6,177,931 B1 | 1/2001 | Alexander et al. |
| 6,239,794 B1 | 5/2001 | Yuen et al. |
| 6,285,804 B1 | 9/2001 | Crinon et al. |
| 6,493,038 B1 | 12/2002 | Singh et al. |
| 6,493,876 B1 | 12/2002 | DeFreese et al. |
| 6,515,968 B1 | 2/2003 | Combar et al. |
| 6,563,515 B1 | 5/2003 | Reynolds et al. |
| 6,564,378 B1 | 5/2003 | Satterfield et al. |
| 6,629,077 B1 | 9/2003 | Arling et al. |
| 6,661,468 B2 | 12/2003 | Alten et al. |
| 6,704,062 B1 | 3/2004 | Ahida |
| 6,766,526 B1 | 7/2004 | Ellis |
| 6,971,118 B1 | 11/2005 | Akhavan et al. |
| 7,058,600 B1 | 6/2006 | Combar et al. |
| 7,174,126 B2 | 2/2007 | McElhatten et al. |
| 7,228,556 B2 | 6/2007 | Beach et al. |
| 7,232,073 B1 | 6/2007 | de Jong |
| 7,233,316 B2 | 6/2007 | Smith et al. |
| 7,266,726 B1 | 9/2007 | Ladd et al. |
| 7,363,591 B2 | 4/2008 | Goldthwaite et al. |
| 7,487,529 B1 | 2/2009 | Orlick |
| 7,493,641 B2 | 2/2009 | Klosterman et al. |
| 7,506,350 B2 | 3/2009 | Johnson |
| 7,543,320 B2 | 6/2009 | Schein et al. |
| 7,577,923 B2 | 8/2009 | Beam et al. |
| 7,623,933 B2 | 11/2009 | Sarosi et al. |

(56) References Cited

U.S. PATENT DOCUMENTS

| | | | |
|---|---|---|---|
| 7,685,520 B2 | 3/2010 | Rashkovskiy et al. |
| 7,698,606 B2 | 4/2010 | Ladd et al. |
| 7,805,634 B2 | 9/2010 | Balazich et al. |
| 7,822,716 B2 | 10/2010 | Lee et al. |
| 7,880,077 B2 | 2/2011 | Pauws et al. |
| 7,900,228 B2 | 3/2011 | Stark et al. |
| 7,904,924 B1 | 3/2011 | De Heer et al. |
| 7,908,635 B2 | 3/2011 | Barton et al. |
| 8,006,201 B2 | 8/2011 | Bhattacharya |
| 8,065,390 B2 | 11/2011 | Cheng |
| 8,089,455 B1 | 1/2012 | Wieder |
| 8,127,329 B1 | 2/2012 | Kunkel et al. |
| 8,151,215 B2 | 4/2012 | Baurmann et al. |
| 8,166,511 B2 | 4/2012 | Griggs |
| 8,201,104 B2 | 6/2012 | Yamamoto et al. |
| 8,220,021 B1 | 7/2012 | Look et al. |
| 8,281,339 B1 | 10/2012 | Walker et al. |
| 8,352,983 B1 | 1/2013 | Chane et al. |
| 8,473,976 B2 | 6/2013 | Udani |
| 8,510,780 B2 | 8/2013 | Stallings et al. |
| 8,516,519 B2 | 8/2013 | Lee |
| 8,549,561 B2 | 10/2013 | Yeh et al. |
| 8,566,874 B2 | 10/2013 | Roberts et al. |
| 8,589,981 B2 | 11/2013 | Lee et al. |
| 8,640,166 B1 | 1/2014 | Craner |
| 8,683,519 B2 | 3/2014 | McCarthy et al. |
| 8,756,620 B2 | 6/2014 | Papish et al. |
| 8,832,742 B2 | 9/2014 | Rasanen et al. |
| 8,875,056 B2 | 10/2014 | Onogi et al. |
| 2001/0001160 A1 | 5/2001 | Shoff et al. |
| 2001/0010097 A1 | 7/2001 | Lee |
| 2001/0056577 A1 | 12/2001 | Gordon et al. |
| 2002/0007485 A1 | 1/2002 | Rodriguez et al. |
| 2002/0026637 A1 | 2/2002 | Markel et al. |
| 2002/0042914 A1 | 4/2002 | Walker et al. |
| 2002/0049970 A1 | 4/2002 | Park |
| 2002/0052237 A1* | 5/2002 | Magill ............ 463/38 |
| 2002/0052746 A1 | 5/2002 | Handelman |
| 2002/0056098 A1 | 5/2002 | White |
| 2002/0067376 A1 | 6/2002 | Martin et al. |
| 2002/0152267 A1 | 10/2002 | Lennon |
| 2002/0188944 A1 | 12/2002 | Noble |
| 2002/0188958 A1 | 12/2002 | Miller |
| 2003/0003876 A1 | 1/2003 | Rumsey |
| 2003/0014752 A1 | 1/2003 | Zaslavsky et al. |
| 2003/0070171 A1 | 4/2003 | Jeon et al. |
| 2003/0084449 A1 | 5/2003 | Chane et al. |
| 2003/0110234 A1 | 6/2003 | Egli et al. |
| 2003/0118323 A1 | 6/2003 | Ismail et al. |
| 2003/0149988 A1 | 8/2003 | Ellis et al. |
| 2003/0151621 A1 | 8/2003 | McEvilly et al. |
| 2003/0177498 A1 | 9/2003 | Ellis et al. |
| 2003/0182658 A1 | 9/2003 | Alexander |
| 2003/0182659 A1 | 9/2003 | Ellis et al. |
| 2003/0208763 A1 | 11/2003 | McElhatten et al. |
| 2003/0221192 A1 | 11/2003 | Rappaport et al. |
| 2003/0225777 A1 | 12/2003 | Marsh |
| 2003/0226146 A1 | 12/2003 | Thurston et al. |
| 2004/0078807 A1 | 4/2004 | Fries et al. |
| 2004/0093616 A1 | 5/2004 | Johnson |
| 2004/0103120 A1 | 5/2004 | Fickle et al. |
| 2004/0117831 A1 | 6/2004 | Ellis et al. |
| 2004/0119815 A1 | 6/2004 | Soloff |
| 2004/0148362 A1 | 7/2004 | Friedman |
| 2004/0154040 A1 | 8/2004 | Ellis |
| 2004/0158193 A1 | 8/2004 | Bui |
| 2004/0211282 A1 | 10/2004 | Kim |
| 2004/0216156 A1 | 10/2004 | Wagner |
| 2004/0233238 A1* | 11/2004 | Lahdesmaki ............ 345/810 |
| 2004/0237108 A1 | 11/2004 | Drazin et al. |
| 2005/0015804 A1 | 1/2005 | LaJoie et al. |
| 2005/0022237 A1 | 1/2005 | Nomura |
| 2005/0091596 A1 | 4/2005 | Anthony et al. |
| 2005/0097606 A1 | 5/2005 | Scott, III et al. |
| 2005/0097622 A1 | 5/2005 | Zigmond et al. |
| 2005/0120306 A1 | 6/2005 | Klassen et al. |
| 2005/0149964 A1 | 7/2005 | Thomas et al. |
| 2005/0160452 A1 | 7/2005 | Lawler et al. |
| 2005/0165918 A1 | 7/2005 | Wantanabe et al. |
| 2005/0188318 A1 | 8/2005 | Tamir et al. |
| 2005/0188402 A1 | 8/2005 | de Andrade et al. |
| 2005/0204382 A1 | 9/2005 | Ellis et al. |
| 2005/0204387 A1 | 9/2005 | Knudson et al. |
| 2005/0229210 A1 | 10/2005 | Akhavan |
| 2005/0232210 A1 | 10/2005 | Karaoguz et al. |
| 2005/0273819 A1 | 12/2005 | Knudson et al. |
| 2005/0289603 A1 | 12/2005 | Cezeaux et al. |
| 2006/0031875 A1 | 2/2006 | Yu |
| 2006/0064716 A1 | 3/2006 | Sull et al. |
| 2006/0090183 A1 | 4/2006 | Zito et al. |
| 2006/0101504 A1 | 5/2006 | Aravamudan et al. |
| 2006/0117337 A1 | 6/2006 | Shivaji Rao et al. |
| 2006/0117343 A1 | 6/2006 | Novak et al. |
| 2006/0123445 A1 | 6/2006 | Sullivan et al. |
| 2006/0143674 A1 | 6/2006 | Jones et al. |
| 2006/0158838 A1 | 7/2006 | Kinoshita et al. |
| 2006/0184972 A1 | 8/2006 | Rafey et al. |
| 2006/0248557 A1 | 11/2006 | Stark et al. |
| 2006/0262116 A1 | 11/2006 | Moshiri et al. |
| 2006/0280449 A1 | 12/2006 | Ogawa et al. |
| 2007/0011702 A1 | 1/2007 | Vaysman |
| 2007/0028282 A1 | 2/2007 | Kooijmans et al. |
| 2007/0050733 A1 | 3/2007 | Lee et al. |
| 2007/0061724 A1 | 3/2007 | Slothouber et al. |
| 2007/0066283 A1 | 3/2007 | Haar et al. |
| 2007/0096939 A1 | 5/2007 | Walrath |
| 2007/0143809 A1 | 6/2007 | Chen et al. |
| 2007/0154163 A1 | 7/2007 | Cordray |
| 2007/0162936 A1 | 7/2007 | Stallings et al. |
| 2007/0192715 A1 | 8/2007 | Kataria et al. |
| 2007/0199022 A1 | 8/2007 | Moshiri et al. |
| 2007/0250762 A1 | 10/2007 | Mansfield |
| 2007/0250864 A1 | 10/2007 | Diaz Perez |
| 2007/0261090 A1 | 11/2007 | Miller et al. |
| 2008/0022309 A1 | 1/2008 | Begeja et al. |
| 2008/0086745 A1 | 4/2008 | Knudson et al. |
| 2008/0092198 A1 | 4/2008 | Hutten |
| 2008/0098433 A1 | 4/2008 | Hardacker et al. |
| 2008/0114794 A1 | 5/2008 | Craner |
| 2008/0114861 A1 | 5/2008 | Gildred |
| 2008/0120635 A1 | 5/2008 | Trimper et al. |
| 2008/0133525 A1 | 6/2008 | Ott |
| 2008/0141307 A1 | 6/2008 | Whitehead |
| 2008/0155613 A1 | 6/2008 | Benya et al. |
| 2008/0163307 A1 | 7/2008 | Coburn et al. |
| 2008/0177828 A1 | 7/2008 | Accarie et al. |
| 2008/0235595 A1 | 9/2008 | Krantz et al. |
| 2008/0244637 A1 | 10/2008 | Candelore |
| 2008/0250455 A1 | 10/2008 | Fukuda et al. |
| 2008/0271080 A1 | 10/2008 | Gossweiler et al. |
| 2008/0276279 A1 | 11/2008 | Gossweiler et al. |
| 2008/0282294 A1 | 11/2008 | Carpenter et al. |
| 2008/0288461 A1 | 11/2008 | Glennon et al. |
| 2008/0307457 A1 | 12/2008 | Yang et al. |
| 2008/0313677 A1 | 12/2008 | Lee |
| 2009/0013350 A1 | 1/2009 | Ohlfs et al. |
| 2009/0019485 A1 | 1/2009 | Ellis et al. |
| 2009/0064222 A1 | 3/2009 | Dawson et al. |
| 2009/0102966 A1 | 4/2009 | Jiang et al. |
| 2009/0106793 A1 | 4/2009 | Tecot et al. |
| 2009/0125940 A1 | 5/2009 | Kim et al. |
| 2009/0129340 A1 | 5/2009 | Handa |
| 2009/0150379 A1 | 6/2009 | Park et al. |
| 2009/0158326 A1 | 6/2009 | Hunt et al. |
| 2009/0158375 A1 | 6/2009 | Rodriguez et al. |
| 2009/0160764 A1 | 6/2009 | Myllymäki |
| 2009/0165045 A1 | 6/2009 | Stallings et al. |
| 2009/0177981 A1 | 7/2009 | Christie et al. |
| 2009/0179989 A1 | 7/2009 | Bessone et al. |
| 2009/0199237 A1 | 8/2009 | White et al. |
| 2009/0199241 A1 | 8/2009 | Unger et al. |
| 2009/0199242 A1 | 8/2009 | Johnson et al. |
| 2009/0204929 A1 | 8/2009 | Baurmann et al. |
| 2009/0210910 A1 | 8/2009 | Smith et al. |

(56) References Cited

U.S. PATENT DOCUMENTS

| | | |
|---|---|---|
| 2009/0213079 A1 | 8/2009 | Segal et al. |
| 2009/0228919 A1 | 9/2009 | Zott et al. |
| 2009/0235311 A1 | 9/2009 | Michel et al. |
| 2009/0241048 A1 | 9/2009 | Augustine et al. |
| 2009/0249394 A1 | 10/2009 | Schwesinger et al. |
| 2009/0271823 A1 | 10/2009 | Jung et al. |
| 2009/0293078 A1 | 11/2009 | Pirani et al. |
| 2009/0293079 A1 | 11/2009 | McKee et al. |
| 2009/0300674 A1 | 12/2009 | Ratsch et al. |
| 2009/0313232 A1 | 12/2009 | Tinsley et al. |
| 2010/0013997 A1 | 1/2010 | Hwang |
| 2010/0031193 A1 | 2/2010 | Stark et al. |
| 2010/0050219 A1 | 2/2010 | Angiolillo et al. |
| 2010/0058231 A1 | 3/2010 | Duarte et al. |
| 2010/0060799 A1 | 3/2010 | Ishii |
| 2010/0071019 A1 | 3/2010 | Blanchard et al. |
| 2010/0086277 A1 | 4/2010 | Craner |
| 2010/0095317 A1 | 4/2010 | Toebes et al. |
| 2010/0100512 A1 | 4/2010 | Brodin et al. |
| 2010/0107112 A1 | 4/2010 | Jennings et al. |
| 2010/0122284 A1 | 5/2010 | Yoon et al. |
| 2010/0128183 A1 | 5/2010 | Ishii |
| 2010/0161506 A1 | 6/2010 | Bosenick et al. |
| 2010/0172407 A1 | 7/2010 | Ramaswamy |
| 2010/0177252 A1 | 7/2010 | Larsen et al. |
| 2010/0180292 A1 | 7/2010 | Epstein et al. |
| 2010/0180300 A1 | 7/2010 | Carpenter et al. |
| 2010/0191727 A1 | 7/2010 | Malik |
| 2010/0201890 A1 | 8/2010 | Degonde et al. |
| 2010/0225830 A1 | 9/2010 | Blanchard et al. |
| 2010/0235740 A1 | 9/2010 | Friedlander et al. |
| 2010/0241962 A1 | 9/2010 | Peterson et al. |
| 2010/0293497 A1 | 11/2010 | Peterson |
| 2010/0302444 A1 | 12/2010 | Ahn et al. |
| 2010/0306402 A1 | 12/2010 | Russell et al. |
| 2010/0306800 A1 | 12/2010 | Jung et al. |
| 2010/0319036 A1 | 12/2010 | Lim et al. |
| 2010/0321405 A1 | 12/2010 | MacInnes et al. |
| 2011/0016492 A1 | 1/2011 | Morita |
| 2011/0022450 A1 | 1/2011 | Meredith |
| 2011/0023608 A1 | 2/2011 | Rueger |
| 2011/0035774 A1 | 2/2011 | Parker |
| 2011/0041150 A1 | 2/2011 | Schein et al. |
| 2011/0043696 A1 | 2/2011 | Onogi et al. |
| 2011/0047572 A1 | 2/2011 | Hill et al. |
| 2011/0055873 A1 | 3/2011 | Heo et al. |
| 2011/0060661 A1 | 3/2011 | Chai et al. |
| 2011/0067066 A1 | 3/2011 | Barton et al. |
| 2011/0072480 A1 | 3/2011 | Stone |
| 2011/0074591 A1 | 3/2011 | Arling et al. |
| 2011/0078745 A1 | 3/2011 | Macrae et al. |
| 2011/0093888 A1 | 4/2011 | Araki et al. |
| 2011/0107376 A1 | 5/2011 | Lee et al. |
| 2011/0119626 A1 | 5/2011 | Faenger et al. |
| 2011/0119702 A1 | 5/2011 | Jang et al. |
| 2011/0119707 A1 | 5/2011 | Bae et al. |
| 2011/0125755 A1 | 5/2011 | Kaila et al. |
| 2011/0126251 A1 | 5/2011 | LaFreniere et al. |
| 2011/0131506 A1 | 6/2011 | Callisendorff |
| 2011/0145860 A1 | 6/2011 | Wei |
| 2011/0145881 A1 | 6/2011 | Hartman et al. |
| 2011/0154198 A1 | 6/2011 | Bachman et al. |
| 2011/0154405 A1 | 6/2011 | Isaias |
| 2011/0161996 A1 | 6/2011 | Hamano et al. |
| 2011/0167452 A1 | 7/2011 | Baumgartner et al. |
| 2011/0173657 A1 | 7/2011 | Thomas et al. |
| 2011/0179453 A1 | 7/2011 | Poniatowski |
| 2011/0179454 A1 | 7/2011 | Yates |
| 2011/0187929 A1 | 8/2011 | Suzuki et al. |
| 2011/0213670 A1 | 9/2011 | Strutton et al. |
| 2011/0213700 A1 | 9/2011 | Sant'Anselmo |
| 2011/0219395 A1 | 9/2011 | Moshiri et al. |
| 2011/0246495 A1 | 10/2011 | Mallinson |
| 2011/0252446 A1 | 10/2011 | Jeong et al. |
| 2011/0273552 A1 | 11/2011 | Wang et al. |
| 2011/0273625 A1 | 11/2011 | McMahon et al. |
| 2011/0276995 A1 | 11/2011 | Alten et al. |
| 2011/0283304 A1 | 11/2011 | Roberts et al. |
| 2011/0283318 A1 | 11/2011 | Seidel et al. |
| 2011/0289067 A1 | 11/2011 | Jordan et al. |
| 2011/0289419 A1 | 11/2011 | Yu et al. |
| 2011/0289452 A1 | 11/2011 | Jordan et al. |
| 2011/0321095 A1 | 12/2011 | Yao et al. |
| 2011/0321098 A1 | 12/2011 | Bangalore et al. |
| 2012/0002951 A1 | 1/2012 | Reisman |
| 2012/0011545 A1 | 1/2012 | Doets et al. |
| 2012/0026400 A1 | 2/2012 | Kang et al. |
| 2012/0030317 A1 | 2/2012 | Smyth et al. |
| 2012/0033950 A1 | 2/2012 | Cordray et al. |
| 2012/0042334 A1 | 2/2012 | Choi et al. |
| 2012/0054803 A1 | 3/2012 | Lee et al. |
| 2012/0060094 A1 | 3/2012 | Irwin et al. |
| 2012/0060187 A1 | 3/2012 | Moon et al. |
| 2012/0069131 A1 | 3/2012 | Abelow |
| 2012/0072952 A1 | 3/2012 | Vaysman et al. |
| 2012/0076473 A1 | 3/2012 | Kunkel et al. |
| 2012/0079096 A1 | 3/2012 | Cowan et al. |
| 2012/0079427 A1 | 3/2012 | Carmichael et al. |
| 2012/0086857 A1 | 4/2012 | Kim et al. |
| 2012/0090004 A1 | 4/2012 | Jeong |
| 2012/0096264 A1 | 4/2012 | Traversat et al. |
| 2012/0099024 A1 | 4/2012 | Ryu et al. |
| 2012/0110623 A1 | 5/2012 | Hill et al. |
| 2012/0120316 A1 | 5/2012 | Lee |
| 2012/0133840 A1 | 5/2012 | Shirasuka et al. |
| 2012/0143972 A1 | 6/2012 | Malik et al. |
| 2012/0144416 A1 | 6/2012 | Wetzer et al. |
| 2012/0144422 A1 | 6/2012 | Han et al. |
| 2012/0144423 A1 | 6/2012 | Kim et al. |
| 2012/0147049 A1 | 6/2012 | Lee |
| 2012/0147270 A1 | 6/2012 | Kim et al. |
| 2012/0147825 A1 | 6/2012 | Hassan et al. |
| 2012/0151006 A1 | 6/2012 | McInerney et al. |
| 2012/0154449 A1 | 6/2012 | Ramagem et al. |
| 2012/0167154 A1 | 6/2012 | Kim et al. |
| 2012/0173979 A1 | 7/2012 | Lee |
| 2012/0174039 A1* | 7/2012 | Rhoads et al. ............. 715/854 |
| 2012/0174157 A1 | 7/2012 | Stinson, III et al. |
| 2012/0176546 A1 | 7/2012 | Yoon |
| 2012/0194742 A1 | 8/2012 | Barnes et al. |
| 2012/0198490 A1 | 8/2012 | Mertens |
| 2012/0200574 A1 | 8/2012 | Hill et al. |
| 2012/0206652 A1 | 8/2012 | Yi |
| 2012/0210275 A1 | 8/2012 | Park et al. |
| 2012/0210355 A1 | 8/2012 | Kim et al. |
| 2012/0210367 A1 | 8/2012 | Lee et al. |
| 2012/0210370 A1 | 8/2012 | Kim et al. |
| 2012/0210375 A1 | 8/2012 | Wong et al. |
| 2012/0210386 A1 | 8/2012 | Kim et al. |
| 2012/0218203 A1 | 8/2012 | Kanki |
| 2012/0221972 A1 | 8/2012 | Dougall et al. |
| 2012/0229320 A1 | 9/2012 | Yu |
| 2012/0229473 A1 | 9/2012 | Tam |
| 2012/0257108 A1 | 10/2012 | Friedlander et al. |
| 2012/0260284 A1 | 10/2012 | Friedlander et al. |
| 2012/0272271 A1 | 10/2012 | Nishizawa et al. |
| 2012/0278725 A1 | 11/2012 | Gordon et al. |
| 2012/0284751 A1 | 11/2012 | Kim et al. |
| 2012/0284752 A1 | 11/2012 | Jung |
| 2012/0291068 A1 | 11/2012 | Khushoo et al. |
| 2012/0297422 A1 | 11/2012 | Mountain |
| 2012/0331505 A1 | 12/2012 | Chun et al. |
| 2013/0014006 A1 | 1/2013 | Abellera et al. |
| 2013/0027613 A1 | 1/2013 | Kim et al. |
| 2013/0034023 A1 | 2/2013 | Jung |
| 2013/0047174 A1 | 2/2013 | Lee et al. |
| 2013/0051615 A1 | 2/2013 | Lim et al. |
| 2013/0091053 A1 | 4/2013 | Park et al. |
| 2013/0097640 A1 | 4/2013 | Lemmons et al. |
| 2013/0148023 A1 | 6/2013 | Sullivan et al. |
| 2013/0152135 A1 | 6/2013 | Hong et al. |
| 2013/0160065 A1 | 6/2013 | Aso et al. |
| 2013/0191869 A1* | 7/2013 | Sugiyama et al. ............. 725/42 |
| 2013/0238777 A1 | 9/2013 | Raleigh |

(56) References Cited

U.S. PATENT DOCUMENTS

| | | |
|---|---|---|
| 2013/0238796 A1 | 9/2013 | Lentzitzky |
| 2013/0263021 A1 | 10/2013 | Dunn et al. |
| 2013/0263053 A1 | 10/2013 | Tritschler et al. |
| 2013/0275519 A1 | 10/2013 | Nichols |
| 2013/0276031 A1 | 10/2013 | Oh et al. |
| 2013/0282839 A1 | 10/2013 | Alcala |
| 2013/0291015 A1 | 10/2013 | Pan |
| 2013/0297697 A1 | 11/2013 | Haimovitch et al. |
| 2013/0298164 A1 | 11/2013 | Moreau et al. |
| 2013/0318553 A1 | 11/2013 | Yegorov et al. |
| 2013/0326557 A1 | 12/2013 | Kang et al. |
| 2013/0332856 A1 | 12/2013 | Sanders et al. |
| 2014/0040344 A1 | 2/2014 | Gehring et al. |
| 2014/0040819 A1 | 2/2014 | Duffy |
| 2014/0049651 A1 | 2/2014 | Voth |
| 2014/0049691 A1 | 2/2014 | Burdzinski et al. |
| 2014/0049692 A1 | 2/2014 | Sirpal et al. |
| 2014/0049693 A1 | 2/2014 | Selim et al. |
| 2014/0052786 A1 | 2/2014 | de Paz |
| 2014/0053176 A1 | 2/2014 | Milano et al. |
| 2014/0053177 A1 | 2/2014 | Voth |
| 2014/0053178 A1 | 2/2014 | Voth et al. |
| 2014/0053179 A1 | 2/2014 | Voth |
| 2014/0053180 A1 | 2/2014 | Shoykher |
| 2014/0053190 A1 | 2/2014 | Sirpal |
| 2014/0053191 A1 | 2/2014 | Selim |
| 2014/0053192 A1 | 2/2014 | Sirpal |
| 2014/0053193 A1 | 2/2014 | Selim et al. |
| 2014/0053194 A1 | 2/2014 | Shoykher et al. |
| 2014/0053195 A1 | 2/2014 | Sirpal et al. |
| 2014/0053196 A1 | 2/2014 | Selim |
| 2014/0053197 A1 | 2/2014 | Shoykher et al. |
| 2014/0053198 A1 | 2/2014 | Sirpal et al. |
| 2014/0053200 A1 | 2/2014 | de Paz et al. |
| 2014/0053202 A1 | 2/2014 | Selim |
| 2014/0053203 A1 | 2/2014 | Csiki |
| 2014/0053204 A1 | 2/2014 | Milano |
| 2014/0053205 A1 | 2/2014 | Sirpal et al. |
| 2014/0053206 A1 | 2/2014 | Shoykher et al. |
| 2014/0053207 A1 | 2/2014 | Shoykher et al. |
| 2014/0053208 A1 | 2/2014 | Sirpal et al. |
| 2014/0053211 A1 | 2/2014 | Milano |
| 2014/0053212 A1 | 2/2014 | Shoykher et al. |
| 2014/0053221 A1 | 2/2014 | Sirpal et al. |
| 2014/0053222 A1 | 2/2014 | Shoykher et al. |
| 2014/0053225 A1 | 2/2014 | Shoykher et al. |
| 2014/0055673 A1 | 2/2014 | Sirpal et al. |
| 2014/0059480 A1 | 2/2014 | de Paz et al. |
| 2014/0059578 A1 | 2/2014 | Voth et al. |
| 2014/0059589 A1 | 2/2014 | Sirpal |
| 2014/0059596 A1 | 2/2014 | Dourado |
| 2014/0059598 A1 | 2/2014 | Milano |
| 2014/0059599 A1 | 2/2014 | Sirpal et al. |
| 2014/0059600 A1 | 2/2014 | Dourado |
| 2014/0059601 A1 | 2/2014 | Sirpal |
| 2014/0059602 A1 | 2/2014 | Sirpal |
| 2014/0059603 A1 | 2/2014 | Lee et al. |
| 2014/0059605 A1 | 2/2014 | Sirpal et al. |
| 2014/0059606 A1 | 2/2014 | Selim et al. |
| 2014/0059609 A1 | 2/2014 | Dourado |
| 2014/0059610 A1 | 2/2014 | Sirpal et al. |
| 2014/0059612 A1 | 2/2014 | Selim |
| 2014/0059613 A1 | 2/2014 | Burdzinski et al. |
| 2014/0059614 A1 | 2/2014 | Shoykher et al. |
| 2014/0059615 A1 | 2/2014 | Sirpal et al. |
| 2014/0059625 A1 | 2/2014 | Dourado et al. |
| 2014/0059626 A1 | 2/2014 | Selim |
| 2014/0059635 A1 | 2/2014 | Sirpal et al. |
| 2014/0059637 A1 | 2/2014 | Chen et al. |
| 2014/0067954 A1 | 3/2014 | Sirpal |
| 2014/0068673 A1 | 3/2014 | Sirpal et al. |
| 2014/0068674 A1 | 3/2014 | Sirpal et al. |
| 2014/0068679 A1 | 3/2014 | Kaneko et al. |
| 2014/0068682 A1 | 3/2014 | Selim et al. |
| 2014/0068683 A1 | 3/2014 | Selim et al. |
| 2014/0068685 A1 | 3/2014 | Selim et al. |
| 2014/0068689 A1 | 3/2014 | Sirpal et al. |
| 2014/0075475 A1 | 3/2014 | Sirpal et al. |
| 2014/0075476 A1 | 3/2014 | de Paz et al. |
| 2014/0075477 A1 | 3/2014 | de Paz et al. |
| 2014/0075479 A1 | 3/2014 | Soto et al. |
| 2014/0075483 A1 | 3/2014 | de Paz et al. |
| 2014/0075484 A1 | 3/2014 | Selim et al. |
| 2014/0075487 A1 | 3/2014 | Selim et al. |
| 2014/0082659 A1 | 3/2014 | Fife et al. |
| 2014/0109143 A1 | 4/2014 | Craner |
| 2014/0173660 A1 | 6/2014 | Correa et al. |
| 2014/0181851 A1 | 6/2014 | Givon et al. |
| 2014/0181853 A1 | 6/2014 | Dureau et al. |
| 2014/0188970 A1 | 7/2014 | Madhok et al. |
| 2014/0223464 A1 | 8/2014 | Moran et al. |
| 2014/0259074 A1 | 9/2014 | Ansari et al. |
| 2014/0380414 A1 | 12/2014 | Saidi et al. |

FOREIGN PATENT DOCUMENTS

| | | |
|---|---|---|
| CN | 101540850 | 9/2009 |
| CN | 101567992 | 10/2009 |
| CN | 201937743 | 8/2011 |
| EP | 1031929 | 8/2000 |
| EP | 1067458 | 1/2001 |
| EP | 1770956 | 4/2007 |
| EP | 1865723 | 12/2007 |
| EP | 2328346 | 6/2011 |
| EP | 2348724 | 7/2011 |
| EP | 2439935 | 4/2012 |
| EP | 2487922 | 8/2012 |
| WO | WO 99/21308 | 4/1999 |
| WO | WO 99/35849 | 7/1999 |
| WO | WO 00/05884 | 2/2000 |
| WO | WO 01/06784 | 1/2001 |
| WO | WO 01/06788 | 1/2001 |
| WO | WO 02/080552 | 10/2002 |
| WO | WO 03/044755 | 5/2003 |
| WO | WO 2007/137611 | 12/2007 |
| WO | WO 2011/148054 | 12/2011 |
| WO | WO 2011/163481 | 12/2011 |
| WO | WO 2012/030024 | 3/2012 |
| WO | WO 2012/068438 | 5/2012 |
| WO | WO 2012/073027 | 6/2012 |
| WO | WO 2012/094247 | 7/2012 |
| WO | WO 2012/103121 | 8/2012 |
| WO | WO 2014/026636 | 2/2014 |
| WO | WO 2014/026640 | 2/2014 |
| WO | WO 2014/028067 | 2/2014 |
| WO | WO 2014/028068 | 2/2014 |
| WO | WO 2014/028069 | 2/2014 |
| WO | WO 2014/028071 | 2/2014 |
| WO | WO 2014/028074 | 2/2014 |

OTHER PUBLICATIONS

Official Action for U.S. Appl. No. 13/969,869, mailed Sep. 16, 2014 20 pages.
Official Action for U.S. Appl. No. 13/969,880, mailed Sep. 11, 2014 10 pages.
Official Action for U.S. Appl. No. 13/969,884, mailed Oct. 23, 2014 20 pages.
Official Action for U.S. Appl. No. 13/969,887, mailed Oct. 23, 2014 16 pages.
Official Action for U.S. Appl. No. 13/969,482, mailed Oct. 21, 2014 22 pages.
Official Action for U.S. Appl. No. 13/969,485, mailed Oct. 2, 2014 21 pages.
Official Action for U.S. Appl. No. 13/970,388, mailed Sep. 4, 2014 14 pages.
Official Action for U.S. Appl. No. 13/970,398, mailed Sep. 2, 2014 14 pages.
Official Action for U.S. Appl. No. 13/970,420, mailed Oct. 9, 2014 15 pages.
Official Action for U.S. Appl. No. 13/970,427, mailed Sep. 30, 2014 24 pages.

(56) References Cited

OTHER PUBLICATIONS

Official Action for U.S. Appl. No. 13/970,442, mailed Oct. 7, 2014 10 pages.
Official Action for U.S. Appl. No. 13/969,588, mailed Nov. 10, 2014 11 pages.
Official Action for U.S. Appl. No. 13/969,487, mailed Sep. 11, 2014 10 pages.
Official Action for U.S. Appl. No. 13/969,491, mailed Oct. 8, 2014 21 pages.
Official Action for U.S. Appl. No. 13/864,214, mailed Aug. 19, 2014 17 pages.
Official Action for U.S. Appl. No. 13/969,506, mailed Oct. 2, 2014 9 pages.
Official Action for U.S. Appl. No. 13/968,665, mailed Oct. 9, 2014 12 pages.
Official Action for U.S. Appl. No. 13/968,897, mailed Aug. 15, 2014 15 pages.
Official Action for U.S. Appl. No. 13/970,234, mailed Aug. 12, 2014 19 pages.
Official Action for U.S. Appl. No. 13/968,969, mailed Aug. 19, 2014 14 pages.
Official Action for U.S. Appl. No. 13/968,610, mailed Aug. 19, 2014 13 pages.
Official Action for U.S. Appl. No. 13/968,630, mailed Jul. 31, 2014 9 pages.
Official Action for U.S. Appl. No. 13/969,507, mailed Aug. 29, 2014 30 pages.
Official Action for U.S. Appl. No. 13/969,508, mailed Nov. 7, 2014 10 pages.
Official Action for U.S. Appl. No. 13/969,510, mailed Nov. 3, 2014 16 pages.
Official Action for U.S. Appl. No. 13/970,243, mailed Aug. 22, 2014 20 pages.
U.S. Appl. No. 13/970,420, filed Aug. 19, 2013, Selim et al.
Tvonicsuk "Tvonics: How to use the EPG search function." 1 pages retrieved from the internet on Nov. 11, 2013 from [www.youtube.com/watch?v=H8euZ0lydo].
International Search Report and Written Opinion for International (PCT) Patent Application No. PCT/US13/36844, mailed Jun. 28, 2013 8 pages.
International Search Report and Written Opinion for International (PCT) Patent Application No. PCT/US13/36843, mailed Jun. 28, 2013 8 pages.
International Search Report and Written Opinion for International (PCT) Patent Application No. PCT/US13/36826, mailed Jun. 17, 2013 8 pages.
International Search Report and Written Opinion for International (PCT) Patent Application No. PCT/US13/55589, mailed Dec. 19, 2013 9 pages.
International Search Report and Written Opinion for International (PCT) Patent Application No. PCT/US2013/055289, mailed Dec. 2, 2013 7 pages.
International Search Report and Written Opinion for International (PCT) Patent Application No. PCT/US2013/055288, mailed Dec. 2, 2013 9 pages.
International Search Report and Written Opinion for International (PCT) Patent Application No. PCT/US2013/055286, mailed Dec. 2, 2013 8 pages.
International Search Report and Written Opinion for International (PCT) Patent Application No. PCT/US13/55285, mailed Dec. 11, 2013 8 pages.
International Search Report and Written Opinion for International (PCT) Patent Application No. PCT/US2013/055284, mailed Jan. 14, 2014 12 pages.
International Search Report and Written Opinion for International (PCT) Patent Application No. PCT/US2013/055293, mailed Dec. 2, 2013 12 pages.
International Search Report and Written Opinion for International (PCT) Patent Application No. PCT/US2013/055294, mailed Dec. 2, 2013 10 pages.
International Search Report and Written Opinion for International (PCT) Patent Application No. PCT/US2013/055296, mailed Nov. 29, 2013 9 pages.
International Search Report and Written Opinion for International (PCT) Patent Application No. PCT/US13/55493, mailed Nov. 7, 2013 9 pages.
International Search Report and Written Opinion for International (PCT) Patent Application No. PCT/US2013/036828, mailed Jun. 28, 2013 12 pages.
International Search Report and Written Opinion for International (PCT) Patent Application No. PCT/US2013/055340, mailed Feb. 10, 2014 10 pages.
International Search Report and Written Opinion for International (PCT) Patent Application No. PCT/US13/55551, mailed Dec. 6, 2013 7 pages.
International Search Report and Written Opinion for International (PCT) Patent Application No. PCT/US2013/036819, mailed Jun. 17, 2013 9 pages.
International Search Report and Written Opinion for International (PCT) Patent Application No. PCT/US2013/036782, mailed Jun. 28, 2013 9 pages.
International Search Report and Written Opinion for International (PCT) Patent Application No. PCT/US13/36678, mailed Aug. 30, 2013 9 pages.
International Search Report and Written Opinion for International (PCT) Patent Application No. PCT/US2013/036804, mailed Jul. 1, 2013 13 pages.
International Search Report and Written Opinion for International (PCT) Patent Application No. PCT/US13/55405, mailed Jan. 17, 2014 8 pages.
International Search Report and Written Opinion for International (PCT) Patent Application No. PCT/US2013/055278, mailed Mar. 11, 2014 9 pages.
International Search Report and Written Opinion for International (PCT) Patent Application No. PCT/US13/55509, mailed Nov. 8, 2013 9 pages.
International Search Report and Written Opinion for Intenational (PCT) Patent Application No. PCT/CN2013/081639, mailed Nov. 28, 2013 10 pages.
International Search Report and Written Opinion for International (PCT) Patent Application No. PCT/US2013/055303, mailed Dec. 5, 2013 8 pages.
International Search Report and Written Opinion for International (PCT) Patent Application No. PCT/US2013/055280, mailed Jan. 10, 2014 10 pages.
International Search Report and Written Opinion for International (PCT) Patent Application No. PCT/US13/55383, mailed Nov. 13, 2013 9 pages.
International Search Report and Written Opinion for International (PCT) Patent Application No. PCT/US2013/055344, mailed Mar. 11, 2014 8 pages.
International Search Report and Written Opinion for International (PCT) Patent Application No. PCT/US2013/055345, mailed Dec. 6, 2013 7 pages.
International Search Report and Written Opinion for International (PCT) Patent Application No. PCT/US13/55371, mailed No. 08, 2013 7 pages.
International Search Report and Written Opinion for International (PCT) Patent Application No. PCT/US13/55389, mailed Mar. 10, 2014 10 pages.
International Search Report and Written Opinion for International (PCT) Patent Application No. PCT/US2013/055283, mailed Mar. 4, 2014 7 pages.
International Search Report and Written Opinion for International (PCT) Patent Application No. PCT/US13/55564, mailed Nov. 22, 2013 7 pages.
International Search Report and Written Opinion for International (PCT) Patent Application No. PCT/US13/55379, mailed Dec. 6, 2013 8 pages.
International Search Report and Written Opinion for International (PCT) Patent Application No. PCT/US2013/055349, mailed Nov. 29, 2013 7 pages.

(56) References Cited

OTHER PUBLICATIONS

International Search Report and Written Opinion for International (PCT) Patent Application No. PCT/US2013/055312, mailed Dec. 5, 2013 8 pages.
International Search Report and Written Opinion for International (PCT) Patent Application No. PCT/US13/55374, mailed Nov. 12, 2013 8 pages.
International Search Report and Written Opinion for International (PCT) Patent Application No. PCT/US13/55542, mailed Mar. 10, 2014 9 pages.
International Search Report and Written Opinion for International (PCT) Patent Application No. PCT/US13/55315, mailed Jan. 24, 2014 9 pages.
International Search Report and Written Opinion for International (PCT) Patent Application No. PCT/US2013/055317, mailed Dec. 2, 2013 9 pages.
International Search Report and Written Opinion for International (PCT) Patent Application No. PCT/US2013/055318, mailed Jan. 9, 2014 10 pages.
International Search Report and Written Opinion for International (PCT) Patent Application No. PCT/US2013/055319, mailed Mar. 11, 2014 7 pages.
International Search Report and Written Opinion for International (PCT) Patent Application No. PCT/US2013/055321, mailed Dec. 6, 2013 9 pages.
International Search Report and Written Opinion for International (PCT) Patent Application No. PCT/CN2013/081630, mailed Nov. 21, 2013 11 pages.
International Search Report and Written Opinion for International (PCT) Patent Application No. PCT/US2013/055298, mailed Nov. 29, 2013 8 pages.
International Search Report and Written Opinion for International (PCT) Patent Application No. PCT/US13/55567, mailed Dec. 20, 2013 10 pages.
International Search Report and Written Opinion for International (PCT) Patent Application No. PCT/US13/55570, mailed Nov. 22, 2013 8 pages.
Official Action for U.S. Appl. No. 13/864,206, mailed Nov. 27, 2013 17 pages.
Official Action for U.S. Appl. No. 13/864,214, mailed Mar. 12, 2014 12 pages.
International Preliminary Report on Patentability for International (PCT) Patent Application No. PCT/US13/55494, mailed Feb. 26, 2015 8 pages.
International Preliminary Report on Patentability for International (PCT) Patent Application No. PCT/US13/36826, mailed Feb. 26, 2015 8 pages.
International Preliminary Report on Patentability for International (PCT) Patent Application No. PCT/US2013/055342, mailed Feb. 26, 2015 10 pages.
International Preliminary Report on Patentability for International (PCT) Patent Application No. PCT/US13/55589, mailed Feb. 26, 2015 8 pages.
International Preliminary Report on Patentability for International (PCT) Patent Application No. PCT/US2013/055289, mailed Feb. 26, 2015 8 pages.
International Preliminary Report on Patentability for International (PCT) Patent Application No. PCT/US2013/055288, mailed Feb. 26, 2015 10 pages.
International Preliminary Report on Patentability for International (PCT) Patent Application No. PCT/US2013/055286, mailed Feb. 26, 2015 8 pages.
International Preliminary Report for International (PCT) Patent Application No. PCT/US2013/055284, mailed Feb. 26, 2015 9 pages.
International Preliminary Report for International (PCT) Patent Application No. PCT/US2013/055293, mailed Feb. 26, 2015 12 pages.
International Preliminary Report on Patentability for International (PCT) Patent Application No. PCT/US2013/055294, mailed Feb. 26, 2015 10 pages.
International Preliminary Report on Patentability for International (PCT) Patent Application No. PCT/US13/55493, mailed Feb. 26, 2015 8 pages.
International Preliminary Report on Patentability for International (PCT) Patent Application No. PCT/US2013/036828, mailed Feb. 26, 2015 12 pages.
International Preliminary Report on Patentability for International (PCT) Patent Application No. PCT/US2013/055340, mailed Feb. 26, 2015 8 pages.
International Preliminary Report on Patentability for International (PCT) Patent Application No. PCT/US2013/055551, mailed Feb. 26, 2015 6 pages.
International Preliminary Report on Patentability for International (PCT) Patent Application No. PCT/US13/55592, mailed Feb. 26, 2015 10 pages.
International Preliminary Report on Patentability for International (PCT) Patent Application No. PCT/US2013/036819, mailed Feb. 26, 2015 8 pages.
International Preliminary Report on Patentability for International (PCT) Patent Application No. PCT/US2013/036782, mailed Feb. 26, 2015 8 pages.
International Preliminary Report on Patentability for International (PCT) Patent Application No. PCT/US13/36678, mailed Feb. 26, 2015 8 pages.
International Preliminary Report on Patentability for International (PCT) Patent Application No. PCT/US2013/036804, mailed Feb. 26, 2015 12 pages.
International Preliminary Report on Patentability for International (PCT) Patent Application No. PCT/US13/55405, mailed Feb. 26, 2015 8 pages.
International Preliminary Report on Patentability for International (PCT) Patent Application No. PCT/US2013/055278, mailed Feb. 26, 2015 8 pages.
International Preliminary Report on Patentability for International (PCT) Patent Application No. PCT/US13/55509, mailed Feb. 26, 2015 8 pages.
International Preliminary Report on Patentability for International (PCT) Patent Application No. PCT/US2013/055303, mailed Feb. 26, 2015 7 pages.
International Preliminary Report for International (PCT) Patent Application No. PCT/US2013/055383, mailed Apr. 2, 2015 8 pages.
International Preliminary Report for International (PCT) Patent Application No. PCT/US2013/055344, mailed Apr. 2, 2015 7 pages.
International Preliminary Report for International (PCT) Patent Application No. PCT/US2013/055389, mailed Apr. 2, 2015 9 pages.
International Preliminary Report for International (PCT) Patent Application No. PCT/US2013/055283, mailed Apr. 2, 2015 6 pages.
International Preliminary Report for International (PCT) Patent Application No. PCT/US2013/055564, mailed Apr. 2, 2015 6 pages.
International Preliminary Report for International (PCT) Patent Application No. PCT/US2013/055379, mailed Apr. 2, 2015 8 pages.
International Preliminary Report for International (PCT) Patent Application No. PCT/US2013/055349, mailed Apr. 2, 2015 7 pages.
International Preliminary Report for International (PCT) Patent Application No. PCT/US2013/055298, mailed Feb. 26, 2015 7 pages.
International Preliminary Report on Patentability for International (PCT) Patent Application No. PCT/US13/55567, mailed Feb. 26, 2015 9 pages.
International Preliminary Report on Patentability for International (PCT) Patent Application No. PCT/US13/55570, mailed Feb. 26, 2015 7 pages.
Official Action for U.S. Appl. No. 13/969,880, mailed Mar. 27, 2015 14 pages.
Notice of Allowance for U.S. Appl. No. 13/969,884, mailed Mar. 24, 2015 16 pages.
Official Action for U.S. Appl. No. 13/969,887, mailed Mar. 11, 2015 24 pages.
Official Action for U.S. Appl. No. 13/969,482, mailed Apr. 3, 2015 19 pages.

(56) References Cited

OTHER PUBLICATIONS

Official Action for U.S. Appl. No. 13/969,485, mailed Mar. 11, 2015 19 pages.
Corrected Notice of Allowance for U.S. Appl. No. 13/968,884, mailed Apr. 1, 2015 15 pages.
Official Action for U.S. Appl. No. 13/968,913, mailed Apr. 1, 2015 16 pages.
Official Action for U.S. Appl. No. 13/968,983, mailed Mar. 12, 2015 21 pages.
Official Action for U.S. Appl. No. 13/968,948, mailed Mar. 11, 2015 13 pages.
Official Action for U.S. Appl. No. 13/968,929, mailed Apr. 29, 2015 12 pages.
Official Action for U.S. Appl. No. 13/969,588, mailed Mar. 11, 2015 12 pages.
Notice of Allowance for U.S. Appl. No. 13/864,120, mailed Apr. 14, 2015 9 pages.
Official Action for U.S. Appl. No. 13/969,490, mailed Mar. 13, 2015 26 pages.
Official Action for U.S. Appl. No. 13/969,491, mailed Mar. 20, 2015 25 pages.
Official Action for U.S. Appl. No. 13/970,000, mailed Mar. 5, 2015 16 pages.
Official Action for U.S. Appl. No. 13/969,179, mailed Mar. 12, 2015 17 pages.
Official Action for U.S. Appl. No. 13/968,652, mailed Apr. 17, 2015 17 pages.
Official Action for U.S. Appl. No. 13/969,777, mailed Apr. 15, 2015 11 pages.
Official Action for U.S. Appl. No. 13/968,630, mailed Mar. 27, 2015 15 pages.
Official Action for U.S. Appl. No. 13/968,937, mailed Apr. 7, 2015 10 pages.
Official Action for U.S. Appl. No. 13/969,508, mailed Mar. 5, 2015 9 pages.
International Search Report and Written Opinion for International (PCT) Patent Application No. PCT/US13/55494, mailed Apr. 16, 2014 9 pages.
International Search Report and Written Opinion for International (PCT) Patent Application No. PCT/US2013/055342, mailed Apr. 17, 2014 12 pages.
International Search Report and Written Opinion for International (PCT) Patent Application No. PCT/US13/55592, mailed Mar. 10, 2014 11 pages.
Notice of Allowance for U.S. Appl. No. 13/864,206, mailed Apr. 16, 2014 7 pages.
Official Action for U.S. Appl. No. 13/970,409, mailed Jul. 21, 2014, 21 pages.
Official Action for U.S. Appl. No. 13/970,442, mailed Jun. 4, 2014 10 pages.
Official Action for U.S. Appl. No. 13/970,450 mailed Jul. 9, 2014 17 pages.
Official Action for U.S. Appl. No. 13/970,453, mailed Jul. 21, 2014 12 pages.
Official Action for U.S. Appl. No. 13/968,858 mailed May 15, 2014 6 pages.
Official Action for U.S. Appl. No. 13/968,884, mailed Jun. 25, 2014 23 pages.
Official Action for U.S. Appl. No. 13/968,876 mailed Jun. 16, 2014 10 pages.
Official Action for U.S. Appl. No. 13/968,983, mailed Jul. 7, 2014 15 pages.
Official Action for U.S. Appl. No. 13/968,948 mailed May 6, 2014 11 pages.
Official Action for U.S. Appl. No. 13/864,120 mailed Jun. 13, 2014 10 pages.
Official Action for U.S. Appl. No. 13/969,505, mailed Jul. 15, 2014 7 pages.
Official Action for U.S. Appl. No. 13/969,490 mailed May 23, 2014 18 pages.
Official Action for U.S. Appl. No. 13/969,492 mailed May 23, 2014 17 pages.
Official Action for U.S. Appl. No. 13/970,000, mailed Jul. 15, 2014 12 pages.
Official Action for U.S. Appl. No. 13/970,355, mailed Jul. 7, 2014 7 pages.
Official Action for U.S. Appl. No. 13/970,374, mailed Jun. 6, 2014 7 pages.
Official Action for U.S. Appl. No. 13/968,903, mailed Jul. 18, 2014 14 pages.
Official Action for U.S. Appl. No. 13/968,969, mailed May 6, 2014 12 pages.
Official Action for U.S. Appl. No. 13/968,610, mailed Apr. 30, 2014 11 pages.
Official Action for U.S. Appl. No. 13/968,732, mailed May 27, 2014 12 pages.
Official Action for U.S. Appl. No. 13/969,777, mailed Jun. 25, 2014 9 pages.
Official Action for U.S. Appl. No. 13/969,510, mailed Jun. 25, 2014 13 pages.
Official Action for U.S. Appl. No. 13/970,247, mailed Jul. 9, 2014 19 pages.
Official Action for U.S. Appl. No. 13/969,504, mailed Jul. 15, 2014 9 pages.
U.S. Appl. No. 14/075,593, filed Dec. 12, 2014, Sirpal et al.
U.S. Appl. No. 14/407,598, filed Dec. 12, 2014, Sirpal et al.
U.S. Appl. No. 14/407,601, filed Dec. 12, 2014, Sirpal et al.
U.S. Appl. No. 14/407,609, filed Dec. 12, 2014, Sirpal et al.
U.S. Appl. No. 14/418,969, filed Feb. 2, 2015, Sirpal et al.
U.S. Appl. No. 14/418,972, filed Feb. 2, 2015, Sirpal et al.
U.S. Appl. No. 14/418,971, filed Feb. 2, 2015, Shoykher et al.
International Preliminary Report on Patentability for Intenational (PCT) Patent Application No. PCT/CN2013/081639, mailed Feb. 26, 2015 6 pages.
Official Action for U.S. Appl. No. 13/969,846, mailed Mar. 2, 2015 21 pages.
Official Action for U.S. Appl. No. 13/969,869, mailed Feb. 24, 2015 22 pages.
Official Action for U.S. Appl. No. 13/970,388, mailed Jan. 22, 2015 12 pages.
Notice of Allowance for U.S. Appl. No. 13/970,398, mailed Feb. 2, 2015 14 pages.
Official Action for U.S. Appl. No. 13/970,409, mailed Feb. 11, 2015 25 pages.
Official Action for U.S. Appl. No. 13/970,420, mailed Feb. 10, 2015 13 pages.
Official Action for U.S. Appl. No. 13/970,442, mailed Feb. 26, 2015 10 pages.
Official Action for U.S. Appl. No. 13/970,450, mailed Nov. 19, 2014 12 pages.
Notice of Allowance for U.S. Appl. No. 13/970,453, mailed Dec. 9, 2014 11 pages.
Official Action for U.S. Appl. No. 13/968,858, mailed Jan. 23, 2015 9 pages.
Notice of Allowance for U.S. Appl. No. 13/968,884, mailed Jan. 5, 2015 20 pages.
Official Action for U.S. Appl. No. 13/968,876, mailed Dec. 26, 2014 13 pages.
Official Action for U.S. Appl. No. 13/968,867, mailed Jan. 27, 2015 17 pages.
Official Action for U.S. Appl. No. 13/968,983, mailed Nov. 26, 2014 17 pages.
Official Action for U.S. Appl. No. 13/968,948, mailed Nov. 24, 2014 13 pages.
Official Action for U.S. Appl. No. 13/864,120, mailed Dec. 24, 2014 13 pages.
Official Action for U.S. Appl. No. 13/969,505, mailed Feb. 24, 2015 9 pages.
Official Action for U.S. Appl. No. 13/969,490, mailed Nov. 19, 2014 22 pages.
Official Action for U.S. Appl. No. 13/969,492, mailed Dec. 5, 2014 14 pages.

(56) References Cited

OTHER PUBLICATIONS

Official Action for U.S. Appl. No. 13/969,493, mailed Mar. 2, 2015 15 pages.
Official Action for U.S. Appl. No. 13/9700,000, mailed Nov. 14, 2014 14 pages.
Official Action for U.S. Appl. No. 13/970,355, mailed Dec. 19, 2014 9 pages.
Official Action for U.S. Appl. No. 13/864,214, mailed Jan. 29, 2015 17 pages.
Official Action for U.S. Appl. No. 13/969,179, mailed Nov. 28, 2014 15 pages.
Official Action for U.S. Appl. No. 13/968,767, mailed Jan. 22, 2015 15 pages.
Official Action for U.S. Appl. No. 13/969,506, mailed Jan. 23, 2015 9 pages.
Official Action for U.S. Appl. No. 13/970,374, mailed Dec. 9, 2014 9 pages.
Official Action for U.S. Appl. No. 13/968,897, mailed Jan. 28, 2015 18 pages.
Official Action for U.S. Appl. No. 13/968,652, mailed Dec. 5, 2014 25 pages.
Official Action for U.S. Appl. No. 13/968,709, mailed Nov. 14, 2014 17 pages.
Official Action for U.S. Appl. No. 13/968,709, mailed Feb. 23, 2015 13 pages.
Official Action for U.S. Appl. No. 13/968,903, mailed Jan. 5, 2015 13 pages.
Official Action for U.S. Appl. No. 13/970,234, mailed Dec. 26, 2014 13 pages.
Notice of Allowance for U.S. Appl. No. 13/968,969, mailed Jan. 6, 2015 6 pages.
Official Action for U.S. Appl. No. 13/968,610, mailed Dec. 31, 2014 7 pages.
Notice of Allowance for U.S. Appl. No. 13/968,610, mailed Feb. 24, 2015 5 pages.
Official Action for U.S. Appl. No. 13/968,732, mailed Dec. 26, 2014 13 pages.
Official Action for U.S. Appl. No. 13/969,777, mailed Jan. 8, 2015 11 pages.
Official Action for U.S. Appl. No. 13/968,630, mailed Nov. 19, 2014 11 pages.
Official Action for U.S. Appl. No. 13/969,507, mailed Jan. 27, 2015 30 pages.
Official Action for U.S. Appl. No. 13/968,937, mailed Dec. 18, 2014 9 pages.
Official Action for U.S. Appl. No. 13/969,510, mailed Feb. 24, 2015 17 pages.
Official Action for U.S. Appl. No. 13/970,243, mailed Jan. 22, 2015 14 pages.
Official Action for U.S. Appl. No. 13/970,247, mailed Dec. 22, 2014 20 pages.
Official Action for U.S. Appl. No. 13/969,504, mailed Feb. 23, 2015 10 pages.

* cited by examiner

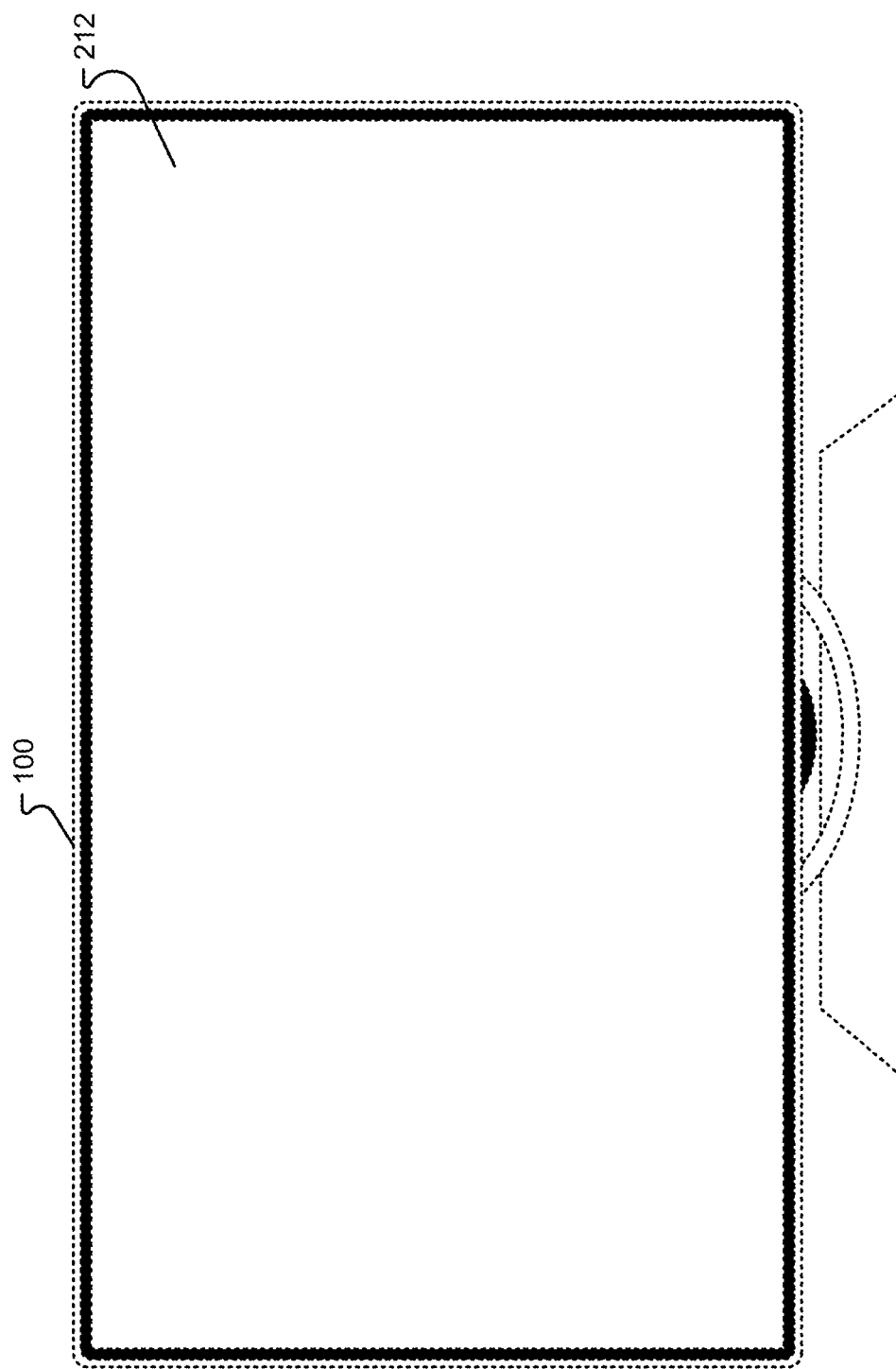

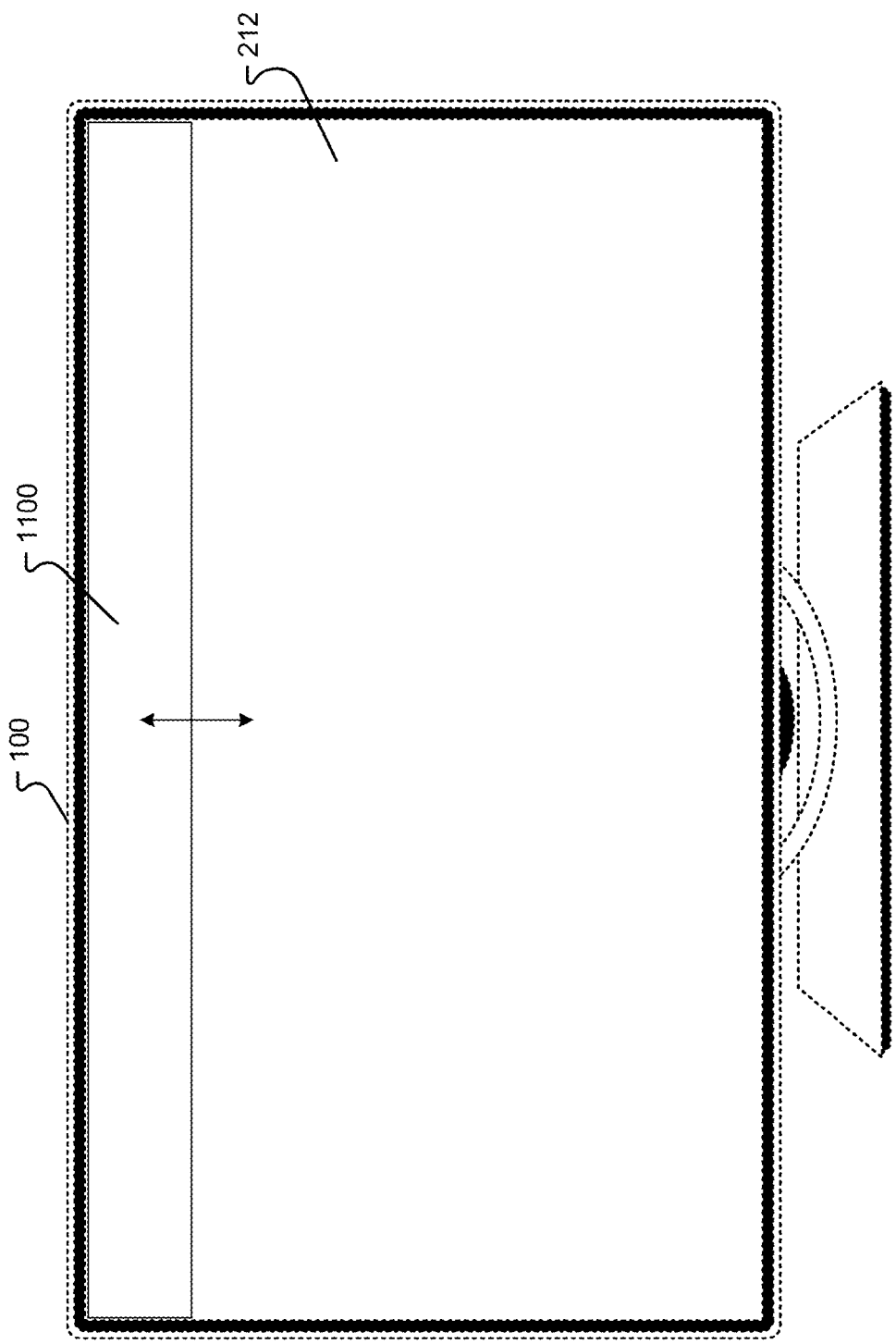

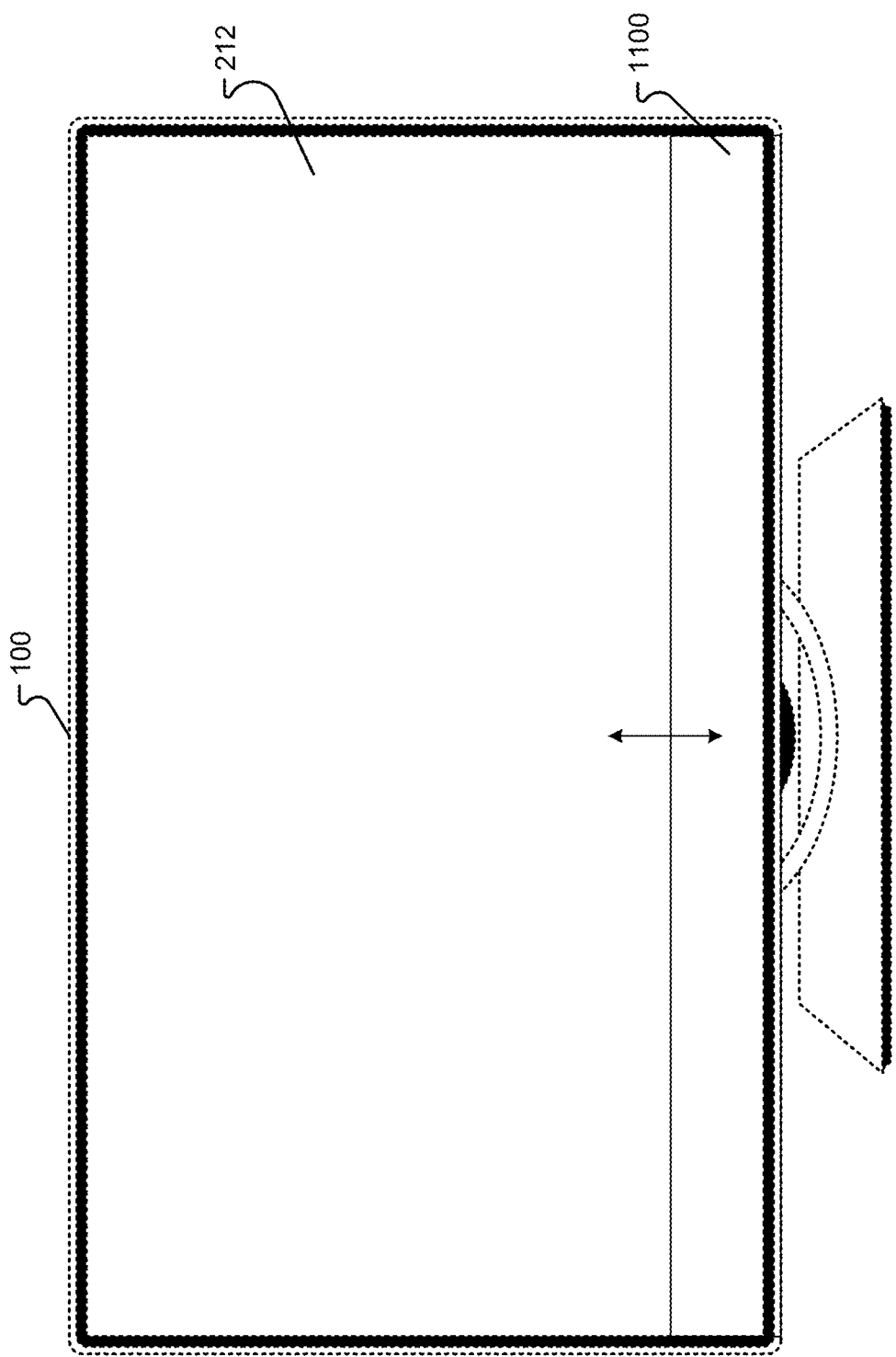

SYSTEMS AND METHODS FOR PROVIDING SOCIAL MEDIA WITH AN INTELLIGENT TELEVISION

CROSS REFERENCE TO RELATED APPLICATION

The present application claims the benefits of and priority, under 35 U.S.C. §119(e), to U.S. Provisional Application Ser. Nos. 61/684,672 filed Aug. 17, 2012, "Smart TV"; 61/702,650 filed Sep. 18, 2012, "Smart TV"; 61/697,710 filed Sep. 6, 2012, "Social TV"; 61/700,182 filed Sep. 12, 2012, "Social TV Roadmap"; 61/736,692 filed Dec. 13, 2012, "SmartTV"; 61/798,821 filed Mar. 15, 2013, "SmartTV"; 61/804,942 filed Mar. 25, 2013, "SmartTV"; 61/804,998 filed Mar. 25, 2013, "SmartTV"; 61/804,971 filed Mar. 25, 2013, "SmartTV"; 61/804,990 filed Mar. 25, 2013, "SmartTV"; 61/805,003 filed Mar. 25, 2013, "SmartTV"; 61/805,053 filed Mar. 25, 2013, "SmartTV"; 61/805,030 filed Mar. 25, 2013, "SmartTV"; 61/805,027 filed Mar. 25, 2013, "SmartTV"; 61/805,042 filed Mar. 25, 2013, "SmartTV"; and 61/805,038 filed Mar. 25, 2013, "SmartTV." Each of the aforementioned documents is incorporated herein by reference in their entirety for all that they teach and for all purposes.

BACKGROUND

Consolidation of device features or technological convergence is in an increasing trend. Technological convergence describes the tendency for different technological systems to evolve toward performing similar tasks. As people use more devices, the need to carry those devices, charge those devices, update software on those devices, etc. becomes more cumbersome. To compensate for these problems, technology companies have been integrating features from different devices into one or two multi-functional devices. For example, cellular phones are now capable of accessing the Internet, taking photographs, providing calendar functions, etc.

The consolidation trend is now affecting the design and functionality of devices generally used in the home. For example, audio receivers can access the Internet, digital video recorders can store or provide access to digital photographs, etc. The television in home audio/video systems remains a cornerstone device because the display function cannot be integrated into other devices. As such, consolidating home devices leads to integrating features and functionality into the television. The emergence of the Smart Television (Smart TV) is evidence of the trend to consolidate functionality into the television.

A Smart TV is generally conceived as a device that integrates access to the Internet and Web 2.0 features into television sets. The Smart TV represents the trend of technological convergence between computers and television sets. The Smart TV generally focuses on online interactive media, Internet TV, on-demand streaming media, and generally does not focus on traditional broadcast media. Unfortunately, most Smart TVs have yet to provide seamless and intuitive user interfaces for navigating and/or executing the various features of the Smart TV. As such, there are still issues with the consolidation of features and the presentation of these features in Smart TVs.

SUMMARY

There is a need for an Intelligent TV with intuitive user interfaces and with seamless user interaction capability. These and other needs are addressed by the various aspects, embodiments, and/or configurations of the present disclosure. Also, while the disclosure is presented in terms of exemplary embodiments, it should be appreciated that individual aspects of the disclosure can be separately claimed.

A method for providing an indication of a linkage to a poster of social media, the method comprising: receiving, by a processor of an intelligent television, two or more social media postings; providing a visual representation of the social media postings; in the visual representation, providing a first visual indicia for a first posting and a second visual indicia for a second posting; and wherein the first and second visual indicia are different and indicate the linkage between a first poster of the first posting or a second poster of the second posting.

An aspect of the above method includes wherein the linkage is a friend on a social media site, a subscription to a social media fee, or a following on a social media site.

An aspect of the above method includes wherein the visual representation is a pile view of the social media postings.

An aspect of the above method includes wherein the visual indicia is a horizontal placement of a thumbnail, representing the first poster or second poster, in the pile view.

An aspect of the above method includes wherein a thumbnail closer to a centerline of the pile view has a closer linkage.

An aspect of the above method includes wherein the visual indicia is a vertical placement of a thumbnail, representing the first poster or second poster, in the pile view.

An aspect of the above method includes wherein a vertical placement nearer a top of the pile view has a closer linkage.

An aspect of the above method includes wherein the visual indicia is a size of the thumbnail in the pile view.

An aspect of the above method includes wherein a poster represented by a larger thumbnail has a closer linkage.

An aspect of the above method wherein a location of a thumbnail in a user interface of the intelligent television indicates a poster has a closer linkage.

An aspect of the above method wherein the first poster has a closer linkage than a second linkage.

An intelligent television system comprising: a memory operable to store social media data; a processor in communication with the memory, the processor operable to: execute a social media application operable to receive two or more social media postings; execute a user interface application in communication with the social media application, the user interface application operable to: provide a visual representation of the social media postings; in the visual representation, provide a first visual indicia f An aspect of the above method includes or a first posting and a second visual indicia for a second posting; and wherein the first and second visual indicia are different and indicate the linkage between a first poster of the first posting or a second poster of the second posting.

An aspect of the above intelligent television system includes wherein the linkage is a friend on a social media site, a subscription to a social media fee, or a following on a social media site, and wherein the first poster has a closer linkage than a second linkage.

An aspect of the above intelligent television system includes wherein the visual representation is a pile view of the social media postings.

An aspect of the above intelligent television system includes wherein the visual indicia is one or more of: a horizontal placement of a thumbnail, representing the first poster or second poster, in the pile view, wherein a thumbnail closer to a centerline of the pile view has a closer linkage; a vertical placement of a thumbnail, representing the first poster or second poster, in the pile view, wherein a vertical placement nearer a top of the pile view has a closer linkage; and a size of the thumbnail in the pile view, wherein a poster represented by a larger thumbnail has a closer linkage.

An aspect of the above intelligent television system includes wherein a location of a thumbnail in a user interface of the intelligent television indicates a poster has a closer linkage.

Omitted

An aspect of the above computer readable medium includes wherein the linkage is a friend on a social media site, a subscription to a social media fee, or a following on a social media site, and wherein the first poster has a closer linkage than a second linkage.

An aspect of the above computer readable medium includes wherein the visual representation is a pile view of the social media postings.

An aspect of the above computer readable medium includes wherein the visual indicia is one or more of: a horizontal placement of a thumbnail, representing the first poster or second poster, in the pile view, wherein a thumbnail closer to a centerline of the pile view has a closer linkage; a vertical placement of a thumbnail, representing the first poster or second poster, in the pile view, wherein a vertical placement nearer a top of the pile view has a closer linkage; and a size of the thumbnail in the pile view, wherein a poster represented by a larger thumbnail has a closer linkage.

A method for providing a rooting section for an intelligent television, the method comprising: receiving, by a processor of an intelligent television, two or more social media postings; receiving a selection for sporting content on the intelligent television; based on the selection, providing a first visual representation of one or more of the social media postings associated with a first team affiliation; and providing a second visual representation of one or more of the social media postings associated with a second team affiliation.

An aspect of the above method further comprises determining a team affiliation for at least one of posters of the two or more social media postings.

An aspect of the above method includes wherein the first visual representation is a first pile view of the one social media postings associated with a first team affiliation and the first visual representation is a second pile view of the one social media postings associated with a second team affiliation.

An aspect of the above method includes wherein the first pile view and the second pile view are in different locations on a user interface of the intelligent television.

An aspect of the above method includes wherein a first visual indicia is provided with the first pile view and a second visual indicia is provided with the second pile view, and wherein the first and second visual indicia indicate teams, sports organizations, or athletes to which the first and second pile views are associated.

An aspect of the above method includes wherein the first and second visual indicia are team logos.

An aspect of the above method includes wherein the user interface further includes a score.

An aspect of the above method further comprises: receiving social media content associated with the sporting content; determining to which team affiliation the social media content applies; and displaying the social media content in physical proximity to the first or second pile view.

An aspect of the above method further comprises determining a team affiliation for a user of the intelligent television.

An aspect of the above method further comprises: receiving a social media posting from the user; and displaying the social media posting from the user in physical proximity to first or second pile view to which the user is associated.

An intelligent television system comprising: a memory operable to store social media data; a processor in communication with the memory, the processor operable to: execute a social media application operable to receive two or more social media postings; execute a user interface application in communication with the social media application, the user interface application operable to: receive a selection for sporting content on the intelligent television; based on the selection, provide a first visual representation of one or more of the social media postings associated with a first team affiliation; and provide a second visual representation of one or more of the social media postings associated with a second team affiliation.

An aspect of the above intelligent television system includes wherein the social media application is further operable to determine a team affiliation for at least one of posters of the two or more social media postings.

An aspect of the above intelligent television system includes wherein the social media application is further operable to: receive social media content associated with the sporting content; determine to which team affiliation the social media content applies; and wherein the user interface application is further operable to display the social media content in physical proximity to the first or second pile view.

An aspect of the above intelligent television system includes wherein the first visual representation is a first pile view of the one social media postings associated with a first team affiliation and the first visual representation is a second pile view of the one social media postings associated with a second team affiliation, wherein the first pile view and the second pile view are in different locations on a user interface of the intelligent television, wherein a first visual indicia is provided with the first pile view and a second visual indicia is provided with the second pile view, and wherein the first and second visual indicia indicate teams, sports organizations, or athletes to which the first and second pile views are associated, wherein the first and second visual indicia are team logos, and wherein the user interface further includes a score.

An aspect of the above intelligent television system includes wherein the social media application is further operable to: determine a team affiliation for a user of the intelligent television; receive a social media posting from the user; and wherein the user interface application is further operable to display the social media posting from the user in physical proximity to first or second pile view to which the user is associated.

An aspect of the above computer readable medium further comprises instructions to determine a team affiliation for at least one of posters of the two or more social media postings.

An aspect of the above computer readable medium further comprises instructions to: receive social media content associated with the sporting content; determine to which team affiliation the social media content applies; and display the social media content in physical proximity to the first or second pile view.

An aspect of the above computer readable medium includes wherein the first visual representation is a first pile view of the one social media postings associated with a first team affiliation and the first visual representation is a second pile view of the one social media postings associated with a second team affiliation, wherein the first pile view and the second pile view are in different locations on a user interface of the intelligent television, wherein a first visual indicia is provided with the first pile view and a second visual indicia is provided with the second pile view, and wherein the first and second visual indicia indicate teams, sports organizations, or athletes to which the first and second pile views are associated, wherein the first and second visual indicia are a team logos, and wherein the user interface further includes a score.

An aspect of the above computer readable medium further comprises instructions to: determine a team affiliation for a user of the intelligent television; receive a social media posting from the user; and display the social media posting from the user in physical proximity to first or second pile view to which the user is associated.

A method for providing social media on an intelligent television, the method comprising: identifying a user of the intelligent television; register user with one or more social media sites; and providing social media posting associated with the user on an user interface of the intelligent television.

An aspect of the above method includes wherein the user is identified automatically.

An aspect of the above method includes wherein the user is identified by facial recognition, voice recognition, or other biometric information.

An aspect of the above method further comprises: determining if the user is a new user of the intelligent television; if the user is a new user of the intelligent television, obtaining credentials for the one or more social media sites; storing the credentials for the one or more social media sites; and if the user is not a new user of the intelligent television, retrieving credentials for the user for the one or more social media sites.

An aspect of the above method further comprises recording content which the user is viewing.

An aspect of the above method further comprises publishing the record of the content which the user is viewing.

An aspect of the above method includes wherein the user receives two or more social media postings.

An aspect of the above method includes wherein the two or more social media postings originate from two or more social media sites.

An aspect of the above method includes wherein the two or more social media sites are presented as a social media pile in the user interface.

An aspect of the above method includes wherein the social media pile includes a visual representation of at least one poster associated with at least one of the two or more social media postings.

An intelligent television system comprising: a memory operable to store social media data; a processor in communication with the memory, the processor operable to: execute a social media application operable to: identify a user of the intelligent television; register user with one or more social media sites; retrieve one or more social media postings from the one or more social media sites; and execute a user interface application in communication with the social media application, the user interface application operable to provide social media posting associated with the user on an user interface of the intelligent television.

An aspect of the above intelligent television system includes wherein the user is identified automatically, and wherein the user is identified by facial recognition, voice recognition, or other biometric information.

An aspect of the above intelligent television system includes wherein the social media application is further operable to: determine if the user is a new user of the intelligent television; if the user is a new user of the intelligent television, obtain credentials for the one or more social media sites; store the credentials for the one or more social media sites; and if the user is not a new user of the intelligent television, retrieve credentials for the user for the one or more social media sites.

An aspect of the above intelligent television system includes wherein the social media application is further operable to: comprise recording content which the user is viewing; and publish the record of the content which the user is viewing.

An aspect of the above intelligent television system includes wherein the user receives two or more social media postings, wherein the two or more social media postings originate from two or more social media sites, wherein the two or more social media sites are presented as a social media pile in the user interface, and wherein the social media pile includes a visual representation of at least one poster associated with at least one of the two or more social media postings.

An aspect of the above computer readable medium includes wherein the user is identified automatically, and wherein the user is identified by facial recognition, voice recognition, or other biometric information.

An aspect of the above computer readable medium further comprises instructions to: determine if the user is a new user of the intelligent television; if the user is a new user of the intelligent television, obtain credentials for the one or more social media sites; store the credentials for the one or more social media sites; and if the user is not a new user of the intelligent television, retrieve credentials for the user for the one or more social media sites.

An aspect of the above computer readable medium further comprises instructions to: comprise recording content which the user is viewing; and publish the record of the content which the user is viewing.

An aspect of the above computer readable medium includes wherein the user receives two or more social media postings, wherein the two or more social media postings originate from two or more social media sites, wherein the two or more social media sites are presented as a social media pile in the user interface, and wherein the social media pile includes a visual representation of at least one poster associated with at least one of the two or more social media postings.

A method for providing social media information on an intelligent television, the method comprising: receiving, by a processor of an intelligent television, a selection of programming for the intelligent television; determining the availability of social media for the selected programming; receiving one or more social media postings; and providing a visual representation of one or more of the social media postings associated with selected programming.

An aspect of the above method includes wherein the visual representation is located in a first position in a first user interface and in a second position in a second user interface.

An aspect of the above method includes wherein the visual representation is a pile view of the one social media postings.

An aspect of the above method includes wherein the selection of programming is a channel change in live television, and wherein the pile view is presented at a bottom location of a user interface providing live television programming.

An aspect of the above method includes wherein the selection of programming is a selection of video on demand content or live television content, and wherein the pile view is presented in a header of a user interface providing either video on demand or live television programming.

An aspect of the above method includes wherein the selection of programming is a selection of a sporting event, and wherein the pile view is presented as a rooting section in a user interface providing the sporting event.

An aspect of the above method further comprises determining a type of selection and wherein the visual representation is positioned in a provided user interface based on the type of selection.

An aspect of the above method further comprises: determining a change to the social media postings; and providing a new visual representation based on the change.

An aspect of the above method further comprises: receiving a second selection; and providing a different visual representation based on the second selection.

An aspect of the above method includes wherein a user selects the position of the visual representation.

An intelligent television system comprising: a memory operable to store social media data; a processor in communication with the memory, the processor operable to: execute a social media application operable to: determine the availability of social media for selected programming; receive one or more social media postings; execute a user interface application in communication with the social media application, the user interface application operable to: receive, by a processor of an intelligent television, a selection of programming for the intelligent television; and provide a visual representation of one or more of the social media postings associated with selected programming.

An aspect of the above intelligent television system includes wherein the visual representation is located in a first position in a first user interface and in a second position in a second user interface.

An aspect of the above intelligent television system includes wherein the visual representation is a pile view of the one social media postings, wherein the selection of programming is one of a channel change in live television or a selection of video on demand content, and wherein the pile view is presented at a bottom location of a user interface providing video on demand or live television programming.

An aspect of the above intelligent television system further comprises the user interface application is operable to determine a type of selection and wherein the visual representation is positioned in a provided user interface based on the type of selection.

An aspect of the above intelligent television system further comprises: the social media application further operable to determine a change to the social media postings; the user interface application is further operable to: provide a new visual representation based on the change; receive a second selection; and provide a different visual representation based on the second selection.

An aspect of the above computer readable medium includes wherein the visual representation is located in a first position in a first user interface and in a second position in a second user interface.

An aspect of the above computer readable medium includes wherein the visual representation is a pile view of the one social media postings, wherein the selection of programming is one of a channel change in live television or a selection of video on demand content, and wherein the pile view is presented at a bottom location of a user interface providing video on demand or live television programming.

An aspect of the above computer readable medium further comprises instructions to determine a type of selection and wherein the visual representation is positioned in a provided user interface based on the type of selection.

An aspect of the above computer readable medium further comprises instructions to: determine a change to the social media postings; provide a new visual representation based on the change; receive a second selection; and provide a different visual representation based on the second selection.

A method for providing social media information on an intelligent television, the method comprising: receiving, by a processor of an intelligent television, a first selection to present social media; receiving one or more social media postings; presenting at least one of the one or more social media postings; receiving a second selection to change a volume of social media; and in response to the second selection, changing an amount of social media presented.

An aspect of the above method further comprises determining if the second selection is for inbound, outbound, or both inbound and outbound social media.

An aspect of the above method further comprises determining type for the second selection, wherein the type is an increase, a decrease, or a mute.

An aspect of the above method includes wherein, if the second selection is an increase, one of providing more social media postings, posting outbound social media to more social media sites, or both providing more social media postings and posting outbound social media to more social media sites.

An aspect of the above method includes wherein, if the second selection is a decrease increase, one of providing fewer social media postings, posting outbound social media to fewer social media sites, or both providing fewer social media postings and posting outbound social media to fewer social media sites.

An aspect of the above method includes wherein, if the second selection is a mute, one of discontinuing a presentation of social media postings, discontinuing posting of outbound social media to social media sites, or both discontinuing a presentation of social media postings and discontinuing posting of outbound social media to social media sites.

An aspect of the above method includes wherein the second selection is received from a social media volume button on a remote control.

An aspect of the above method includes wherein the second selection changes a social media volume, and wherein the social media volume has two or more levels.

An aspect of the above method includes wherein the social media volume has ten levels.

An aspect of the above method includes wherein increasing an outbound social media volume causes the intelligent television to post user social media content to more social media sites.

An intelligent television system comprising: a memory operable to store social media data; a processor in communication with the memory, the processor operable to: execute a social media application operable to: receive a first selection to present social media; receive one or more social media postings; execute a user interface application in communication with the social media application, the user interface application operable to: present at least one of the one or more social media postings; receive a second selection to change a volume of social media; and in response to the second selection, change an amount of social media presented.

An aspect of the above intelligent television system includes wherein the social media application is further operable to: determine if the second selection is for inbound, outbound, or both inbound and outbound social media; and determine type for the second selection, wherein the type is an increase, a decrease, or a mute.

An aspect of the above intelligent television system includes wherein, if the second selection is an increase, one of providing more social media postings, posting outbound social media to more social media sites, or both providing more social media postings and posting outbound social media to more social media sites, wherein, if the second selection is a decrease increase, one of providing fewer social media postings, posting outbound social media to fewer social media sites, or both providing fewer social media postings and posting outbound social media to fewer social media sites, and wherein, if the second selection is a mute, one of discontinuing a presentation of social media postings, discontinuing posting of outbound social media to social media sites, or both discontinuing a presentation of social media postings and discontinuing posting of outbound social media to social media sites.

An aspect of the above intelligent television system includes wherein the second selection is received from a social media volume button on a remote control.

An aspect of the above intelligent television system includes wherein the second selection changes a social media volume, and wherein the social media volume has two or more levels.

An aspect of the above computer readable medium further comprises instructions to: determine if the second selection is for inbound, outbound, or both inbound and outbound social media; and determine type for the second selection, wherein the type is an increase, a decrease, or a mute.

An aspect of the above computer readable medium includes wherein, if the second selection is an increase, one of providing more social media postings, posting outbound social media to more social media sites, or both providing more social media postings and posting outbound social media to more social media sites, wherein, if the second selection is a decrease increase, one of providing fewer social media postings, posting outbound social media to fewer social media sites, or both providing fewer social media postings and posting outbound social media to fewer social media sites, and wherein, if the second selection is a mute, one of discontinuing a presentation of social media postings, discontinuing posting of outbound social media to social media sites, or both discontinuing a presentation of social media postings and discontinuing posting of outbound social media to social media sites.

An aspect of the above computer readable medium includes wherein the second selection is received from a social media volume button on a remote control.

An aspect of the above computer readable medium includes wherein the second selection changes a social media volume, and wherein the social media volume has two or more levels.

A method for providing social media information on an intelligent television, the method comprising: connecting, by a processor of an intelligent television, the intelligent television to a network; the intelligent television discovering a device also connected to the network; connecting the device to the intelligent television; a user pushes a social media message from the device; and displaying the social media message on the intelligent television.

An aspect of the above method further comprises the device connecting to the network, wherein the intelligent television discovers the device after the device connects to the network.

An aspect of the above method further comprises: after discovering the device, the intelligent television pushing an object, including a user-selectable interface device, to the device; receiving a selection of the user-selectable interface device; and in response to receiving the selection, connecting the device to the intelligent television.

An aspect of the above method includes wherein the object displays a current media status for the intelligent television on a display associated with the device.

An aspect of the above method includes wherein the user pushes the social media message to a social media site.

An aspect of the above method further comprises relaying the social media message from the device to the intelligent television.

An aspect of the above method further comprises displaying the social media message on the display associated with the device.

An aspect of the above method further comprises displaying the social media message on a second display associated with a second device.

An aspect of the above method further comprises the intelligent television posting, for the user, the social media message on the social media site.

An aspect of the above method includes wherein the social media message is presented on the social media site.

An intelligent television system comprising: a memory operable to store social media data; a processor in communication with the memory, the processor operable to: connect the intelligent television to a network; discover a device also connected to the network; connect the device to the intelligent television; execute a social media application operable to receive a social media message pushed by the user from the device; execute a user interface application in communication with the social media application, the user interface application operable to display the social media message on the intelligent television.

An aspect of the above intelligent television system includes wherein the social media application is further operable to: after discovering the device, push an object, including a user-selectable interface device, to the device, wherein the object displays a current media status for the intelligent television on a display associated with the device; receive a selection of the user-selectable interface device; and in response to receiving the selection, connect the device to the intelligent television.

An aspect of the above intelligent television system further comprises the object relaying the social media message from the device to the intelligent television, while displaying the social media message on the display associated with the device.

An aspect of the above intelligent television system includes wherein a second display on a second device displays the social media message.

An aspect of the above intelligent television system includes wherein the social media application is further operable to post, for the user, the social media message on the social media site, wherein the social media message is presented on the social media site.

An aspect of the above computer readable medium further comprises instructions to: after discovering the device, push an object, including a user-selectable interface device, to the device, wherein the object displays a current media status for the intelligent television on a display associated with the device; receive a selection of the user-selectable interface device; and in response to receiving the selection, connect the device to the intelligent television.

An aspect of the above computer readable medium includes wherein the object relays the social media message from the device to the intelligent television, while displaying the social media message on the display associated with the device.

An aspect of the above computer readable medium includes wherein the social media application is further operable to post, for the user, the social media message on the social media site, wherein the social media message is presented on the social media site.

An aspect of the above computer readable medium includes wherein a second display on a second device displays the social media message.

A method for providing media on an intelligent television, the method comprising: receiving, by a processor of an intelligent television, a selection to view media; retrieving available media from one or more social media sources; retrieving available media from one or more local sources; and presenting together media from both one or more social media sources and one or more local sources.

An aspect of the above method includes wherein the media is one of a picture file, a video file, or a music file.

An aspect of the above method further comprises: determining available media from one or more social media sources; and determining available media from one or more local sources.

An aspect of the above method further comprises providing, for at least one item of media, a visual indicia of the social media source.

An aspect of the above method includes wherein the visual indicia is a logo associated with a social media site.

An aspect of the above method further comprises: receiving a selection of media; determining if the selected media was retrieved from a social media source; and presenting a user interface with information associated with the media.

An aspect of the above method includes wherein the information associated with the media is a social media posting associated with the media on a social media site.

An aspect of the above method further comprises presenting the media, and wherein the user interface is an edge user interface presented to a side of the media.

An aspect of the above method further comprises: receiving a selection of media; and presenting the media.

An aspect of the above method includes wherein the media is presented in a display of a second device connected to the intelligent television.

An intelligent television system comprising: a memory operable to store social media data; a processor in communication with the memory, the processor operable to: execute a media subservice operable to: receive a selection to view media; retrieve available media from one or more social media sources; retrieve available media from one or more local sources; and execute a user interface application in communication with the media subservice, the user interface application operable to present together media from both one or more social media sources and one or more local sources, wherein the media is one of a picture file, a video file, or a music file.

An aspect of the above intelligent television system includes wherein the media subservice is further operable to: determine available media from one or more social media sources; and determine available media from one or more local sources.

An aspect of the above intelligent television system includes the user interface application further operable to: provide, for at least one item of media, a visual indicia of the social media source, wherein the visual indicia is a logo associated with a social media site; receive a selection of media; determine if the selected media was retrieved from a social media source; if the selected media was retrieved from a social media source, presenting a user interface with information associated with the media, wherein the information associated with the media is a social media posting associated with the media on a social media site; and present the media.

An aspect of the above intelligent television system includes wherein the user interface is an edge user interface presented to a side of the media.

An aspect of the above intelligent television system includes wherein the media is presented in a display of a second device connected to the intelligent television.

An aspect of the above computer readable medium further comprises instructions to: determine available media from one or more social media sources; and determine available media from one or more local sources.

An aspect of the above computer readable medium further comprises instructions to: provide, for at least one item of media, a visual indicia of the social media source, wherein the visual indicia is a logo associated with a social media site; receive a selection of media; determine if the selected media was retrieved from a social media source; if the selected media was retrieved from a social media source, presenting a user interface with information associated with the media, wherein the information associated with the media is a social media posting associated with the media on a social media site; and present the media.

An aspect of the above computer readable medium includes wherein the user interface is an edge user interface presented to a side of the media.

An aspect of the above computer readable medium includes wherein the media is presented in a display of a second device connected to the intelligent television.

A method for providing social media on an intelligent television, the method comprising: receiving one or more social media postings; receiving, by a processor of an intelligent television, a programming change input; determining the type of programming changing input; and based on the determination, providing one of two or more user interfaces that include a presentation of social media information.

An aspect of the above method includes wherein the programming change input is a selection of one of a channel change, an electronic programming guide (EPG), a card view, or a media application.

An aspect of the above method further comprises providing a visual representation of the one or more social media postings.

An aspect of the above method includes wherein the visual representation is a pile view of the one or more social media postings.

An aspect of the above method further comprises, during the channel change, providing the pile view in a channel representation.

An aspect of the above method further comprises, during the display of the EPG, providing the pile view in a channel field in the EPG.

An aspect of the above method further comprises, during the display of the card view, providing the pile view in a card.

An aspect of the above method further comprises, during the display of the media application, providing a representation of the one or more social media postings in a user interface associated with the media application.

An aspect of the above method includes wherein the user interface is a timeline view of one or more media available from one or more social media sites.

An aspect of the above method further comprises: determining a state of the intelligent television; and determining a selection for social media.

An intelligent television system comprising: a memory operable to store social media data; a processor in communication with the memory, the processor operable to: execute a social media application operable to: receive one or more social media postings; execute a user interface application in communication with the social media application, the user interface application operable to: receive a programming change input; determine the type of programming changing input; and based on the determination, provide one of two or more user interfaces that include a presentation of social media information.

An aspect of the above intelligent television system includes wherein the programming change input is a selection of one of a channel change, an electronic programming guide (EPG), a card view, or a media application.

An aspect of the above intelligent television system includes wherein the user interface application is further operable to provide a visual representation of the one or more social media postings, wherein the visual representation is a pile view of the one or more social media postings.

An aspect of the above intelligent television system includes wherein the user interface application is further operable to: during the channel change, provide the pile view in a channel representation; during the display of the EPG, provide the pile view in a channel field in the EPG; during the display of the card view, provide the pile view in a card; and during the display of the media application, provide a representation of the one or more social media postings in a user interface associated with the media application, wherein the user interface is a timeline view of one or more media available from one or more social media sites.

An aspect of the above intelligent television system includes wherein the user interface application is further operable to determine a state of the intelligent television, and wherein the social media application is further operable to determine a selection for social media.

Omitted

An aspect of the above computer readable medium includes wherein the programming change input is a selection of one of a channel change, an electronic programming guide (EPG), a card view, or a media application.

An aspect of the above computer readable medium includes wherein the user interface application is further operable to provide a visual representation of the one or more social media postings, wherein the visual representation is a pile view of the one or more social media postings.

An aspect of the above computer readable medium further comprises instructions to: during the channel change, provide the pile view in a channel representation; during the display of the EPG, provide the pile view in a channel field in the EPG; during the display of the card view, provide the pile view in a card; and during the display of the media application, provide a representation of the one or more social media postings in a user interface associated with the media application, wherein the user interface is a timeline view of one or more media available from one or more social media sites.

An aspect of the above computer readable medium further comprises instructions to: determine a state of the intelligent television; and determine a selection for social media.

A method for providing social media on an intelligent television, the method comprising: receiving, by a processor of an intelligent television, a selection to play media, wherein the media is video content presented in real-time; receiving a pause selection for the media; pausing the media playback on the intelligent television while the media continues to be presented in real-time; during the pause, receiving one or more social media postings associated with the media; and storing the one or more social media postings in a time sequence correlated to the media presentation.

An aspect of the above method further comprises: receiving a selection to view a timeline of the media; and providing the timeline user interface with one or more social media tags, associated with the one or more social media postings stored while the media was paused.

An aspect of the above method includes wherein the social media tags are presented in at a position in the timeline view that relates to a time during which the social media posting was received during the media presentation.

An aspect of the above method includes wherein the social media tags are selectable.

An aspect of the above method further comprises: receiving a selection of a social media tag; and expanding the social media tag to provide the social media posting associated with the social media tag.

An aspect of the above method includes wherein the time sequence of the social media tags is referenced to a frame of the video content.

An aspect of the above method includes wherein two or more social media tags are presented at a single time in the timeline view.

An aspect of the above method further comprises providing a user-selectable user interface device to show or hide the social media tags.

An aspect of the above method includes wherein selecting the user-selectable user interface device expands all social media tags associated with a frame to view all social media postings associated with the frame.

An aspect of the above method includes wherein the one or more social media postings are from one or more social media sites.

An intelligent television system comprising: a memory operable to store social media data; a processor in communication with the memory, the processor operable to: execute a user interface application operable to: receive a selection to play media, wherein the media is video content presented in real-time; receive a pause selection for the media; pause the media playback on the intelligent television while the media continues to be presented in real-time; execute a social media application in communication with the user interface application, the social media application operable to: during the pause, receive one or more social media postings associated with the media; and store the one or more social media postings in a time sequence correlated to the media presentation.

An aspect of the above intelligent television system includes wherein the user interface application is further operable to: receive a selection to view a timeline of the media; and provide the timeline user interface with one or more social media tags, associated with the one or more social media postings stored while the media was paused, wherein the social media tags are presented in at a position in the timeline view that relates to a time during which the social media posting was received during the media presentation, and wherein the social media tags are selectable.

An aspect of the above intelligent television system includes wherein the user interface application is further operable to: receive a selection of a social media tag; and expand the social media tag to provide the social media posting associated with the social media tag, wherein the time sequence of the social media tags is referenced to a frame of the video content, and wherein two or more social media tags are presented at a single time in the timeline view.

An aspect of the above intelligent television system includes wherein the user interface application is further operable to provide a user-selectable user interface device to show or hide the social media tags, wherein selecting the user-selectable user interface device expands all social media tags associated with a frame to view all social media postings associated with the frame.

An aspect of the above intelligent television system includes wherein the one or more social media postings are from one or more social media sites.

Omitted

An aspect of the above computer readable medium further comprises instructions to: instructions to receive a selection to view a timeline of the media; and instructions to provide the timeline user interface with one or more social media tags, associated with the one or more social media postings stored while the media was paused, wherein the social media tags are presented in at a position in the timeline view that relates to a time during which the social media posting was received during the media presentation, and wherein the social media tags are selectable.

An aspect of the above computer readable medium further comprises instructions to: receive a selection of a social media tag; and expand the social media tag to provide the social media posting associated with the social media tag, wherein the time sequence of the social media tags is referenced to a frame of the video content, and wherein two or more social media tags are presented at a single time in the timeline view.

An aspect of the above computer readable medium includes wherein the user interface application is further operable to provide a user-selectable user interface device to show or hide the social media tags, wherein selecting the user-selectable user interface device expands all social media tags associated with a frame to view all social media postings associated with the frame.

An aspect of the above computer readable medium includes wherein the one or more social media postings are from one or more social media sites.

A method for providing social media on an intelligent television, the method comprising: receiving one or more social media postings; receiving a selection of a control device on a remote control associated with an intelligent television; receiving, by a processor of the intelligent television, the selection; determining whether the selection is a first type or a second type; if the selection is a first type, providing a first user interface at the bottom of a display of the intelligent television, wherein the first user interface provides at least one social media posting; and if the selection is a second type, providing a second user interface at the top of the display of the intelligent television, wherein the second user interface provides information associated with content being presented in the display.

An aspect of the above method includes wherein the control device is a joystick on a back of the remote control.

An aspect of the above method includes wherein the first type of selection is a peek up selection caused by moving the joystick up.

An aspect of the above method includes wherein the second type of selection is a peek down selection caused by moving the joystick down.

An aspect of the above method includes wherein the first user interface is a footer in the display having two or more social media posting listed across the footer in time sequence.

An aspect of the above method includes wherein the second user interface is a banner in the display having at least one user-selectable control to change the presentation of content in the display.

An aspect of the above method includes wherein the banner includes an ooh-ahh device to post automatically information about the content to one or more social media sites.

An aspect of the above method includes wherein the first user interface is hidden by moving the joystick down to a neutral position.

An aspect of the above method includes wherein the first user interface is hidden by moving the joystick up to a neutral position.

An aspect of the above method includes wherein the joystick is moved left or right to affect other user interface interactions.

An intelligent television system comprising: a memory operable to store social media data; a processor in communication with the memory, the processor operable to: execute a social media application operable to receive one or more social media postings; execute a user interface application in communication with the social media application, the user interface application operable to: receive a selection, wherein the selection is of a control device on a remote control associated with the intelligent television; determine whether the selection is a first type or a second type; if the selection is a first type, provide a first user interface at the bottom of a display of the intelligent television, wherein the first user interface provides at least one social media posting; and if the selection is a second type, provide a second user interface at the top of the display of the intelligent television, wherein the second user interface provides information associated with content being presented in the display.

An aspect of the above intelligent television system includes wherein the control device is a joystick on a back of the remote control, wherein the first type of selection is a peek up selection caused by moving the joystick up, and wherein the second type of selection is a peek down selection caused by moving the joystick down.

An aspect of the above intelligent television system includes wherein the first user interface is a footer in the display having two or more social media posting listed across the footer in time sequence, and wherein the second user interface is a banner in the display having at least one user-selectable control to change the presentation of content in the display.

An aspect of the above intelligent television system includes wherein the banner includes an ooh-ahh device to post automatically information about the content to one or more social media sites.

An aspect of the above intelligent television system includes wherein the first user interface is hidden by moving the joystick down to a neutral position, and wherein the first user interface is hidden by moving the joystick up to a neutral position.

Omitted

An aspect of the above computer readable medium includes wherein the control device is a joystick on a back of the remote control, wherein the first type of selection is a peek up selection caused by moving the joystick up, and wherein the second type of selection is a peek down selection caused by moving the joystick down.

An aspect of the above computer readable medium includes wherein the first user interface is a footer in the display having two or more social media posting listed across the footer in time sequence, and wherein the second user interface is a banner in the display having at least one user-selectable control to change the presentation of content in the display.

An aspect of the above computer readable medium includes wherein the banner includes an ooh-ahh device to post automatically information about the content to one or more social media sites.

An aspect of the above computer readable medium includes wherein the first user interface is hidden by moving the joystick down to a neutral position, and wherein the first user interface is hidden by moving the joystick up to a neutral position.

A method for publishing social media by an intelligent television, the method comprising: displaying content by the intelligent television; receiving a selection of a control device associated with the intelligent television; and based on the selection, automatically publishing information about the content to a social media site.

An aspect of the above method includes wherein the control device is an ooh-ahh button on a remote control.

An aspect of the above method includes the control device is a user-selectable ooh-ahh device displayed on a user interface by the intelligent television.

An aspect of the above method further comprises: determining a state of the content; and based on the determination, publishing the information.

An aspect of the above method includes wherein a social media posting is made with the information.

An aspect of the above method includes wherein the social media posting is made to two or more social media sites.

An aspect of the above method includes wherein the social media posting is one of a name of the content, a thumbnail view of the content, a sound bite from the content, a rating of the content, or an opinion about the content.

An aspect of the above method includes wherein the social media posting is made by a predetermined process.

An aspect of the above method includes wherein the social media posting to a first social media site is made with a first predetermined process.

An aspect of the above method includes wherein the social media posting to a second social media site is made with a second predetermined process.

An intelligent television system comprising: a memory operable to store social media data; a processor in communication with the memory, the processor operable to: execute a user interface application operable to: display content by the intelligent television; receive a selection of a control device associated with the intelligent television; and execute a social media application in communication with the user interface application, the social media application operable to: based on the selection, automatically publish information about the content to a social media site.

An aspect of the above intelligent television system includes wherein the control device is one of an ooh-ahh button on a remote control or a user-selectable ooh-ahh device displayed on a user interface by the intelligent television.

An aspect of the above intelligent television system includes wherein the social media application is further operable to: determine a state of the content; and based on the determination, publish the information, wherein a social media posting is made with the information.

An aspect of the above intelligent television system includes wherein the social media posting is made to two or more social media sites, wherein the social media posting is made by a predetermined process, wherein the social media posting to a first social media site is made with a first predetermined process, and wherein the social media posting to a second social media site is made with a second predetermined process.

An aspect of the above intelligent television system includes wherein the social media posting is one of a name of the content, a thumbnail view of the content, a sound bite from the content, a rating of the content, or an opinion about the content.

Omitted

An aspect of the above computer readable medium includes wherein the control device is one of an ooh-ahh button on a remote control or a user-selectable ooh-ahh device displayed on a user interface by the intelligent television.

An aspect of the above computer readable medium further comprises instructions to: determine a state of the content; and based on the determination, publish the information, wherein a social media posting is made with the information.

An aspect of the above computer readable medium includes wherein the social media posting is made to two or more social media sites, wherein the social media posting is made by a predetermined process, wherein the social media posting to a first social media site is made with a first predetermined process, and wherein the social media posting to a second social media site is made with a second predetermined process.

An aspect of the above computer readable medium includes wherein the social media posting is one of a name of the content, a thumbnail view of the content, a sound bite from the content, a rating of the content, or an opinion about the content.

A method for providing social media on an intelligent television, the method comprising: receiving one or more social media postings; receiving, by a processor of the intelligent television, a selection to provide a social media application; determining a state associated with a social media posting; providing a user interface, for the social media application, having the social media posting displayed based on the state.

An aspect of the above method includes wherein the state is associated with metadata about the social media posting.

An aspect of the above method includes wherein the state is a date at which the social media posting was published.

An aspect of the above method includes wherein the user interface is a timeline view having two or more social media postings displayed by the date.

An aspect of the above method includes wherein the user interface includes a demarcation, wherein the demarcation is associated with the date.

An aspect of the above method includes wherein a first social media posting to a left of the demarcation was published before a second social media posting to a right of the demarcation.

An aspect of the above method includes wherein the demarcation includes a visual indicia of the date.

An aspect of the above method includes wherein a second state is a number of views of the social media posting.

An aspect of the above method includes wherein a first social media posting having a larger thumbnail representation has been viewed more than a second social media posting with a smaller thumbnail representation.

An aspect of the above method includes wherein a user moves a focus to a thumbnail representation of the social media posting and selects a remote control device or button to view the social media posting.

An intelligent television system comprising: a memory operable to store social media data; a processor in communication with the memory, the processor operable to: execute a social media application operable to: receive one or more social media postings; determine a state associated with a social media posting; execute a user interface application in communication with the social media application, the user interface application operable to: receive a selection to provide a social media application; and provide a user interface, for the social media application, having the social media posting displayed based on the state.

An aspect of the above intelligent television system includes wherein the state is associated with metadata about the social media posting.

An aspect of the above intelligent television system includes wherein the state is a date at which the social media posting was published, wherein the user interface is a timeline view having two or more social media postings displayed by the date, wherein the user interface includes a demarcation, wherein the demarcation is associated with the date, wherein a first social media posting to a left of the demarcation was published before a second social media posting to a right of the demarcation, and wherein the demarcation includes a visual indicia of the date.

An aspect of the above intelligent television system includes wherein a second state is a number of views of the social media posting, and wherein a first social media posting having a larger thumbnail representation has been viewed more than a second social media posting with a smaller thumbnail representation.

An aspect of the above intelligent television system includes wherein a user moves a focus to a thumbnail representation of the social media posting and selects a remote control device or button to view the social media posting.

Omitted

An aspect of the above computer readable medium includes wherein the state is associated with metadata about the social media posting.

An aspect of the above computer readable medium includes wherein the state is a date at which the social media posting was published, wherein the user interface is a timeline view having two or more social media postings displayed by the date, wherein the user interface includes a demarcation, wherein the demarcation is associated with the date, wherein a first social media posting to a left of the demarcation was published before a second social media posting to a right of the demarcation, and wherein the demarcation includes a visual indicia of the date.

An aspect of the above computer readable medium includes wherein a second state is a number of views of the social media posting, and wherein a first social media posting having a larger thumbnail representation has been viewed more than a second social media posting with a smaller thumbnail representation.

An aspect of the above computer readable medium includes wherein a user moves a focus to a thumbnail representation of the social media posting and selects a remote control device or button to view the social media posting.

The methods and systems herein provide a more intuitive and visual appealing process for both presenting social media with television content and publishing social media associated with a user viewing television content.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

A "blog" (a blend of the term web log) is a type of website or part of a website supposed to be updated with new content from time to time. Blogs are usually maintained by an individual with regular entries of commentary, descriptions of events, or other material such as graphics or video. Entries are commonly displayed in reverse-chronological order.

A "blogging service" is a blog-publishing service that allows private or multi-user blogs with time-stamped entries.

The term "cable TV" refers to a system of distributing television programs to subscribers via radio frequency (RF) signals transmitted through coaxial cables or light pulses through fiber-optic cables. This contrasts with traditional broadcast television (terrestrial television) in which the television signal is transmitted over the air by radio waves and received by a television antenna attached to the television.

The term "channel" or "television channel," as used herein, can be a physical or virtual channel over which a television station or television network is distributed. A physical cannel in analog television can be an amount of bandwidth, typically 6, 7, or 8 MHz, that occupies a predetermine channel frequency. A virtual channel is a representation, in cable or satellite television, of a data stream for a particular television media provider (e.g., CDS, TNT, HBO, etc.).

The term "computer-readable medium," as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "enhanced television" (ETV) refers to a collection of specifications developed under the OpenCable project of CableLabs (Cable Television Laboratories, Inc.) that define an ETV Application consisting of resources (files) adhering to the Enhanced TV Binary Interchange Format (EBIF) content format as well as PNG images, JPEG images, and PFR downloadable fonts. An ETV application is normally delivered through an MPEG transport stream and accompanies an MPEG program containing video and audio elementary streams. An "ETV Application" is a collection of resources (files) that include one or more EBIF resources that represent viewable information in the form of pages. Two forms of a given ETV Application may be distinguished: (1) an interchange form and (2) an execution form. The interchange form of an ETV Application consists of the resources (files) that represent the compiled application prior to its actual execution by an ETV User Agent. The execution form of an ETV Application consists of the stored, and possibly mutated forms of these resources while being decoded, presented, and executed by an ETV User Agent. An "ETV User Agent" is a software component that operates on a set-top box, a television, or any other computing environment capable of receiving, decoding, presenting, and processing an ETV Application. This component usually provides, along with its host hardware environment, one or more mechanisms for an end-user to navigate and interact with the multimedia content represented by ETV Applications.

The term "high-definition television" (HDTV) provides a resolution that is substantially higher than that of standard-definition television. HDTV may be transmitted in various formats, namely 1080 p-1920×1080 p: 2,073,600 pixels (approximately 2.1 megapixels) per frame, 1080i (which is typically either 1920×1080i: 1,036,800 pixels (approximately 1 megapixel) per field or 2,073,600 pixels (approximately 2.1 megapixels) per frame or 1440×1080i:[1] 777,600 pixels (approximately 0.8 megapixels) per field or 1,555,200 pixels (approximately 1.6 megapixels) per frame), or 720 p-1280×720 p: 921,600 pixels (approximately 0.9 megapixels) per frame. As will be appreciated, "frame size" in pixels is defined as number of horizontal pixels×number of vertical pixels, for example 1280×720 or 1920×1080. Often the number of horizontal pixels is implied from context and is omitted, as in the case of 720 p and 1080 p, "scanning system" is identified with the letter "p" for progressive scanning or "i" for interlaced scanning, and "frame rate" is identified as number of video frames per second. For interlaced systems an alternative form of specifying number of fields per second is often used. For purposes of this disclosure, "high-definition television" is deemed to include other high-definition analog or digital video formats, including ultra high definition television.

The term "internet television" (otherwise known as Internet TV, Online Television, or Online TV) is the digital distribution of television content via the Internet. It should not be confused with Web television—short programs or videos created by a wide variety of companies and individuals, or Internet protocol television (IPTV)—an emerging internet technology standard for use by television broadcasters. Internet Television is a general term that covers the delivery of television shows and other video content over the internet by video streaming technology, typically by major traditional television broadcasters. It does not describe a technology used to deliver content (see Internet protocol television). Internet television has become very popular through services such as RTÉ Player in Ireland; BBC iPlayer, 4oD, ITV Player (also STV Player and UTV Player) and Demand Five in the United Kingdom; Hulu in the United States; Nederland 24 in the Netherlands; ABC iview and Australia Live TV in Australia; Tivibu in Turkey; and iWanTV! in the Philippines.

The term "internet protocol television" (IPTV) refers to a system through which television services are delivered using the Internet protocol suite over a packet-switched network such as the Internet, instead of being delivered through traditional terrestrial, satellite signal, and cable television formats. IPTV services may be classified into three main groups, namely live television, with or without interactivity related to the current TV show; time-shifted television: catch-up TV (replays a TV show that was broadcast hours or days ago), start-over TV (replays the current TV show from its beginning); and video on demand (VOD): browse a catalog of videos, not related to TV programming IPTV is distinguished from Internet television by its on-going standardization process (e.g., European Telecommunications Standards Institute) and preferential deployment scenarios in subscriber-based telecommunications networks with high-speed access channels into end-user premises via set-top boxes or other customer-premises equipment.

The term "silo," as used herein, can be a logical representation of an input, source, or application. An input can be a device or devices (e.g., DVD, VCR, etc.) electrically connected to the television through a port (e.g., HDMI, video/audio inputs, etc.) or through a network (e.g., LAN WAN, etc.). Rather than a device or devices, the input could be configured as an electrical or physical connection to one or more devices. A source, particularly a content source, can be a data service that provides content (e.g., a media center, a file system, etc.). An application can be a software service that provides a particular type of function (e.g., Live TV, Video on Demand, User Applications, photograph display, etc.). The silo, as a logical representation, can have an associated definition or property, such as a setting, feature, or other characteristic.

The term "panel," as used herein, can mean a user interface displayed in at least a portion of the display. The panel may be interactive (e.g., accepts user input) or informational (e.g., does not accept user input). A panel may be translucent whereby the panel obscures but does not mask the underlying content being displayed in the display. Panels may be provided in response to a user input from a button or remote control interface.

The term "screen," as used herein, refers to a physical structure that includes one or more hardware components that provide the device with the ability to render a user interface and/or receive user input. A screen can encompass any combination of gesture capture region, a touch sensitive display, and/or a configurable area. The device can have one or more physical screens embedded in the hardware. However a screen may also include an external peripheral device that may be attached and detached from the device. In embodiments, multiple external devices may be attached to the device. For example, another screen may be included with a remote control unit that interfaces with the Intelligent TV.

The term "media" of "multimedia," as used herein, refers to content that may assume one of a combination of different content forms. Multimedia can include one or more of, but is not limited to, text, audio, still images, animation, video, or interactivity content forms.

The term "Intelligent TV," as used herein, refers to a television configured to provide one or more intuitive user interfaces and interactions based on a unique application platform and architecture. The Intelligent TV utilizes processing resources associated with the television to integrate Internet connectivity with parallel application functionality. This integration allows a user the ability to intuitively access various sources of media and content (e.g., Internet, over-the-top content, on-demand streaming media, over-the-air broadcast media, and/or other forms of information) via the Intelligent TV in a quick and efficient manner. The Intelligent TV can be a soft television. Although the Intelligent TV disclosed herein may comprise one or more components of a "smart TV," it is an aspect of the Intelligent TV to provide expanded intuitive user interaction capability for navigating and executing the various features of the television. A "smart TV," sometimes referred to as a connected TV, or hybrid TV (not to be confused with IPTV, Internet TV, or with Web TV), describes a trend of integration of the Internet and Web 2.0 features into television sets and set-top boxes, as well as the technological convergence between computers and these television sets/set-top boxes. The smart TV devices have a higher focus on online interactive media, Internet TV, over-the-top content, as well as on-demand streaming media, and less focus on traditional broadcast media than traditional television sets and set-top boxes. As can be appreciated, the Intelligent TV encompasses a broader range of technology than that of the smart TV defined above.

The term "television" is a telecommunication medium, device (or set) or set of associated devices, programming, and/or transmission for transmitting and receiving moving images that can be monochrome (black-and-white) or colored, with or without accompanying sound. Different countries use one of the three main video standards for TVs, namely PAL, NTSC or SECAM. Television is most commonly used for displaying broadcast television signals. The broadcast television system is typically disseminated via radio transmissions on designated channels in the 54-890 MHz frequency band. A common television set comprises multiple internal electronic circuits, including those for receiving and decoding broadcast signals. A visual display device which lacks a tuner is properly called a video monitor, rather than a television. A television may be different from other monitors or displays based on the distance maintained between the user and the television when the user watches the media and based on the inclusion of a tuner or other electronic circuit to receive the broadcast television signal.

The term "Live TV," as used herein, refers to a television production broadcast in real-time, as events happen, in the present.

The term "standard-definition television" (SDTV) is a television system that uses a resolution that is not considered to be either high-definition television (HDTV 720 p and 1080 p) or enhanced-definition television (EDTV 480 p). The two common SDTV signal types are 576i, with 576 interlaced lines of resolution, derived from the European-developed PAL and SECAM systems; and 480i based on the American National Television System Committee NTSC system. In the US, digital SDTV is broadcast in the same 4:3 aspect ratio as NTSC signals. However, in other parts of the world that used the PAL or SECAM analog standards, standard-definition television is now usually shown with a 16:9 aspect ratio. Standards that support digital SDTV broadcast include DVB, ATSC and ISDB. Television signals are transmitted in digital form, and their pixels have a rectangular shape, as opposed to square pixels that are used in modern computer monitors and modern implementations of HDTV. The table below summarizes pixel aspect ratios for various kinds of SDTV video signal. Note that the actual image (be it 4:3 or 16:9) is always contained in the center 704 horizontal pixels of the digital frame, regardless of how many horizontal pixels (704 or 720) are used. In case of digital video signal having 720 horizontal pixels, only the center 704 pixels contain actual 4:3 or 16:9 image, and the 8 pixel wide stripes from either side are called nominal analogue blanking and should be discarded before displaying the image. Nominal analogue blanking should not be confused with overscan, as overscan areas are part of the actual 4:3 or 16:9 image.

The term "video on demand (VOD)," as used herein, refers to systems and processes which allow users to select and watch/listen to video or audio content on demand. VOD systems may stream content, to view the content in real time, or download the content to a storage medium for viewing at a later time.

The term "satellite positioning system receiver" refers to a wireless receiver or transceiver to receive and/or send location signals from and/or to a satellite positioning system, such as the Global Positioning System ("GPS") (US), GLO-NASS (Russia), Galileo positioning system (EU), Compass navigation system (China), and Regional Navigational Satellite System (India).

The term "display," as used herein, refers to at least a portion of a screen used to display the output of the television to a user. A display may be a single-screen display or a multi-screen display, referred to as a composite display. A composite display can encompass the touch sensitive display of one or more screens. A single physical screen can include multiple displays that are managed as separate logical displays. Thus, different content can be displayed on the separate displays although part of the same physical screen.

The term "displayed image," as used herein, refers to an image produced on the display. A typical displayed image is a television broadcast or menu. The displayed image may occupy all or a portion of the display.

The term "display orientation," as used herein, refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical.

The term "module," as used herein, refers to any known or later developed hardware, software, firmware, artificial intelligence, fuzzy logic, or combination of hardware and software that is capable of performing the functionality associated with that element.

The terms "determine," "calculate" and "compute," and variations thereof, as used herein, are used interchangeably and include any type of methodology, process, mathematical operation or technique.

The term "touch screen" or "touchscreen" refer to screen that can receive user contact or other tactile input, such as a stylus. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "web television" is original television content produced for broadcast via the World Wide Web. Some major distributors of web television are YouTube, Myspace, Newgrounds, Blip.tv, and Crackle.

The terms "instant message" and "instant messaging" refer to a form of real-time text communication between two or more people, typically based on typed text.

The term "internet search engine" refers to a web search engine designed to search for information on the World Wide Web and FTP servers. The search results are generally presented in a list of results often referred to as SERPS, or "search engine results pages". The information may consist of web pages, images, information and other types of files. Some search engines also mine data available in databases or open directories. Web search engines work by storing information about many web pages, which they retrieve from the html itself. These pages are retrieved by a Web crawler (sometimes also known as a spider)—an automated Web browser which follows every link on the site. The contents of each page are then analyzed to determine how it should be indexed (for example, words are extracted from the titles, headings, or special fields called meta tags). Data about web pages are stored in an index database for use in later queries. Some search engines, such as Google™, store all or part of the source page (referred to as a cache) as well as information about the web pages, whereas others, such as AltaVista™, store every word of every page they find.

The terms "online community", "e-community", or "virtual community" mean a group of people that primarily interact via a computer network, rather than face to face, for social, professional, educational or other purposes. The interaction can use a variety of media formats, including wilds, blogs, chat rooms, Internet forums, instant messaging, email, and other forms of electronic media. Many media formats are used in social software separately or in combination, including text-based chatrooms and forums that use voice, video text or avatars.

The term "remote control" refers to a component of an electronics device, most commonly a television set, DVD player and/or home theater system for operating the device wirelessly, typically from a short line-of-sight distance. Remote control normally uses infrared and/or radio frequency (RF) signaling and can include WiFi, wireless USB, Bluetooth™ connectivity, motion sensor enabled capabilities and/or voice control. A touchscreen remote control is a handheld remote control device which uses a touchscreen user interface to replace most of the hard, built-in physical buttons used in normal remote control devices.

The term "satellite TV" refers to television programming delivered by the means of communications satellites and received by an outdoor antenna, usually a parabolic reflector generally referred to as a satellite dish, and as far as household usage is concerned, a satellite receiver either in the form of an external set-top box or a satellite tuner module built into a TV set.

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The term "social network" refers to a web-based social network.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "gesture capture" refers to a sense or otherwise a detection of an instance and/or type of user gesture. The gesture capture can occur in one or more areas of the screen. A gesture region can be on the display, where it may be referred to as a touch sensitive display or off the display where it may be referred to as a gesture capture area.

The term "electronic address" refers to any contactable address, including a telephone number, instant message handle, e-mail address, Universal Resource Locator (URL), Universal Resource Identifier (URI), Address of Record (AOR), electronic alias in a database, like addresses, and combinations thereof.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "social media" can refer to the means of interactions among people in which they create, share, and exchange information and ideas in virtual communities and networks. Embodiments of social media can include a group of Internet-based applications that allow the creation and exchange of content. Furthermore, social media may depend on mobile and web-based technologies to create highly interactive platforms through which individuals and communities share, co-create, discuss, and modify user-generated content. Social media differentiates from traditional/industrial media in many aspects such as quality, reach, frequency, usability, immediacy, and permanence.

The term "social media site" can refer to a social network or social network service.

The term "social media posting" can refer to an item of content or a provider of content on a social media site.

The term "social media poster" can refer to an author of an item of content or a provider of content on a social media site.

The term "social media pile" can refer to a user interface where each social media posters is represented by a thumbnail or other visual indicia. The social media pile can include two or more thumbnails or visual indicia formed into an arrangement that resembles a pile.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 11A is a front view of an embodiment of an Intelligent TV screen;

FIG. 11B is a front view of an embodiment of an Intelligent TV screen;

FIG. 11C is a front view of an embodiment of an Intelligent TV screen;

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a device. The device can be a network-enabled telecommunications device, such as a television, an electronic visual display device, or other smart device. The device can include one or more screens, or sections of a screen, that are configured to receive and present information from a number of sources. Further, the device can receive user input in unique ways. The overall design and functionality of the device provides for an enhanced user experience making the device more useful and more efficient.

Figure 1A:
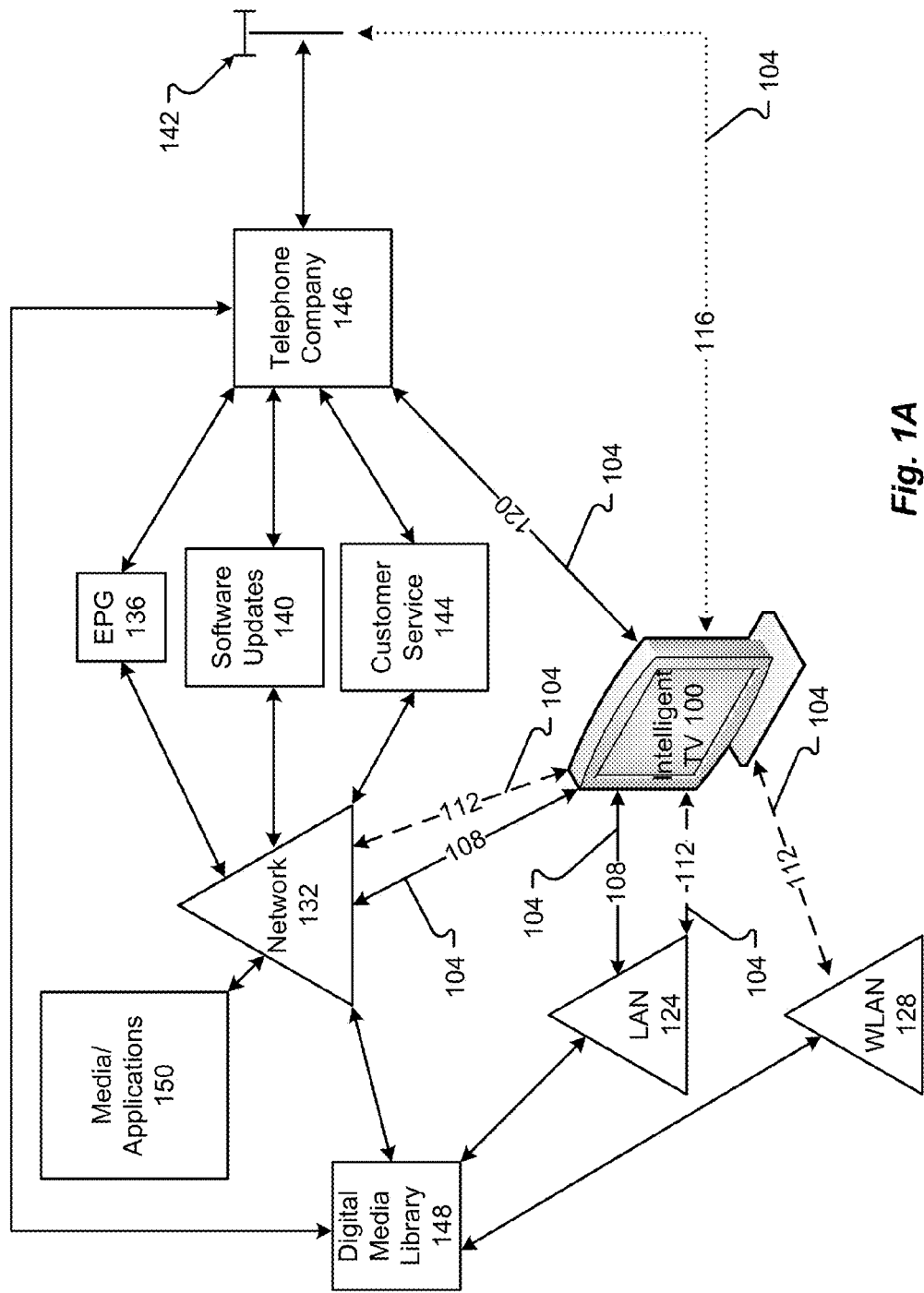
FIG. 1A includes a first view of an embodiment of an environment of an intelligent television.
Figure 1B:
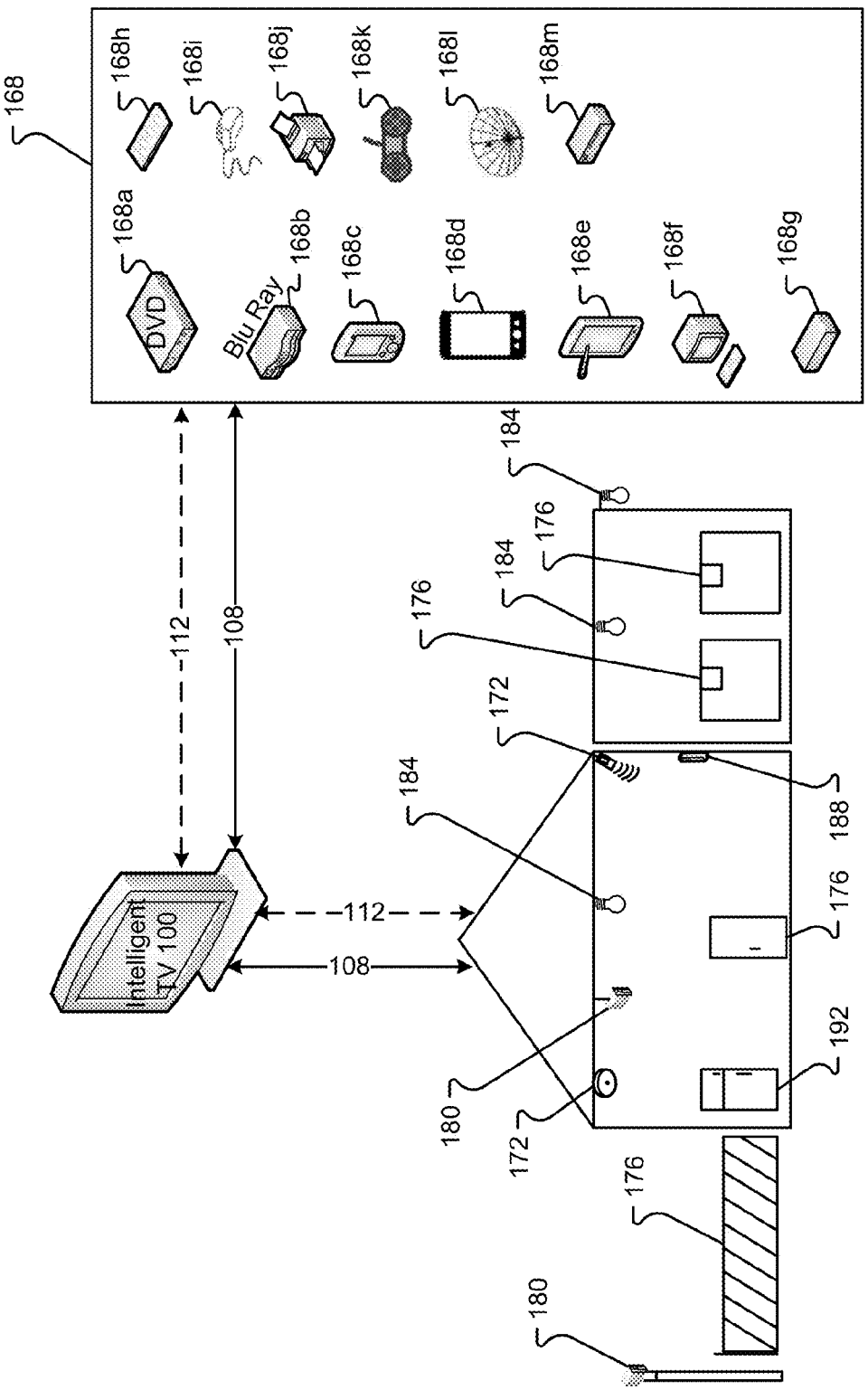
FIG. 1B includes a second view of an embodiment of an environment of an intelligent television.

Intelligent Television (TV) Environment:

Referring to FIGS. 1A and 1B, an Intelligent TV, or device, 100 is shown. It is anticipated that the Intelligent TV 100 may be used for entertainment, business applications, social interaction, content creation and/or consumption, and to organize and control one or more other devices that are in communication with the Intelligent TV 100. As can be appreciated, the Intelligent TV 100 can be used to enhance the user interactive experience whether at home or at work.

In some embodiments, the Intelligent TV 100 may be configured to receive and understand a variety of user and/or device inputs. For example, a user may interface with the Intelligent TV 100 via one or more physical or electrical controls, such as buttons, switches, touch sensitive screens/regions (e.g., capacitive touch, resistive touch, etc.), and/or other controls associated with the Intelligent TV 100. In some cases, the Intelligent TV 100 may include the one or more interactive controls. Additionally or alternatively, the one or more controls may be associated with a remote control. The remote control may communicate with the Intelligent TV 100 via wired and/or wireless signals. As can be appreciated, the remote control may operate via radio frequency (RF), infrared (IR), and/or a specific wireless communications protocol (e.g., Bluetooth™, Wi-Fi, etc.). In some cases, the controls, whether physical or electrical, may be configured (e.g., programmed) to suit a user's preferences.

Additionally or alternatively, smart phones, tablets, computers, laptops, netbooks, and other smart devices may be used to control the Intelligent TV 100. For example, control of the Intelligent TV 100 may be achieved via an application running on a smart device. The application may be configured to present a user with various Intelligent TV 100 controls in an intuitive user interface (UI) on a screen associated with the device 100. The screen may be a touch sensitive, or touch screen, display. Selections input by a user via the UI may be configured to control the Intelligent TV 100 by the application accessing one or more communication features associated with the smart device.

It is anticipated that the Intelligent TV 100 can receive input via various input devices including, but in no way limited to, video, audio, radio, light, tactile, and combinations thereof. Among other things, these input devices may be configured to allow the Intelligent TV 100 to see, recognize, and react to user gestures. For instance, a user may talk to the Intelligent TV 100 in a conversational manner. The Intelligent TV 100 may hear and understand voice commands in a manner similar to a smart device's intelligent personal assistant and voice-controlled navigator application (e.g., Apple's Siri, Android's Skyvi, Robin, his, and other applications).

The Intelligent TV 100 may also be a communications device which can establish network connections 104 through many alternate means, including wired 108 or wireless 112 means, over cellular networks 116 to connect via cellular base antenna 142 to telephone networks operated by telephone company 146, and by using a telephone line 120 to connect to telephone networks operated by telephone company 146. These connections 104 enable the Intelligent TV 100 to access one or more communication networks 132. The communication networks may comprise any type of known communication medium or collection of communication media and may use any type of protocols to transport messages or signals between endpoints. The communication networks may include wired and/or wireless communication technologies. The Internet is an example of a communication network 132 that constitutes an Internet Protocol (IP) network consisting of many computers, computing networks, and other communication devices located all over the world, which are connected through many telephone systems and other means.

Other examples of the communication network 132 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 132 need not be limited to any one network type, and instead may be comprised of a number of different networks and/or network types.

In some embodiments, the Intelligent TV 100 may be equipped with multiple communication means. The multiple communication means may allow the Intelligent TV 100 to communicate across Local Area Networks (LANs) 124, wireless local area networks (WLANs) 128, and other networks 132. The networks 132 may be connected in a redundant manner to ensure network access. In other words, if one connection is interrupted, the Intelligent TV 100 can use an alternate communications path to reestablish and/or maintain the network connection 104. Among other things, the Intelligent TV 100 may use these network connections 104 to send and receive information, interact with an electronic program guide (EPG) 136, receive software updates 140, contact customer service 144 (e.g., to receive help or service, etc.), and/or access remotely stored digital media libraries 148. In addition, these connections can allow the Intelligent TV 100 to make phone calls, send and/or receive email messages, send and/or receive text messages (such as email and instant messages), surf the Internet using an internet search engine, post blogs by a blogging service, and connect/interact with social media sites and/or an online community (e.g., Facebook™ Twitter™, LinkedIn™, Pinterest™, Google+™, MySpace™, and the like) maintained by a social network service. In combination with other components of the Intelligent TV 100 described in more detail below, these network connections 104 also enable the Intelligent TV 100 to conduct video teleconferences, electronic meetings, and other communications. The intelligent TV 100 may capture and store images and sound, using associated cameras, microphones, and other sensors. Additionally or alternatively, the Intelligent TV 100 may create and save screen shots of media, images, and data displayed on a screen associated with the Intelligent TV 100.

Further, as shown in FIG. 1B, the Intelligent TV 100 can interact with other electronic devices 168 by either by the wired 108 and/or wireless 112 connections. As described herein, components of the Intelligent TV 100 allow the device 100 to be connected to devices 168 including, but not limited to, DVD players 168*a*, BluRay players 168*b*, portable digital media devices 168*c*, smart phones 168*d*, tablet devices 168*e*, personal computers 168*f*, external cable boxes 168*g*, keyboards 168*h*, pointing devices 168*i*, printers 168*j*, game controllers and/or game pads 168*k*, satellite dishes 168*l*, external display devices 168*m*, and other universal serial bus (USB), local area network (LAN), Bluetooth™, or high-definition multimedia interface (HDMI) compliant devices, and/or wireless devices. When connected to an external cable box 168*g* or satellite dish 168*l*, the Intelligent TV 100 can access additional media content. Also, as further described below, the Intelligent TV 100 is capable of receiving digital and/or analog signals broadcast by TV stations. The Intelligent TV 100 can be configured as one or more of a standard-definition television, enhanced television, and high-definition television. It may operate as one or more of cable, Internet, Internet Protocol, satellite, web, and/or smart television. The Intelligent TV 100 may also be used to control the operation of, and may interface with, other smart components such as security systems 172, door/gate controllers 176, remote video cameras 180, lighting systems 184, thermostats 188, refrigerators 192, and other appliances.

Figure 2A:
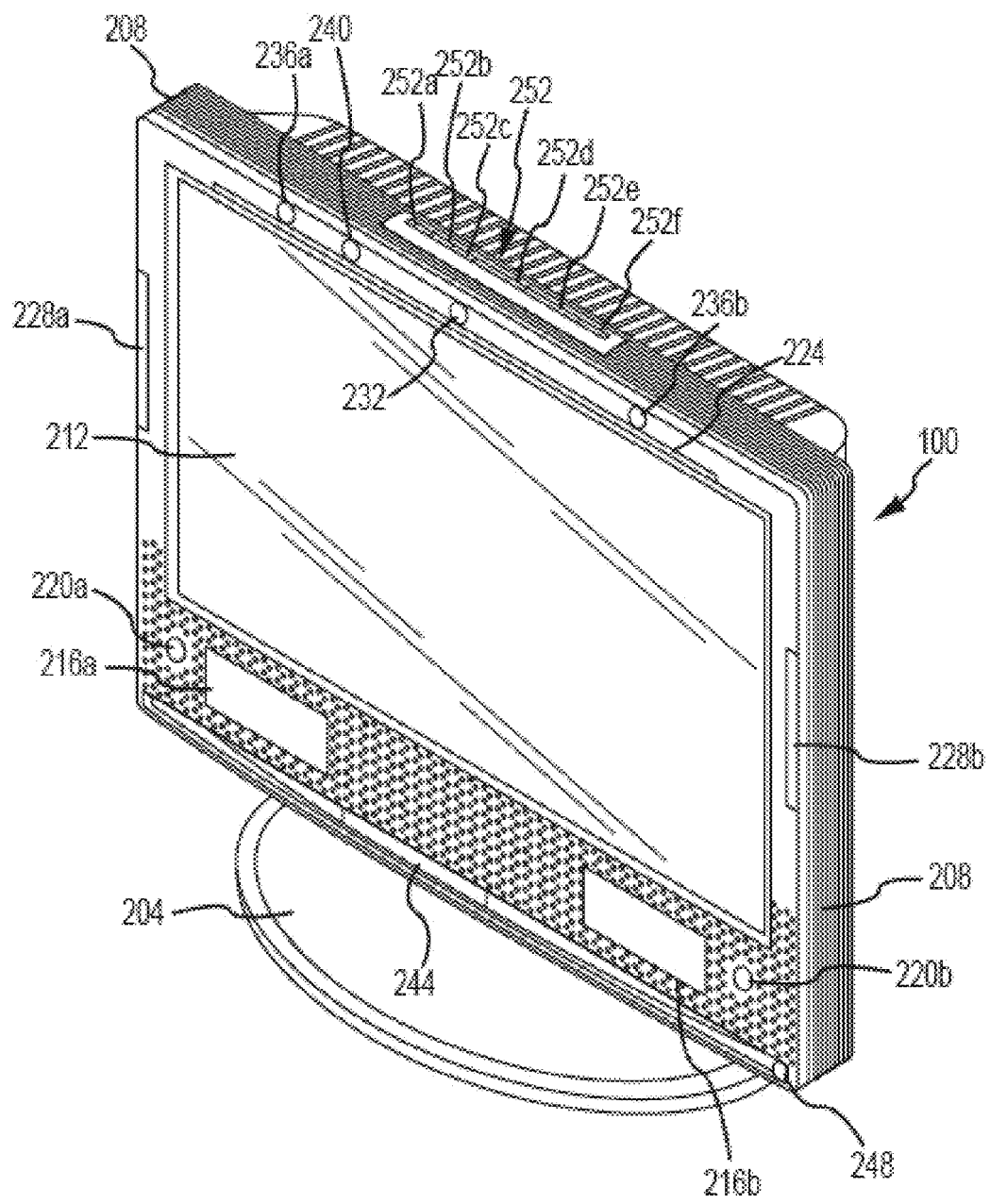
FIG. 2A includes a first view of an embodiment of an intelligent television.

Intelligent TV:

FIGS. 2A-2D illustrate components of the Intelligent TV 100. In general, as shown by FIG. 2A, the Intelligent TV 100 can be supported by a removable base or stand 204 that is attached to a frame 208. The frame 208 surrounds edges of a display screen 212, leaving a front surface of the display screen 212 uncovered. The display screen 212 may comprise a Liquid Crystal Display (LCD) screen, a plasma screen, Light Emitting Diode (LED) screen, or other screen types. In embodiments, the entire front surface of the screen 212 may be touch sensitive and capable of receiving input by the user touching the front surface of the screen 212.

The intelligent TV 100 may include integrated speakers 216 and at least one microphone 220. A first area of the frame 208 may comprise a horizontal gesture capture region 224 and second areas comprise vertical gesture capture regions 228. The gesture capture regions 224, 228 may comprise areas or regions that are capable of receiving input by recognizing gestures made by the user, and in some examples, without the need for the user to actually touch the screen 212 surface of the Intelligent TV 100. However, the gesture capture regions 224, 228 may not include pixels that can perform a display function or capability.

One or more image capture devices 232, such as a camera, can be included for capturing still and/or video images. The image capture device 232 can include or be associated with additional elements, such as a flash or other light source 236 and a range finding device 240 to assist focusing of the image capture device. In addition, the microphone 220, gesture capture regions 224, 228, image capture devices 232, and the range finding device 240 may be used by the Intelligent TV 100 to recognize individual users. Additionally or alternatively, the Intelligent TV 100 may learn and remember preferences associated with the individual users. In some embodiments, the learning and remembering (i.e., identifying and recalling stored information) may be associated with the recognition of a user.

An IR transmitter and receiver 244 may also be provided to connect the Intelligent TV 100 with a remote control device (not shown) or other IR devices. Additionally or alternatively, the remote control device may transmit wireless signals via RF, light, and/or a means other than IR. Also shown in FIG. 2A is an audio jack 248, which may be hidden behind a panel that is hinged or removable. The audio jack 248 accommodates a tip, ring, sleeve (TRS) connector, for example, to allow the user to utilize headphones, a headset, or other external audio equipment.

The Intelligent TV 100 can also include a number of buttons 252. For example, FIG. 2A illustrates the buttons 252 on the top of the Intelligent TV 100, although the buttons could be placed at other locations. As shown, the Intelligent TV 100 includes six buttons 252a-f, which can be configured for specific inputs. For example, the first button 252a may be configured as an on/off button used to control overall system power to the Intelligent TV 100. The buttons 252 may be configured to, in combination or alone, control a number of aspects of the Intelligent TV 100. Some non-limiting examples include, but are not limited to, overall system volume, brightness, the image capture device, the microphone, and initiation/termination of a video conference. Instead of separate buttons, two of the buttons may be combined into a rocker button. This rocker button arrangement may be useful in situations where the buttons are configured to control features such as volume or brightness. In some embodiments, one or more of the buttons 252 are capable of supporting different user commands. By way of example, a normal press has a duration commonly of less than about 1 second and resembles a quick input. A medium press has a duration commonly of 1 second or more but less than about 12 seconds. A long press has a duration commonly of about 12 seconds or more. The function of the buttons is normally specific to the application that is active on the Intelligent TV 100. In the video conference application for instance and depending on the particular button, a normal, medium, or long press can mean end the video conference, increase or decrease the volume, increase a rate speed associated with a response to an input, and toggle microphone mute. Depending on the particular button, a normal, medium, or long press can also control the image capture device 232 to increase zoom, decrease zoom, take a photograph, or record video.

Figure 2B:
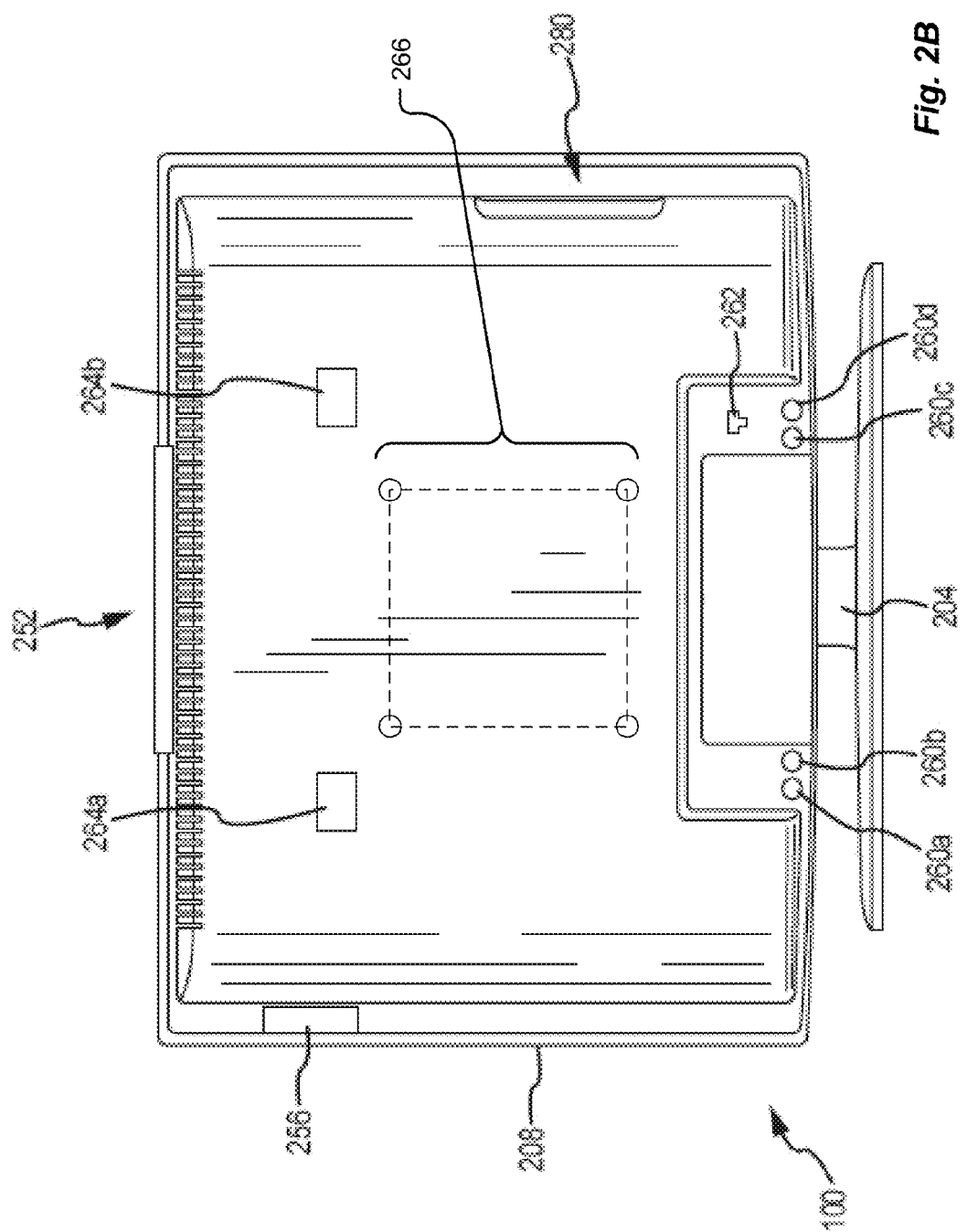
FIG. 2B includes a second view of an embodiment of an intelligent television.

In support of communications functions or capabilities, the Intelligent TV 100 can include one or more shared or dedicated antennae 256 and wired broadband connections 260 as shown in FIG. 2B. The antennae 256 also enable the Intelligent TV 100 to receive digital and/or analog broadcast TV channels. The wired broadband connections 260 are, for example, a Digital Subscriber Line (DSL), an optical line, an Ethernet port, an IEEE 1394 interface, or other interfaces. The Intelligent TV 100 also has a telephone line jack 262 to further provide communications capability.

In addition to the removable base 204, the Intelligent TV 100 may include hardware and mounting points 264 on a rear surface to facilitate mounting the Intelligent TV 100 to a surface, such as a wall. In one example, the Intelligent TV 100 may incorporate at least one Video Equipment Standards Association (VESA) mounting interface for attaching the device 100 to the surface.

Figure 2C:
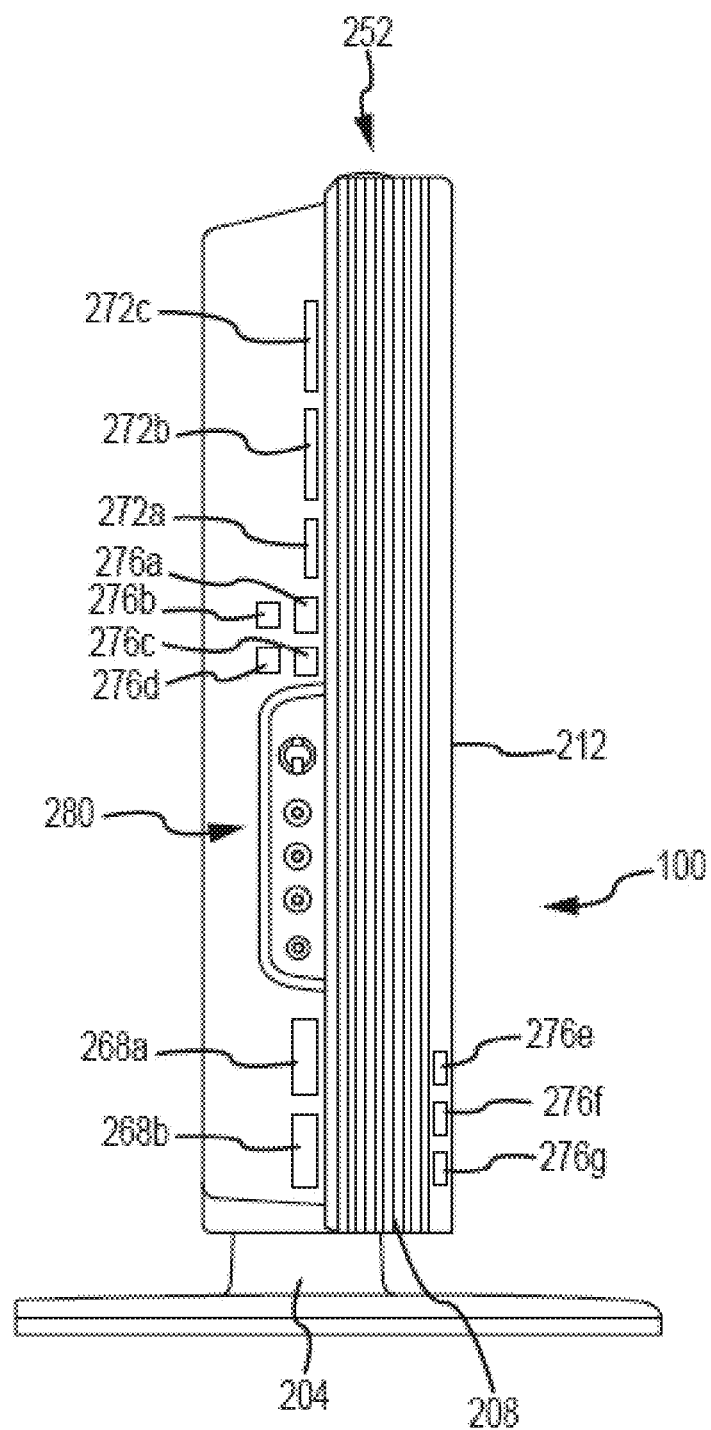
FIG. 2C includes a third view of an embodiment of an intelligent television.
Figure 2D:
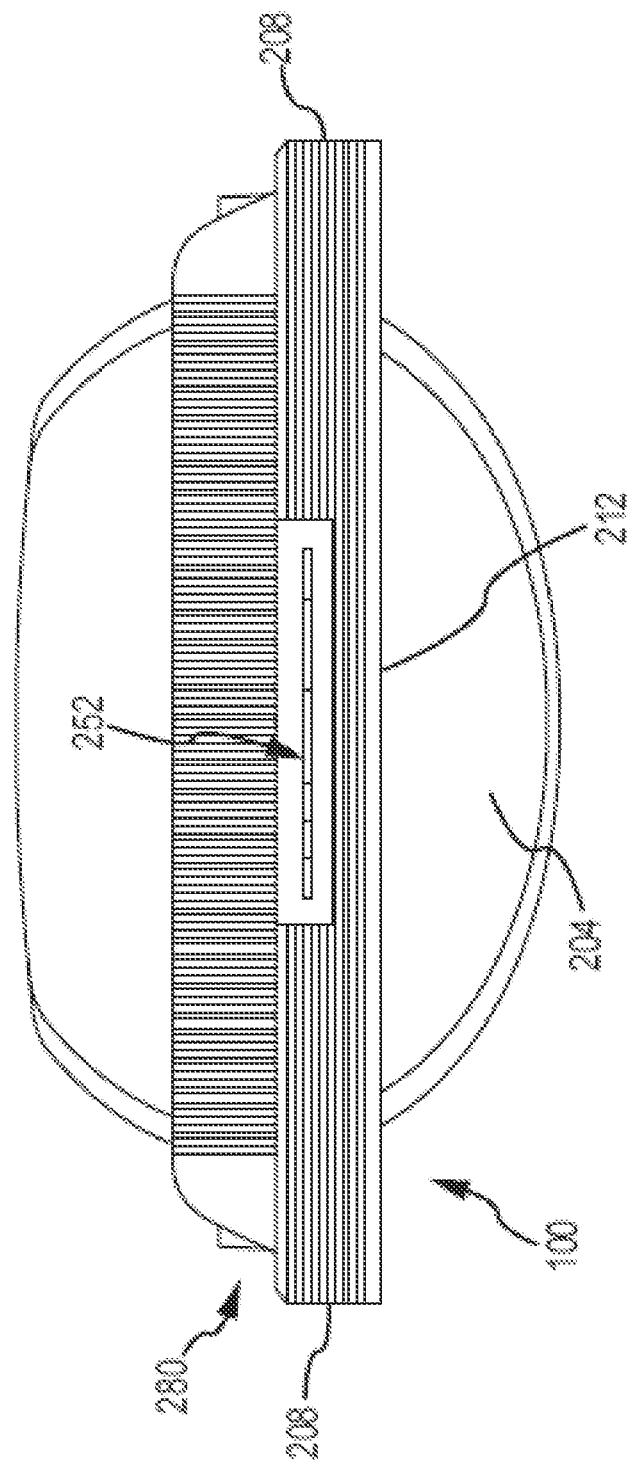
FIG. 2D includes a fourth view of an embodiment of an intelligent television.

As shown in FIG. 2C, the Intelligent TV 100 may include docking interfaces or ports 268. The docking ports 268 may include proprietary or universal ports to support the interconnection of the Intelligent TV 100 to other devices or components, which may or may not include additional or different capabilities from those integral to the Intelligent TV 100. In addition to supporting an exchange of communication signals between the Intelligent TV 100 and a connected device or component, the docking ports 268 can support the supply of power to the connected device or component. The docking ports 268 can also comprise an intelligent element that comprises a docking module for controlling communications or other interactions between the Intelligent TV 100 and the connected device or component.

The Intelligent TV 100 also includes a number of card slots 272 and network or peripheral interface ports 276. The card slots 272 may accommodate different types of cards including subscriber identity modules (SIM), secure digital (SD) cards, MiniSD cards, flash memory cards, and other cards. Ports 276 in embodiments may include input/output (I/O) ports, such as universal serial bus (USB) ports, parallel ports, game ports, and high-definition multimedia interface (HDMI) connectors.

An audio/video (A/V) I/O module 280 can be included to provide audio to an interconnected speaker or other device, and to receive audio input from a connected microphone or other device. As an example, the audio input/output interface 280 may comprise an associated amplifier and analog-to-digital converter.

Figure 3:
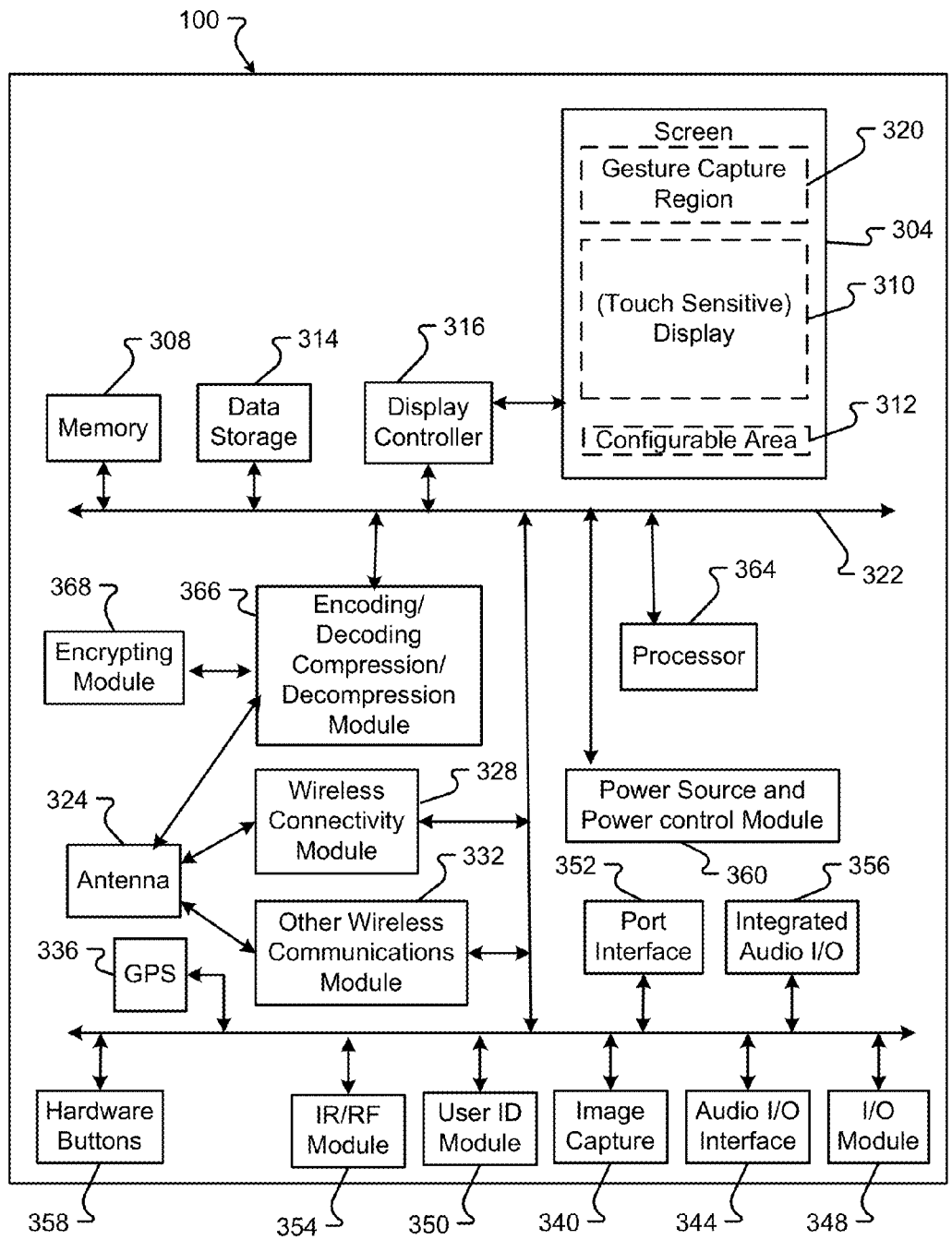
FIG. 3 is a block diagram of an embodiment of the hardware of an intelligent television.

Hardware Features:

FIG. 3 illustrates components of a Intelligent TV 100 in accordance with embodiments of the present disclosure. In general, the Intelligent TV 100 includes a primary screen 304. Screen 304 can be a touch sensitive screen and can include different operative areas.

For example, a first operative area, within the screen 304, may comprise a display 310. In some embodiments, the display 310 may be touch sensitive. In general, the display 310 may comprise a full color, display.

A second area within the screen 304 may comprise a gesture capture region 320. The gesture capture region 320 may comprise an area or region that is outside of the display 310 area, and that is capable of receiving input, for example in the form of gestures provided by a user. However, the gesture capture region 320 does not include pixels that can perform a display function or capability.

A third region of the screen 304 may comprise a configurable area 312. The configurable area 312 is capable of receiving input and has display or limited display capabilities. In embodiments, the configurable area 312 may present different input options to the user. For example, the configurable area 312 may display buttons or other relatable items. Moreover, the identity of displayed buttons, or whether any buttons are displayed at all within the configurable area 312 of a screen 304, may be determined from the context in which the Intelligent TV 100 is used and/or operated.

In an exemplary touch sensitive screen 304 embodiment, the touch sensitive screen 304 comprises a liquid crystal display extending across at least those regions of the touch sensitive screen 304 that are capable of providing visual output to a user, and a capacitive input matrix over those regions of the touch sensitive screen 304 that are capable of receiving input from the user.

One or more display controllers 316 may be provided for controlling the operation of the screen 304. The display controller 316 may control the operation of the touch sensitive screen 304, including input (touch sensing) and output (display) functions. The display controller 316 may also control the operation of the screen 304 and may interface with other inputs, such as infrared and/or radio input signals (e.g., door/gate controllers, alarm system components, etc.). In accordance with still other embodiments, the functions of a display controller 316 may be incorporated into other components, such as a processor 364.

The processor 364 may comprise a general purpose programmable processor or controller for executing application programming or instructions. In accordance with at least some embodiments, the processor 364 may include multiple processor cores, and/or implement multiple virtual processors. In accordance with still other embodiments, the processor 364 may include multiple physical processors. As a particular example, the processor 364 may comprise a specially configured application specific integrated circuit (ASIC) or other integrated circuit, a digital signal processor, a controller, a hardwired electronic or logic circuit, a programmable logic device or gate array, a special purpose computer, or the like. The processor 364 generally functions to run programming code or instructions implementing various functions of the Intelligent TV 100.

In support of connectivity functions or capabilities, the Intelligent TV 100 can include a module for encoding/decoding and/or compression/decompression 366 for receiving and managing digital television information. Encoding/decoding compression/decompression module 366 enables decompression and/or decoding of analog and/or digital information dispatched by a public television chain or in a private television network and received across antenna 324, I/O module 348, wireless connectivity module 328, and/or other wireless communications module 332. The television information may be sent to screen 304 and/or attached speakers receiving analog or digital reception signals. Any encoding/decoding and compression/decompression is performable on the basis of various formats (e.g., audio, video, and data). Encrypting module 368 is in communication with encoding/decoding compression/decompression module 366 and enables the confidentiality of all the data received or transmitted by the user or supplier.

In support of communications functions or capabilities, the Intelligent TV 100 can include a wireless connectivity module 328. As examples, the wireless connectivity module 328 can comprise a GSM, CDMA, FDMA and/or analog cellular telephony transceiver capable of supporting voice, multimedia and/or data transfers over a cellular network. Alternatively or in addition, the Intelligent TV 100 can include an additional or other wireless communications module 332. As examples, the other wireless communications module 332 can comprise a Wi-Fi, Blutooth™, WiMax, infrared, or other wireless communications link. The wireless connectivity module 328 and the other wireless communications module 332 can each be associated with a shared or a dedicated antenna 324 and a shared or dedicated I/O module 348.

An input/output module 348 and associated ports may be included to support communications over wired networks or links, for example with other communication devices, server devices, and/or peripheral devices. Examples of an input/output module 348 include an Ethernet port, a Universal Serial Bus (USB) port, Thunderbolt™ or Light Peak interface, Institute of Electrical and Electronics Engineers (IEEE) 1394 port, or other interface.

An audio input/output interface/device(s) 344 can be included to provide analog audio to an interconnected speaker or other device, and to receive analog audio input from a connected microphone or other device. As an example, the audio input/output interface/device(s) 344 may comprise an associated amplifier and analog-to-digital converter. Alternatively or in addition, the Intelligent TV 100 can include an integrated audio input/output device 356 and/or an audio jack for interconnecting an external speaker or microphone. For example, an integrated speaker and an integrated microphone can be provided, to support near talk or speaker phone operations.

A port interface 352 may be included. The port interface 352 may include proprietary or universal ports to support the interconnection of the device 100 to other devices or components, such as a dock, which may or may not include additional or different capabilities from those integral to the device 100. In addition to supporting an exchange of communication signals between the device 100 and another device or component, the docking port 136 and/or port interface 352 can support the supply of power to or from the device 100. The port interface 352 also comprises an intelligent element that comprises a docking module for controlling communications or other interactions between the Intelligent TV 100 and a connected device or component. The docking module may interface with software applications that allow for the remote control of other devices or components (e.g., media centers, media players, and computer systems).

An Intelligent TV 100 may also include memory 308 for use in connection with the execution of application programming or instructions by the processor 364, and for the temporary or long term storage of program instructions and/or data. As examples, the memory 308 may comprise RAM, DRAM, SDRAM, or other solid state memory. Alternatively or in addition, data storage 314 may be provided. Like the memory 308, the data storage 314 may comprise a solid state memory device or devices. Alternatively or in addition, the data storage 314 may comprise a hard disk drive or other random access memory.

Hardware buttons 358 can be included for example for use in connection with certain control operations. One or more image capture interfaces/devices 340, such as a camera, can be included for capturing still and/or video images. Alternatively or in addition, an image capture interface/device 340 can include a scanner, code reader, or motion sensor. An image capture interface/device 340 can include or be associated with additional elements, such as a flash or other light source. The image capture interfaces/devices 340 may interface with a user ID module 350 that assists in identifying users of the Intelligent TV 100.

The Intelligent TV 100 can also include a global positioning system (GPS) receiver 336. In accordance with embodiments of the present invention, the GPS receiver 336 may further comprise a GPS module that is capable of providing absolute location information to other components of the Intelligent TV 100. As will be appreciated, other satellite-positioning system receivers can be used in lieu of or in addition to GPS.

Power can be supplied to the components of the Intelligent TV 100 from a power source and/or power control module 360. The power control module 360 can, for example, include a battery, an AC-to-DC converter, power control logic, and/or ports for interconnecting the Intelligent TV 100 to an external source of power.

Communication between components of the Intelligent TV 100 is provided by bus 322. Bus 322 may comprise one or more physical buses for control, addressing, and/or data transmission. Bus 322 may be parallel, serial, a hybrid thereof, or other technology.

Figure 4:
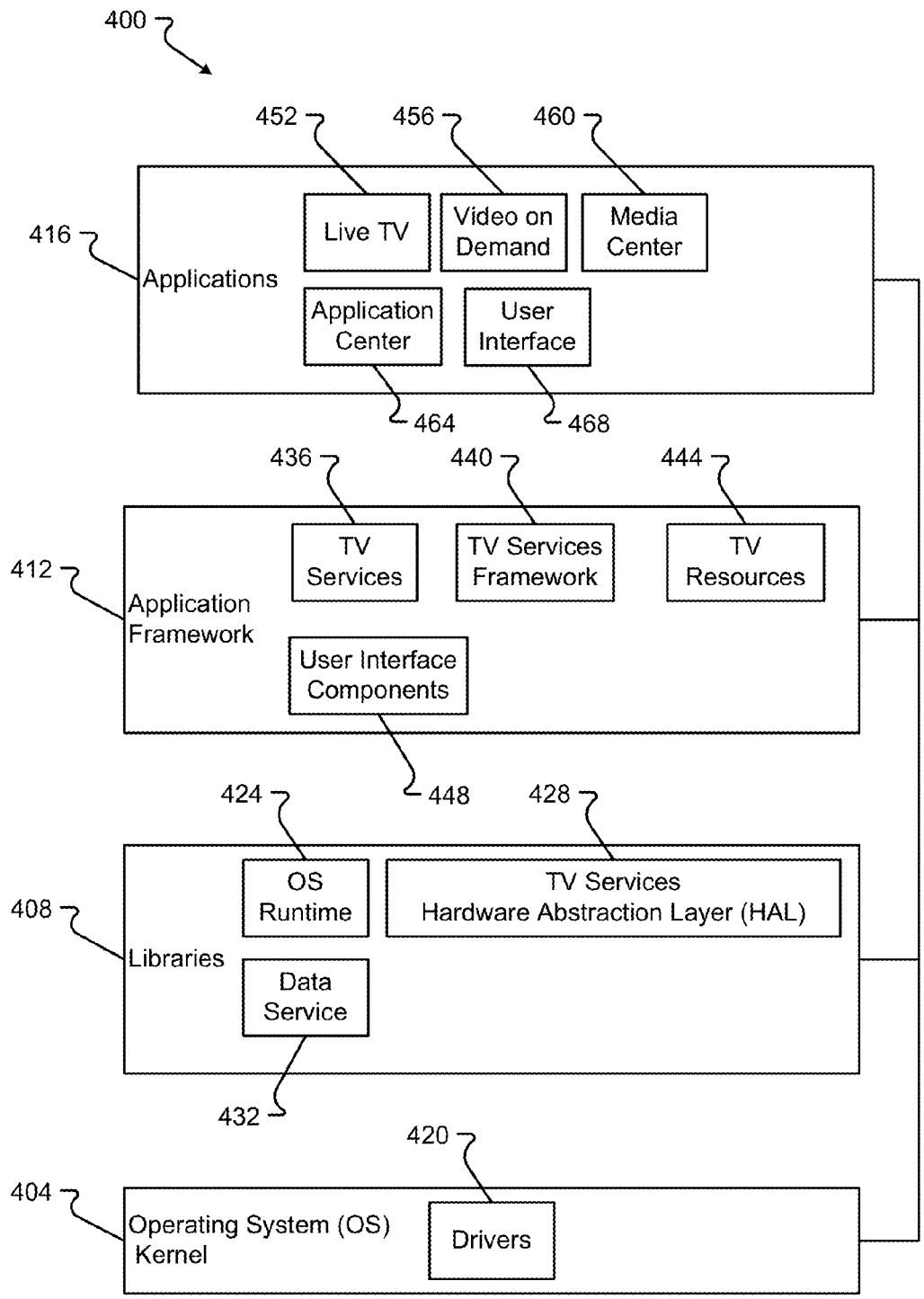
FIG. 4 is a block diagram of an embodiment of the intelligent television software and/or firmware.

Firmware and Software:

An embodiment of the software system components and modules 400 is shown in FIG. 4. The software system 400 may comprise one or more layers including, but not limited to, an operating system kernel 404, one or more libraries 408, an application framework 412, and one or more applications 416. The one or more layers 404-416 can communicate with each other to perform functions for the Intelligent TV 100.

An operating system (OS) kernel 404 contains the primary functions that allow the software to interact with hardware associated with the Intelligent TV 100. Kernel 404 can include a collection of software that manages the computer hardware resources and provides services for other computer programs or software code. The operating system kernel 404 is the main component of the operating system and acts as an intermediary between the applications and data processing done with the hardware components. Part of the operating system kernel 404 can include one or more device drivers 420. A device driver 420 can be any code within the operating system that helps operate or control a device or hardware attached to or associated with the Intelligent TV. The driver 420 can include code for operating video, audio, and/or other multimedia components of the Intelligent TV 100. Examples of drivers include display, camera, flash, binder (IPC), keypad, WiFi, and audio drivers.

Library 408 can contain code or other components that may be accessed and implemented during the operation of the software system 400. The library 408 may contain one or more of, but is not limited to, an operating system runtime library 424, a TV services hardware abstraction layer (HAL) library 428, and/or a data service library 432. The OS runtime library 424 may contain the code required by the operating system kernel 404 or other operating system functions to be executed during the runtime of the software system 400. The library can include the code that is initiated during the running of the software system 400.

The TV services hardware abstraction layer library 428 can include code required by TV services either executed in the application framework 412 or an application 416. The TV services HAL library 428 is specific to the Intelligent TV 100 operations that control different functions of the Intelligent TV. The TV service HAL library 428 can also be formed from other types of application languages or embodiments of different types of code or formats for code beyond the hardware abstraction layer.

Figure 6:
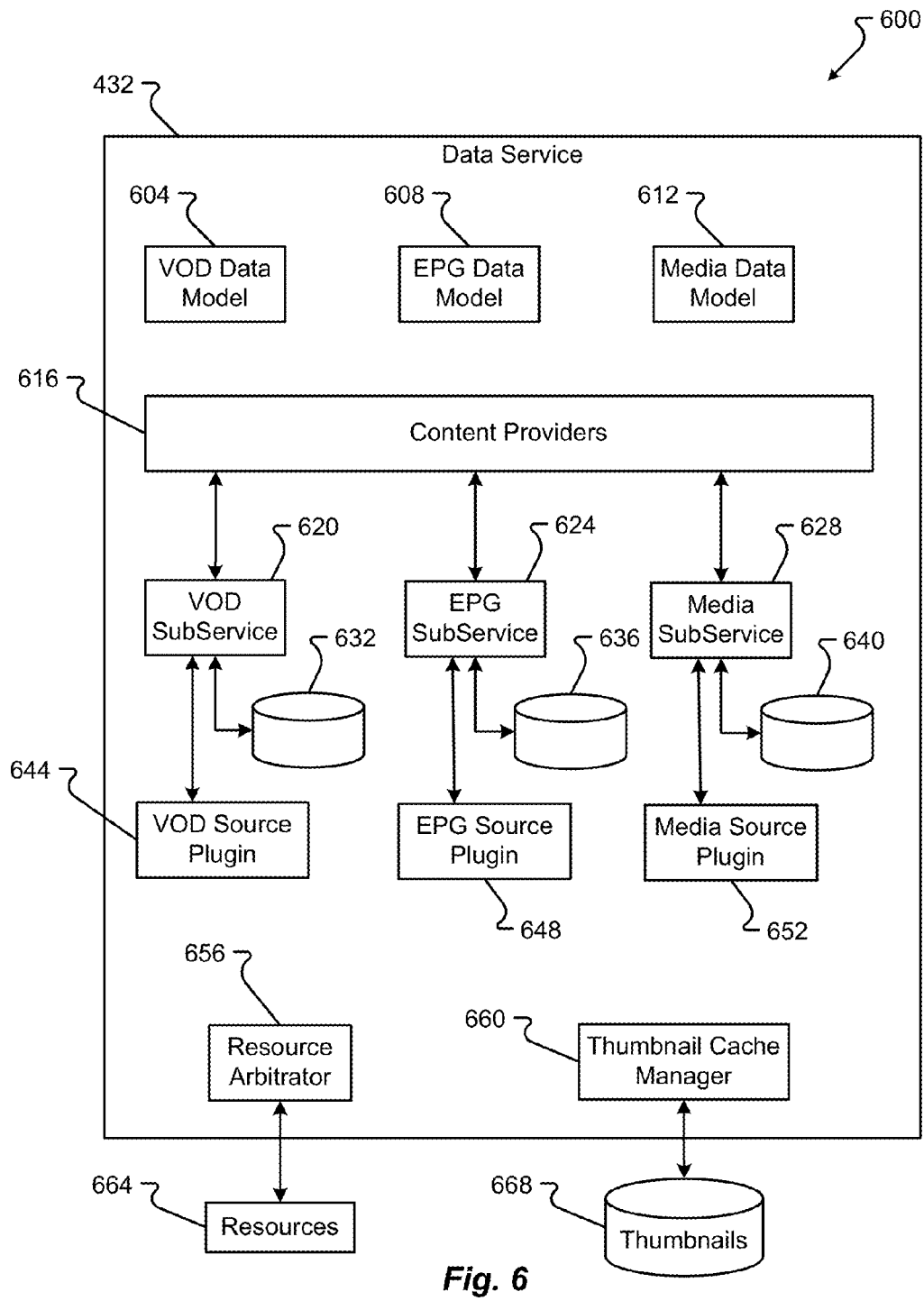
FIG. 6 is a third block diagram of an embodiment of the intelligent television software and/or firmware.

The data services library 432 can include the one or more components or codes to implement components for the data services function. The data services function can be implemented in the application framework 412 and/or applications layer 416. An embodiment of a function of the data services and the type of components that may be included is shown in FIG. 6.

The application framework 412 can include a general abstraction for providing functionality that can be selected by one or more applications 416 to provide specific application functions or software for those applications. Thus, the framework 412 can include one or more different services, or other applications, that can be accessed by the applications 416 to provide general functions across two or more applications. Such functions include, for example, management of one or more of windows or panels, surfaces, activities, content, and resources, The application framework 412 can include one or more, but is not limited to, TV services 434, TV services framework 440, TV resources 444, and user interface components 448.

The TV services framework 440 can provide an additional abstraction for different TV services. TV services framework 440 allows for the general access and function of services that are associated with the TV functionality. The TV services 436 are general services provided within the TV services framework 440 that can be accessed by applications in the applications layer 416. The TV resources 444 provide code for accessing TV resources 444 including any type of storage, video, audio, or other functionality provided with the Intelligent TV 100. The TV resources 444, TV services 436, and TV services framework 440 provide for the different implementations of TV functionality that may occur with the Intelligent TV 100.

One or more user interface components 448 can provide general components for display of the Intelligent TV 100. The user interface components 448 might be general components that may be accessed by different applications provided in the application framework 412. The user interface components 448 may be accessed to provide for panels and silos as described in conjunction with FIG. 5.

The applications layer 416 can both contain and execute applications associated with the Intelligent TV 100. Applications layer 416 may include one or more of, but is not limited to, a live TV application 452, a video on demand application 456, a media center application 460, an application center application 464, and a user interface application 468. The live TV application 452 can provide live TV over different signal sources. For example, the live TV application 452 can provide TV from input from cable television, over air broadcasts, from satellite services, or other types of live TV services. Live TV application 452 may then present the multimedia presentation or video and audio presentation of the live television signal over the display of the Intelligent TV 100.

The video on demand application 456 can provide for video from different storage sources. Unlike Live TV application 452, video on demand 456 provides for display of videos that are accessed from some memory source. The sources of the video on demand can be associated with users or with the Intelligent TV or some other type of service. For example, the video on demand 456 may be provided from an iTunes library stored in a cloud, from a local disc storage that contains stored video programs, or from some other source.

The media center application 460 can provide applications for different types of media presentation. For example, the media center 460 can provide for displaying pictures or audio that is different from, but still accessible by the user and different from live TV or video on demand. The media center 460 allows for the access of different sources to obtain the media in the display of such media on the Intelligent TV 100.

The application center 464 allows for the provision, storage and use of applications. An application can be a game, a productivity application, or some other application generally associated with computer systems or other devices, but may be operated within the Intelligent TV. An application center 464 may obtain these applications from different sources, store them locally and then execute those types of applications for the user on the Intelligent TV 100.

Figure 5:
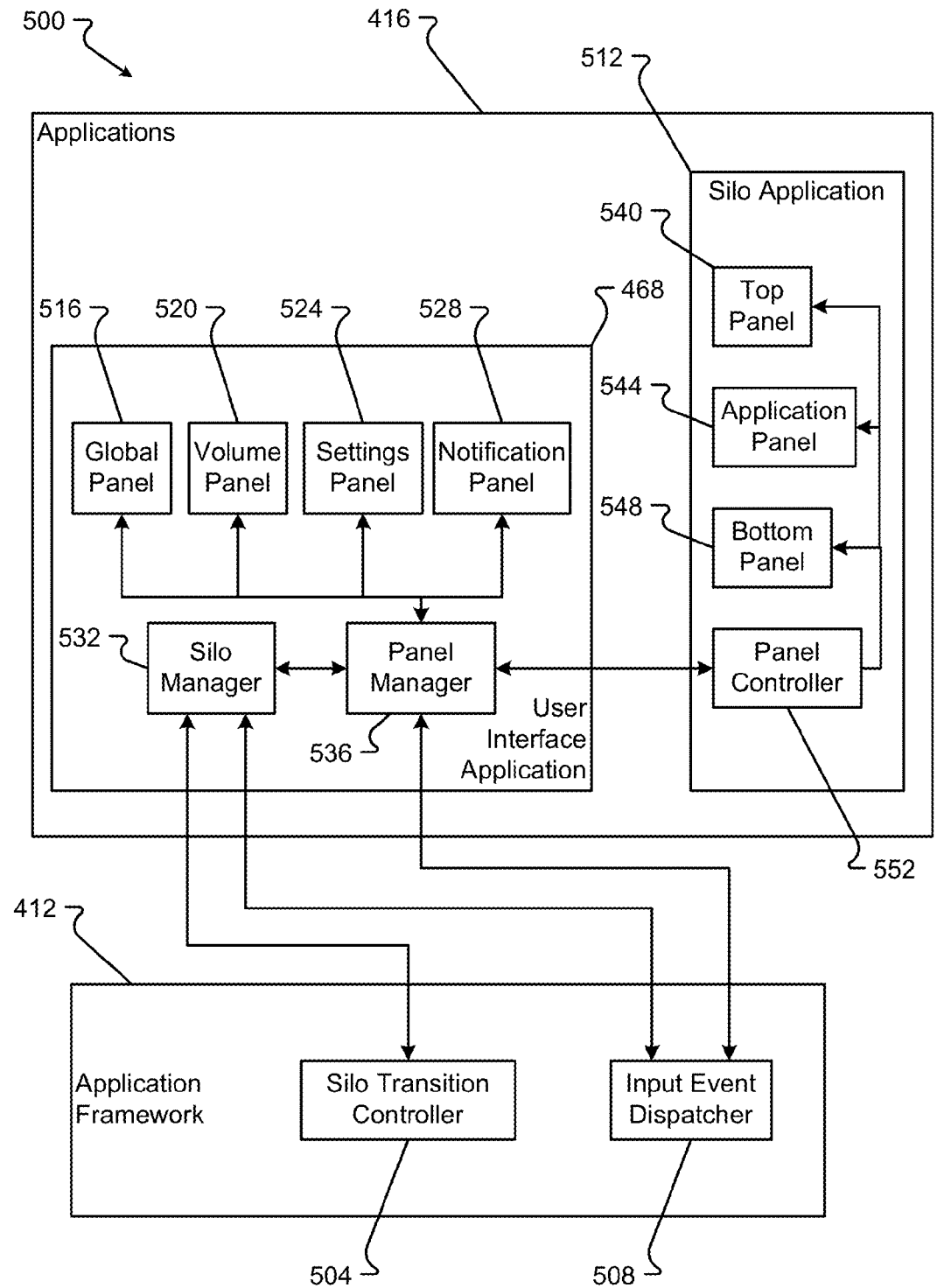
FIG. 5 is a second block diagram of an embodiment of the intelligent television software and/or firmware.

User interface application 468 provides for the specific user interfaces associated with the Intelligent TV 100. These user interfaces can include the silos and panels that are described in FIG. 5. An embodiment of the user interface software 500 is shown in FIG. 5. Here the application framework 412 contains one or more code components which help control the user interface events while one or more applications in the applications layer 416 affects the user interface use for the Intelligent TV 100. The application framework 412 can include a silo transition controller 504 and/or an input event dispatcher 508. There may be more or fewer code components in the application framework 412 than those shown in FIG. 5. The silo transition controller 504 contains the code and language that manages the transitions between one or more silos. A silo can be a vertical user interface feature on the Intelligent TV that contains information for user. The transition controller 504 can manage the changes between two silos when an event occurs in the user interface. The input event dispatcher 508 can receive user interface events that may be received from the operating system and provided to the input event dispatcher 508. These events can include selections of buttons on a remote control or on the TV or other types of user interface inputs. The input event dispatcher 508 may then send these events to a silo manager 532 or panel manager 536 depending on the type of the event. The silo transition controller 504 can interface with the silo manager 532 to affect changes in the silos.

The applications layer 416 can include a user interface application 468 and/or a silo application 512. The applications layer 416 can include more or fewer user interface applications as necessary to control the user interface of the Intelligent TV 100 than those shown in FIG. 5. The user interface application 468 can include a silo manager 532, a panel manager 536, and one or more types of panels 516-528. The silo manager 532 manages the display and/or features of silos. The silo manager 532 can receive or send information from the silo transition controller 504 or the input event dispatcher 508 to change the silos displayed and/or to determine types of input received in the silos.

A panel manager 536 is operable to display panels in the user interface to manage transitions between those panels or to affect user interface inputs received in the panel. The panel manager 536 may thus be in communication with different user interface panels such as a global panel 516, a volume panel 520, a settings panel 524, and/or a notification panel 528. The panel manager 536 can display these types of panels depending on the inputs received from the input event dispatcher 508. The global panel 516 may include information that is associated with the home screen or top level hierarchal information for the user. A volume panel 520 may display information about an audio volume control or other settings for volume. A settings panel 524 can include information displayed about the settings of the audio or video, or other settable characteristics of the Intelligent TV 100. A notification panel 528 can provide information about notifications to a user. These notifications can be associated with information, such as, video on demand displays, favorites, currently provided programs, or other information. Notifications can be associated with the media or with some type of setting, or operation or the Intelligent TV 100. The panel manager 536 may be in communication with the panel controller 552 of the silo application 512.

The panel controller 552 may operate to control portions of the panels of the types described previously. Thus, the panel controller 552 may be in communication with a top panel application 540, an application panel 544, and/or bottom panel 548. These types of panels may be differently displayed in the user interface of the Intelligent TV 100. The panel control thus may be based on the configuration of the system or the type of display being used currently, put the types of panels 516-528 into a certain display orientation governed by the top panel application 540, application panel 544, or bottom panel application 548.

An embodiment of the data service 432 and the operation of the data management is shown in FIG. 6. The data management 600 can include one or more code components that are associated with different types of data. For example, there may be code components within the data service 432 that execute and are associated with video on demand, the electronic program guide, or media data. There may be more or fewer types of data service 432 components than those shown in FIG. 6. Each of the different types of data may include a data model 604-612. The data models govern what information is to be stored and how that information will be stored by the data service. Thus, the data model can govern regardless of where the data comes from, how the data will be received or managed within the Intelligent TV system. Thus, the data model 604, 608, and/or 612, can provide a translation ability or affect the ability to translate data from one form to another to be used by the Intelligent TV 100.

The different types of data services (video on demand, electronic programming guide, media) each have a data subservice 620, 624, and/or 628 that is in communication with one or more internal and/or external content providers 616. The data subservices 620, 624, and 628 that communicate with the content providers 616 to obtain data that may then be stored in databases 632, 636, and 640. The subservices 620, 624, and 628 may communicate with and initiate or enable one or more source plug-ins 644, 648, and 652 to communicate with the content provider. For each content provider 616, there may be a different source plug-in 644, 648, and 652. Thus, if there is more than one source of content for the data, each of the data subservices 620, 624, and 628 may determine and then enable or initiate a different source plug-in 644, 648, and/or 652. The content providers 616 may also provide information to a resource arbitrator 656 and/or thumbnail cache manager 660. The resource arbitrator 656 may operate to communicate with resources 664 that are external to the data service 432. Thus, the resource arbitrator 656 may communicate with cloud based storage, network based storage, or other types of external storage in the resources 664. This information may then be provided through the content provider module 616 to the data subservices 620, 624, 628. Likewise, a thumbnail cache manager 660 may obtain thumbnail information from one of the data subservices 620, 624, 628 and store that information in the thumbnails database 668. Further, the thumbnail cache manager 660 may extract or retrieve that information from the thumbnails database 668 to provide to one of the data subservices 620, 624, 628.

Figure 13:
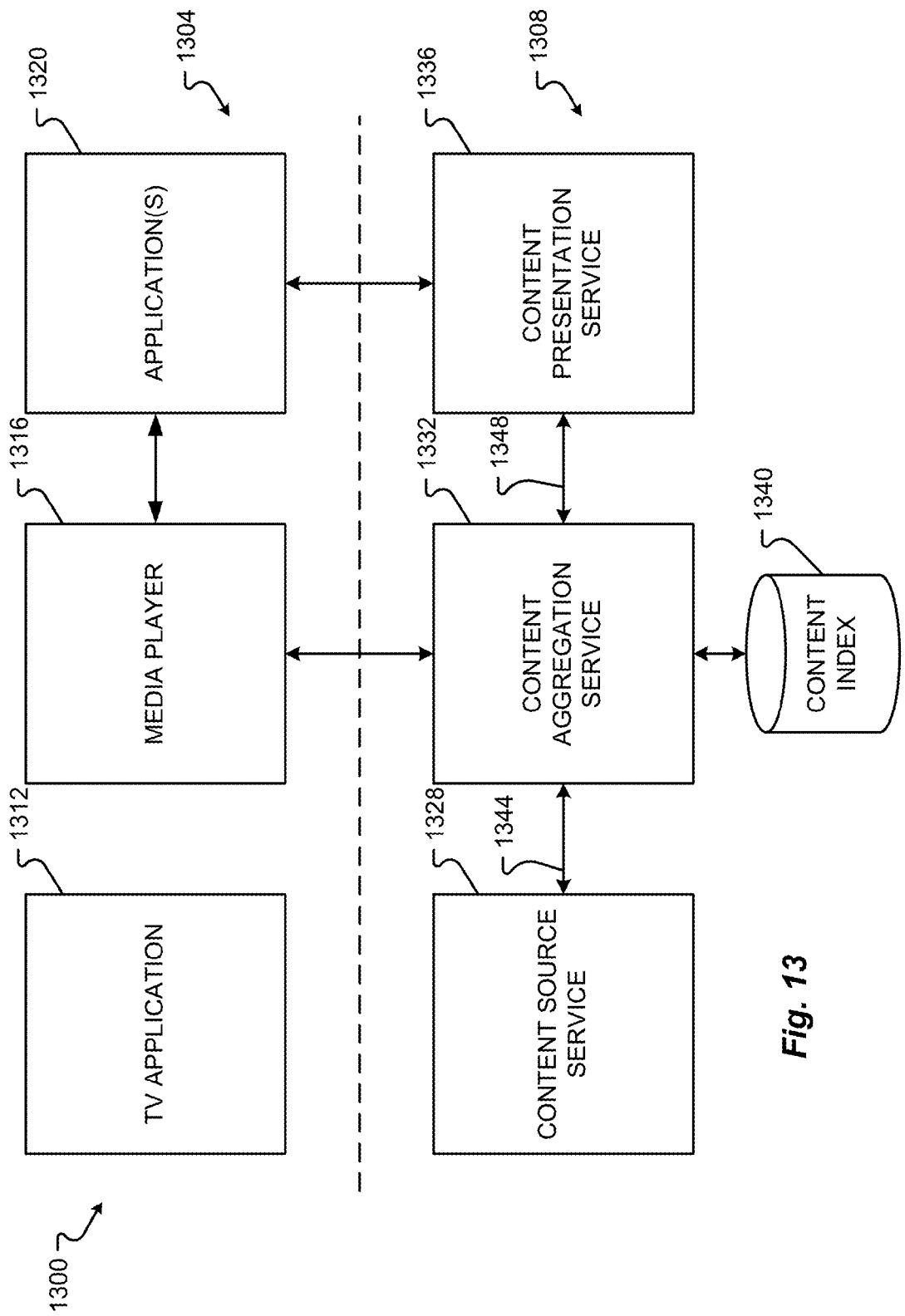
FIG. 13 is a block diagram of an embodiment of a content data service.

An exemplary content aggregation architecture 1300 is shown in FIG. 13. The architecture can include a user interface layer 1304 and a content aggregation layer 1308. The user interface layer 1304 may include a TV application 1312, media player 1316, and application(s) 1320. The TV application 1312 enables the viewer to view channels received via an appropriate transmission medium, such as cable, satellite, and/or the Internet. The media player 1316 views other types of media received via an appropriate transmission medium, such as the Internet. The application (s) 1320 include other TV-related (pre-installed) applications, such as content viewing, content searching, device viewing, and setup algorithms, and coordinates with the media player 1316 to provide information to the viewer.

The content source layer 1308 includes, as data services, a content source service 1328, a content aggregation service 1332 and a content presentation service 1336. The content source service 1328 can manage content source investigators, including local and/or network file system(s), digital network device manager (which discovers handheld and non-handheld devices (e.g., digital media servers, players, renderers, controllers, printers, uploaders, downloaders, network connectivity functions, and interoperability units) by known techniques, such as a multicast universal plug and play or UPnP discovery techniques, and, for each discovered device, retrieves, parses, and encodes device descriptors, notifies the content source service of the newly discovered device, and provides information, such as an index, on previously discovered devices), Internet Protocol Television or IPTV, digital television or DTV (including high definition and enhanced TV), third party services (such as those referenced above), and applications (such as Android applications).

Content source investigators can track content sources and are typically configured as binaries. The content source service 1328 starts content source investigators and maintains open and persistent channels for communications. The communications include query or command and response pairs. The content aggregation service 1332 can manage content metadata fetchers, such as for video, audio, and/or picture metadata. The content presentation service 1336 may provide interfaces to the content index 1340, such as an Android application interface and digital device interfaces.

The content source service 1328 can send and receive communications 1344 to and from the content aggregation service 1332. The communications can include notifications regarding new and removed digital devices and/or content and search queries and results. The content aggregation service 1332 can send and receive communications 1348 to and from the content presentation service 1336 including device and/or content lookup notifications, content-of-interest advisories and notifications, and search queries and results.

When a search is performed, particularly when the user is searching or browsing content, a user request may be received from the user interface layer 1300, by the content presentation service 1336, which responsively opens a socket and sends the request to the content aggregation service 1332. The content aggregation service 1332 first returns results from the local database 1340. The local database 1340 includes an index or data model and indexed metadata. The content source service 1328 further issues search and browse requests for all content source investigators and other data management systems. The results are forwarded to the content aggregation service 1332, which updates the database 1340 to reflect the further search results and provides the original content aggregation database search results and the data updates, reflecting the additional content source service search results, over the previously opened socket to the content presentation service 1336. The content presentation service 1336 then provides the results to one or more components in the user interface layer 1300 for presentation to the viewer. When the search session is over (e.g., the search session is terminated by the user or by an action associated with user), the user interface layer 1300 disconnects the socket. As shown, media can be provided directly by the content aggregation service 1332 to the media player 1316 for presentation to the user.

Figure 7:
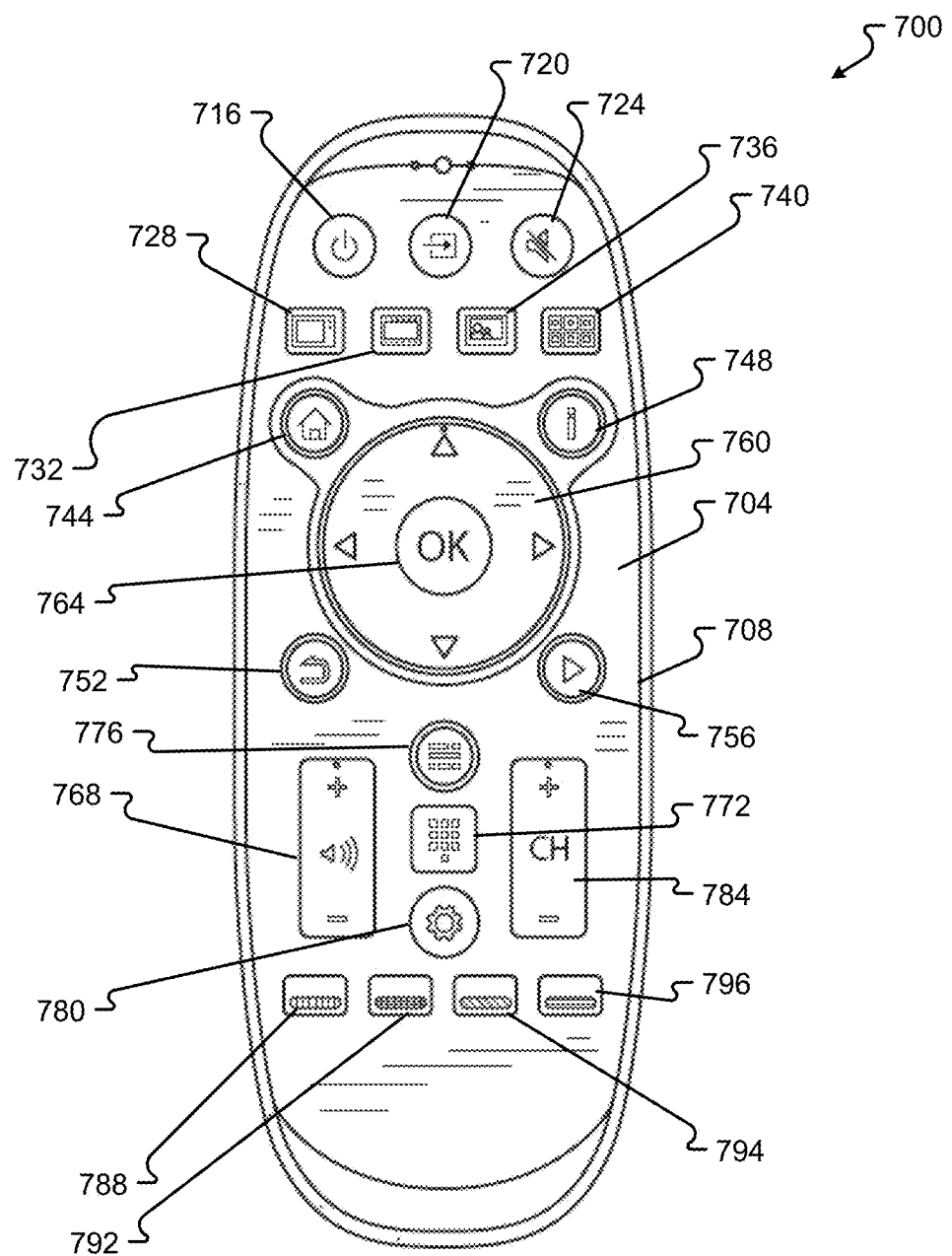
FIG. 7 is a plan view of an embodiment of a handheld remote control.
Figure 8:
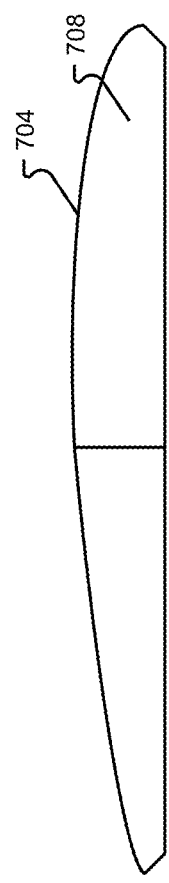
FIG. 8 is a side view of an embodiment of a remote control.
Figure 9A:
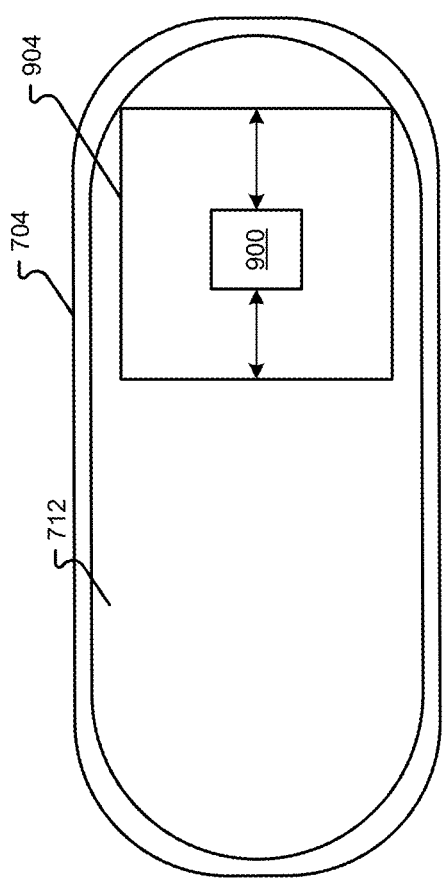
FIG. 9A is a bottom view of an embodiment of a remote control with a joystick in a neutral position.

Remote Control:

A handheld remote control can be provided to enable user interaction with the Intelligent TV 100. An exemplary handheld remote control is shown in FIGS. 7-9. The remote control 700 can include one or more of, but is not limited to, top, side and bottom housings 704, 708, and 712, an (on/off) power button 716, an input source button 720 (to select input source such as Live TV, video on demand, media center, application center, high definition multimedia interface or HDMI, component or COMP, audio/Video or A/V, digital or analog television or DTV/ATV, and video graphics array (VGA)), a (volume) mute button 724, a Live TV button 728 (to activate or select the Live TV silo), a video on demand (VOD) button 732 (to activate or select the video on demand silo), a media center button 736 (to activate or select the media center application or silo, which access various types of media such as music, TV programming, videos, and the like), an application center button 740 (to activate or select the application center application or silo), a global panel button 744, an application panel button 748, a back button 752 (to select a prior user operation or Intelligent TV state and/or navigate up a hierarchy of any displayed image or object(s) (in which case the back button 752 does not navigate within application panels or across application silos), a play button 756 (to play or pause media), a D-pad 760 (which includes north, east, west, and south directional arrows to navigate among displayed images and/or move between levels of an application's or object's hierarchy such as application view navigation, panel navigation, and collection navigation), an OK (or select) button 764 (to select a highlighted displayed image (such as displayed speed control, rewind, forward, play, and pause objects and/or objects on menu bar or in a menu box) and/or navigate down a hierarchy of any displayed image or object(s)), a rocker-type volume-up and volume-down button 768 (to adjust the volume), a menu/guide button 772 (to select for display a menu or guide of programming), a 0-9 (number) button 776 (to display a number pad on the TV screen), a settings button 780 (which launches an application to access current and change TV settings (such as channel settings and settings used to adjust picture and sound effects (e.g., image mode (e.g., standard, playground, game, cinema, concert, and studio), brightness, contrast, saturation, color temperature, energy savings, 3D noise reduction, hue, sharpness, zoom mode (e.g., full screen, standard, smart zoom, and dot-to-dot), picture position, 3D mode, for picture, and sound retrieval system or SRS TruSurround, sound mode (e.g., standard, live 1, live 2, theatre, music, speech, user equalizer mode, Left/Right speaker balance, auto volume control, Sony/Philips Interconnect Format or S/PDIF (off, auto, pulse code modulation or PCM) for sound) and system settings (such as system (e.g., selected language for graphical user interface, user geographical and/or geopolitical location information, input method, area settings, and sleep time), network (e.g., WiFi, WiFi hotspot, WiFi direct, Point-to-Point Protocol over Ethernet or PPPoE (asymmetric digital subscriber line or ADSL), Ethernet) settings (e.g., enabled and disabled and selected and non-selected) and information (e.g., network information (e.g., electronic address such as Internet Protocol or IP address, subnet mask, gateway, domain name server information, domain name, Media Access Control or MAC address, service set identification or SSID, security information, and password information) and inline status), manage applications (e.g., currently installed applications, currently executing applications, and internal and external computer readable medium usage), and view user information regarding the Intelligent TV 100)), a rocker-type channel-up and channel-down button 784 (to increment or decrement the selected channel), and first, second, third and fourth hotkeys 788, 792, 794, and 796, and/or a moveable joystick 900 on a bottom of the remote control 700. The first, second, third, and fourth hotkeys are generally assigned different colors, which color indexing is depicted as visual indicia on a selected panel to show the currently assigned function, if any, for each hotkey. As can be seen, the actuator layout can provide a highly efficient, satisfactory, and easily usable experience to the end user.

Unlike the functional associations and functions of many of the actuators, those of some of the actuators are not readily apparent. A number of examples will now be discussed by way of illustration.

The media center button 736, when selected, can provide information regarding music, videos, photographs, collections or groupings of music, videos, and/or photographs, and internal and external computational devices (such as personal computers, laptops, tablet computers, wireless phones, removable computer readable media, and the like), which can be grouped in a selected manner (such as favorites, most recently viewed, most watched or viewed, and most recently added). The information can includes previews (which can include selected portions of the media content, duration, file size, date created, date last watched, times watched or viewed, and audio and/or video format information).

The application center button 740, when selected, may provide information regarding pre-installed and downloaded applications. Unlike downloaded applications, pre-installed applications cannot be removed by the user or manually updated. Exemplary pre-installed applications include web browser, settings control, and content search algorithms. By way of illustration, the application center button 740 can provide a scrollable graphical grid of icons (each icon being associated with an application) currently available in the application center.

The global panel button 744, when selected, can provide the user, via one or more panels or windows, with access to one or more of, but not limited to, silos, notifications, a web browser, system settings, and/or information associated therewith. For example, the global panel button 744 can enable the user to determine what external devices are currently connected to and/or disconnected from the Intelligent TV 100, determine what inputs (e.g., HDMI ports) are currently available for connecting to external devices, determine a connection and/or operational status of a selected external device and/or network (e.g., WiFi connected, Ethernet connected, and offline), assign a custom (or user selected) name to each input source, determine what content is currently being offered on Live TV, on demand, the media center, and/or the application center, access vendor messages and notifications to the user (e.g., system and/or application updates are available), activate the Internet browser, and/or access shortcuts on a displayed shortcut bar to more frequently used and desired applications. Common shortcuts are Internet browser (e.g., Internet search engine), system settings, and notifications. The common types of panels are for information (which is typically information related to a currently displayed image and/or content (e.g., title, date/time, audio/visual indicator, rating, and genre), browse requests, and/or search requests (such as search term field)). Each of the panel types may include a panel navigation bar, detailed information or relevant content to the panel function, operation and/or purpose, and a hotkey bar (defining currently enabled functional associations of hotkeys).

The application panel button 748, when selected, can display an application window or panel. One application panel may be an information panel regarding a selected (pre-installed or previously downloaded) application icon. The information panel can one or more of identify the selected application, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs), provide the option to launch, remove, update, and add to favorites the identified application, and provide a listing of selectable links of other (not yet downloaded) recommended applications that provide similar functionality to the identified application. The latter listing can, in turn, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs).

The functions of the first, second, third, and fourth hotkeys 788, 792, 794, and 796 can change depending on system state, context, and/or, within a selected screen and/or panel, based on a content or currently selected portion of (or relative cursor position on) the screen. Commonly, a currently assigned function of any of the first, second, third, and fourth hotkeys 788, 792, 794, and 796 depends on a currently accessed silo and/or panel (with which the user is currently interacting within the silo). In other words, a first function of one of the first, second, third, and fourth hotkeys 788, 792, 794, and 796 is activated by the respective hotkey in a first system state while a different second function is activated by the respective hotkey in a different second system state. In another example, a third function of one of the first, second, third, and fourth hotkeys 788, 792, 794, and 796 is activated by the respective hotkey when a user focus (or currently selected cursor position or screen portion) is at a first screen position while a different fourth function is activated by the respective hotkey when a user focus (or currently selected cursor position or screen portion) is at a different second screen position. The first screen position can, for instance, be within an icon while the second screen position is outside of the icon. Hotkey functionality that could be enabled when in the first screen position may be "configure" and "remove" and disabled is "add", and, when in the second position hotkey functionality enabled can be "add" and disabled is "configure" and "remove". Generally, the states of hotkeys can include normal (for enabled actions or functions), disabled (when an action or function is temporarily disabled), pressed (when selected by a user to command an action or function to be performed), and unavailable (when no association between the hotkey and an action or function is currently available). While examples of hotkey functions are discussed below, it is to be understood that these are not intended to be exhaustive or limiting examples.

The first hotkey 788, when selected in a first system state, can enable the user to assign, change, or edit a name of an input source. It is typically enabled only when the input source of HDMI, Comp/YPbPr (e.g., component video cables), video output, and VGA is in focus. When selected in a second system state, the first hotkey 788 can return the user to a top of a scrollable collection of objects, such as application icons.

The second hotkey 792 may show all or less. In other words, the hotkey 792 can allow the user to show all inputs, including the unconnected/undetected ones and to hide the unconnected/undetected inputs, e.g., to expand and collapse the silo/input list. Each input source can have one of two states, namely connected/detected and unconnected/undetected. Some input sources, including Live TV, video on demand, media center, and application center are always connected/detected.

Figure 9B:
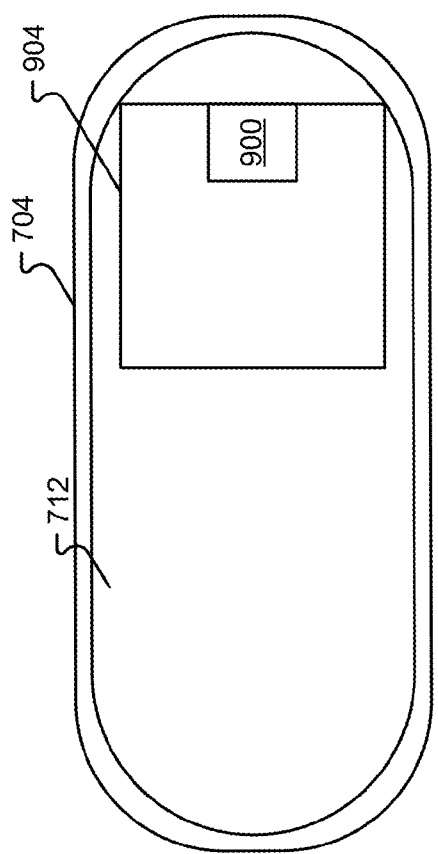
FIG. 9B is a bottom view of an embodiment of a remote control with the joystick in a lower position.
Figure 9C:
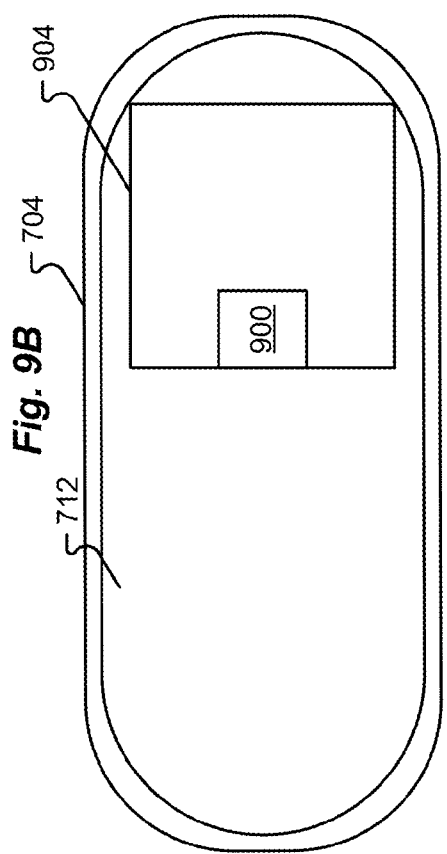
FIG. 9C is a bottom view of an embodiment of a remote control with the joystick in an upper position.

The moveable joystick 900 on the bottom of the remote control 700, when manipulated, can cause a displayed image on the Intelligent TV 100 screen to be displaced a proportional amount. In other words, the displayed image is displaced substantially simultaneously with displacement of the joystick 900 within the joystick aperture 904 in the bottom housing 712 of the remote control. As shown in FIGS. 9B-C, the joystick 900 moves or slides between forward and reverse positions. Releasing the joystick 900 causes the joystick 900 to return to the center position of FIG. 9A, and the window to move or slide upwardly (when the joystick is released from the joystick position of FIG. 9B) or downwardly (when the joystick is released from the joystick position of FIG. 9C) until it disappears from view as shown in FIG. 11A. The effect on the screen of the Intelligent TV 100 is shown in FIGS. 11A-C. In FIG. 11A, video content, such as TV programming, a video, movie, and the like, is being displayed by front surface of the screen 212. In FIG. 11B, the joystick 900 is moved or slid to the upper position of FIG. 9B, and a drop down window or panel 1100 moves or slides down (at the substantially the same rate of joystick 900 movement) at the top of the screen 212. In FIG. 11C, the joystick 900 is moved or slid to the lower position of FIG. 9C, and a drop up window or panel 1100 moves or slides up (at the substantially the same rate of joystick 900 movement) at the bottom of the screen 212. The window 1100 partially covers the video content appearing on the remainder of the screen 212 and/or causes a portion of the screen 212 displaying video content to move and/or compress up or down the height of the window 1100.

The window 1100 can include one or more of information (which is typically information related to a currently displayed image and/or content (e.g., panel navigation bar, detailed information (e.g., title, date/time, audio/visual indicator, rating, and genre), and hotkey bar (defining current functional associations of hotkeys)), browse requests, and/or search requests. Commonly, the window 1100 includes suitable information about the content (such as name, duration, and/or remaining viewing duration of content), settings information, TV or system control information, application (activation) icons (such as for pre-installed and/or downloaded applications such as application center, media center and Web browser), and/or information about input source(s), When the joystick 900 is in either the forward or reverse position, the user can select an actuator on the front of the remote control, such as the OK button 764, and be taken, by displayed images on the screen 212, to another location in the user interface, such as a desktop. This process can be done in a nonintrusive manner and without affecting the flow of content that is pushed up or down. The joystick 900 could be moved, additionally or differently, from side-to-side to cause the window to appear at the left or right edge of the screen 212.

Figure 10:
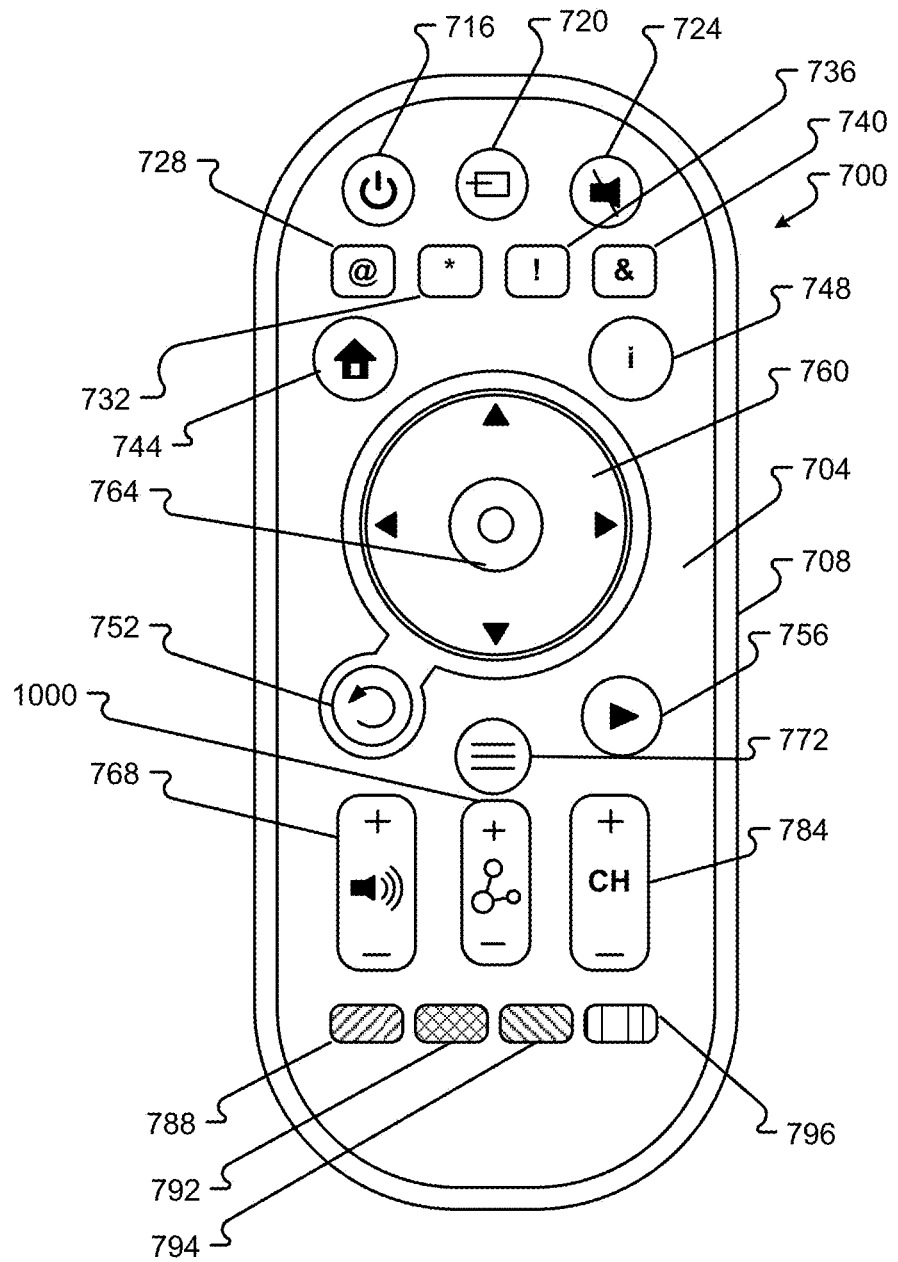
FIG. 10 is a plan view of another embodiment of a handheld remote control.

An alternative actuator configuration is shown in FIG. 10. The actuators are substantially the same as those of FIGS. 7-9 except that the social network button 1000, when selected, can automatically select content and publish, via a social network service or other social media, the content to a social network or online community. User or viewer comments and/or other messages can be included in the outbound message. For example, all or one or frames or portions of media content (such as a video, music, a photograph, a picture, or text) can be provided automatically to a predetermined or selected group of people via LinkedIn™, Myspace™, Twitter™, YouTube™, DailyMotion™, Facebook™, Google+™) or Second Life™. The user, upon activating the button 1000 could, in response, select a social forum or media upon which the selected content (which is the content displayed to the user when the social network button 1000 is activated) is to be posted and/or a predetermined group within that social media to which the content is to be posted. Alternatively, these selections could be preconfigured or preselected by the user.

The social network button can also be used to "turn up" or "turn down" a social volume visualization. The Intelligent TV 100 can create dynamically a visualization of aggregated connections (and inbound and/or outbound messages) from a variety of social networks. The aggregation (and inbound and outbound messages) can be depicted graphically on the screen as a volume of connections to influence the viewer user. With a social volume visualization, selected contents of each linked social network profile of a social contact (and inbound and/or outbound messages from or to the linked social network contact and/or current activity of the social contact (such as watching the same programming or content the viewer is currently watching) can be presented in a separate tile (or visually displayed object). The size of the tile can be related to any number of criteria, including a relationship of the linked social contact (e.g., a relative degree of importance or type of relationship can determine the relative size of the tile, a degree of influence of the linked social contact to the current viewer, a geographic proximity of the linked social contact to the current viewer, a degree to which the currently provided media content is of interest to both the viewer and linked social contact (e.g., both parties enjoy war movies, murder mysteries, musicals, comedies, and the like), an assigned ranking of the linked viewer by the viewer, a type of social network type linking the viewer with the linked social contact, a current activity of the social network contact (e.g., currently watching the same content that the viewer is currently watching), a current online or offline status of the linked social contact, and a social network grouping type or category to which both the viewer and linked social contact belong (e.g., work contact, best friend, family member, etc.).

The viewer can designate a portion of the screen to depict the social network aggregation. By turning the social volume up (+) or down (-), the viewer can increase the size and/or numbers of linked contact tiles provided to the viewer. In other words, by increasing the social volume the viewer can view, access, and/or push more social content from those of his or her social networks associated with him or her in a memory of the Intelligent TV. By decreasing the social volume, the viewer can view, access, and/or push less social content from his or her associated social networks. By selecting the mute button 724, the viewer can stop or pause any interactivity with his or her associated social networks (e.g., inbound or outbound messages). Social volume and/or mute can be separated into two (or more) volume settings for outbound and inbound social network activity. By way of illustration, a first volume setting, control, and/or button can control the volume for outbound social network activity (e.g., outbound social messages) while a second (different) volume setting, control, and/or button can control the volume for inbound social network activity (e.g., inbound social messages). By way of further illustration, a first mute setting, control, and/or button can stop or pause outbound social network activity (e.g., outbound social messages) while a second (different) mute setting, control, and/or button can stop or pause inbound social network activity (e.g., inbound social messages).

Figure 12:
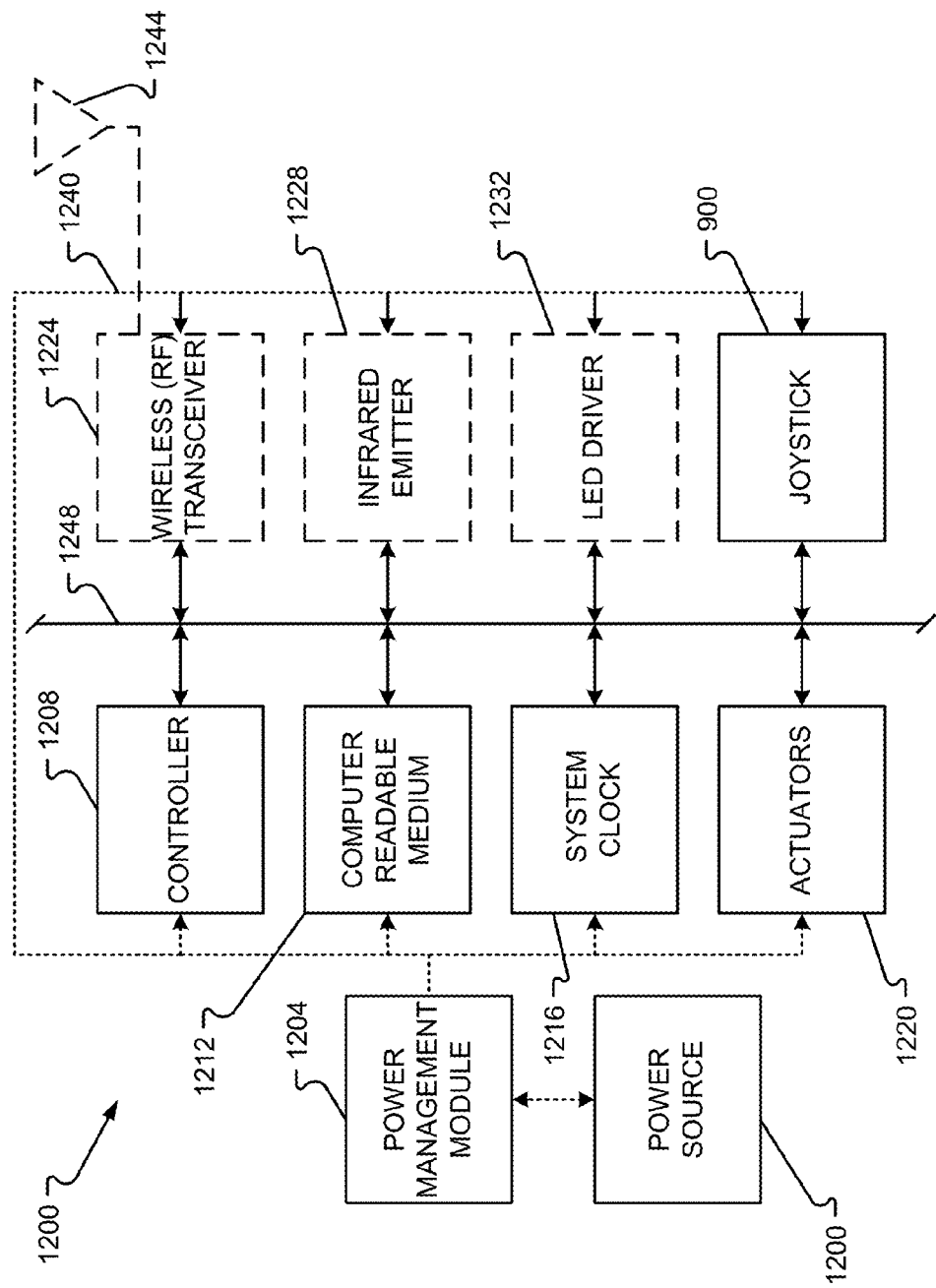
FIG. 12 is a block diagram of an embodiment of a handheld remote control of either FIG. 7 or 10.

A functional block diagram of the remote control is shown in FIG. 12. The remote control 700 includes a controller 1208 to control and supervise remote control operations, optional wireless (RF) transceiver 1224 and antenna 1244 to send and receive wireless signals to and from the Intelligent TV 100 and other external components, optional infrared emitter 1228 to emit infrared signals to the Intelligent TV 100, optional light emitting diode or LED driver 1232 to control LED operation to provide video-enabled feedback to the user, actuators 1220 (including the various buttons and other actuators discussed above in connection with FIGS. 7 and 10), and joystick 900, all interconnected via a bus 1248. An on board power source 1200 and power management module 1204 provide power to each of these components via power circuitry 1240. The infrared emitter 1228 and receiver (not shown) on the Intelligent TV system 100 can be used to determine a displayed object illuminated by the infrared signal and therefore adjust the displayed image, for example to indicate a focus of the user (e.g., illuminate a displayed object or show cursor position relative to displayed objects on the screen) and to determine and activate a desired command of the user. This can be done by tracking a position of the remote control in relation to infrared tracking reference points (e.g., a sensor bar or infrared LED's) positioned on or adjacent to the screen of the Intelligent TV 100. Motion tracking can further be augmented using position information received from a multi-axis gyroscope and/or accelerometer on board the remote control (not shown).

Figure 14:
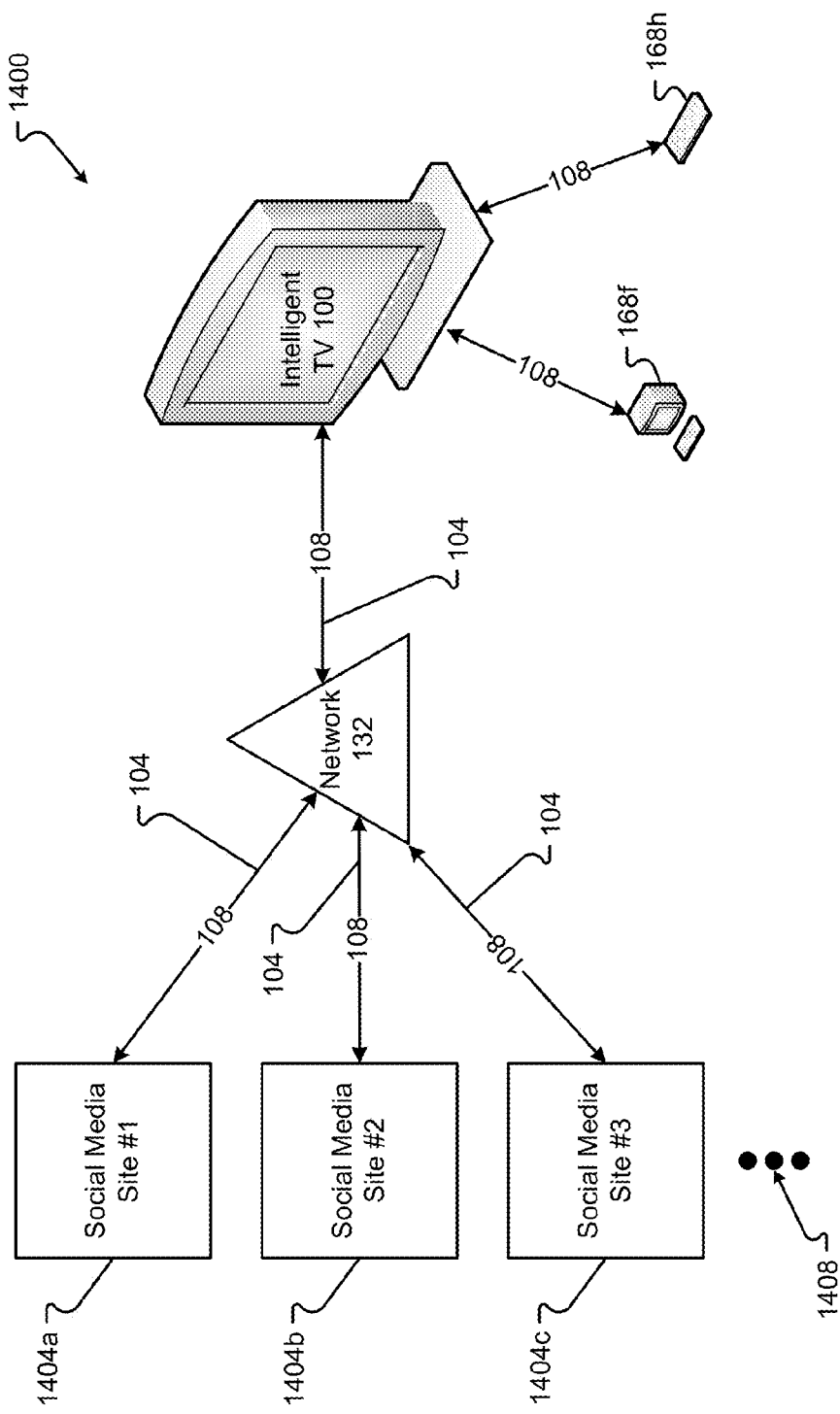
FIG. 14 includes another view of an embodiment of an environment of an intelligent television.

An embodiment of another Intelligent TV system 1400 is shown in FIG. 14. The Intelligent Television 100 connects through a network 132 by one or more communications interfaces 108 to one or more social media sites 1404a through 1404c. There may be more or fewer social media sites 1404, than that shown in FIG. 14, as represented by the ellipses 1408. The communications links 108 can be bidirectional and may include or use any format, protocol, or system as described in conjunction with FIG. 1.

The social media sites 1404 can be any kind of social media website, server, or other system or content provider that allows the user to interact socially with other people or systems. These social media sites 1404 can include, for example, Twitter™, Facebook™, one or more blogs, one or more video blogs, YouTube™, MySpace™, etc. The Intelligent TV 100 is operable to interact as an agent or intermediary for one or more users identified by the Intelligent TV 100. Therefore, the Intelligent TV 100 can access and retrieve social media data from one or more of the social media sites 1404 or post information from the Intelligent TV 100 to the social media sites 1404.

The Intelligent TV 100 can interact with a user through a computer system 168f or through remote control 168h, as previously described. The Intelligent TV 100 can use the interactions to identify the user and to obtain information that allows the Intelligent TV 100 to access the social media sites 1404.

Figure 15:
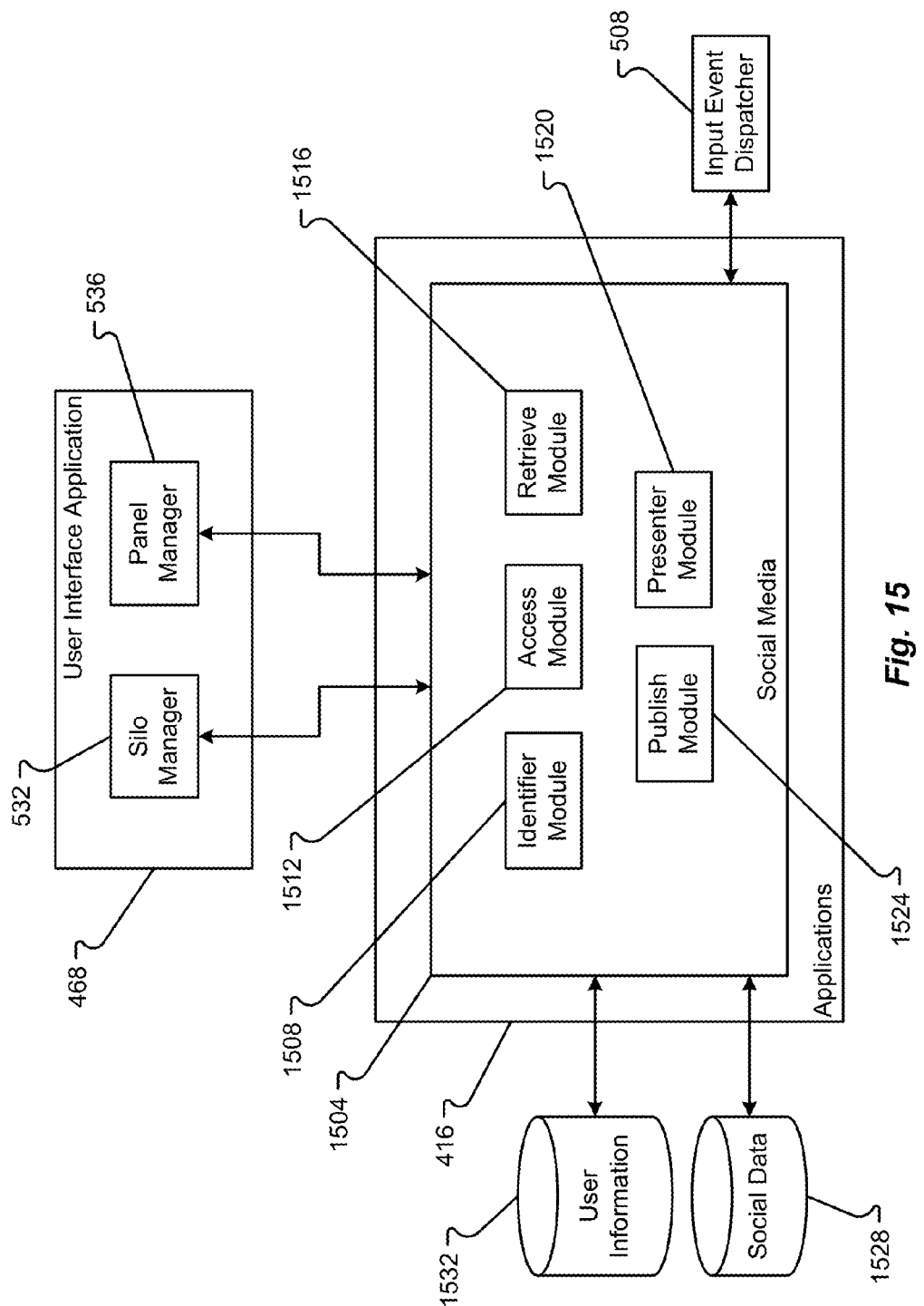
FIG. 15 is a block diagram of an embodiment of a social media application.

A further embodiment of the computer system described in conjunction with the FIGS. 4 and 5 is shown in FIG. 15. The system applications 416 can include a new application 1504 directed to social media interaction. The social media interaction application 1504 can interact with the input event dispatcher 508 to receive events that are associated with the publishing or retrieval of social media. The social media interaction application 1504 can also store, retrieve, or manage social media data or user data in a user information database 1532 and/or a social data database 1528. The user information data, in the user information database 1532, can include login credentials for one or more social media sites, user names, and other information used or associated with a user and employed to access social media sites 1404.

Social media data 1528 can include social media postings or other information associated with the social media sites 1404. The social media data 1528 may be stored locally or remotely and can be used to post social media content to the Intelligent TV 100. The social media application 1504 can also interact with the user interface application 468, including the silo manager 532 and the panel manager 536. Thus, the social media application 1504 can publish to and/or render information from the Smart TV 100 user interface as controlled by the silo manager 532 and/or the panel manager 536.

A social media application 1504 can include one or more of the following modules, but is not limited to, an identifier module 1508, an access module 1512, a retrieve module 1516, a publish model 1524, and a presenter module 1520. The identifier module 1508 is operable to retrieve user login information after identifying a user. The identifier module 1508 may identify a user by a code or some other information entered by the user through the remote control 168h, through a computer 168f, or through some other interface. Further, each user may have a separate and reserved remote control 168h that sends a unique identifying signal. Thus, if the remote control 168h is identified, then the user using the remote control 168h is also identified. The identifier module 1508 can also use other means to identify the user, including facial recognition, biometric information, voice recognition, or some other passive or active system or process that identifies a user. Once identified, the identifier module 1508 can use the information to access user information database 1532 to retrieve social media site information, including, but not limited to, user names and passwords that allow the Intelligent Television 100 to access the social media sites 1404.

The information retrieved from the user information database 1532 is provided to the access module 1512. The access module 1512 can then access the social media sites 1404 and login to those social media sites 1404 as an agent or proxy for the user. The social media application 1504 may then be able to access the data within those different social media sites 1404.

The retrieve module 1516 can, after access is gained by the access module 1512, retrieve social media data from the social media sites 1404. The retrieve module 1516 may be able to crawl or filter the social media sites 1404 to determine new information (new information may be content added to the social media site 1404 after the last time access was gained). The retrieve module 1516 may then copy and retrieve that information to store in the local social database 1528. The retrieve module 1516 may also provide the social media data to a user interface application 468, such as the silo manager 532 or the panel manager 536.

Once retrieved, the social media data may be presented to the user, by the presenter module 1520. The presenter module 1520 is operable to provide rendered or usable information to the user interface application 468 to show on a user interface of the Intelligent TV 100. This presented social media data may social media posting and include one or more of, but is not limited to, videos, audio files, pictures, comments from other users, or other information that is retrieved by the retrieve module 1516. The presenter module 1520 can react to any type of input event received by the input event dispatcher 508 that increases or decreases the amount of information desired by the user. Thus, the presenter module 1520 can provide more or less social media data and may instruct the retrieve module 1516 to retrieve more or less social media data based on user input.

A publisher module 1524 is operable to receive an input from the input event dispatcher 508 that includes social media data to be posted. The publisher module 1524 can package the information for the social media site 1404 to publish. As the publisher module 1524 is operable to translate or configure any kind of posting that allows the Intelligent TV 100 to post that information to the social media site 1404, the publisher module 1524 may act as a proxy for the user.

Figure 16:
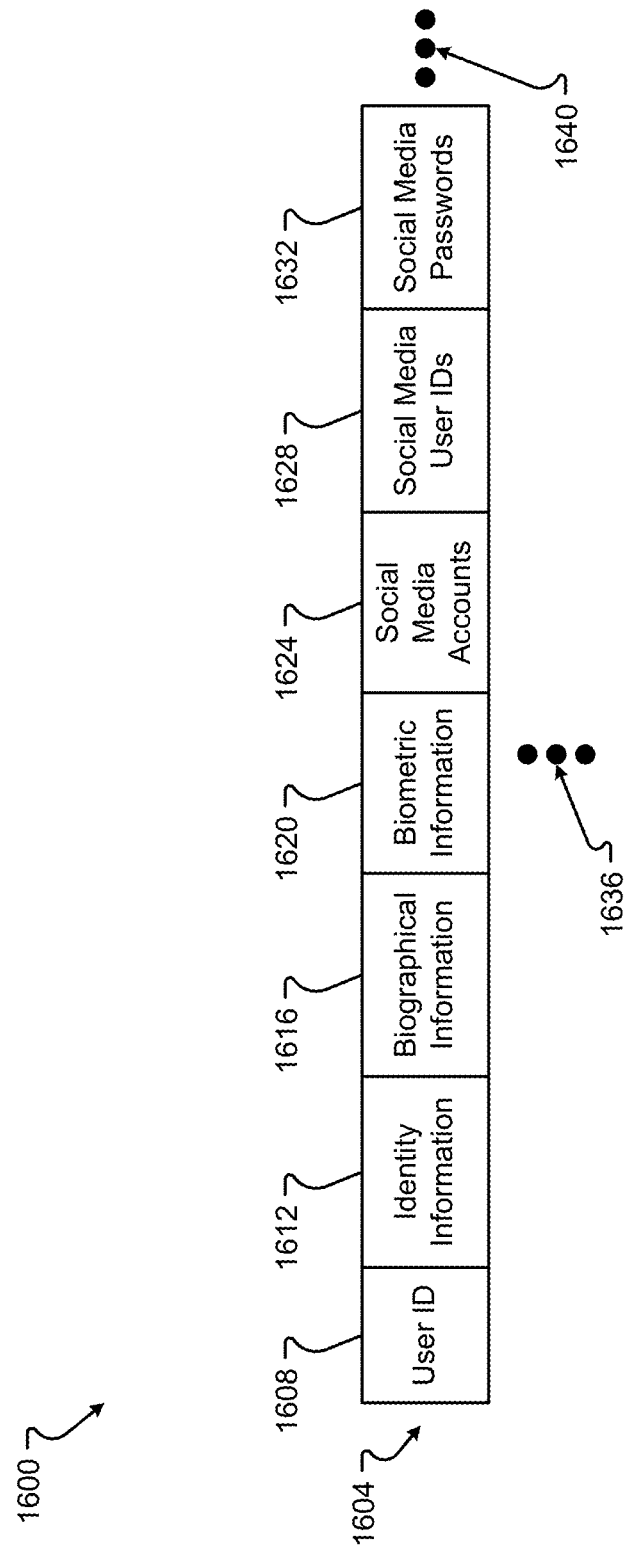
FIG. 16 is a block diagram of an embodiment of a data structure storing data about an Intelligent TV user.

An embodiment of a database 1600, including one or more data structures 1604, where user information is stored is shown in FIG. 16. Thus, the database 1600 may be associated with the user information database 1532. There may be more or fewer data structures 1604 included in the database 1600, as represented by ellipses 1636. The data structure 1604 can include one or more fields to store information. Those fields may include a user identifier field 1608, an identity information field 1612, a biographical information field 1616, a biometric information field 1620, a social media accounts information field 1624, a social media user IDs field 1628, and/or a social media passwords field 1632. There may be more or fewer fields than those shown in FIG. 16, as represented by ellipses 1640.

A user ID field 1608 can include an identifier (ID) for the user that is interfacing with the Intelligent TV 100. Each user may have a unique user ID 1608 that can be alphanumeric, numeric, a globally unique identifier (GUID), or some other unique and novel identifier.

Identity information 1612 can include any information needed to identify the user and access the data structure 1604 associated with that user. The identity information 1612 can include information such as a user name, password, or some other kind of information provided by the user to the Intelligent TV 100 to identify the user. The biographical information 1616 can include any information that better defines the user. This biographical information 1616 can include information retrieved from social media sites or provided by the user. Biographical information 1616 can include one or more of the following, but is not limited to, an address, a full name, a birthdate, a social security number, an address, a telephone number, an email address, or other such information.

Biometric information 1620 can be any information that describes the appearance or some characteristic of the user. Biometric information 1620 can be used with, or instead of, identity information 1612 to identify the user associated with the data structure 1604. Biometric information 1620 can include one or more of, but is not limited to, fingerprints, facial recognition information, voice recognition information, or other such information associated with a physical characteristic of the user.

Social media accounts information 1624 can include any information about which social media sites the user may belong to, have access to, and/or have an account with. Thus, the social media accounts 1624 lists the social media sites 1404 to which the user may interface. A social media user IDs field 1628 can include the user's usernames for at least one of the social media accounts 1624. The social media passwords field 1632 can include the password used by at least one of the social media accounts listed in social media accounts fields 1624. Thus, the information in field 1624-1632 can be used to access the social media sites 1404 for the user associated with the data structure 1604.

Figure 17:
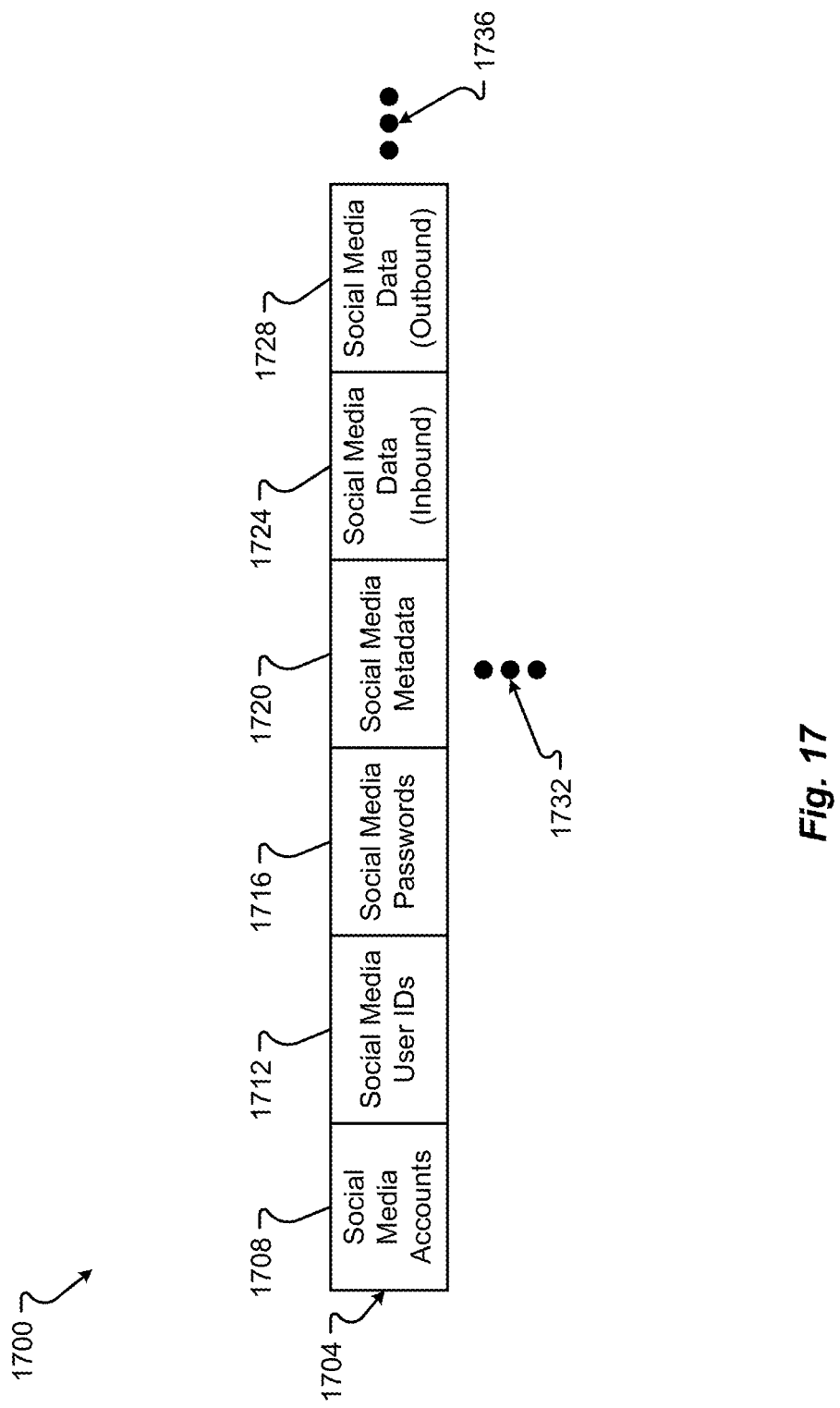
FIG. 17 is a block diagram of an embodiment of a data structure storing social media data.

An embodiment of a database 1700 for storing social media information, such as that associated with database 1528, is shown in FIG. 17. The database 1700 can include one or more data structures 1704. There may be more or fewer data structures in the database 1700 than that shown in FIG. 17, as represented by ellipses 1732. The data structures 1704 can include one or more fields, but not limited to, a social media accounts field 1708, social media user IDs field 1712, social media passwords field 1716, social media metadata field 1720, a social media data inbound field 1724, and/or a social media data outbound field 1728. The social media data structure 1704 can include more or fewer field than those shown in FIG. 17, as represented by ellipses 1736.

The social media accounts field 1708 may be the same or similar to the social media accounts field 1624, as described in conjunction with FIG. 16. The social media user IDs field 1712 can be the same or similar to the social media user IDs field 1628 described in FIG. 16. Further, the social media passwords field 1716 may be the same or similar to the social media passwords field 1613 as described in FIG. 16. Thus, fields 1708 through 1716 will not be described further as the description associated with FIG. 16 is applicable to these fields.

The social media metadata field 1720 can include any metadata associated with social media content. The social media metadata 1720 can include information that describes the content as stored or provided. Social media metadata 1720 can include one or more of, but is not limited to, a date and/or time at which the social media posting was made or received, the type of social media posting, the size of the social media posting, the person to which made the social media posting, which site the social media posting was made on, information about a poster of social media content, or other such information. The social media metadata 1720 may be used to organize or modify the user interfaces provided herein. The social media metadata 1720 can also include information about one or more posters, including one or more of, but not limited to, the amount of likes or dislikes received by that poster, the number of subscribers, the number of views of content, or some other information that indicates an influence or readership of a social media poster. Further, the social media metadata 1720 can include information about how a poster or content source is associated with or related to a user of the Intelligent TV 100.

Social media data fields 1724 and 1728 can include the content of a social media posting. This social media data 1724 and 1728 can include pictures, text, audio, visual or such data. The inbound field 1724 stores social media data that is inbound to the Intelligent TV 100. Outbound field 1728 stores social media data that is outbound from the Intelligent TV 100 and is to be posted, is posted, or has been posted, on a social media site 1404.

Figure 18:
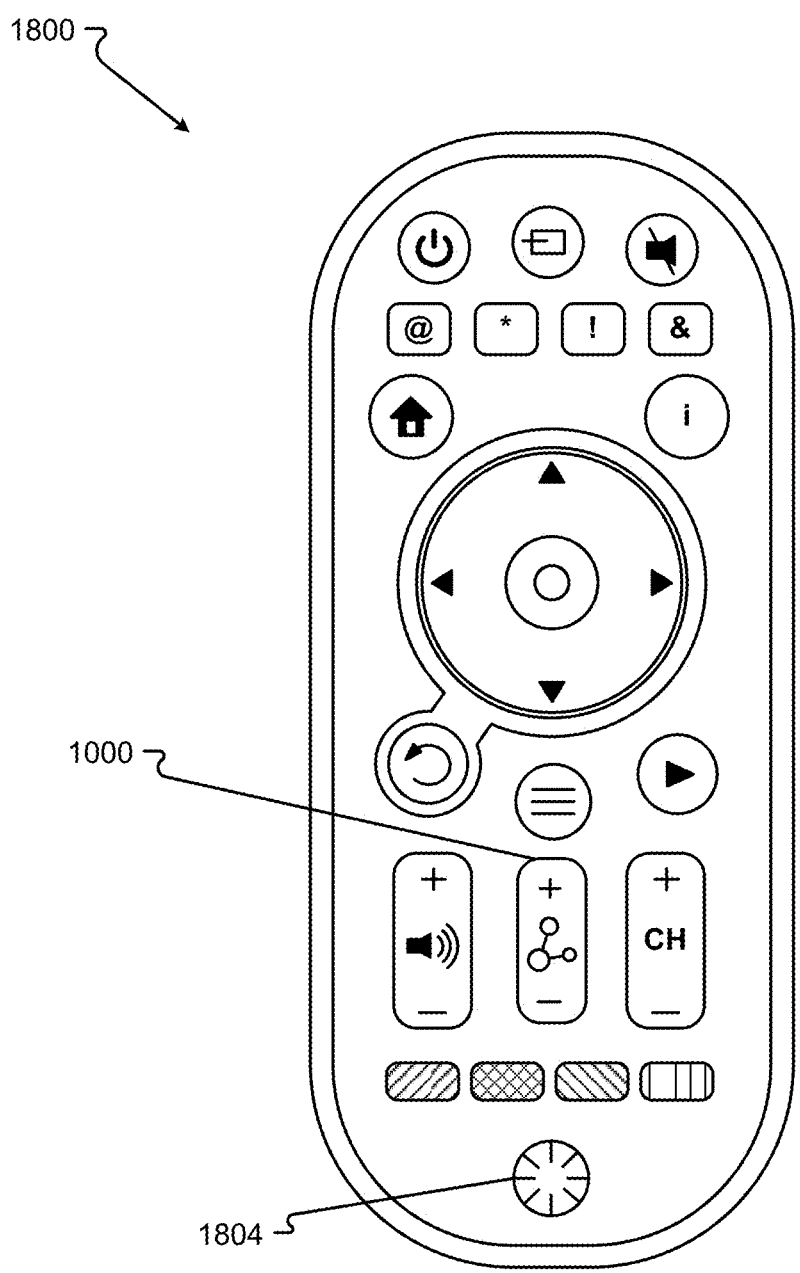
FIG. 18 is another plan view of an embodiment of a handheld remote control.

Another embodiment of a remote control 1800 is shown in FIG. 18. The remote control 1800 can include a social media volume button 1000. This social media volume button may be used to control the amount of social media either inbound to or outbound from the Intelligent TV 100. The remote control 1800 can also include an "ooh-aah" button 1804. The ooh-aah button may be selected to post some type of media content or other data to social media sites. For example, when selected by a user, the ooh-aah button 1804 causes the remote control 1800 to send a signal to the Intelligent TV 100 to act as a proxy and post social media data, which is in focus or selected in the Intelligent Television 100 interface, to one or more social media sites. The Intelligent Television 100 may then post the social media using canned, pre-determined, or preselected processes to one or more social media sites 1404 associated with the user.

For example, the user may browse pictures within a media application. Upon selecting a picture, the user may select the ooh-aah button 1804. Selecting the button 1804 causes the Intelligent Television to send the picture data associated with the selected picture, on the Intelligent Television user interface, to one or more social media sites 1404. Thus, the user can take a picture from their media application and post the picture directly to a social media site (e.g., Facebook™) using a one-click button 1804 on the remote control 1800.

Figure 19:
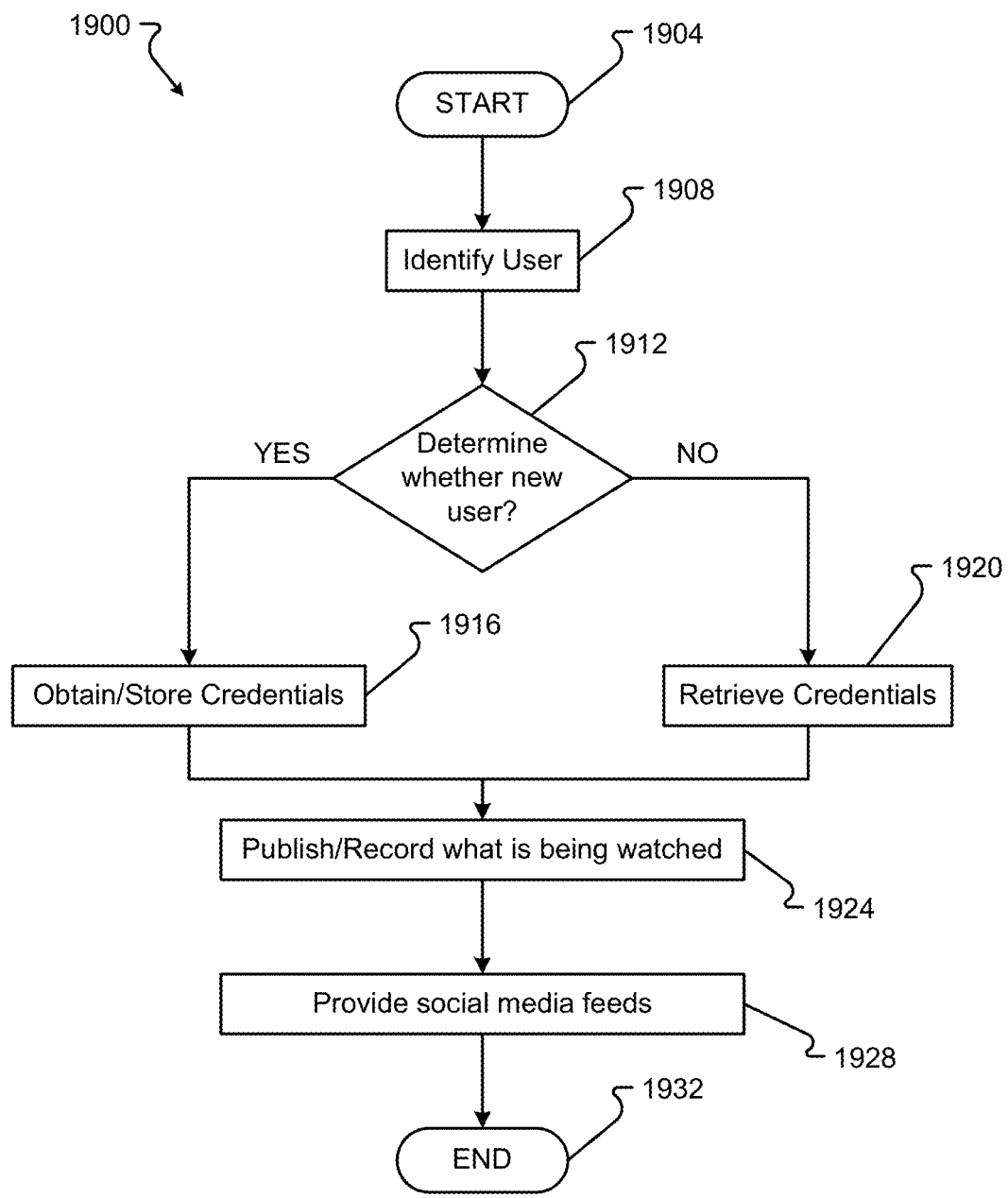
FIG. 19 is a flowchart view of an embodiment of a method for presenting and/or publishing social media information.

An embodiment of a method 1900 for obtaining one or more social media feeds is shown in FIG. 19. While a general order for the steps of the method 1900 is shown in FIG. 19. Generally, the method 1900 starts with a start operation 1904 and ends with an end operation 1932. The method 1900 can include more or fewer steps or can arrange the order of the steps differently than those shown in FIG. 19. The method 1900 can be executed as a set of computer-executable instructions, executed by a computer system, and encoded or stored on a computer readable medium. Further, the method 1900 can be executed by a gate or other hardware device or component in an Application Specific Integrated Circuit, a Field Programmable Gate Array, or other type of hardware device. Hereinafter, the method 1900 shall be explained with reference to the systems, components, modules, software, data structures, user interfaces, etc. described herein.

A user may begin interacting with the Intelligent Television 100 by interfacing with the remote control 168*h*. Any interaction or other information received by the Intelligent Television 100 can be used by the identifier module 1508 to identify the user, in step 1908. The user may exchange data with the Television 100, such as a user name, password, identifier, or other information. Further, the identifier module 1508 can obtain information about the user, including any type of facial or voice recognition, fingerprint analysis, or some other biometric data. Any of the information received or retrieved by the identifier module 1508 can be used to identify the user.

The identifier module 1508 can then determine whether the identified user is new, in step 1912. The identifier module 1508 may search for the information received about the user in one or more identity information fields 1612 or biometric information fields 1620, of data structure 1604, in the database 1600. If the information is found, then the user is not new, and the method 1900 proceeds YES to step 1916. However, if the retrieved or received information is not the same or similar to the data in fields 1612 and 1620, the identifier module 1508 may then determine that the user is new, and the method 1900 proceeds NO to step 1920.

In step 1916, the identifier module 1508 may obtain the social media credentials from the new user and store those credentials the fields 1612 and 1620. The module 1508 can then create a new data structure 1604 with a new user ID 1608. The identifier module 1508 may then present a series of questions, in the user interface, to determine to which social media accounts the user belongs, what the user IDs and passwords are for those accounts, and any other necessary information. This received information can be stored in fields 1624 through 1632. Optionally, the identifier module 1508 may also ask any information about characteristics or other types of data associated with biographical information 1616. This information may also be stored in data structure 1604.

In step 1920, the identifier module 1508 may retrieve the data structure 1604, and any other credential information stored in fields 1624 through 1632 associated with the user. This information may then be sent to the access module 1512.

Figure 20A:
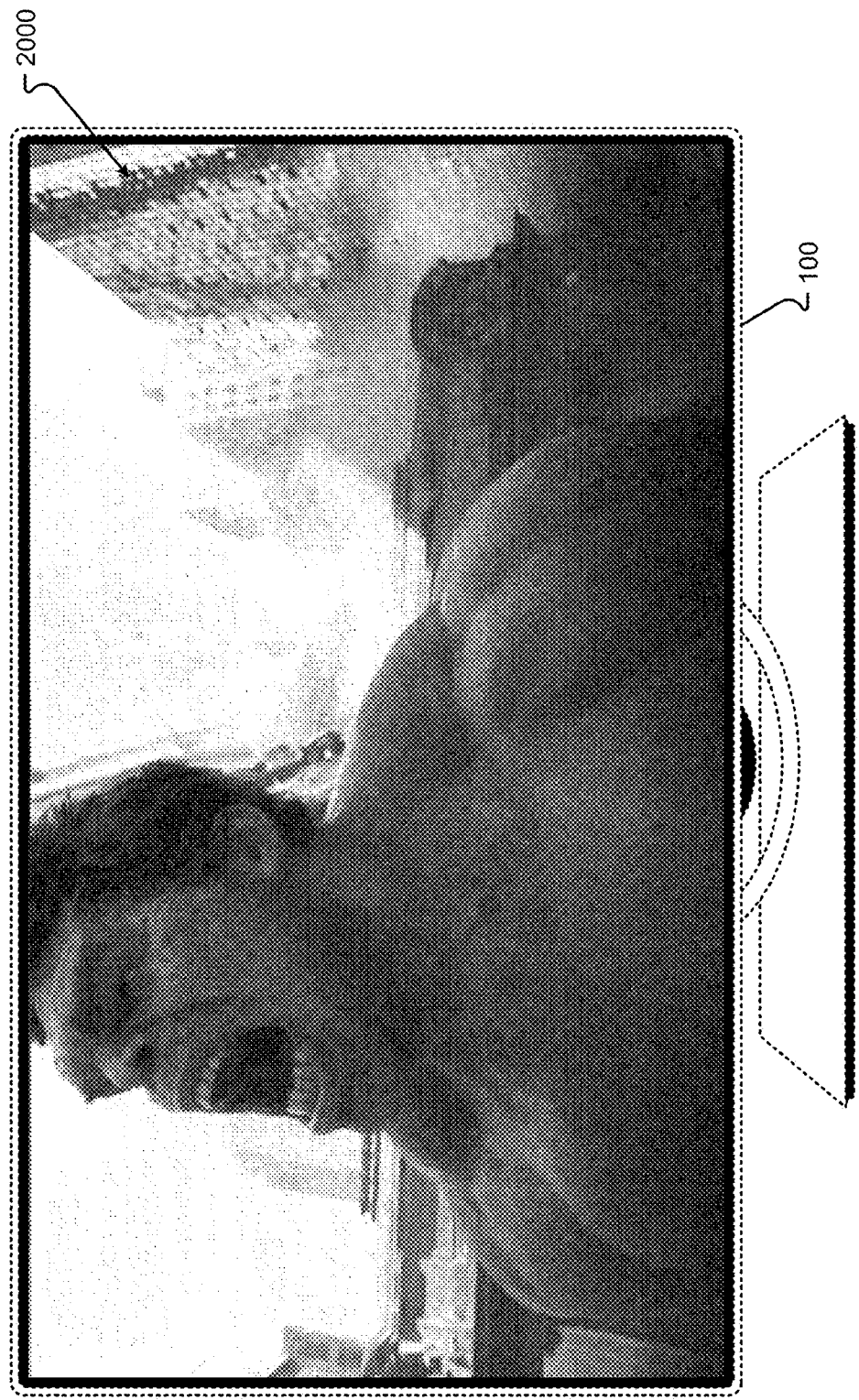
FIG. 20A is a view of an embodiment of a user interface for an Intelligent TV for presenting social media information.

Upon retrieving the information or the credentials, the access module 1512 may then access the social media sites associated with the user. A publish module 1524 may then record what is being watched, for example, the movie or content shown in interface 2000 of FIG. 20A. For example, if the user is watching "The Avengers," the publish module 1524 can publish that information to one or more social media sites 1404. Thus, the user's Facebook™ page may contain a published indication that the user is watching "The Avengers" at that moment. The publish module 1524 can also publish other types of information, including the TV series watched, the television channel being watched, or other information about the content. Thus, the publish module 1524 can automatically publish or record what is being watched, in step 1924, for a user after gaining access to the one or more social media sites.

Figure 20B:
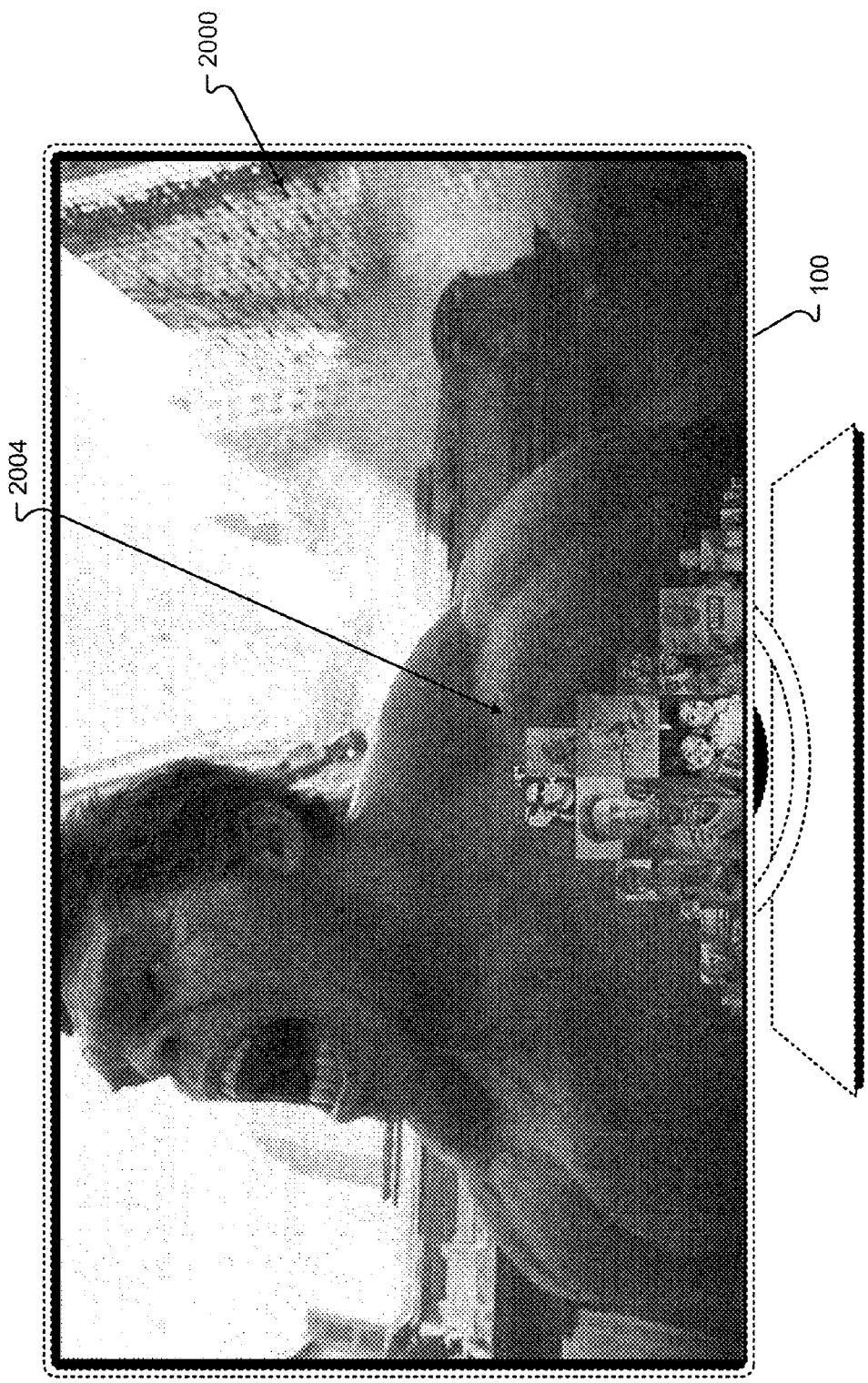
FIG. 20B is a view of an embodiment of a user interface for an Intelligent TV for presenting social media information.

After gaining access, the retrieve module 1516 can retrieve one or more social media datasets and may store those media datasets in the social media data 1528. A presenter module 1520 may then provide the social media feeds to the user, in step 1928. For example, after retrieving information, the presenter module 1520 can create user interface addition 2004, as shown in FIG. 20B. Here, the presenter module 1520 is showing one or more indications of other people using social media that may be associated with the content the user's currently viewing. This user interface may be selectable such that the user may be able to select a picture or icon to see what social media is being provided.

In other instances, the actual pictures or icons shown in 2004 are indicative of an importance of the person, the relation of that person to the user, or some other indication of which the user may be concerned. The tuning into social media channels can be done based on an episode, show, or channel. The tuning into social media channels can be done by a single user or many users. Thus, if several users are tuning into a into social media channel, or identified as watching the television, the social media feeds may be aggregated onto the television user interface.

Further, any posting may go to two or more users' social media accounts. The tuning can be done by either a button or other interaction, with remote control or some on-screen method or menu, that may be navigated by a user using buttons either on the Intelligent TV or on the remote control. The type of tuning completed by the user may influence the visualization presented on the user interface. For example, if several users are tuning into a program, the visualization of the pile of social media pictures 2004 may be visually different. Further, a tune-in into content by a user may register that user as viewing a particular show or episode for other users of the Intelligent TV in other households. Thus, the user, once registered, may be shown on someone else's TV as viewing a particular content. The information about the social media tune-in can be published to social networks, can be used for badging or sharing with advertisers, and can influence the analytics algorithms used to statistically measure how or what content is being watched.

Figure 21:
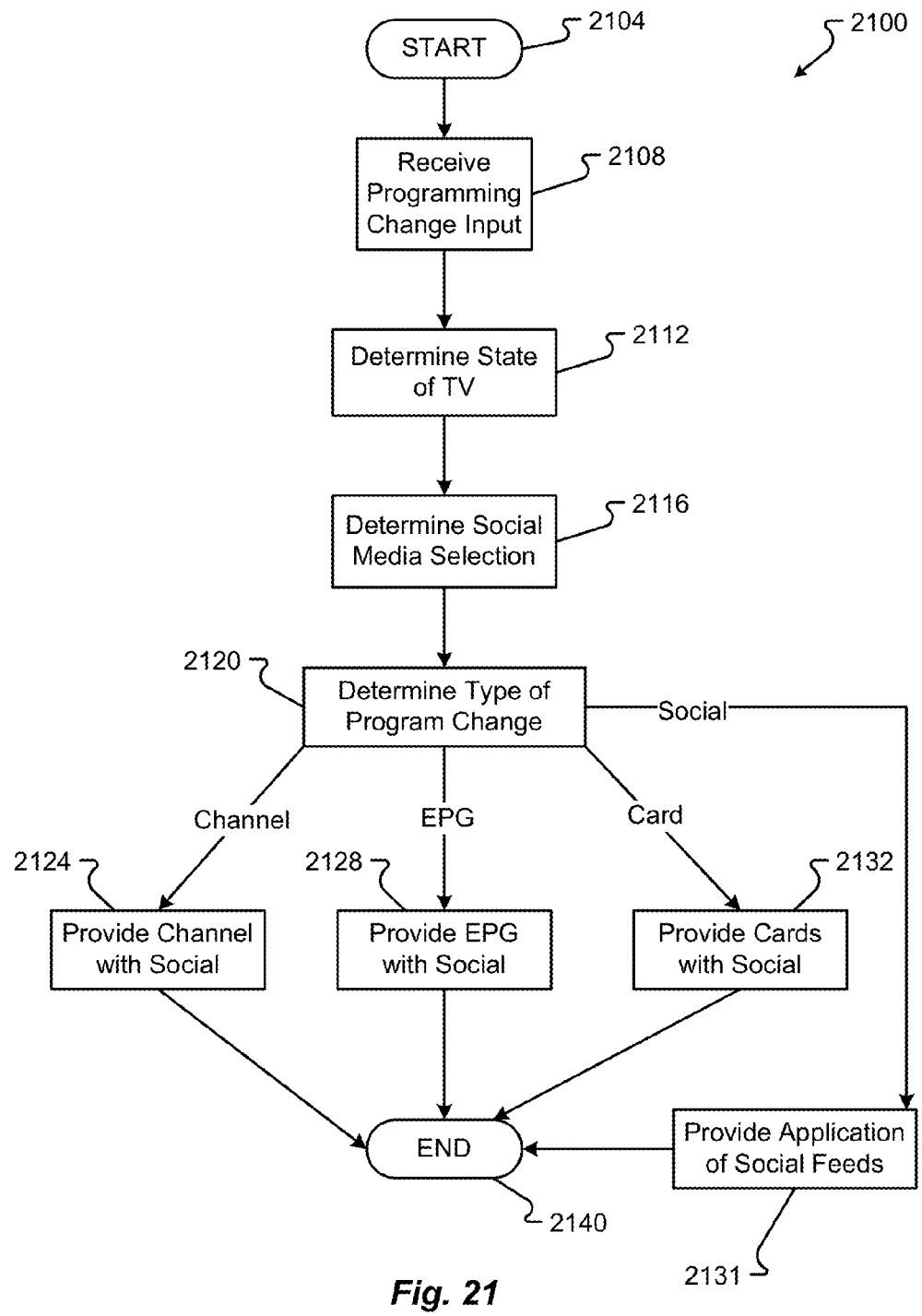
FIG. 21 is a flowchart view of an embodiment of a method for presenting and/or publishing social media information.

A method 2100 for providing a user interface specific to a type of interaction being conducted by the user shown in FIG. 21. While a general order for the steps of the method 2100 is shown in FIG. 21. Generally, the method 2100 starts with a start operation 2104 and ends with an end operation 2140. The method 2100 can include more or fewer steps or can arrange the order of the steps differently than those shown in FIG. 21. The method 2100 can be executed as a set of computer-executable instructions, executed by a computer system, and encoded or stored on a computer readable medium. Further, the method 2100 can be executed by a gate or other hardware device or component in an Application Specific Integrated Circuit, a Field Programmable Gate Array, or other type of hardware device. Hereinafter, the method 2100 shall be explained with reference to the systems, components, modules, software, data structures, user interfaces, etc. described herein.

An Intelligent TV 100 may receive a programming change input, in step 2108. The programming change input can be a signal sent from the remote control 700 that occurs when a user selects a channel change button 784, EPG button 776, or some other type of programming change input button. The remote control 700 sends a signal to the Intelligent TV, which is received by the IR/RF module 354. The IR/RF module 354 then sends the signal to the processor 364 to be interpreted. After receiving the signal, the processor may execute a driver 420 for the remote control 700 in the operating system kernel 404. The driver 420 may translate the received signal and provide that translated signal to the OS runtime 424. The OS runtime 424 may then execute an instance of the input event dispatcher 508, which may then react or interpret the signal further. The remote control input is then sent from the input event dispatcher 508 to one or more user interface application 468 components to provide a user interface display. This process is similar for all remote control 700 inputs and will not be explained again hereinafter but this description should apply hereinafter.

The user interface module 468 can determine the state of the Intelligent TV 100, in step 2112. The state of the TV may be one or more of, but is not limited to, whether social media is being provided, what type of content is currently being viewed, what the state of that content in the display, etc. The user interface application 468 may also determine other factors related to the status of the TV and to understand the programming change input. Such determinations allow the user interface application to understand what will need to be shown on the user interface of the TV to effect the change in programming.

The input event dispatcher 508 may also send the interpreted signal of the programming input change to the presenter module 1520. The presenter module 1520 can determine what social media selection has been made, in step 2116. Here, the presenter module 1520 may interpret past or current inputs as to how much or what type of social media is being provided on the television. This information may then be used by the presenter module 1520 to inform the user interface application 468 as to how to present the social media during or after the programming input change.

The user interface application 468 may then determine the type of programming change that was made, in step 2120. Here, the user interface application 468 can determine if the programming input change is a change of the channel, a selection to view the electronic programming guide (EPG), a selection to view the card display, or a selection of an application. There may be other types of programming change types that are included and envisioned in the application herein. Depending on the type of programming change, the silo manager 532, the panel manager 536, or another user interface application 468 may then be signaled to change the programming or make a transition of programming while including a view of social media available for that programming that is selected by the user.

If the type of programming change is to change the channel, the method 2100 proceeds through the CHANNEL path to step 2124. If the programming type change is for electronic programming guide, the method 2100 proceeds through the EPG path to step 2128. If the programming change is for a card display, the method 2100 proceeds through the CARD path to step 2132. Finally, if the programming type change is for an application, the method 2100 proceeds through the APPLICATION path to step 2136.

Figure 22:
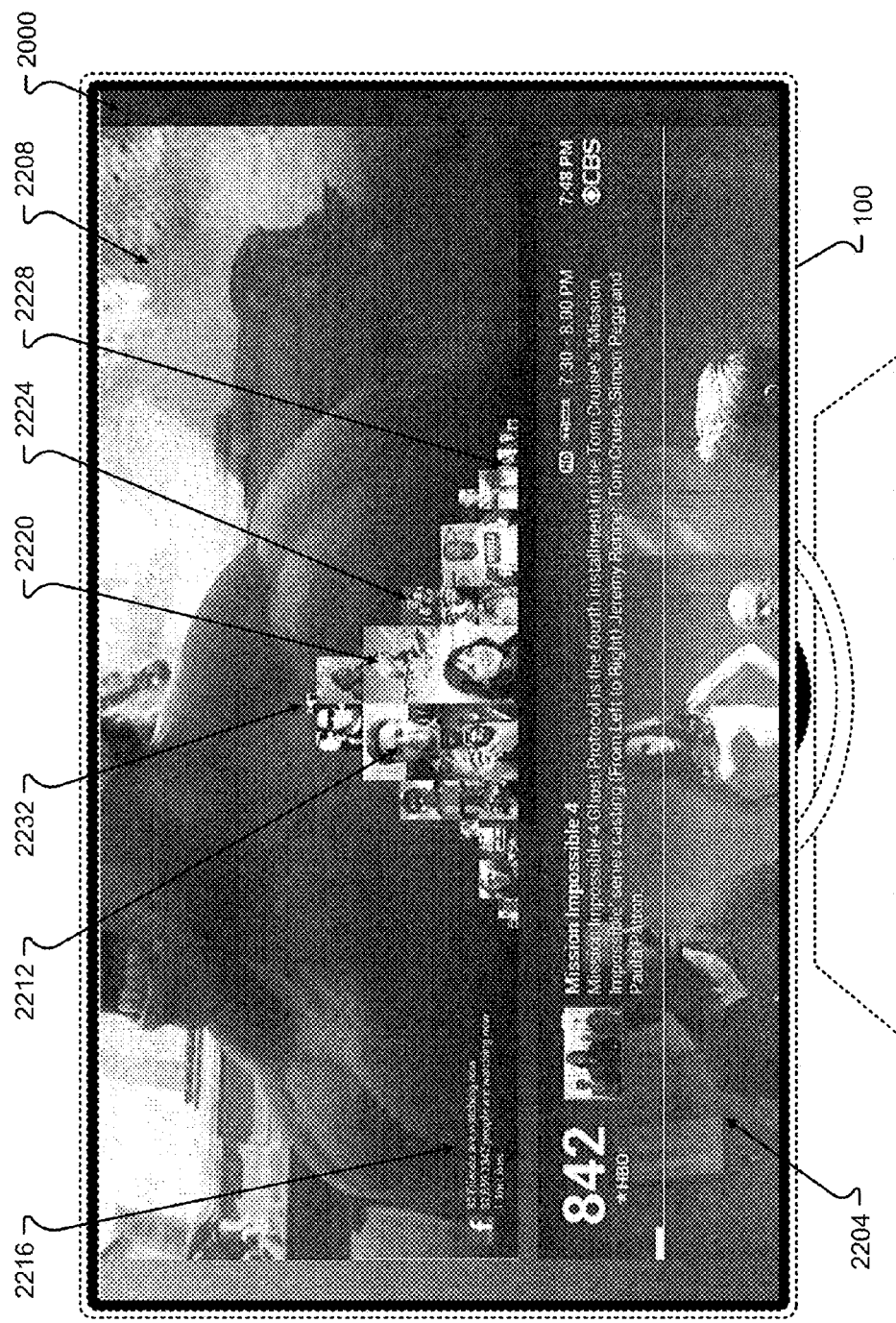
FIG. 22 is a view of an embodiment of a user interface for an Intelligent TV for presenting social media information.

In a programming type change, the silo manager 532 can provide a display for changing the channels, step 2124. Here, the silo manager 532 can show a transition between two television or content channels. An example display 2200 is shown in FIG. 22. Here, the silo manager 532 shows the transition from a first content panel 2204 to a second content panel 2208. The movement may be up or down depending on the direction of the channel change. Regardless, the current panel may appear to move up or down off the screen while the new channel panel is presented on the user interface 2200. The panels, while moving, can show a display of information about the social media associated with that panel. For example, panel 2208 provides for a pile view of thumbnails (e.g., social media pictures or icons) 2212 that indicates that there is social media associated with the content of that panel 2208. Further, the panel 2208 can provide a description of the type social media, for example, the information 2216, which describes the associated Facebook™ social media content that is associated with the content presented in panel 2208. Thus, as channel changes are being made, the user can receive a visual and descriptive indication of the social media that may be associated with that program or content.

Figure 23:
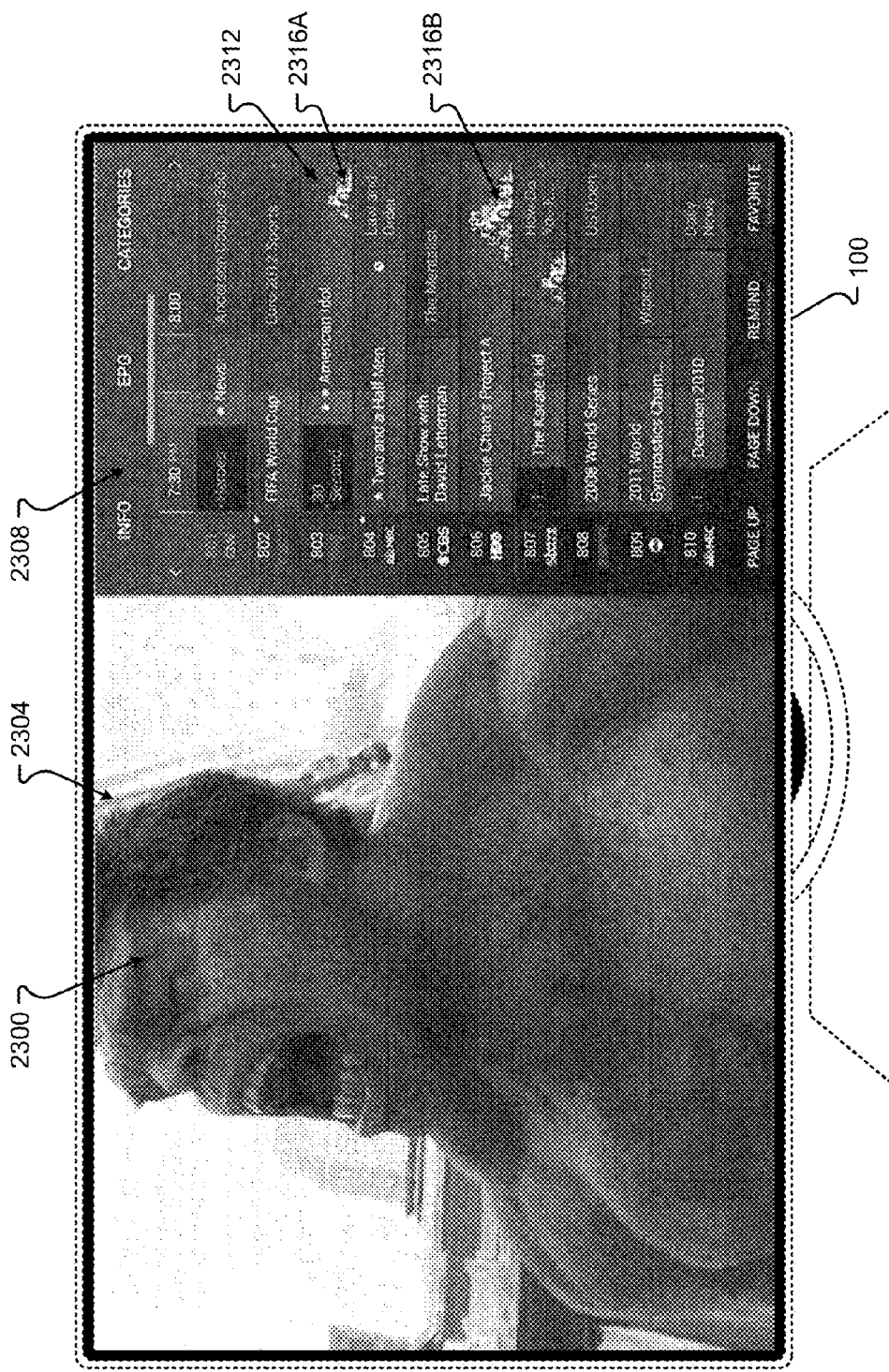
FIG. 23 is a view of an embodiment of a user interface for an Intelligent TV for presenting social media information.
Figure 24:
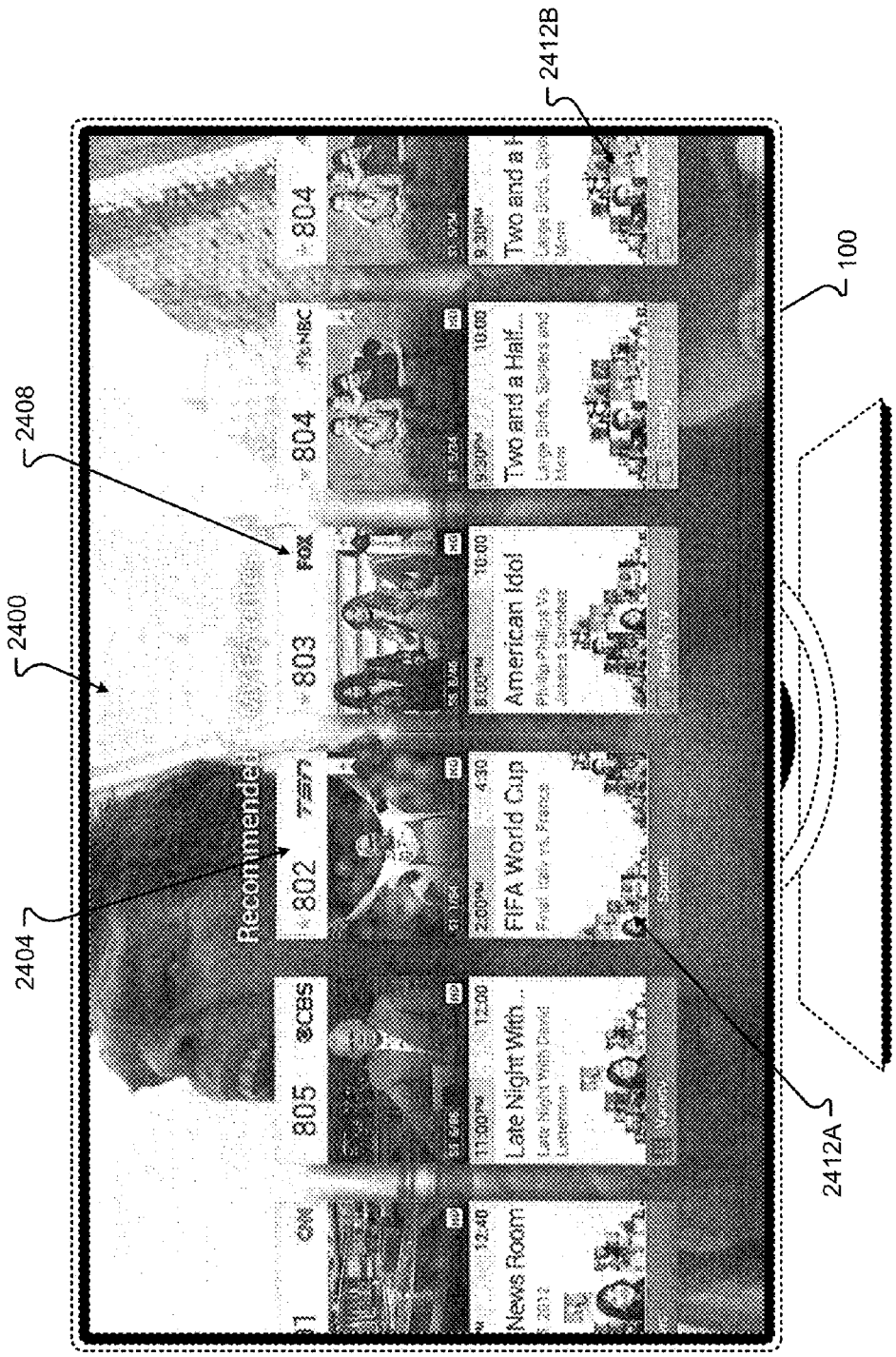
FIG. 24 is a view of an embodiment of a user interface for an Intelligent TV for presenting social media information.

In step 2128, the panel manager 536 and/or silo manager 532 may provide content 2304, in a user interface 2300, as shown in FIG. 23. The user may then select an EPG display and be provided with a silo 2308 which provides the EPG. Thus, the silo manager 532 can provide for a silo or panel on one portion of the display 2300 that shows electronic programming guide information. The EPG guide may include one or more program listings 2312 for one or more channels. The program listings 2312 can have an indication of social media content 2316a, 2316b, which demonstrates that social media is associated with the content being provided by that channel. The view of the social media indication 2316 may be different depending on the volume of social media provided for that content or based on the size or display area of the channel or content description. Thus, the silo manager 532 and/or panel manager 536 can provide for an EPG panel with social medial indications as shown in FIG. 23.

A card view 2400 can be provided by the silo manager 532 and/or panel manager 536, in step 2132, which includes a user interface providing cards of different content. The cards 2404, 2408, show a single episode or program on some channel, station, or content provider that may be associated with recommended content or content selected as a favorite by a user. The 2404, 2408 card may be selected to switch the channel to provide that content. Each content card 2404, 2408, may include an indication of social media associated with that program. For example, social media indications 2412a and 2412b provide an indication of social media is associated with that particular program. These indications may be of different types, and may change by visual appearance or style based on how much social media is provided with the program or what type of social media is provided with the program. Thus, the silo manager 532 and/or panel manager 536 can provide these social media indications as provided by the presenter module 1520 based on what content the user desires to view and/or what type of social media is offered with that content.

Figure 25:
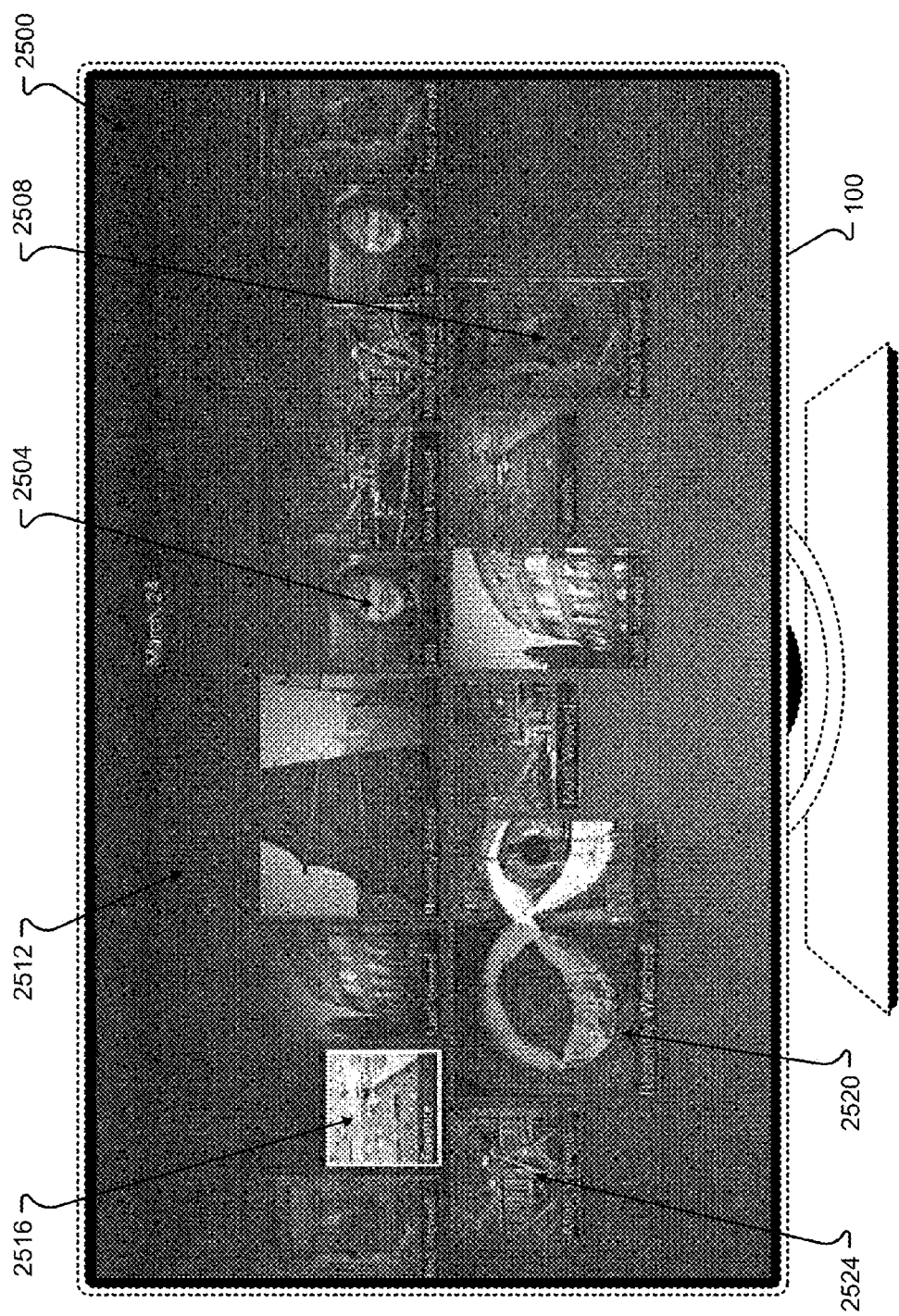
FIG. 25 is a view of an embodiment of a user interface for an Intelligent TV for presenting social media information.

In step 2136, the silo manager 532 and/or panel manager 536, or some other function of the user interface application 468, can provide a view 2500 of a social media application, shown in FIG. 25. The view 2500 can include one or more indications of social media, 2504, 2508 associated with the social media application. Here, the social media application can receive information from the presenter module 1520 and provide indications of social media currently available for the user. This social media can include pictures, texts, blog entries, or other information provided in the user's various social media streams. The display provided by the presenter module 1520 can provide an indication of the type of social media, the amount of social media that's being provided, a timeline for that social media, or other indications of the relation of social media to the user.

Figure 26:
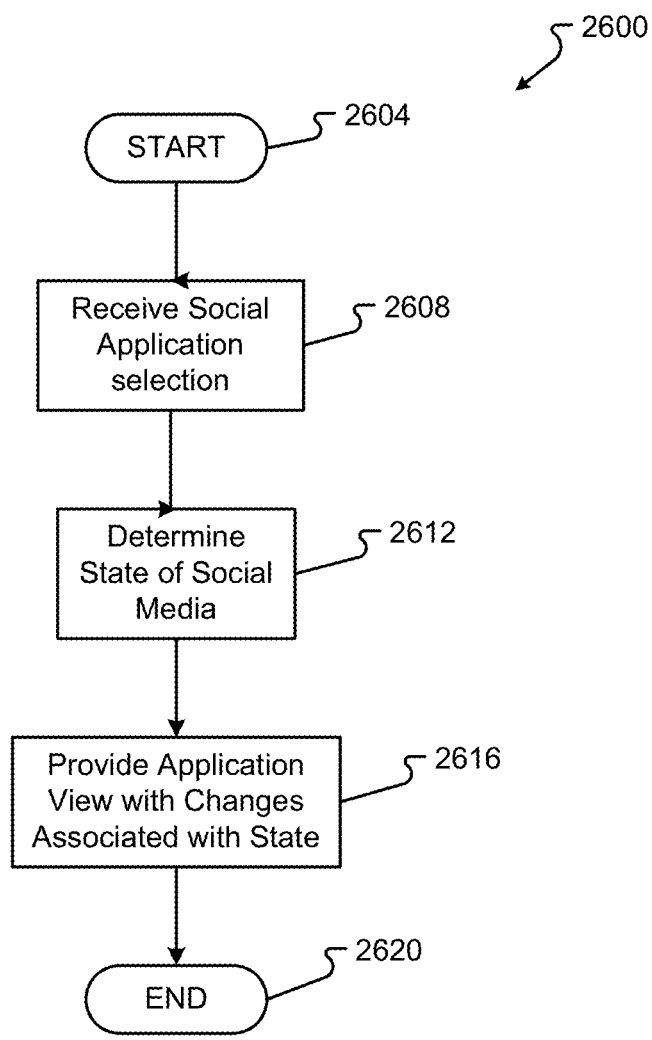
FIG. 26 is a flowchart view of an embodiment of a method for presenting and/or publishing social media information.

A method 2600 for changing the appearance of the social media application is shown in FIG. 26. While a general order for the steps of the method 2600 is shown in FIG. 26. Generally, the method 2600 starts with a start operation 2604 and ends with an end operation 2620. The method 2600 can include more or fewer steps or can arrange the order of the steps differently than those shown in FIG. 26. The method 2600 can be executed as a set of computer-executable instructions, executed by a computer system, and encoded or stored on a computer readable medium. Further, the method 2600 can be executed by a gate or other hardware device or component in an Application Specific Integrated Circuit, a Field Programmable Gate Array, or other type of hardware device. Hereinafter, the method 2600 shall be explained with reference to the systems, components, modules, software, data structures, user interfaces, etc. described herein.

A user may send a signal, via the remote control 700, to switch the user interface to a social media application, in step 2608. The Intelligent TV 100 may receive this signal and interpret the signal to present the social media application. The process of receiving the social media application signal may be similar to that as described in FIG. 21.

The presenter module 1520 may, upon switching to the social media app, determine the state of the social media streams, in step 2612. Here, the presenter module 1520 may access the social data 1528, as provided by the retrieve module 1516. In the social media data 1528, the presenter module 1520 may determine what metadata and other data is provided in data structure(s) 1704, in fields 1720 through 1728. This information can be used to order or sort the social media. The information can determine the state as to one of more of, but not limited to, favorites, what's been watched, what hasn't been viewed, the timing of the social media streams, and other such data. On determining the state of the social media data, the presenter module 1520 may order/sort the social media data for presentation in user interface 2500.

The presenter module 1520 may then provide the information to the user interface application 468 to provide an application view 2500 with changes associated with the state of the social media, in step 2616. Here, the application view 2500 provides for different views of social media streams based on preview thumbnails. These thumbnails may each be ordered or changed based on the state of the social media stream. For example, a delineation line 2512 indicates a demarcation between dates of when the social media was received. For example, thumbnails to the right of demarcation 2512 may be received on March 24th, while thumbnails presented to the left of demarcation 2512 may have been received before March 24th. Further, within each date, the thumbnails may be changed to indicate some sort of state of the social media. For example, the size of the thumbnail may indicate how many views have been made to that particular piece of social media. For example, the most viewed thumbnail 2524 is smaller than the most viewed thumbnail 2508 to indicate that the social media associated with thumbnail 2524 does not have as many views as the social media associated with thumbnail 2508.

Further, the thumbnails may be an item picked from the social media to provide a visual indication of what the social media is about. For example, the recently watched thumbnail 2520 may provide a picture or a frame of video from the social media. Thus, the user can determine quickly what the social media may be and whether it is worth selecting to view. The user may also select or highlight one or more of the thumbnails, for example, thumbnail 2516, which can indicate to the user they may select that thumbnail to view that social media. The order of the social media thumbnails, and the sorting or placement of the social media within the application user interface 2500, may also indicate other types of status of the social media.

Figure 27:
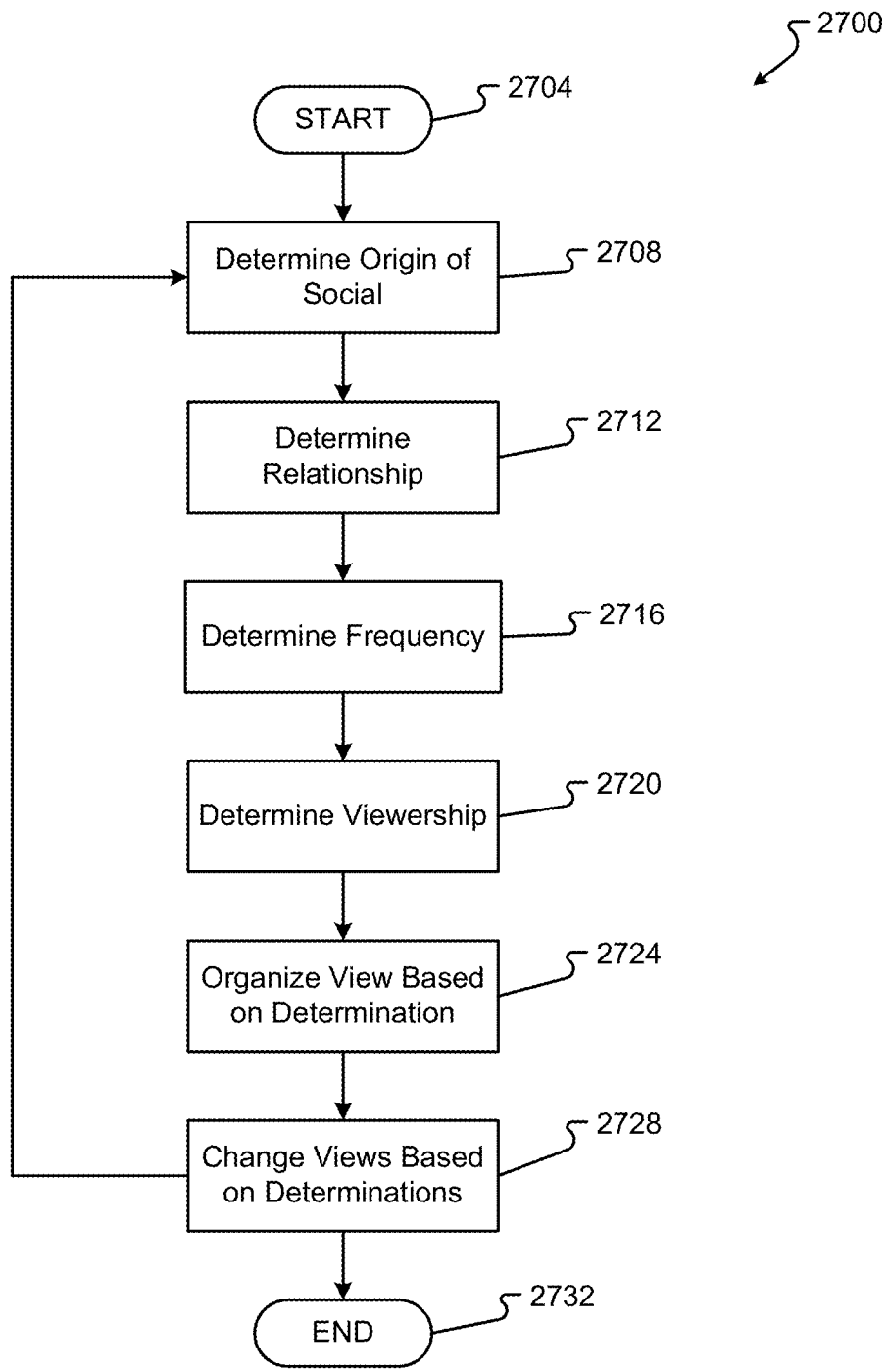
FIG. 27 is a flowchart view of an embodiment of a method for presenting and/or publishing social media information.

An embodiment of a method 2700 for semantically presenting social media stream information is provided in FIG. 27. While a general order for the steps of the method 2700 is shown in FIG. 27. Generally, the method 2700 starts with a start operation 2704 and ends with an end operation 2732. The method 2700 can include more or fewer steps or can arrange the order of the steps differently than those shown in FIG. 27. The method 2700 can be executed as a set of computer-executable instructions, executed by a computer system, and encoded or stored on a computer readable medium. Further, the method 2700 can be executed by a gate or other hardware device or component in an Application Specific Integrated Circuit, a Field Programmable Gate Array, or other type of hardware device. Hereinafter, the method 2700 shall be explained with reference to the systems, components, modules, software, data structures, user interfaces, etc. described herein.

The presenter module 1520 can determine the origin of social media based on social media metadata 1720, in step 2708. The origin of the social media may be based on country or user or poster. This origin may be stored by the retrieve module 1516 in the social media metadata field 1720.

The presenter module 1520 can also determine a relation of that presenter or poster determined in step 2708, in step 2712. The relation may be whether the poster is a friend, whether the channel is subscribed to, whether the user has liked information in the social media postings, or some other information that may be determined about the relationship between the current TV watcher and the social media poster. This information may be presented or extracted from data in a social media metadata 1720.

The presenter module 1520 may also determine some frequency of postings by the poster determined in step 2708, in step 2716. A frequency of posting, for example, every hour, every day, every week, can indicate the amount or impact of the poster has in the social media stream. This frequency may be derived from two or more postings made by that particular social media poster. This information may be found in the social media metadata 1720, or extracted therefrom, by determining a calculation of frequency based on dates of postings made by that poster.

The presenter module 1520 may also access social media metadata 1720 to determine the viewership, in step 2720, for a poster determined in step 2708. Viewership may be the number of subscribers, the number of likes, the number of friends, or other information about the poster. This information may be stored in the social media metadata 1720, by the retrieve module 1516. The viewership may provide for how important the social media poster is on that particular social media site. On determining these and possibly other criteria or information about the social media, the presenter module 1520 can organize a view of the social media data based on these determinations, in step 2724. Thus, the presenter module 1520 may rank or organize the view of the social media data based on viewership, relationship, or other information that determines the importance of the poster in the general social media environment and how important that poster is to the current user of the Intelligent TV 100.

The presenter module 1520 may then change the view of the social media user interface 2500 based on the determinations and organization completed in step 2724, in step 2728. For example, the social media pile 2212 shown in FIG. 22 may have two or more thumbnails that are organized or presented based on the determinations in method 2700. For example, thumbnail 2220 may be bigger than thumbnail 2224 to indicate the number of, or frequency of, postings made by that poster associated with that thumbnail. Thus, each thumbnail may represent a poster in a social media stream. The size of the thumbnails may indicate the importance of that poster on that social media stream.

Further, the positioning of the thumbnails may indicate some relation to the user. For example, thumbnail 2228 is positioned at the bottom and periphery of the pile 2212. In contrast, thumbnail 2232 is presented at the apex of the pile 2212 in the center. Thus, the poster 2232 may be a closer relation or more important to the current Intelligent TV user than the poster represented by thumbnail 2228. The views, and thus the pile 2212, may be changed based on dynamic settings determined by the presenter module 1520. The pile 2212 then allows the user to visually and semantically determine the importance of the social media being offered on user interface 2200.

Figure 28A:
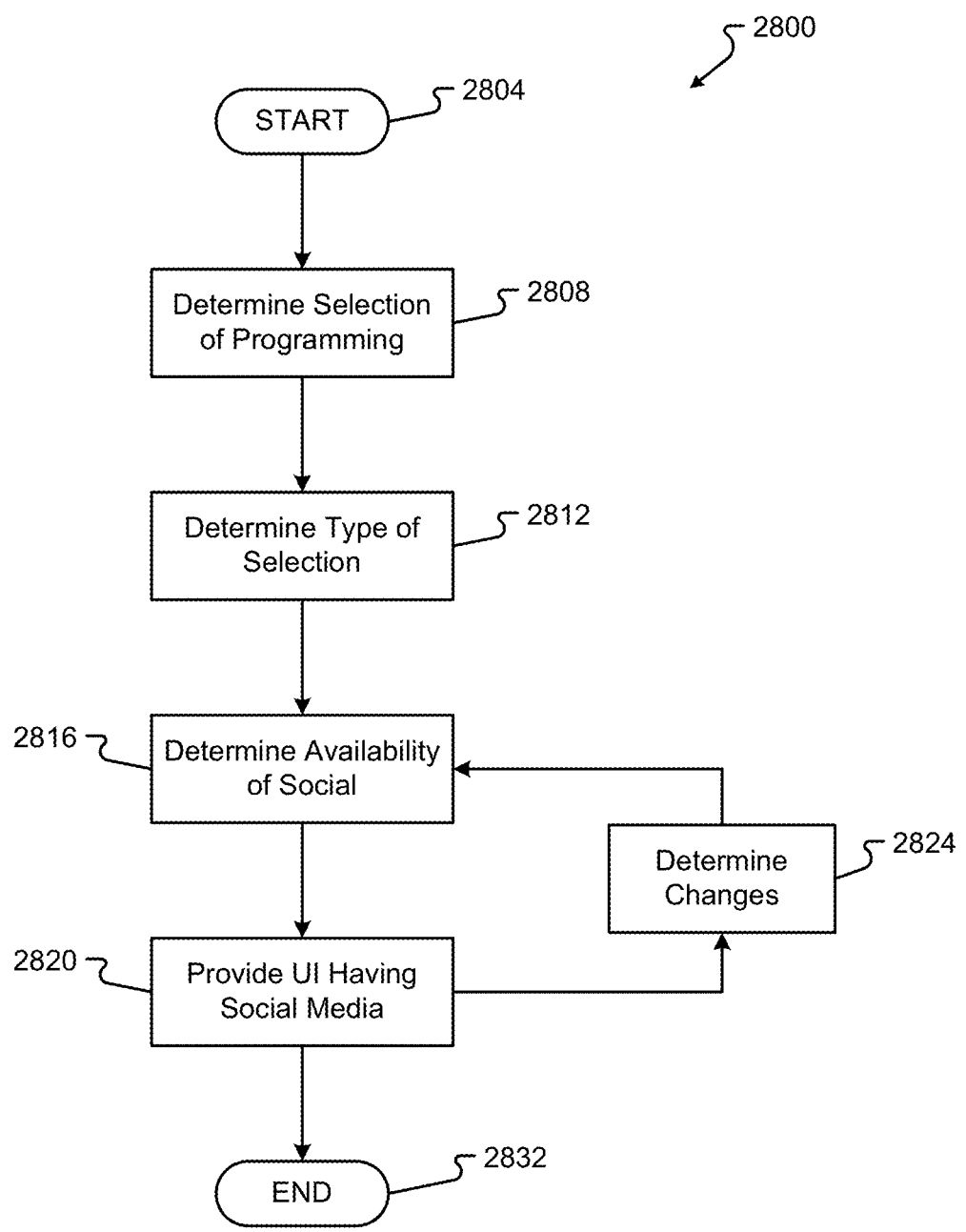
FIG. 28A is a flowchart view of an embodiment of a method for presenting and/or publishing social media information.

A method 2800 for providing a visual interface for accessing social media associated with content is provided in FIG. 28A. While a general order for the steps of the method 2800 is shown in FIG. 28A. Generally, the method 2800 starts with a start operation 2804 and ends with an end operation 2832. The method 2800 can include more or fewer steps or can arrange the order of the steps differently than those shown in FIG. 28A. The method 2800 can be executed as a set of computer-executable instructions, executed by a computer system, and encoded or stored on a computer readable medium. Further, the method 2800 can be executed by a gate or other hardware device or component in an Application Specific Integrated Circuit, a Field Programmable Gate Array, or other type of hardware device. Hereinafter, the method 2800 shall be explained with reference to the systems, components, modules, software, data structures, user interfaces, etc. described herein.

A Intelligent TV 100 may receive a selection for programming, in step 2808. The selection, and the reception thereof, may be similar to step 2108 described in conjunction with FIG. 21. The presenter module 1520 can determine the type of selection, in step 2812. The selection may be a type of user interface that is going to be watched. The presenter module 1520 can determine the type of social media indication that should be provided for that user based on that selection. The selections can include a content view, a view for changing channels, a view for playing media, a view for watching sports, or some other selection.

Upon determining the type of selection, the presenter module 1520 may determine the availability of social media, in step 2816. Here, each piece of social media may have some relation to a piece of content. Thus, based either on the data within the social media, as accessed in field 1724, or based on associations deduced by information in the social media metadata 1720, the presenter module 1520 can determine whether the social media posting is related to the content, and thus, available to be presented in the user interface. This determination can be based on whether the user or poster is also registered as watching that content on another TV in another location, whether the posting itself was directed to that content, or some other information.

Figure 29:
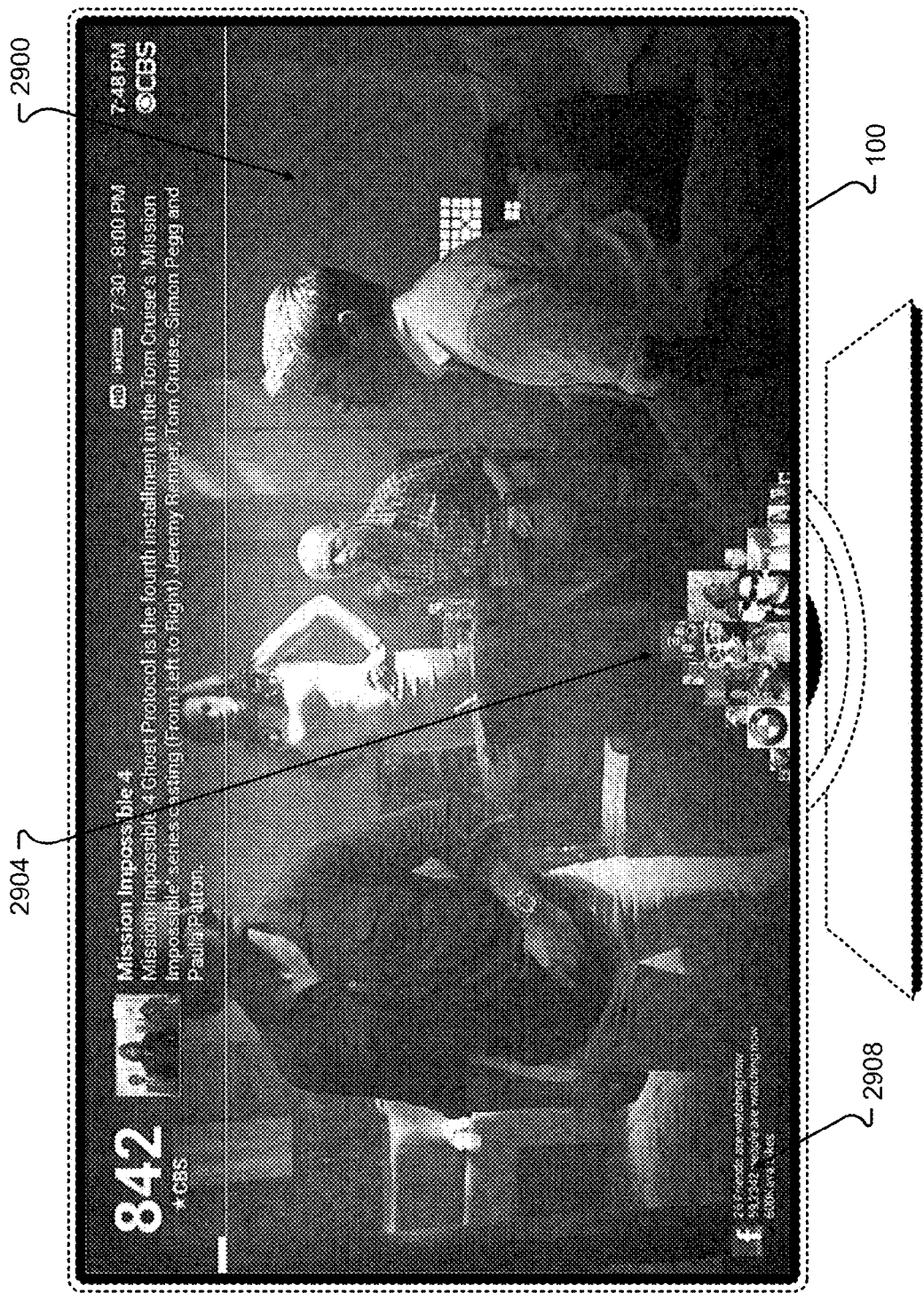
FIG. 29 is a view of an embodiment of a user interface for an Intelligent TV for presenting social media information.
Figure 30:
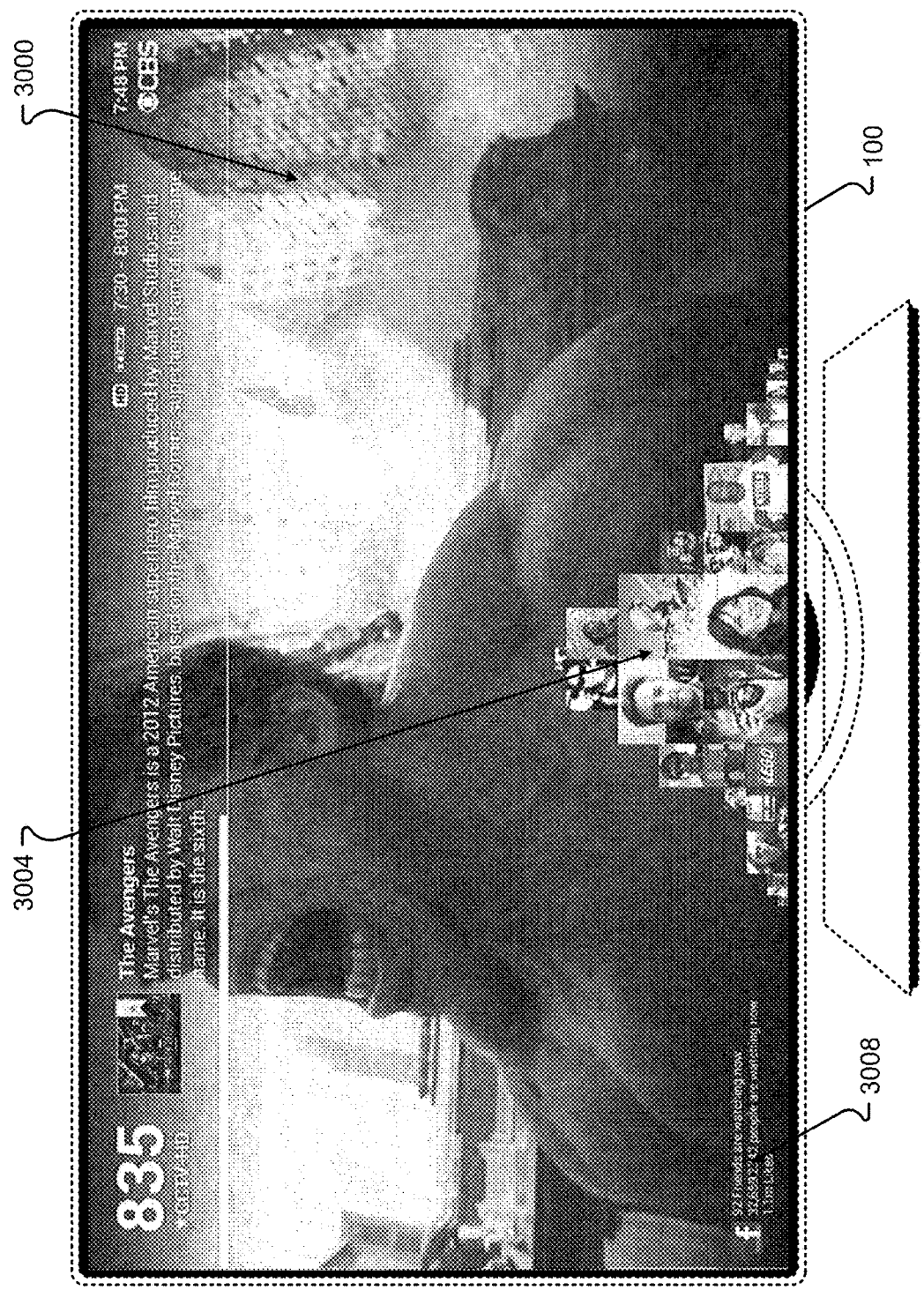
FIG. 30 is a view of an embodiment of a user interface for an Intelligent TV for presenting social media information.

Based on the determinations in step 2816, the presenter module 1520 can provide a user interface having social media, in step 2820. For example, the presenter module 1520 can present the user interface 2900, shown in FIG. 29. Here, the user may be watching a movie in a player or on a channel. The movie may have associated social media content presented in a pile view 2904. Further, there may be more information about who is watching, or currently registered as watching, that program, as provided in text 2908. If the user is watching a different channel, such as user interface 3000, shown in FIG. 30, the social media pile 3004 may include more social media as evidenced by the fact that there are more friends watching that program, as listed in the text 3008. Thus, the social media pile 3004 may be larger in one view as compared to another 2904 based on the availability of social media, as determined in step 2816. In this way, the presenter module 1520 can change the view or provide a different view for social media content for the Intelligent TV 100.

In another view, the social media may be presented in a new area; as shown in user interface 3100, the social media pile 3104 is presented in a banner 3108. Further, the text 3112 is also provided in the banner 3108. In this way, the social media content may be accessed if the user brings up the banner but does obstruct the view of the content. This user interface may be a setting or an indication for a user and may be provided based on the type of selections determined in step 2812.

Figure 31:
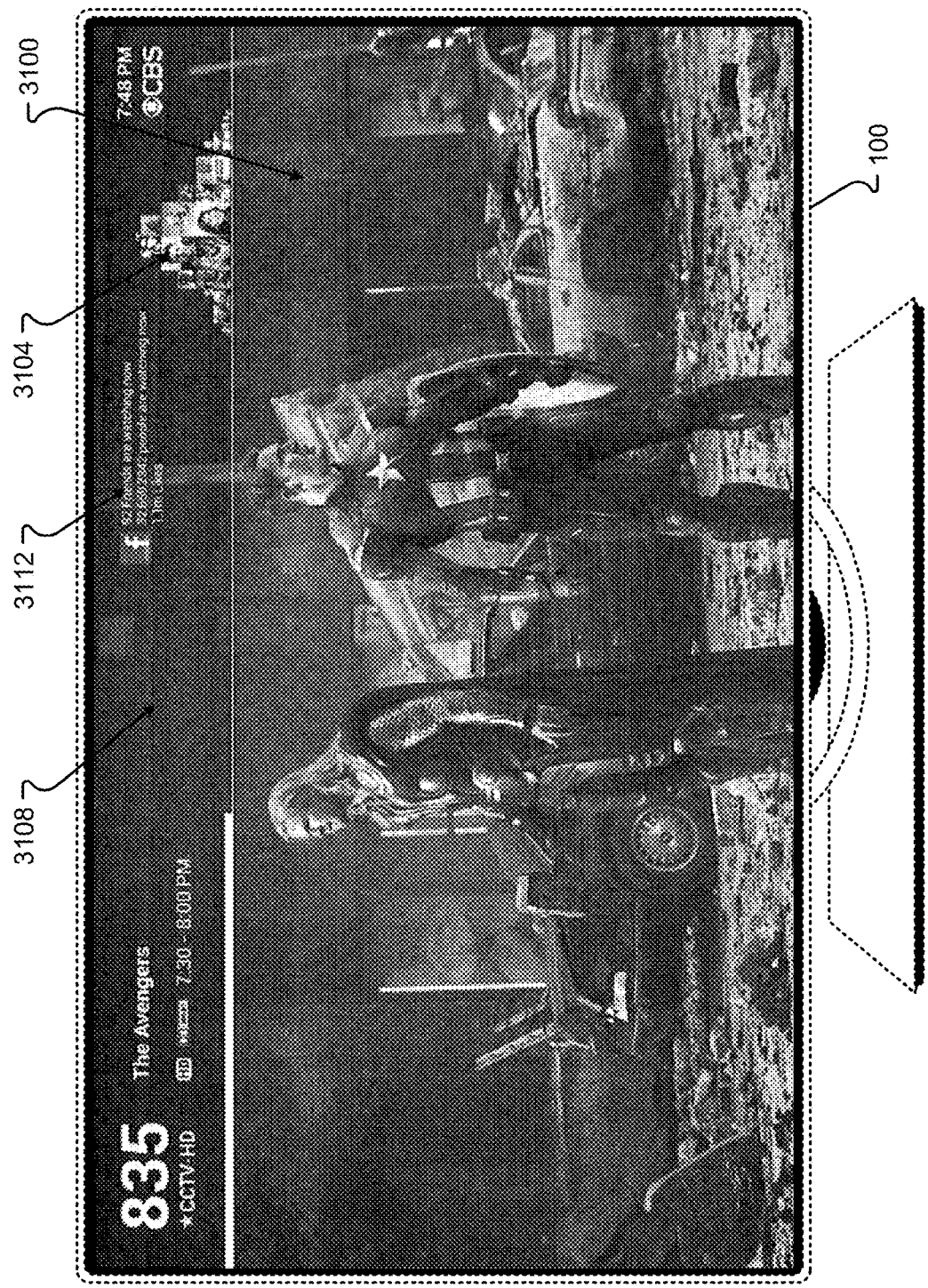
FIG. 31 is a view of an embodiment of a user interface for an Intelligent TV for presenting social media information.
Figure 32:
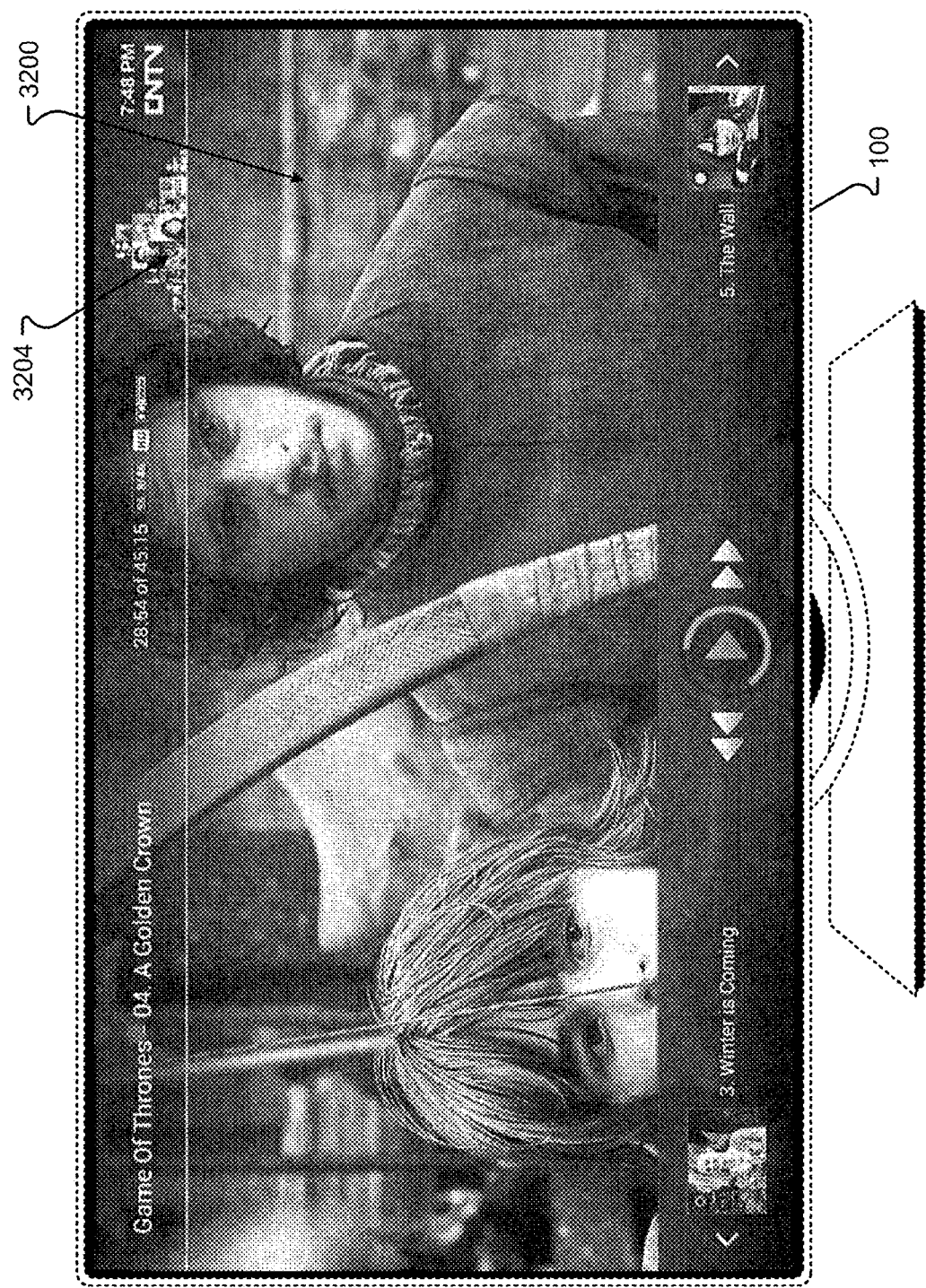
FIG. 32 is a view of an embodiment of a user interface for an Intelligent TV for presenting social media information.

The Intelligent TV 10 may also provide social media indications in a media player user interface 3200, as shown in FIG. 32. Here, the presenter module 1520 may present the social media pile 3204 in a banner, but not provide the text (similar to text 3112, shown in FIG. 31). Thus, the presenter module 1520 may change the type of presentation of the social media data or indication of social media data based on user preference and the type of user interface selected by the user.

Figure 28B:
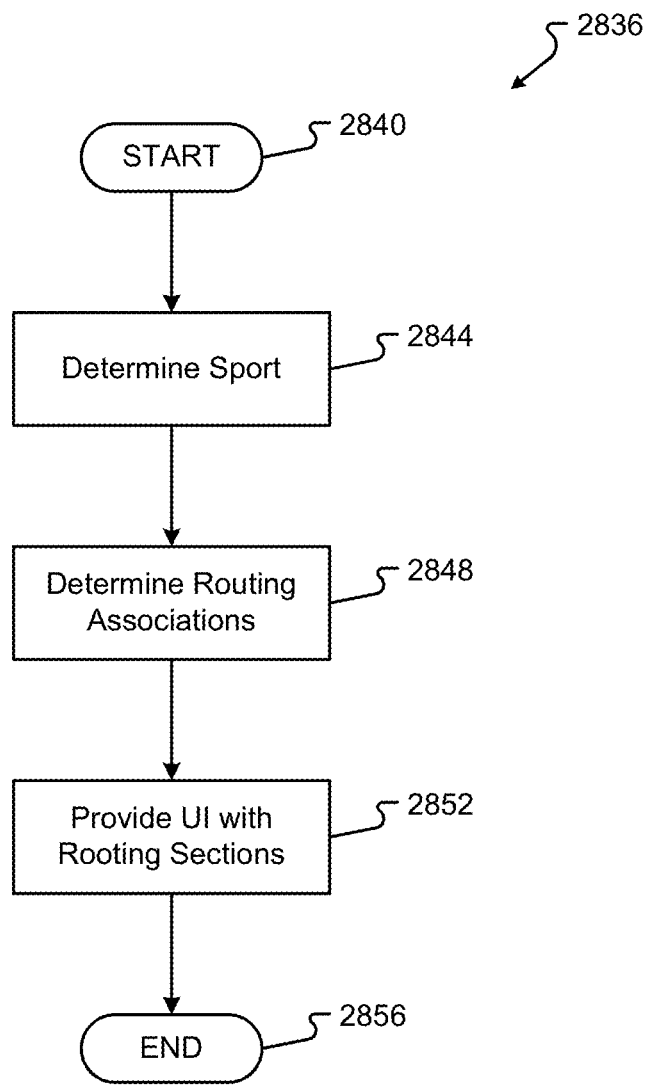
FIG. 28B is a flowchart view of an embodiment of a method for presenting and/or publishing social media information.

Another type of social media presentation may be associated with a sporting event that is described in conjunction with FIG. 28B. While a general order for the steps of the method 2836 is shown in FIG. 28B. Generally, the method 2836 starts with a start operation 1904 and ends with an end operation 1956. The method 2836 can include more or fewer steps or can arrange the order of the steps differently than those shown in FIG. 28B. The method 2836 can be executed as a set of computer-executable instructions, executed by a computer system, and encoded or stored on a computer readable medium. Further, the method 2836 can be executed by a gate or other hardware device or component in an Application Specific Integrated Circuit, a Field Programmable Gate Array, or other type of hardware device. Hereinafter, the method 2836 shall be explained with reference to the systems, components, modules, software, data structures, user interfaces, etc. described herein.

Figure 33:
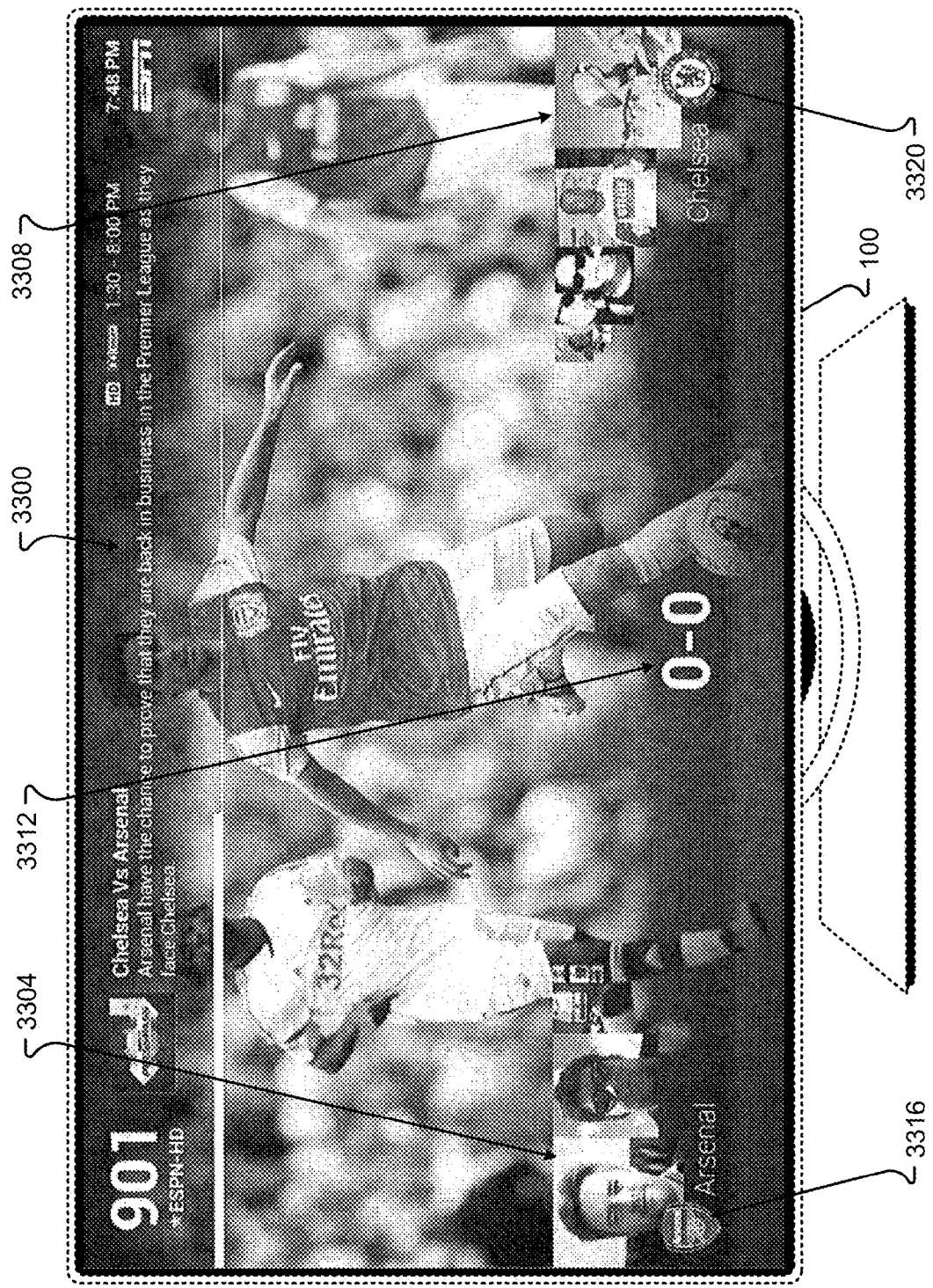
FIG. 33 is a view of an embodiment of a user interface for an Intelligent TV for presenting social media information.

Method 2836 can provide for a special display for sporting events, as shown in FIG. 33. The presenter module 1520 may access information provided by the EPG data or other information to determine the type of sport being watched on the channel, in step 2844. This sport and the participants may be determined by the presenter module 1520. Upon determining the sport, in step 2844, the presenter module 1520 may access social media data 1704 to determine rooting associations of posters within the social media metadata, in step 2848. The rooting association can be an affiliation of the poster or social media user with a certain team. For example, as shown in FIG. 33, social media users represented by thumbnails 3304 may be associated with the soccer team "Arsenal." Likewise, users represented by thumbnails 3308 may be associated with the soccer team "Chelsea." These relationships may be indicated by favorites or other indications provided by the social media users in the social media sites or streams. This information may be deduced by the presenter module 1520 or provided by the retrieve module 1516.

Upon determining the rooting associations, the presenter module 1520 can provide a user interface with rooting sections on the user interfaces shown in user interface 3300 in FIG. 33, in step 2852. Here, the thumbnails are organized on two sides of the screen 3300. This organization allows for the different posters to be partitioned or designated as associated with certain teams. Further, the user interface 3300 can provide one or more indications, such as a name or team information or logos or trademarks 3316 and 3320, to indicate which teams the two rooting sections are associated therewith. The organization of the rooting sections may also be associated with the score indication 3312 presented in the user interface. Further, the rooting sections may be logically associated based on who's the home team or the away team. Those different associations or rooting section locations may change based on the culture of the certain sport. For example, European soccer may indicate the home team on the left side of the screen, while, if watching a basketball game from the National Basketball Association, the rooting section home team may be on the right side. Thus, this unique user interface 3300 provides for a different type of social media indication than those user interfaces provided previously.

Figure 34:
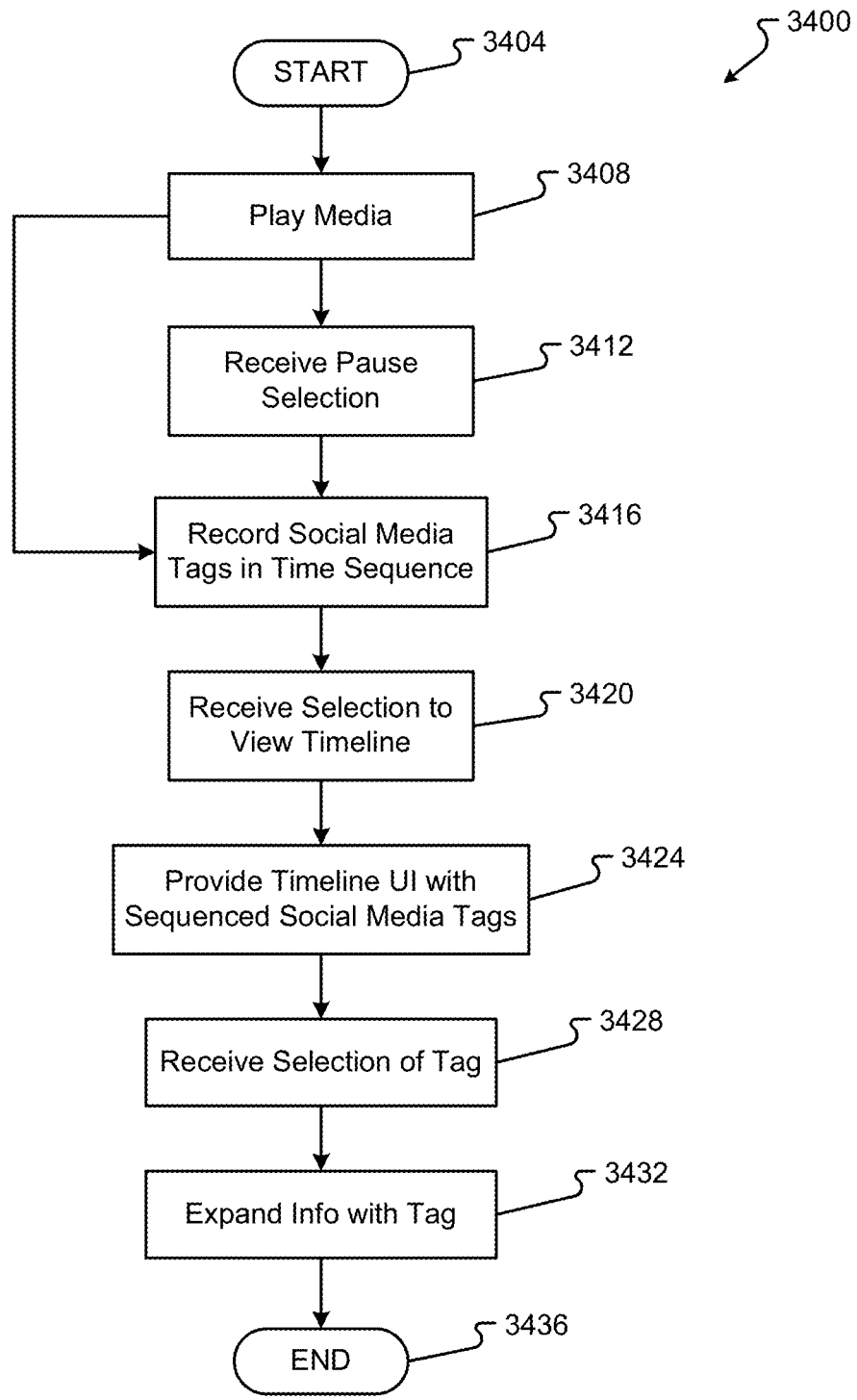
FIG. 34 is a flowchart view of an embodiment of a method for presenting and/or publishing social media information.

An embodiment of a method 3400 for providing time sequenced social media tags is a media player is shown in FIG. 34. While a general order for the steps of the method 3400 is shown in FIG. 34. Generally, the method 3400 starts with a start operation 3404 and ends with an end operation 3436. The method 3400 can include more or fewer steps or can arrange the order of the steps differently than those shown in FIG. 34. The method 3400 can be executed as a set of computer-executable instructions, executed by a computer system, and encoded or stored on a computer readable medium. Further, the method 3400 can be executed by a gate or other hardware device or component in an Application Specific Integrated Circuit, a Field Programmable Gate Array, or other type of hardware device. Hereinafter, the method 3400 shall be explained with reference to the systems, components, modules, software, data structures, user interfaces, etc. described herein.

Figure 35:
FIG. 35 is a view of an embodiment of a user interface for an Intelligent TV for presenting social media information.

And, Intelligent TV 100 may receive a selection on device 3504 to play a media player, in step 3408. The selection to play the media player may follow a similar process as to step 2108 described in conjunction with FIG. 21. The Intelligent Television 100 may then provide a user interface 3500 to play the media, as shown in FIG. 35. The media may continue to play until the user makes another selection. For example, the user may select user interface device 3504 to pause the content shown in user interface 3500. The Intelligent Television 100 may receive the selection of the pause button, in step 3412. The selection of pause in the media player may follow similar processes as that described in FIG. 21.

Figure 36:
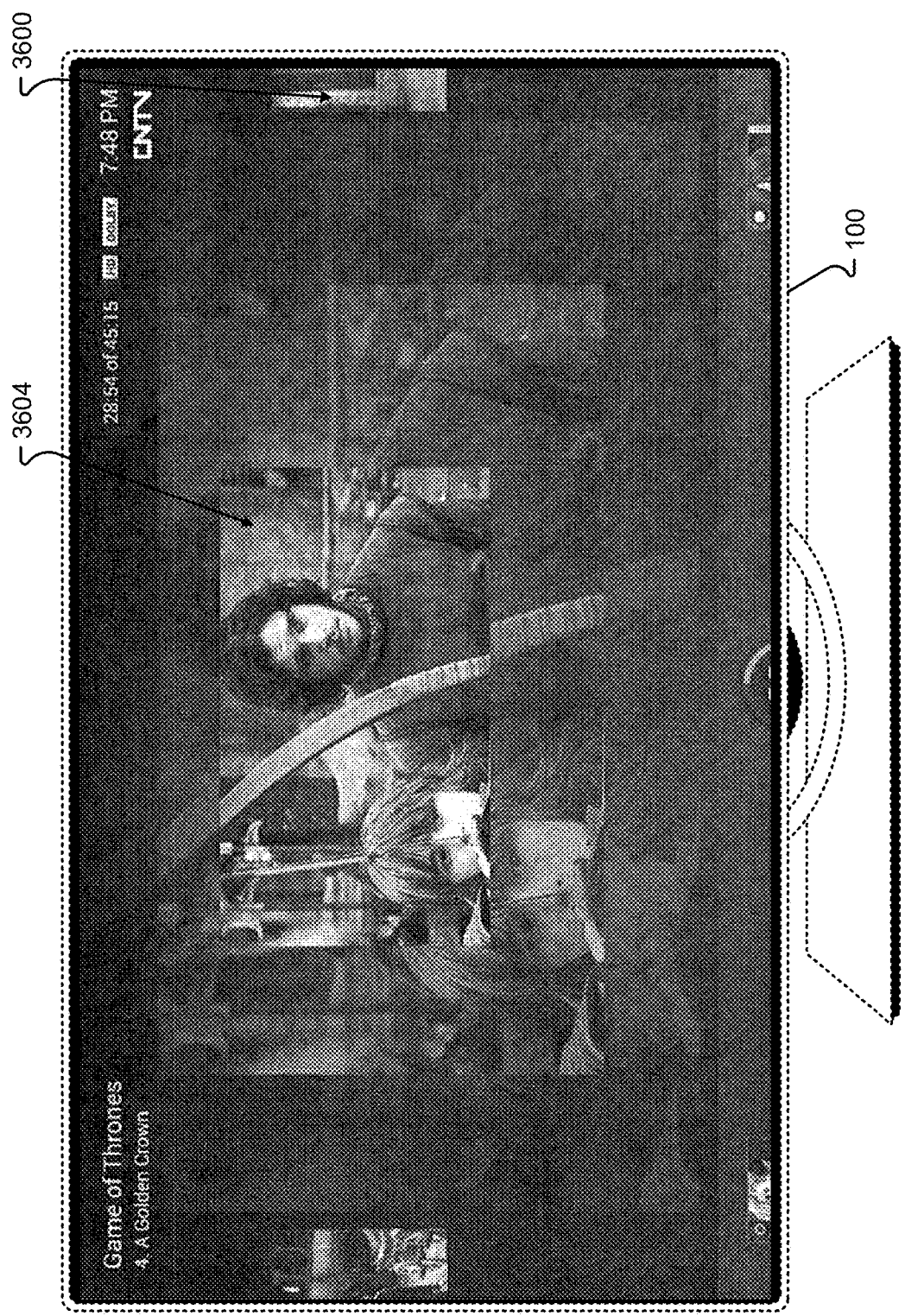
FIG. 36 is a view of an embodiment of a user interface for an Intelligent TV for presenting social media information.

Upon receiving the selection, the user interface may be changed according to the silo manager 532 and/or panel manager 536, as shown in FIG. 36. The transition may show the shrinking of the content window 3604. Thus, the shrinking may indicate that the content is now paused and may now give a timeline view of frames within the content that are provided and recorded while the content is paused. Once the content is paused, the presenter module 1520 may receive a signal to begin to record social media tags in the time sequence of the paused material, in step 3416. The presenter module 1520 can determine and record when social media tags or postings provided in data 1700 were received in relation to a frame or time of the program.

Figure 37:
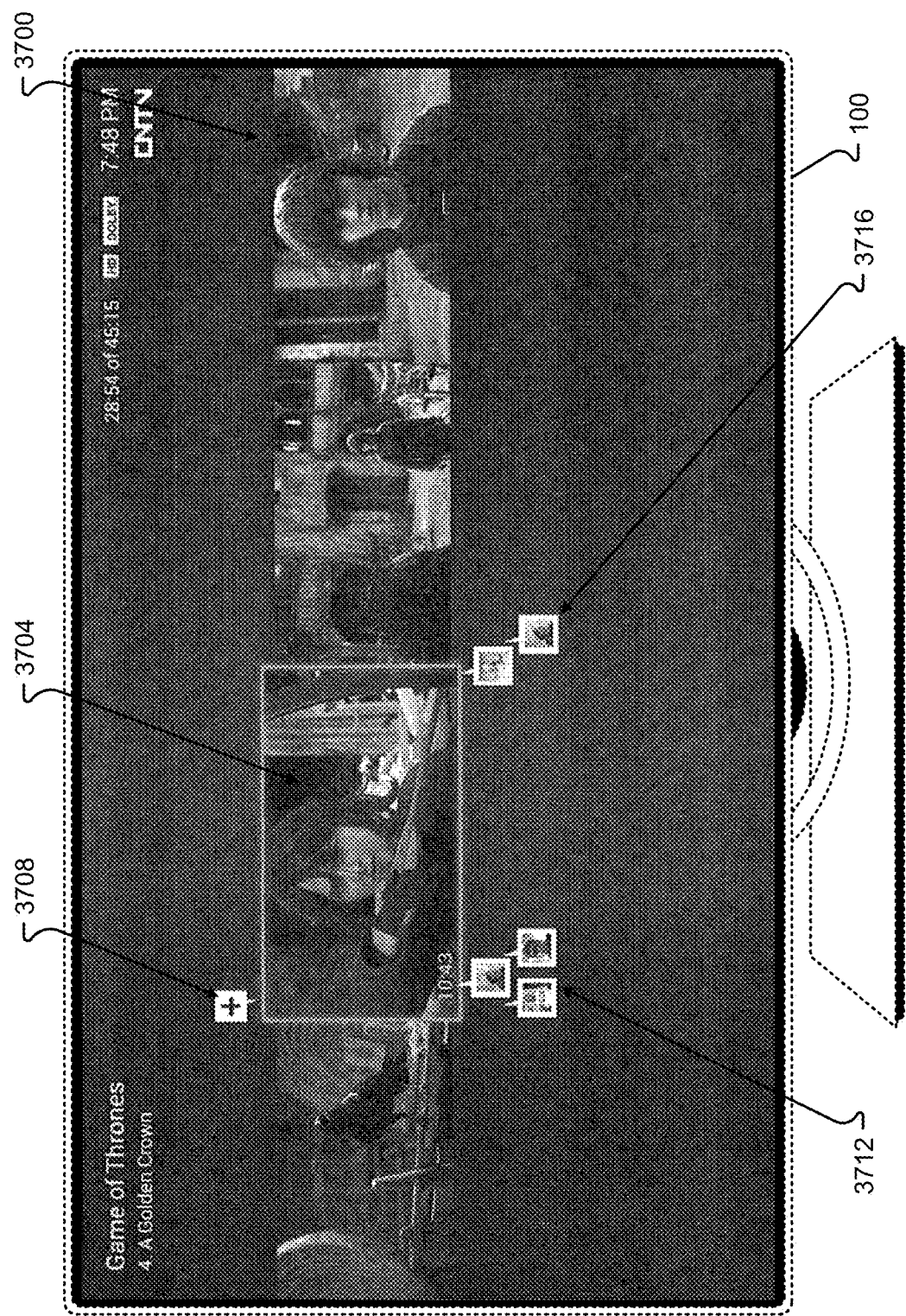
FIG. 37 is a view of an embodiment of a user interface for an Intelligent TV for presenting social media information.

Thereinafter, the Intelligent TV 100 may receive a selection to view the timeline view for the media, in step 3420. The Intelligent Television 100 may present a user interface 3700 according to the silo manager 532 and/or panel manager 536, as shown in FIG. 37. This timeline view can include social media tags 3712, 3716, provided by the presenter module 1520. Thus, the timeline view 3700 may show a series of frames 3704 or super frames of the content in user interface 3700. Social media tags associated with those frames, as stored in step 3416, may be shown. Thus, for frame 3704, social media tags 3712 and 3716 indicate that social media was received during this scene represented by frame 3704. The positioning of the social media tags may indicate when those tags were received. For example, tag 3712 may be received at the beginning of the scene, while tag 3716 was received at the end of the scene. The placement determination may be made based on the midpoint of the frame or scene represented by frame 3704.

The user may select to see the social media tags by selecting user interface device 3708. In other instances, the social media tags may be presented automatically based on a user's preferences. Thus, the presenter module 1520 can provide a timeline user interface with sequence social media tags, in step 3424. The sequence may be based on the time that the social media was received or based on association with the frame or super frame for when the social media was received. Thus, the social media tags 3712, 3716 may be organized differently in user interface 3700 based on how the presenter module 1520 is configured to store the social media tags.

Figure 38:
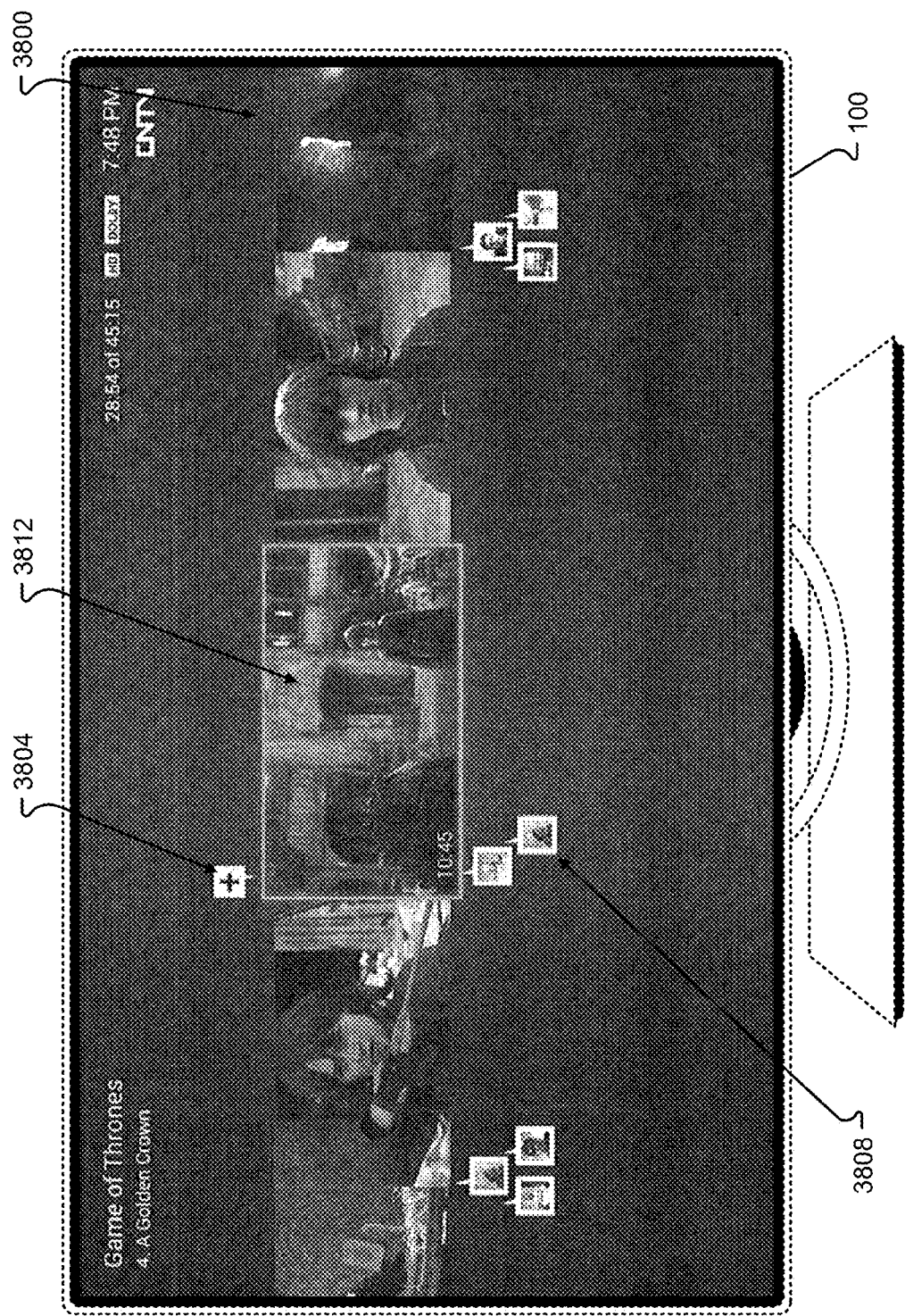
FIG. 38 is a view of an embodiment of a user interface for an Intelligent TV for presenting social media information.

The presenter module 1520 may receive a selection of a social media tag, in step 3428. For example, the presenter module 1520 may present a user interface 3800 with a timeline view of the media, as shown in FIG. 38. The presenter module 1520 may then receive indication that the user selected user interface device 3804 to display social media tag 3808 that is associated with the particular frame 3812 of the content. In other examples, the social media tags 3808 are already displayed with the frame of video 3812. The user may then select user interface device 3804 to present the information or social media posting associated with one of the social media tags.

Figure 39:
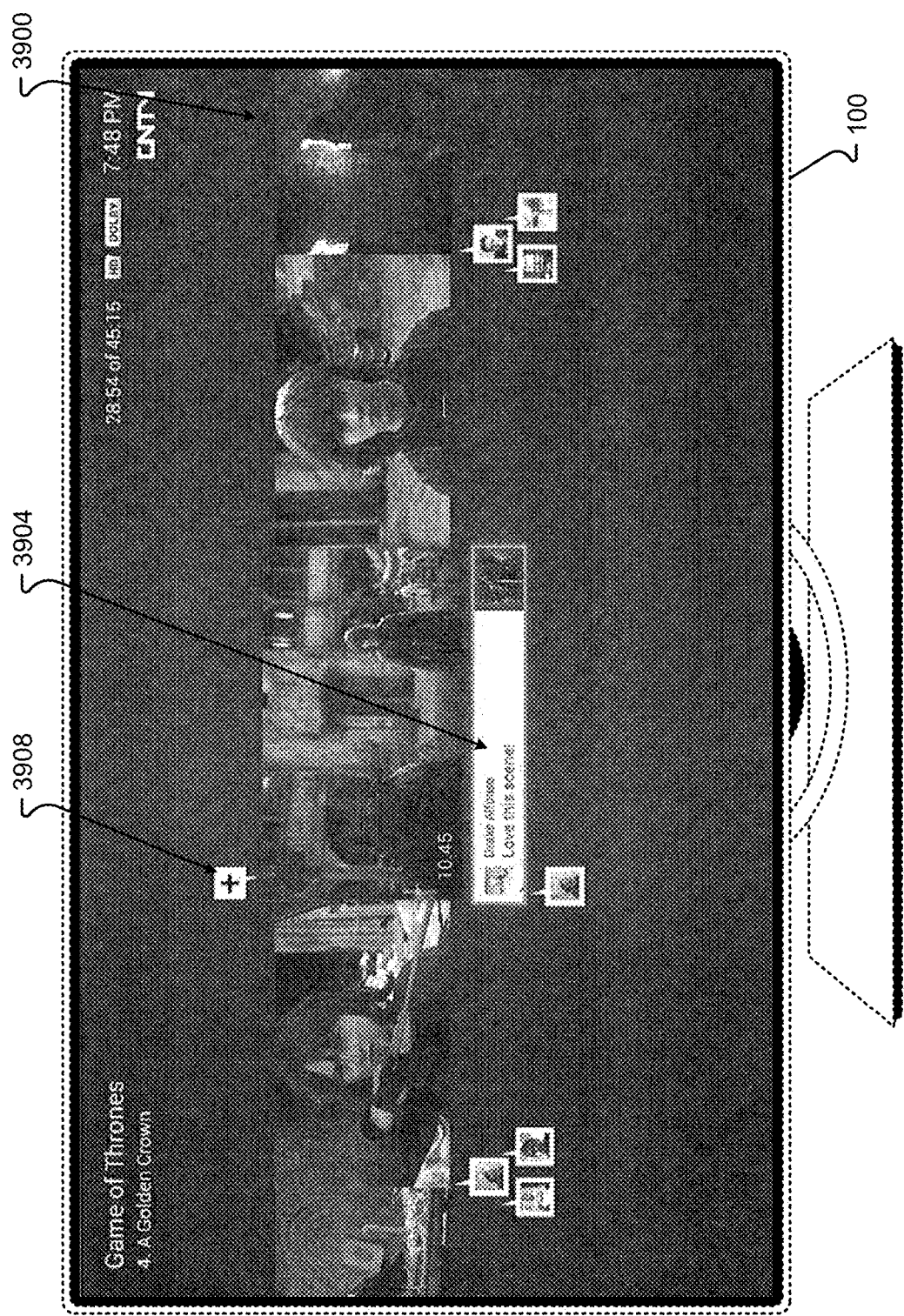
FIG. 39 is a view of an embodiment of a user interface for an Intelligent TV for presenting social media information.

As shown in FIG. 39, user interface 3900 shows that one of the social media tags 3904 has been expanded to provide the actual content associated with the social media. This expansion may be done by selecting user interface device 3908, or by selecting the actual social media tag 3904. Thus, the user can view the social media associated with the content while the content is paused and is previewing the frames in the timeline view.

Figure 40:
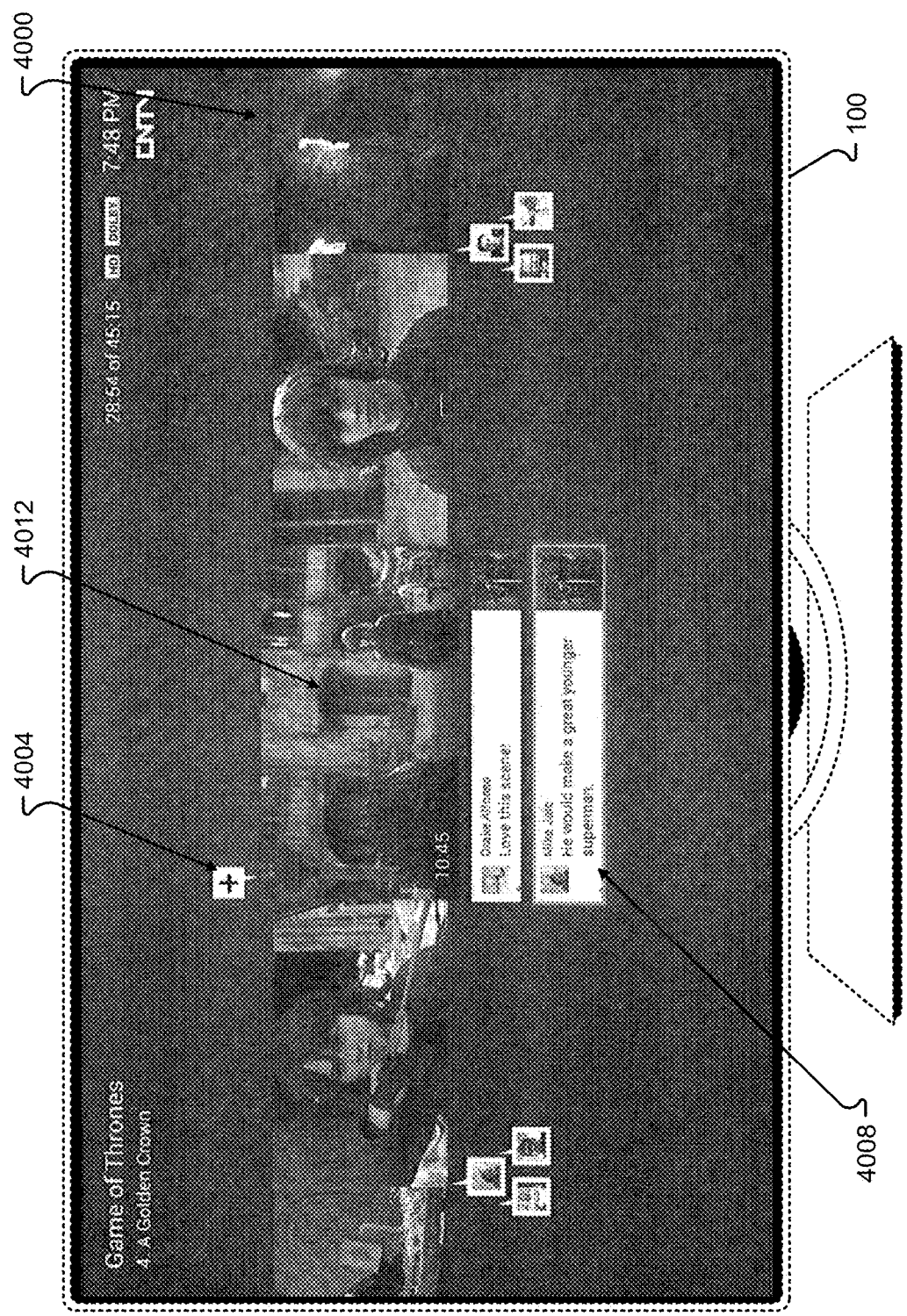
FIG. 40 is a view of an embodiment of a user interface for an Intelligent TV for presenting social media information.

In other scenarios, the user may select the user interface device 4004 shown in user interface 4000 of FIG. 40. Here, the user interface device 4004 may allow the user to expand all social media tags 4808 associated with that frame 4012. Thus, the presenter module 1520 can expand the information within the social media tag, in step 3432. The expansion allows the user better ability to read the social media associated with the scene, determine where the user may want to resume watching the content, or allow the user to skip around in the content once paused.

Figure 41:
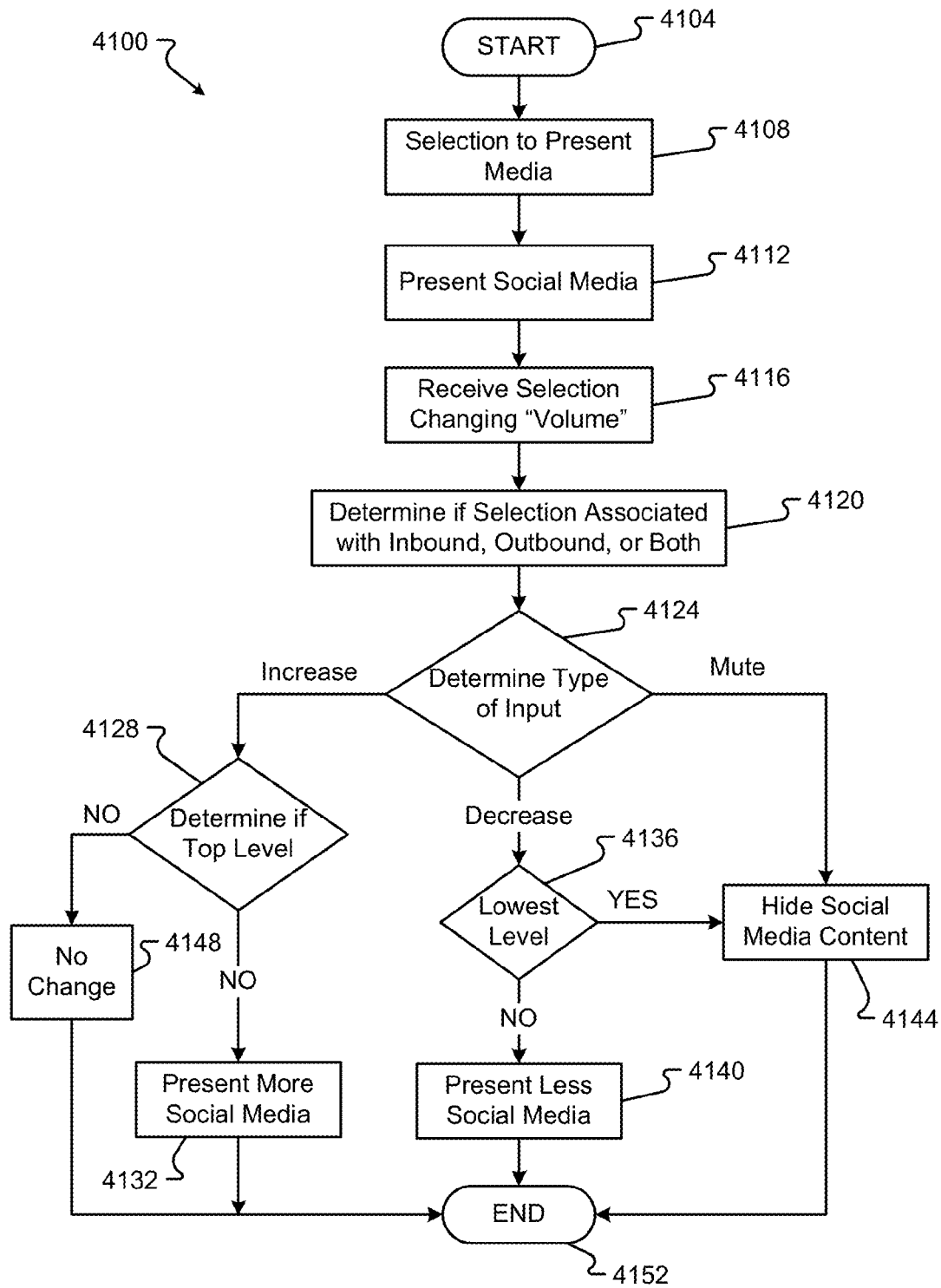
FIG. 41 is a flowchart view of an embodiment of a method for presenting and/or publishing social media information.

A method 4100 for changing the amount of social media viewed or changing the "social media volume" is shown in FIG. 41. While a general order for the steps of the method 4100 is shown in FIG. 41. Generally, the method 4100 starts with a start operation 4104 and ends with an end operation 4152. The method 4100 can include more or fewer steps or can arrange the order of the steps differently than those shown in FIG. 41. The method 4100 can be executed as a set of computer-executable instructions, executed by a computer system, and encoded or stored on a computer readable medium. Further, the method 4100 can be executed by a gate or other hardware device or component in an Application Specific Integrated Circuit, a Field Programmable Gate Array, or other type of hardware device. Hereinafter, the method 4100 shall be explained with reference to the systems, components, modules, software, data structures, user interfaces, etc. described herein.

Here, the user may select a remote control button 1000, which controls the social media volume. A change or selection of the button 1000 may send a signal to the Intelligent TV 100 to change the amount of social media being presented in a user interface or the amount of social media being posted on behalf of the user. The Intelligent Television 100 can receive the selection to present social media in a process similar to step 2108 described in FIG. 21. The selection may be provided to the presenter module 1520/publisher module 1524 to change the publication or presentation of social media.

Figure 42:
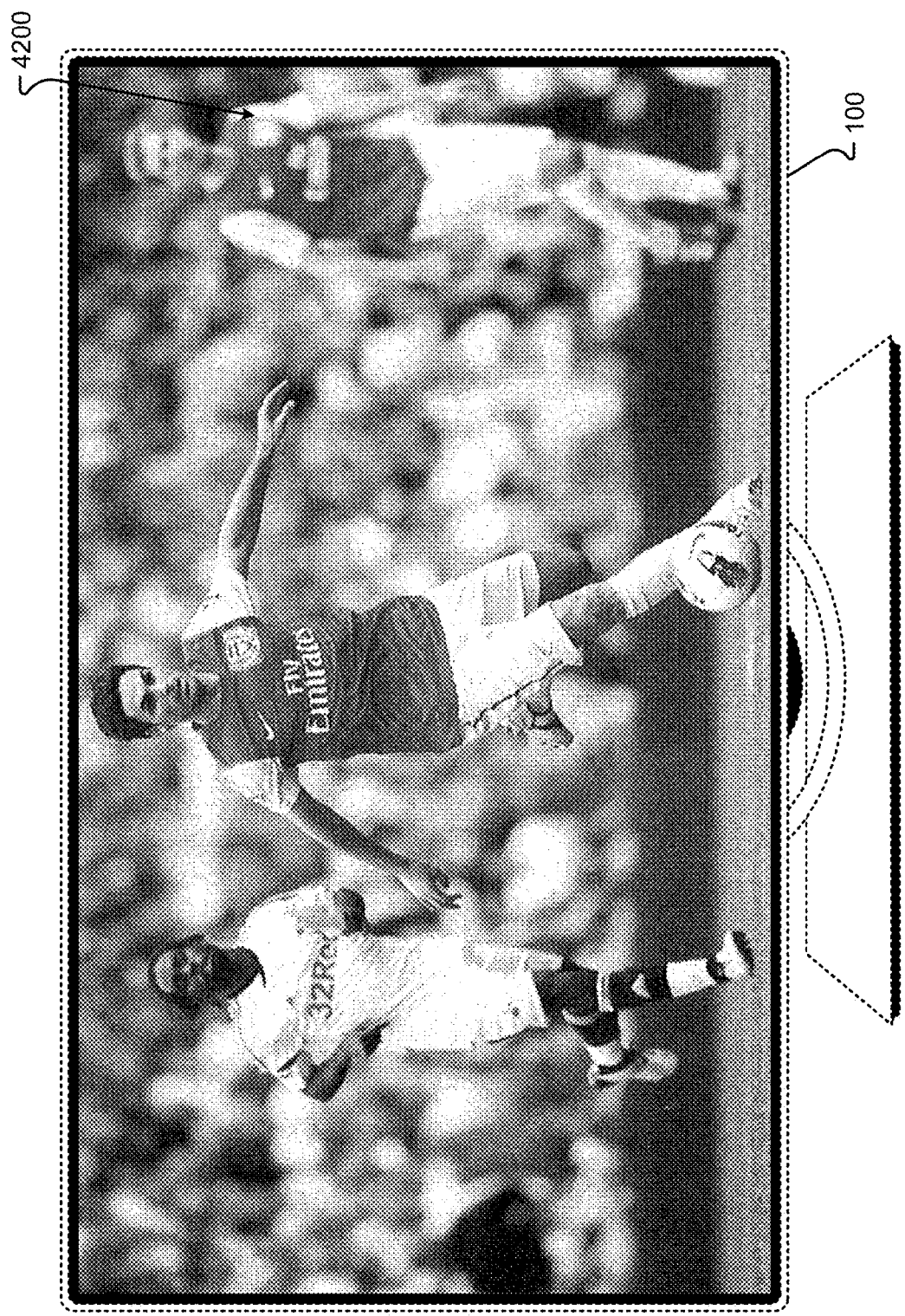
FIG. 42 is a view of an embodiment of a user interface for an Intelligent TV for presenting social media information.
Figure 43:
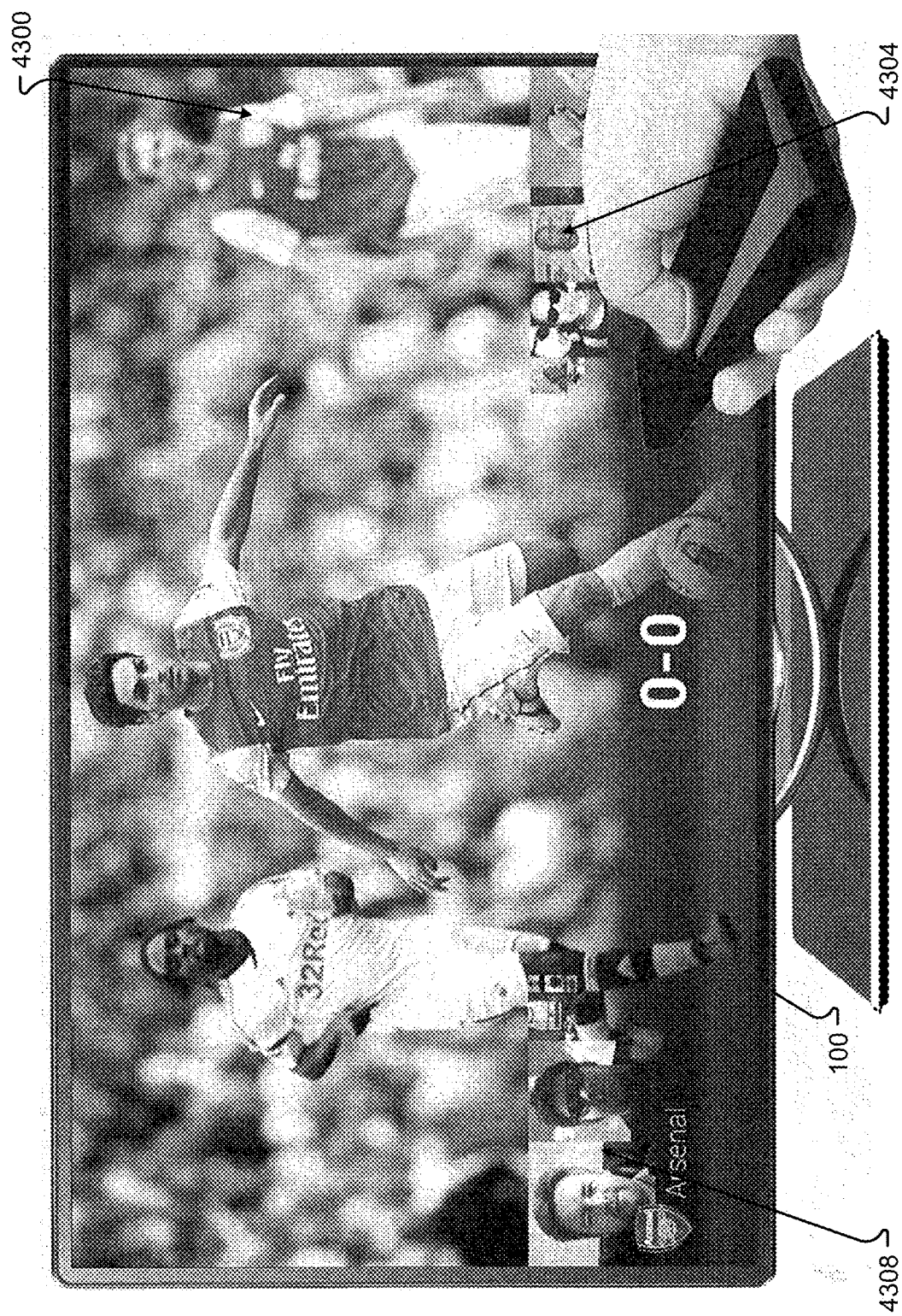
FIG. 43 is a view of an embodiment of a user interface for an Intelligent TV for presenting social media information.

The presenter module 1520 may then present social media, in step 4112. For example, before selecting the social volume button 1000, the Intelligent TV 100 may present a user interface 4200, as shown in FIG. 42. Here, there is no social media information being presented in the user interface 4200. Upon selecting to show social media, the presenter module 1520 may begin to present the user interface 4300, as shown in FIG. 43. Here, a rooting section 4304, 4308, is presented with the content in user interface 4300. This user interface 4300 may include the lowest amount of social media presented in any type of user interface.

The presenter module 1520 and/or publish module 1524 may then receive a selection to change the volume of social media, in step 4116. Here, the user may increase or decrease the social media volume by selecting either the up or down sections of remote control button 1000. This selection provides an indication to presenter module 1520 and/or publish module 1524 the user wants to see or publish more or less social media. The publish module 1524 and presenter module 1520 may then determine if the selection to change the social media volume is associated with the inbound social media, the outbound social media, or both the inbound and outbound social media, in step 4120. Thus, the user may change not only how much social media is being viewed in the user interface but may also change the amount of data that is being posted to sites by the user based on selections described hereinafter.

The presenter module 1520 and/or publish module 1524 may then determine the type of input that is received by the selection of the social media volume, in step 4124. The types of inputs may be an increase, a decrease, or a mute of the social media. If the user selects to increase the social media volume, method 4100 flows through the INCREASE branch to step 4128. If the user desires to decrease the social media volume, the method 4100 flows through the DECREASE branch to step 4136. If the user desires to mute the social media, method 4100 proceeds through the MUTE branch to step 4144.

In step 4128, the presenter module 1520 and/or publish module 1524, may determine if the amount of increase is possible because the social media volume is at a top level. If the social media volume is at the highest level, the method flows YES to step 4148, where no change is made in how the social media is either presented or published.

Figure 44:
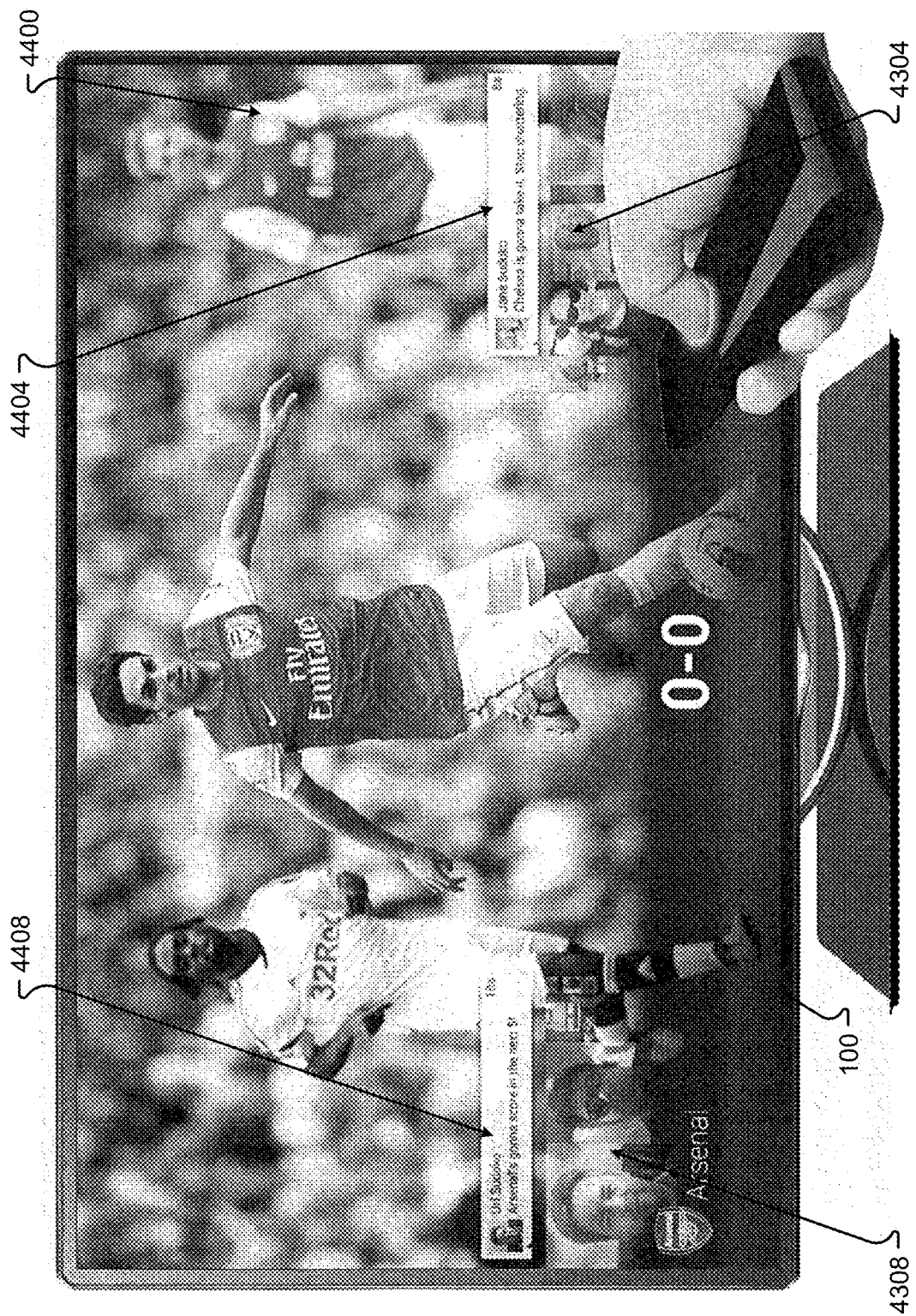
FIG. 44 is a view of an embodiment of a user interface for an Intelligent TV for presenting social media information.

If the social media is not at a top level, the method flows NO to step 4132. In step 4132, the presenter module 1520 and/or publish module 1524 either presents or publishes more social media content. The presentation of more social media is shown in a series of figures, FIG. 43 through FIG. 46. For example, in FIG. 43, user interface 4300 includes rooting sections 4308 and 4304. However, there is no indication of any of the content in the social media streams but requires the user to select one of the thumbnails provided in the rooting sections 4304, 4308. At the next social media volume, for example social media volume 2, at least one social media posting 4408, 4404 is provided in each rooting section, as seen in FIG. 44. The rooting sections 4304 and 4308 remain unchanged. Thus, the most recent comment by a poster or the most relevant comment by a poster is presented in the next volume of social media. This change is shown in user interface 4400 in FIG. 44.

Figure 45:
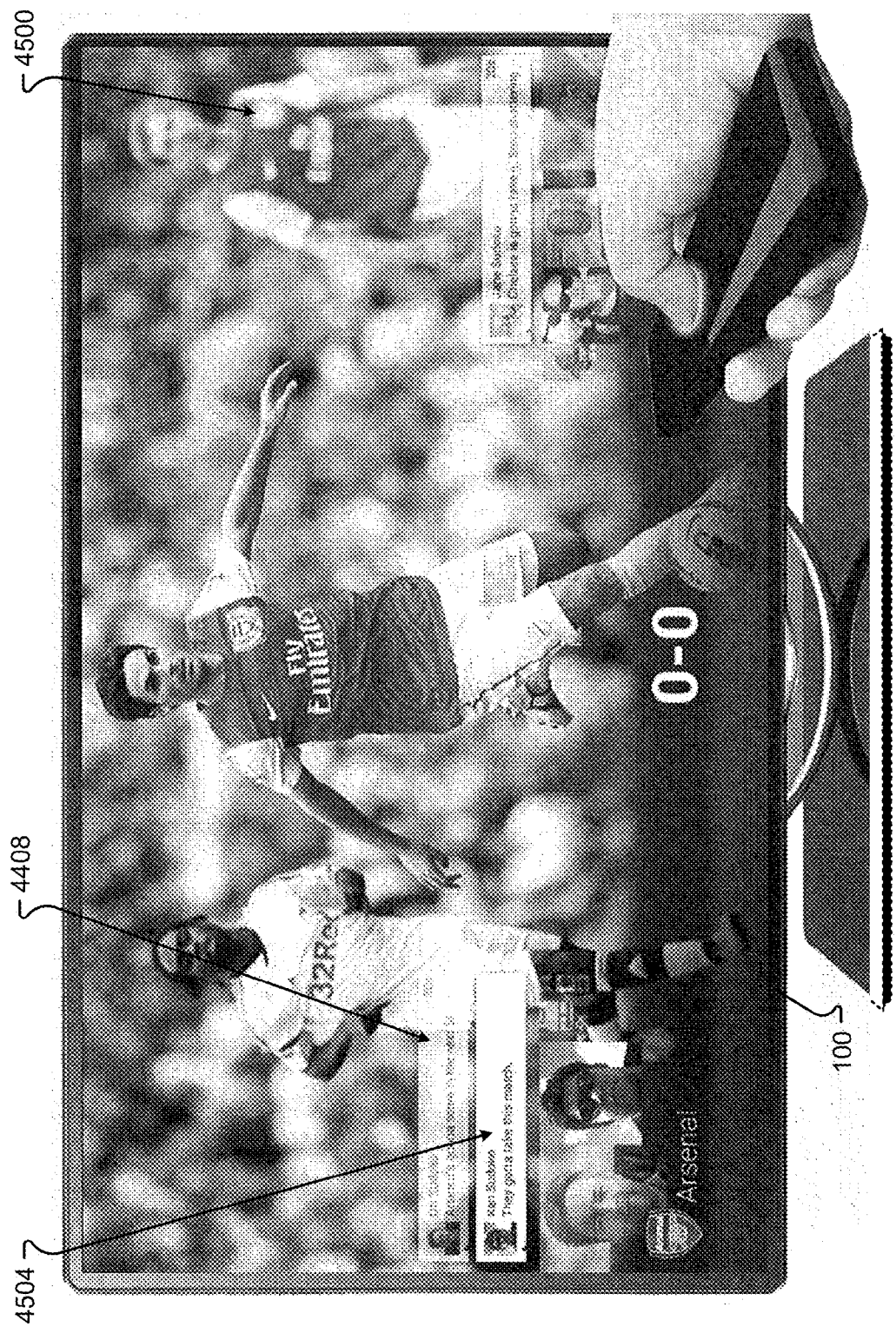
FIG. 45 is a view of an embodiment of a user interface for an Intelligent TV for presenting social media information.
Figure 46:
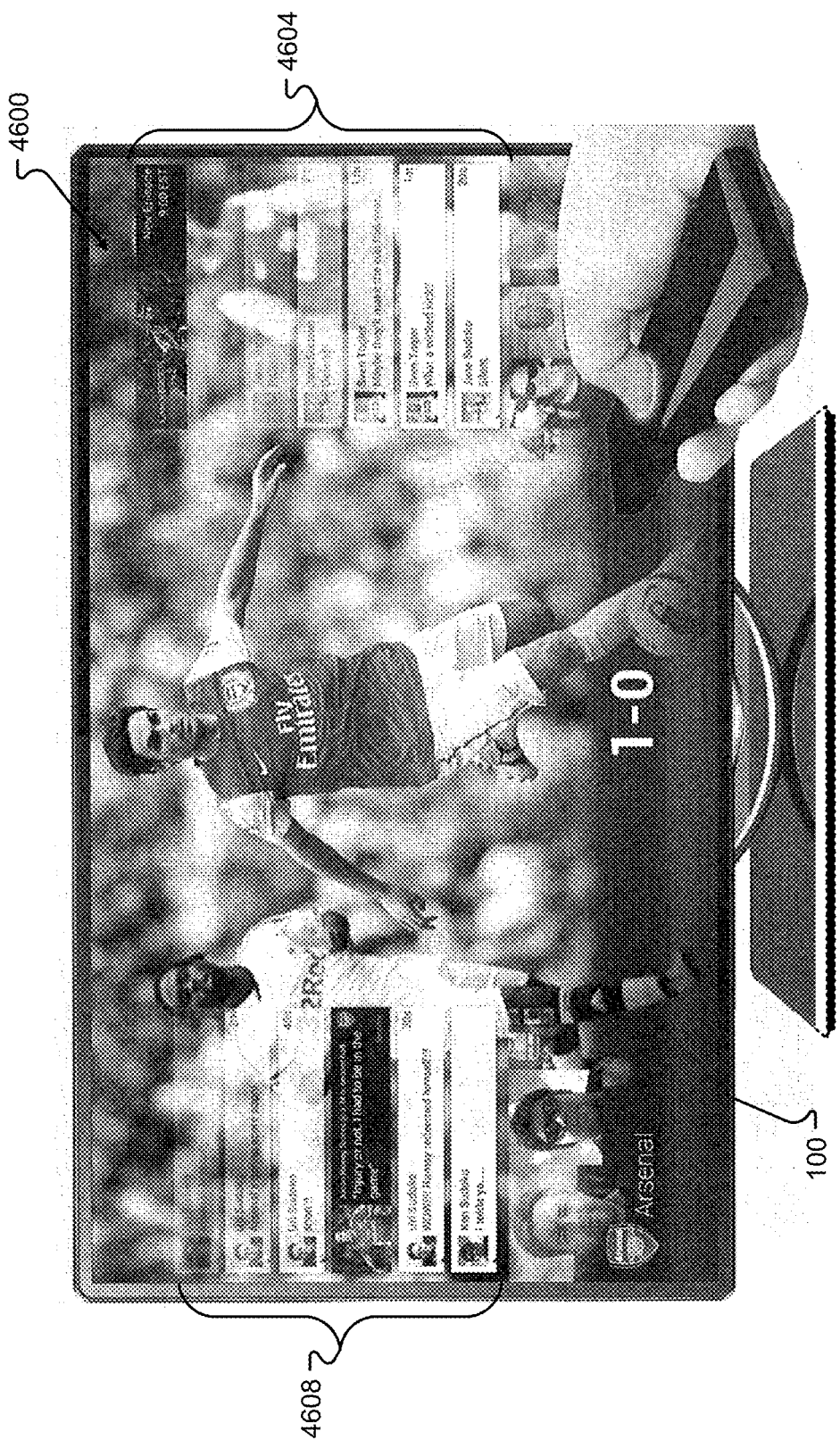
FIG. 46 is a view of an embodiment of a user interface for an Intelligent TV for presenting social media information.

At a next social volume, shown in FIG. 45, there may be more than one posting, for example, posting 4408 and 4504 in one of the rooting sections. Thus, the user may increase the number of postings shown in at least one or more of the rooting sections of user interface 4500. In FIG. 46, the maximum amount of social volume may be shown. Here, in user interface 4600, there may be several postings provided in sections 4604 and 4608. The user can see a series of recent postings going back in time from most recent to least recent posting. These postings may also include other information from other sites, may also provide for other information not necessarily related to the current content being viewed. The user can determine the amount of social media to be presented at any one time during a content viewing session.

In step 4136, the presenter module 1520 can determine if the social media is at a lowest level of presentation or publication. If the presenter module 1520 and/or publish module 1524 determine that the amount of social media is at a lowest level, method 4100 proceeds YES to step 4144. If the presenter module 1520 and/or publish module 1524 determine that the social media is not at the lowest level, the method 4100 proceeds NO to step 4140.

In step 4140, the presenter module 1520 and/or publish module 1524 may present or publish less social media information. This change is more easily seen with the presentation of social media as shown in FIGS. 43 through 46. Here, the presentation of user interfaces may proceed from user interface 4600, in FIG. 46, back to user interface 4300 in FIG. 43 as the social media volume is decreased. For the decrease in publication, publish module 1524 may publish to fewer sites or publish fewer postings or less information from the user if the social media volume is decreased.

Figure 47:
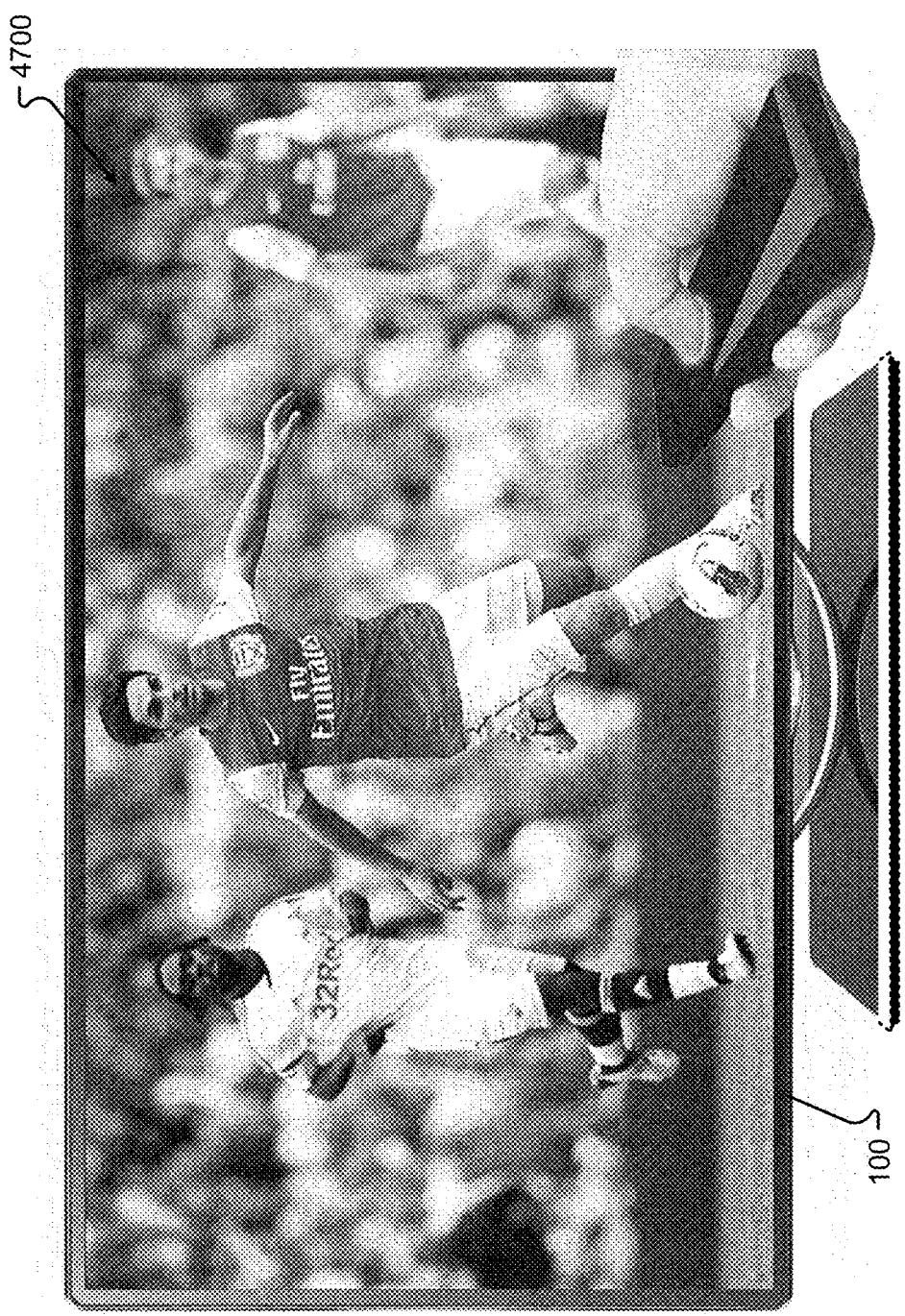
FIG. 47 is a view of an embodiment of a user interface for an Intelligent TV for presenting social media information.

In step 4144, the social media may be muted either by selection of a certain button or the eventual decrease of the social media volume to none or level zero. In this case, the presenter module 1520 and/or publish module 1524 may not present any social media information or may not publish any social media information. For example, the user interface 4700 in FIG. 47 may be presented that shows us no social media information. Thus, the social media is muted at this point.

Figure 48:
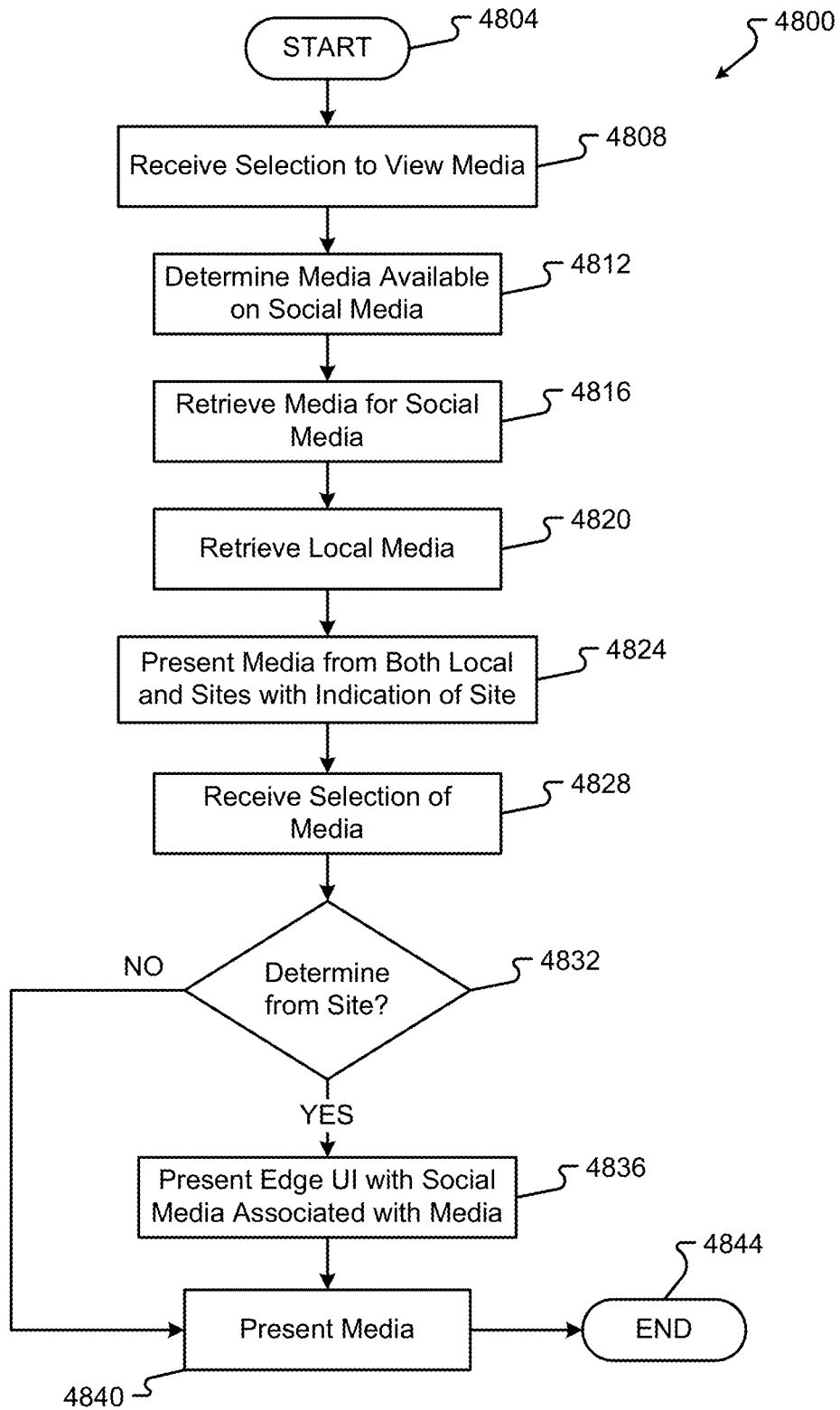
FIG. 48 is a flowchart view of an embodiment of a method for presenting and/or publishing social media information.

A method 4800 for consolidating media from social media sites and local media sources is shown in FIG. 48. While a general order for the steps of the method 4800 is shown in FIG. 48. Generally, the method 4800 starts with a start operation 4804 and ends with an end operation 4844. The method 4800 can include more or fewer steps or can arrange the order of the steps differently than those shown in FIG. 48. The method 4800 can be executed as a set of computer-executable instructions, executed by a computer system, and encoded or stored on a computer readable medium. Further, the method 4800 can be executed by a gate or other hardware device or component in an Application Specific Integrated Circuit, a Field Programmable Gate Array, or other type of hardware device. Hereinafter, the method 4800 shall be explained with reference to the systems, components, modules, software, data structures, user interfaces, etc. described herein.

The Intelligent Television 100 may receive a selection to view media, in step 4808. The selection to view media may proceed through a process similar to step 2108 described in FIG. 21. Upon receiving the selection to view media, the presenter module 1520 may determine what media is available from social media sources, in step 4812. Here, these presenter module 1520 may access data 1704 to determine what inbound media is available in database 1700. Further, the presenter module 1520 may send a signal to the retrieve module 1516 to access different social media sites and determine if social media is available and to retrieve that social media if possible.

The retrieve module 1516 may retrieve social media from the social media sites, in step 4816. Here, the social media database 1700 may not be populated except when requested by the user. This prevents the abundant storage of media presented in social media sites. The retrieve module 1516 may then go to social media site to retrieve media of the desired type selected by the user. For example, if the user desires to look at pictures or videos, the retrieve module 1516 can go and retrieve pictures or videos associated with the user from social media sites.

The data service 432 may also be sent a signal to retrieve local media, in step 4820. Thus the data service may instantiate an instance of the media subservice 628 to access database 640 to retrieve media. This data 640 is local to either the Intelligent Television 100 or to a local network connected to by the Intelligent Television 100. This media may also be accessed and provided to the user interface application 468.

Figure 49:
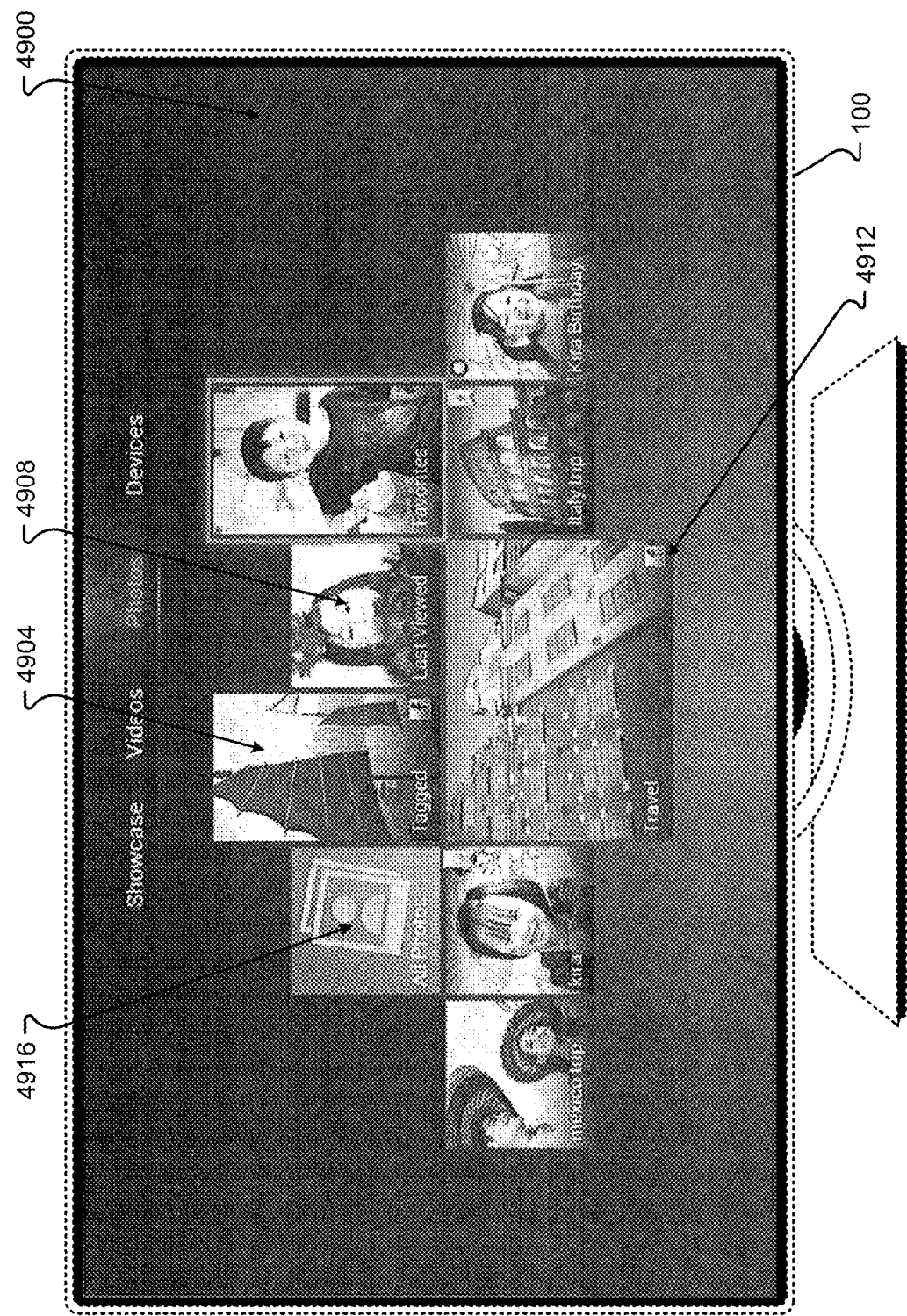
FIG. 49 is a view of an embodiment of a user interface for an Intelligent TV for presenting social media information.

The user interface application 468 may then present a user interface that includes both local media and media retrieved from social media sites, in step 4824. For example, user interface application 468 may present user interface 4900 shown in FIG. 49. Here, thumbnails representing categories of media are presented. These categories of media may be associated with local media or media from social media sites. For example, thumbnail 4908 is associated with media from a local site, and the category includes only local media. Thumbnail 4904 may be associated with social tagged media that either includes or is exclusively media from a social media site. Indication 4912 may indicate whether the content within that category encompasses or contains media from a social media site. Further, the indication 4912 can indicate what social media site the social media data comes from. For example, indication 4912 is a Facebook™ indicator, thus, notifying the user that the travel category includes content from the Facebook™ social media site.

Figure 50:
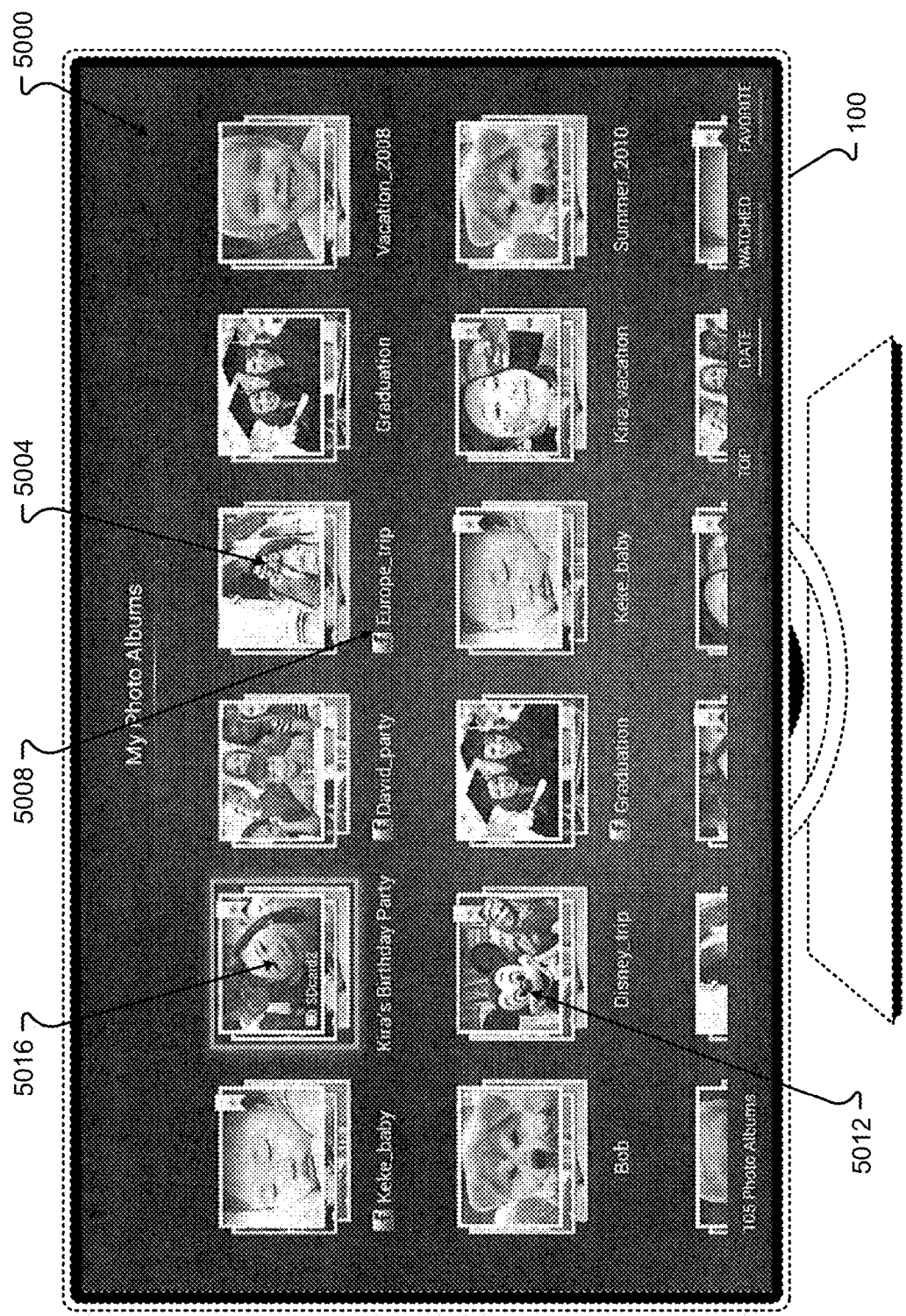
FIG. 50 is a view of an embodiment of a user interface for an Intelligent TV for presenting social media information.

Thereinafter, the user interface application 468 can receive a selection of media, in step 4828. For example, the user may select thumbnail 4916 in user interface 4900. The selection may be received by the user interface application in which case user interface application 468 provides user interface 5000 shown in FIG. 50. The media album 5000 may indicate whether the social media is local or from a social media site. For example, thumbnails 5004 provide an indication 5008 that the media within that category includes social media site information. In contrast, thumbnail set 5012 does not include the indication, and therefore, includes only local media.

Figure 51:
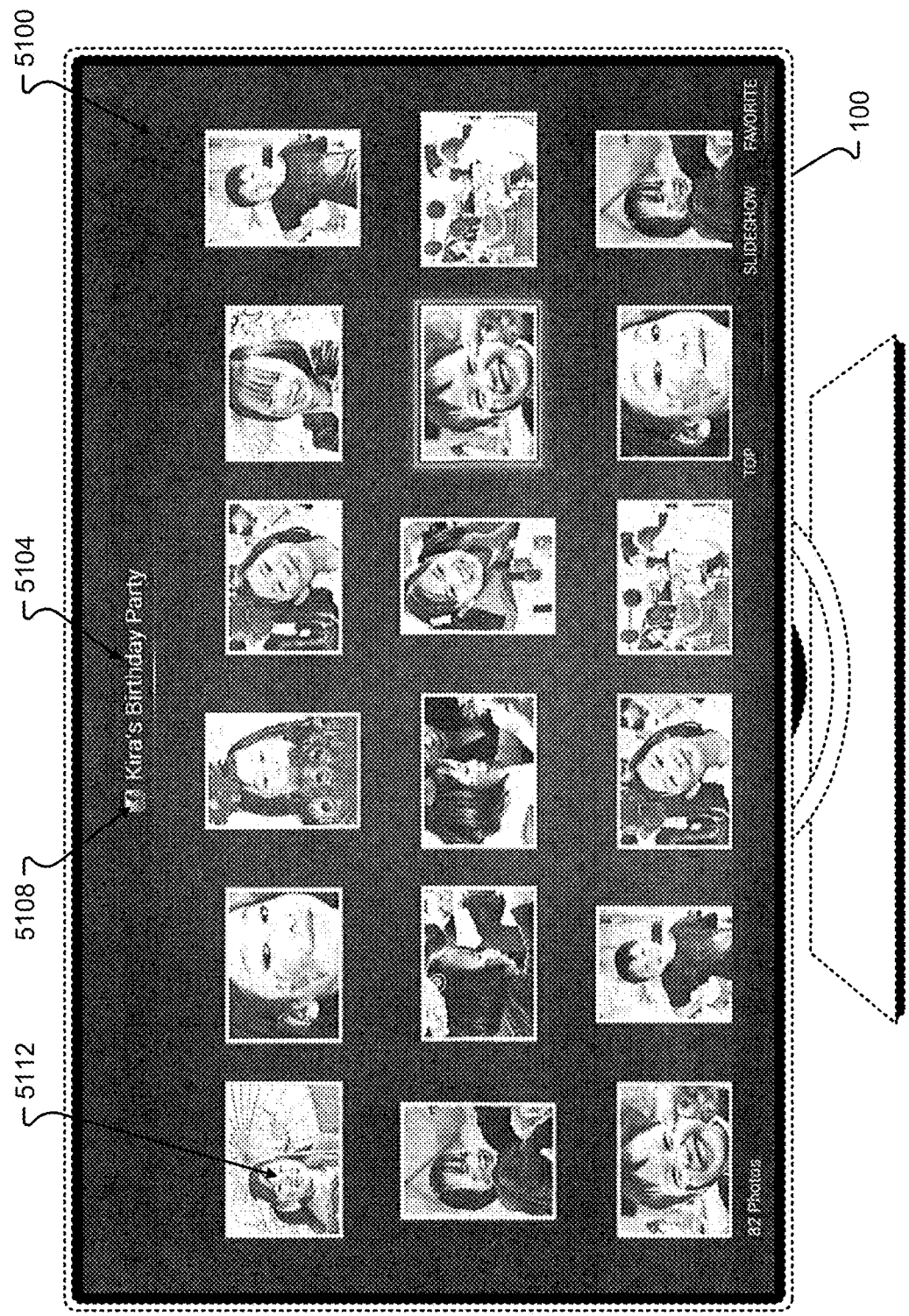
FIG. 51 is a view of an embodiment of a user interface for an Intelligent TV for presenting social media information.

The user may select a category of media from user interface 5000 and, in response, may be presented with another user interface. For example, if the user selects thumbnail set 5016, user interface application 468 can present user interface 5100 shown in FIG. 51. Here, the media application shows several photographs, which are stored in category "Kira's Birthday Party" as indicated by the banner 5104. Further, indication 5108, in the banner 5104, indicates that the media within user interface 5100 was at least partially obtained from a social media site. If the user selects one of the thumbnails, for example, thumbnail 5112, user interface application 468 can determine if the social media is from a social media site, in step 4832. If the media is from a social media site, the method 4800 proceeds YES to step 4836. If the media is not from a social media site, the method 4800 proceeds NO to step 4840.

Figure 52:
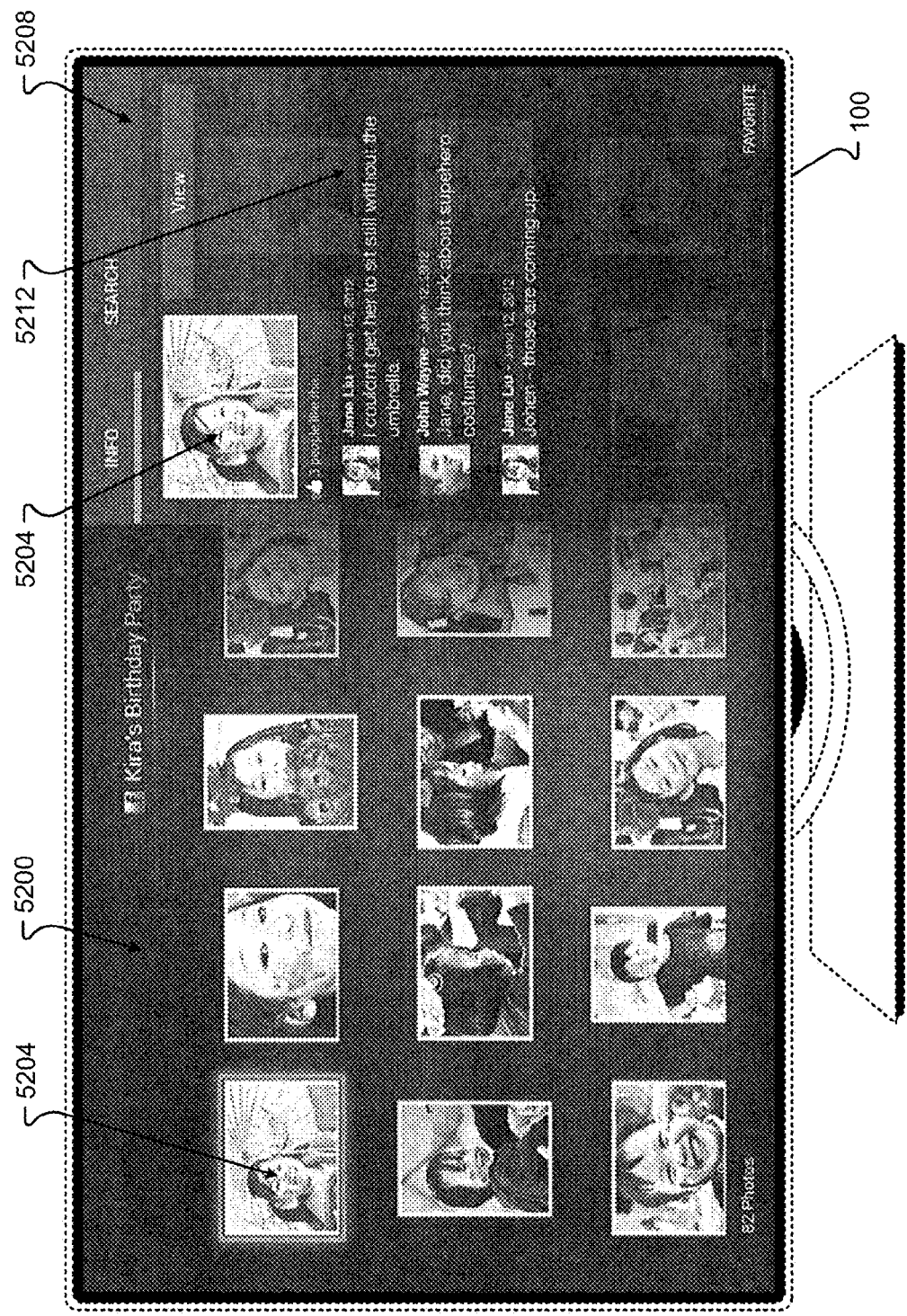
FIG. 52 is a view of an embodiment of a user interface for an Intelligent TV for presenting social media information.

In step 4836, the user interface application 468 can indicate to the presenter module 1520 to provide data for an edge user interface 5208 shown in FIG. 52. Here, the user interface 5200 includes the thumbnail 5204. The thumbnail 5204 is selected, and the media is from a social media site. The presenter module 1520, therefore, obtains data associated with that media on the social media site. The edge user interface 5208 includes not only the media 5204, but one or more social media postings 5212 that are associated with that media. Thus, the user can view not only the media 5204 but any information on that social media site that may be associated with the media. The user application 4608 may then present the media 5204, in step 4840. If the media is not from a social media site, the user application 468 may present only the media without any edge user interface describing the media. Thus, the media may be presented in a full screen view, or some other view.

Figure 53:
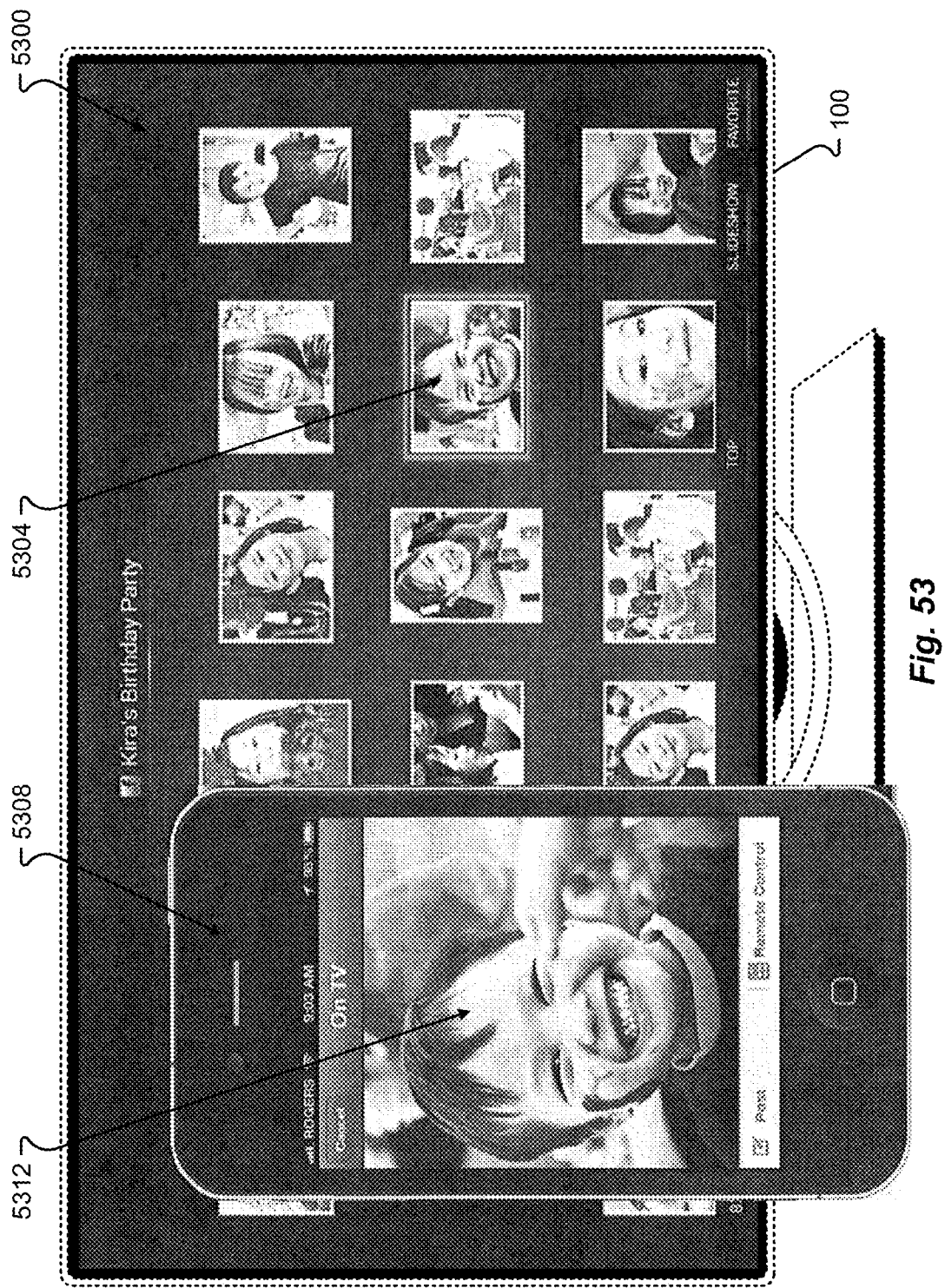
FIG. 53 is a view of an embodiment of a user interface for an Intelligent TV for presenting social media information.

Further, when media is selected, the user interface application 468 may send a signal to a second device to show the media. For example, in FIG. 53, the user may select a thumbnail 5304 in user interface 5300. Upon selecting the thumbnail 5304, the processor 3604 can instruct a wireless connectivity module 328 to send information to another device 168f to display the media. The information sent by the wireless connectivity module 328 may include the media data so that the second device 5308 can show the media in a user interface 5312.

Figure 54:
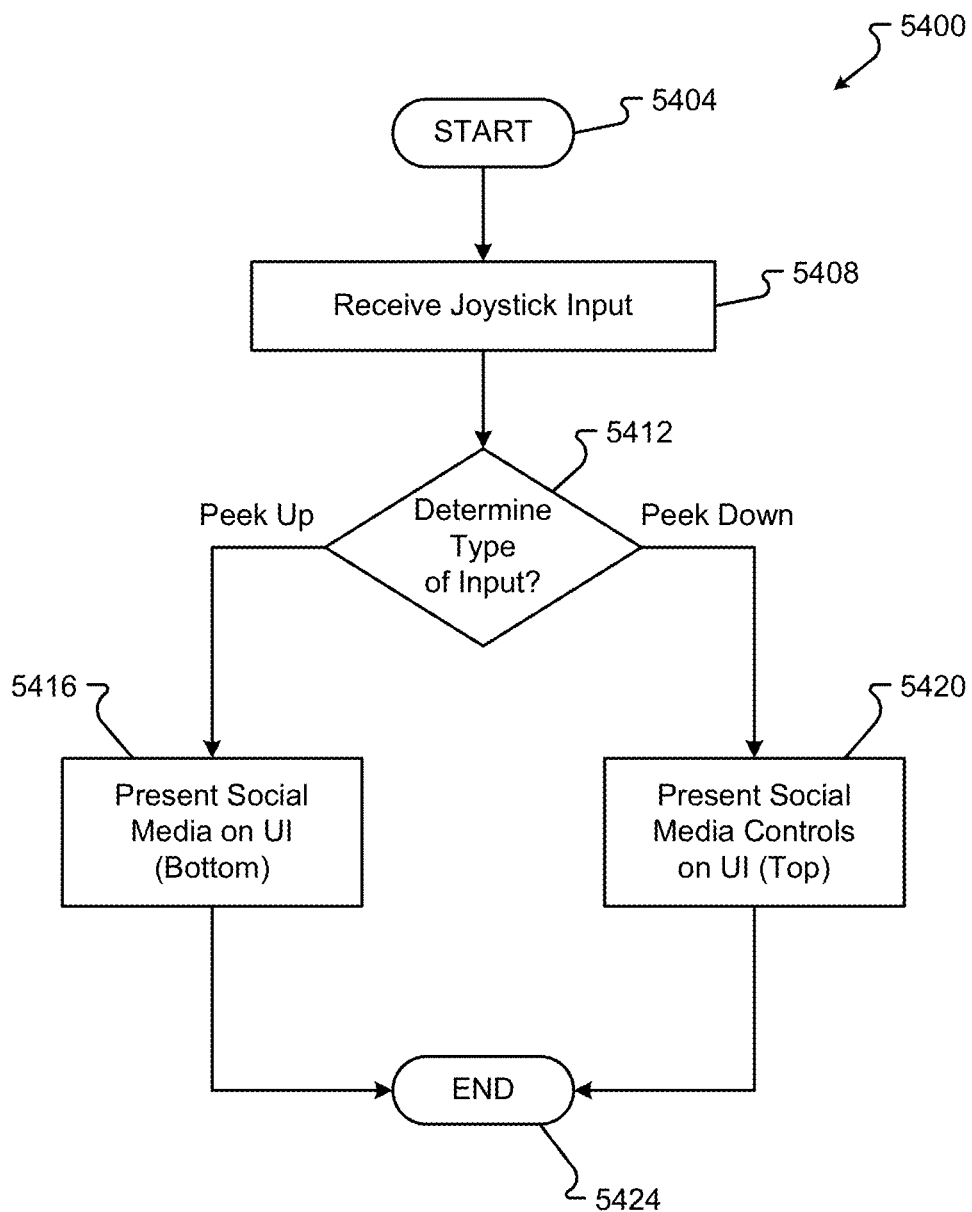
FIG. 54 is a flowchart view of an embodiment of a method for presenting and/or publishing social media information.

An embodiment of the method 5400 for presenting social media information in a user interface by controlling a joystick associated with a remote control is shown in FIG. 54. While a general order for the steps of the method 5400 is shown in FIG. 54. Generally, the method 5400 starts with a start operation 5404 and ends with an end operation 5424. The method 5400 can include more or fewer steps or can arrange the order of the steps differently than those shown in FIG. 54. The method 5400 can be executed as a set of computer-executable instructions, executed by a computer system, and encoded or stored on a computer readable medium. Further, the method 5400 can be executed by a gate or other hardware device or component in an Application Specific Integrated Circuit, a Field Programmable Gate Array, or other type of hardware device. Hereinafter, the method 5400 shall be explained with reference to the systems, components, modules, software, data structures, user interfaces, etc. described herein.

The user may make a selection with a joystick 900 of a remote control 704, in step 5408. The joystick control 900 is described in conjunction with FIG. 9a through 9c. Here, there may be a joystick input into joystick 900. This joystick selection may be presented or provided similar to step 2108 in FIG. 21. A presenter module 1520, and the user interface application 468, may determine the type of joystick input, in step 5412. For example, the user may move the joystick up, as shown in FIG. 9b, or move the joystick 900 down, as shown in FIG. 9c. If the user moves the joystick up, the input is a peak up command and the method 5400 flows through the PEAK UP branch to step 5416. If the mover moves the joystick down, the user interface application 468 determines the selection is a peak down command, and the method 5400 flows through the PEAK DOWN branch to step 5420.

Figure 55:
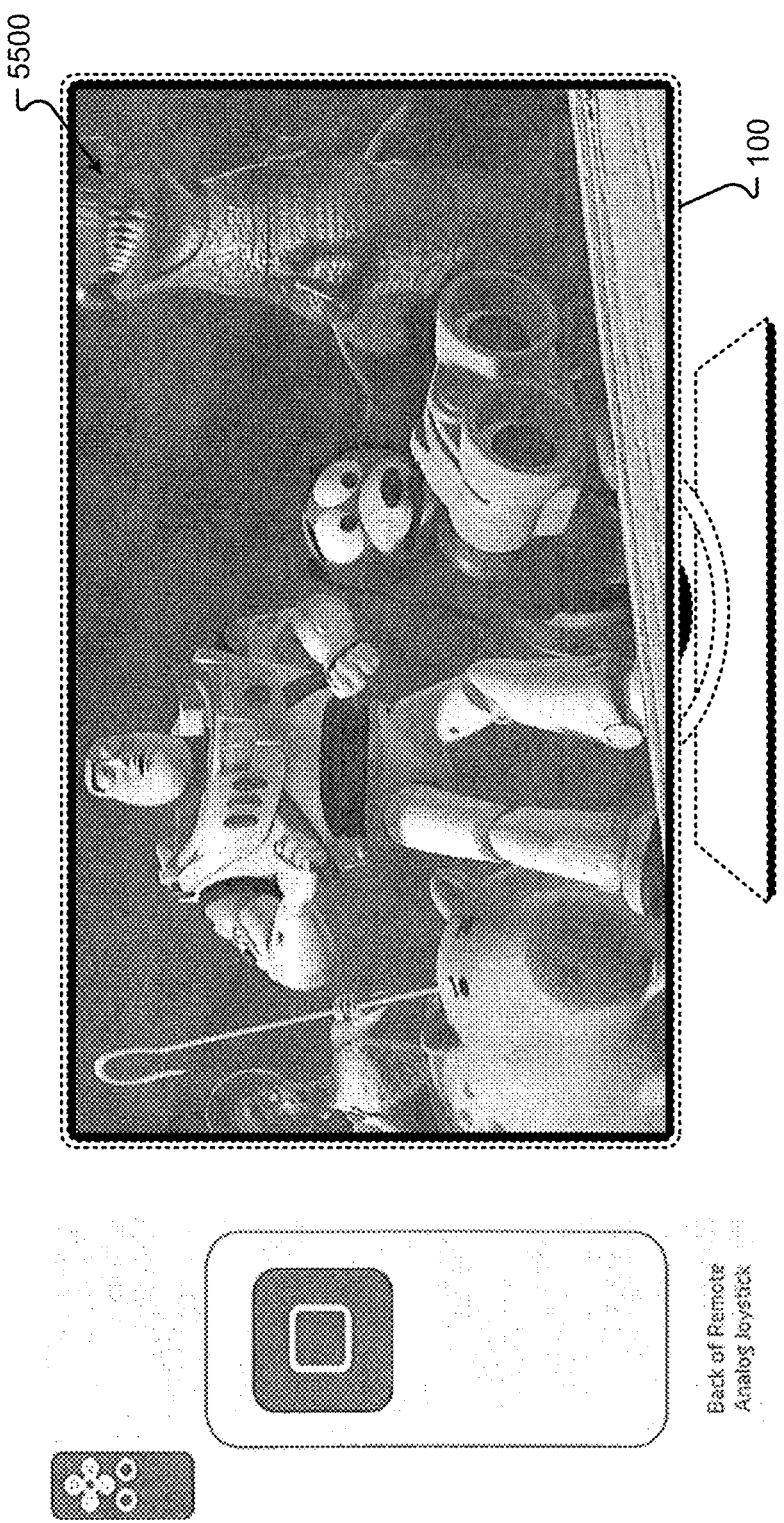
FIG. 55 is a view of an embodiment of a user interface for an Intelligent TV for presenting social media information.

In step 5416, the presenter module 1520 can present social media in a user interface after a peak up command. For example, as shown in user interface 5500 of FIG. 55, the neutral user interface 5500 presents no information. If the user moves the joystick into the peak up position, as shown in FIG. 9b, the presenter module 1520 can present user interface 5600 shown in FIG. 56. Here, a footer 5604 is presented at the bottom of the user interface 5600. The footer 5604 includes social media inputs 5608 associated with the content shown in the user interface 5600. The social media postings in the footer 5604 may be listed in chronological order from left to right.

Figure 56:
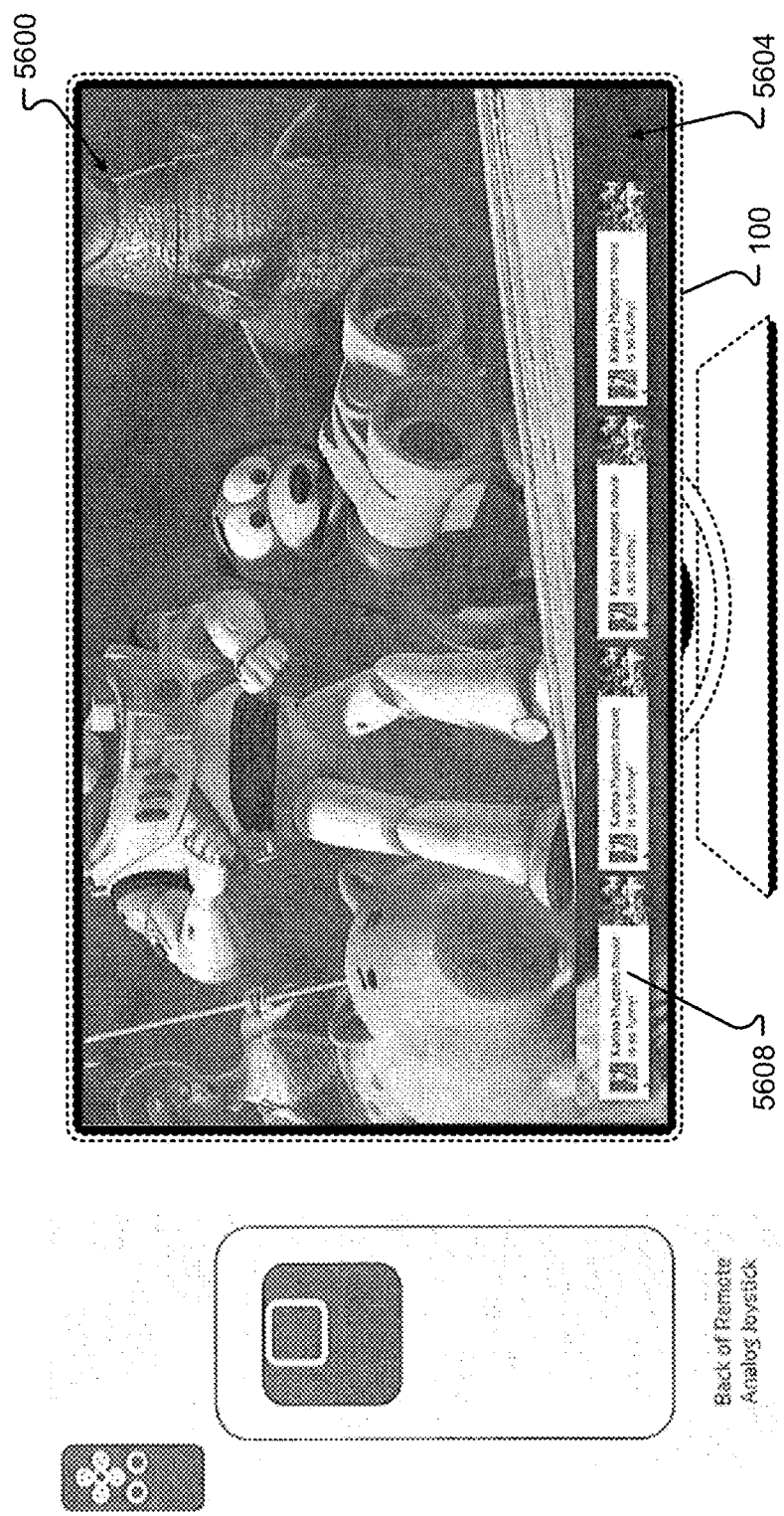
FIG. 56 is a view of an embodiment of a user interface for an Intelligent TV for presenting social media information.
Figure 57:
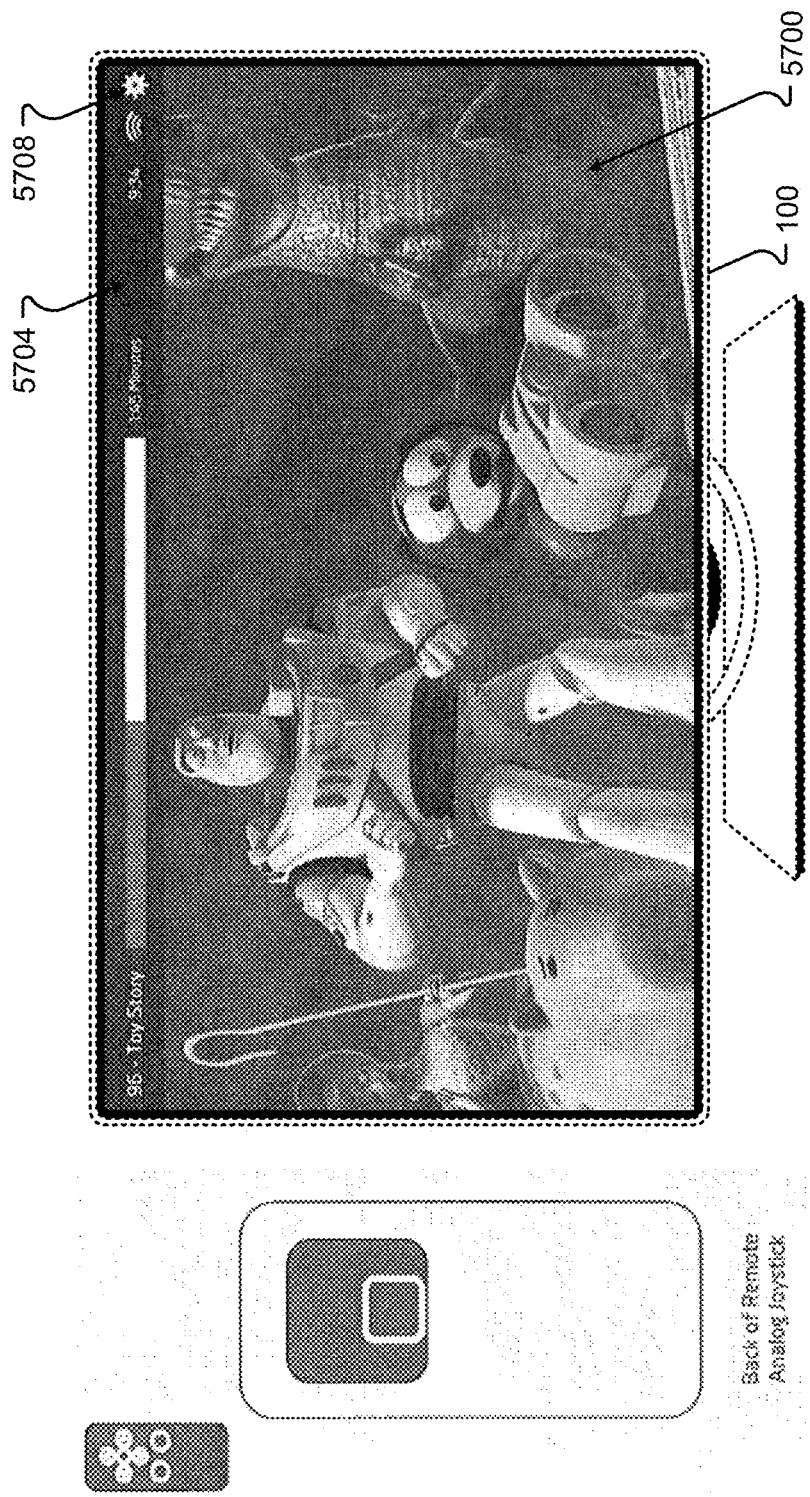
FIG. 57 is a view of an embodiment of a user interface for an Intelligent TV for presenting social media information.

In step 5420, the user moves the joystick in a peak down command shown in FIG. 9c. Here, user interface 5700 shown in FIG. 57 is presented. The user interface application 468 provides a banner 5704 including information about the content. However, there is no social media information in banner 5704. The user may be presented with an ooh-aah device 5708 to automatically post social media about the content shown in user interface 5700. The ooh-aah button is described hereinafter. Thus, the joystick control could control the access to social media about the content in a unique user interface as shown in FIG. 56. If the joystick is moved back to a neutral position by moving it up or down, the user interfaces 5600 and/or 5700 are hidden.

Figure 58:
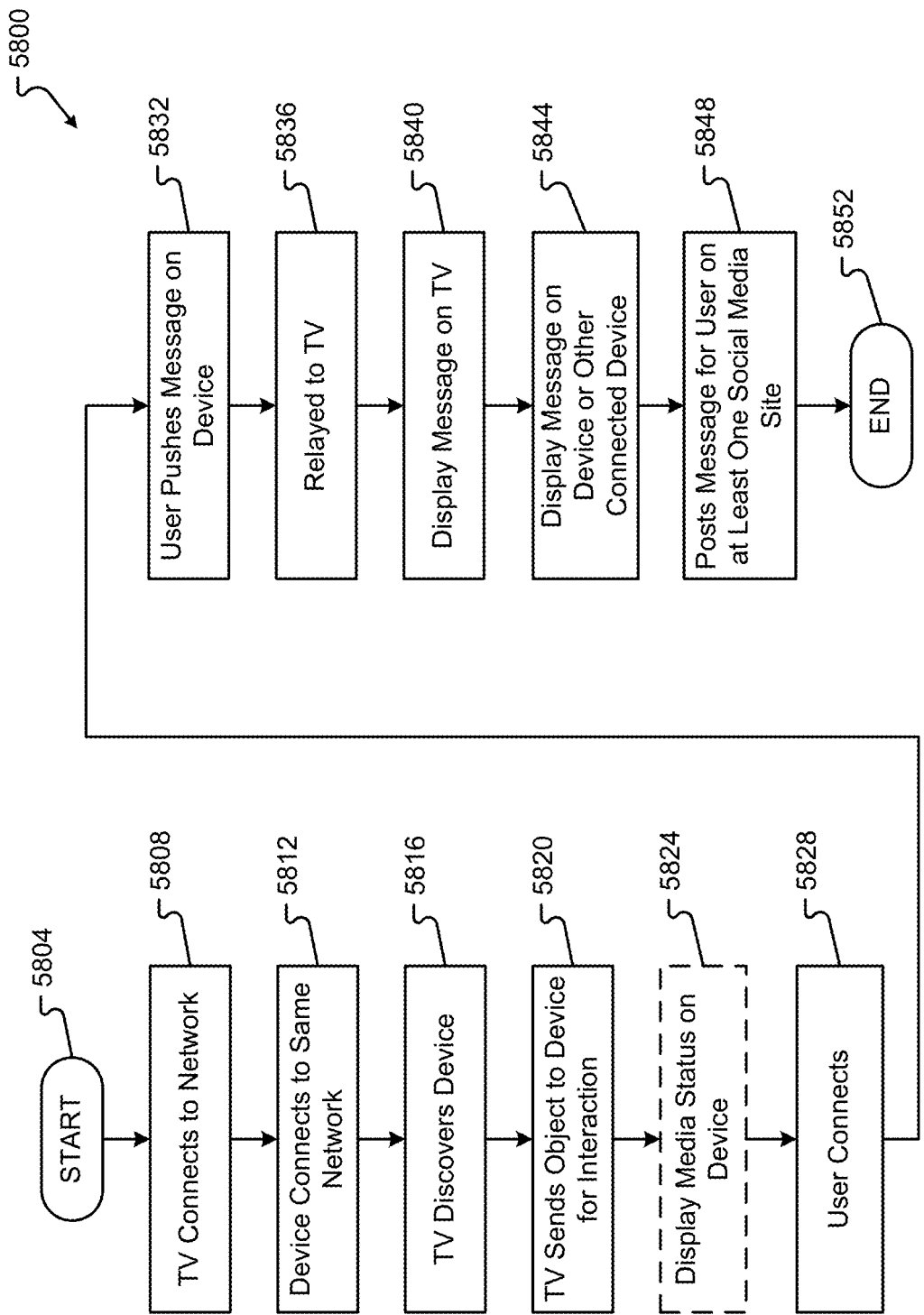
FIG. 58 is a flowchart view of an embodiment of a method for presenting and/or publishing social media information.

An embodiment of a method 5800 for posting social media with a second device is described in FIG. 58. While a general order for the steps of the method 5800 is shown in FIG. 58. Generally, the method 5800 starts with a start operation 5804 and ends with an end operation 5852. The method 5800 can include more or fewer steps or can arrange the order of the steps differently than those shown in FIG. 58. The method 5800 can be executed as a set of computer-executable instructions, executed by a computer system, and encoded or stored on a computer readable medium. Further, the method 5800 can be executed by a gate or other hardware device or component in an Application Specific Integrated Circuit, a Field Programmable Gate Array, or other type of hardware device. Hereinafter, the method 5800 shall be explained with reference to the systems, components, modules, software, data structures, user interfaces, etc. described herein.

The Intelligent TV 100 can connect to a network, in step 5808. For example, the processor 364 can instruct a wireless connectivity module 328 to send necessary information, commands, or data to a network 132. A user can obtain, or the processor 364 can obtain, any kind of information to connect to the network 132, including an ID or other kinds of credentials. The connection to the network 132 can happen in the background. A device 168e may then connect to the same network 132, in step 5812. Any of the connections to the network 132 can be made through known methods. Upon connecting to the network 132, the Intelligent TV 100 may discover the device 168e, in step 5816. Here, the processor 364 may receive signals from the wireless connectivity module 328 when a new device is put on the network 132. The device 168e can be discovered through known methods and provide an indication to the processor of the newly-discovered device 168e.

Figure 59:
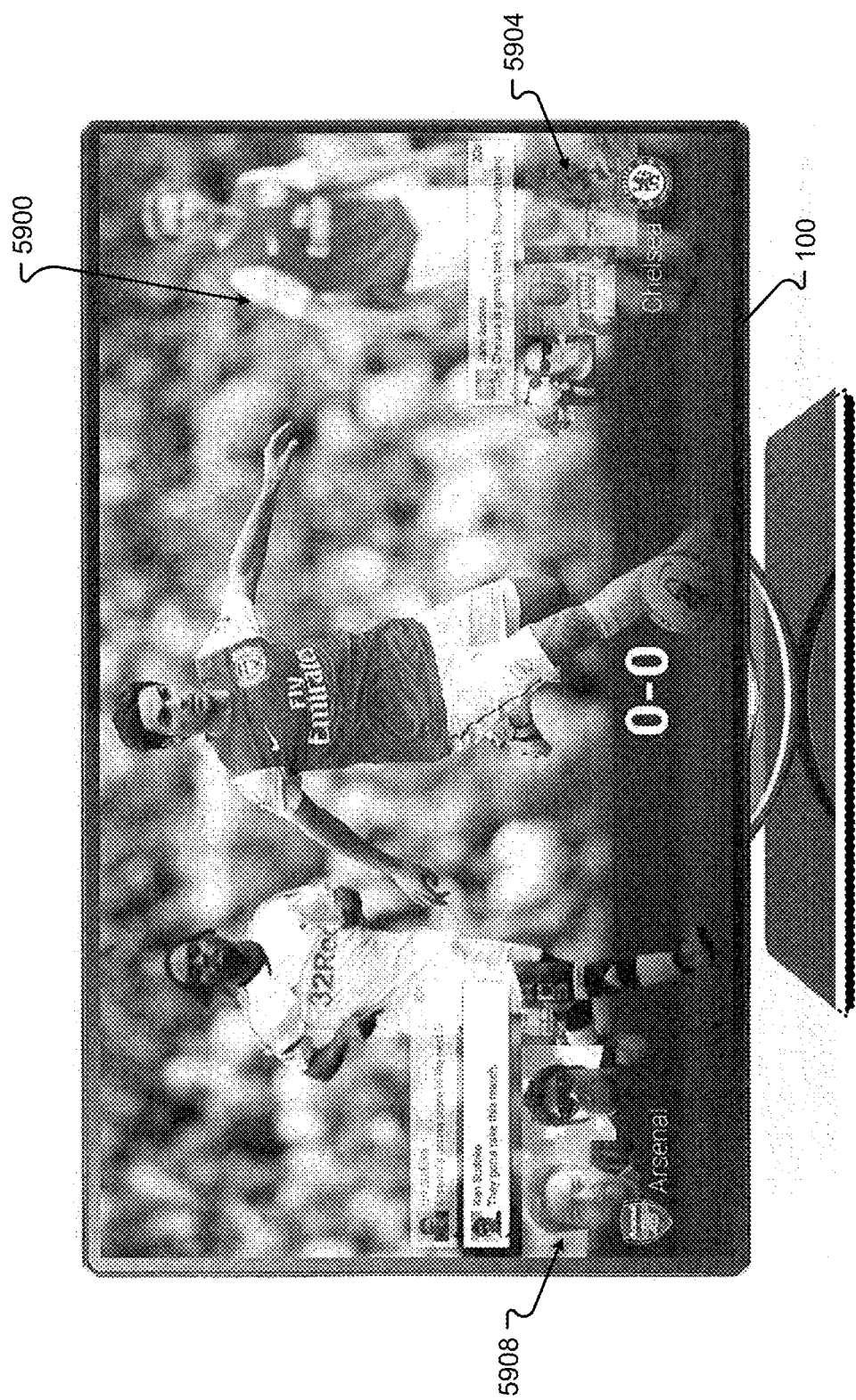
FIG. 59 is a view of an embodiment of a user interface for an Intelligent TV for presenting social media information.
Figure 60:
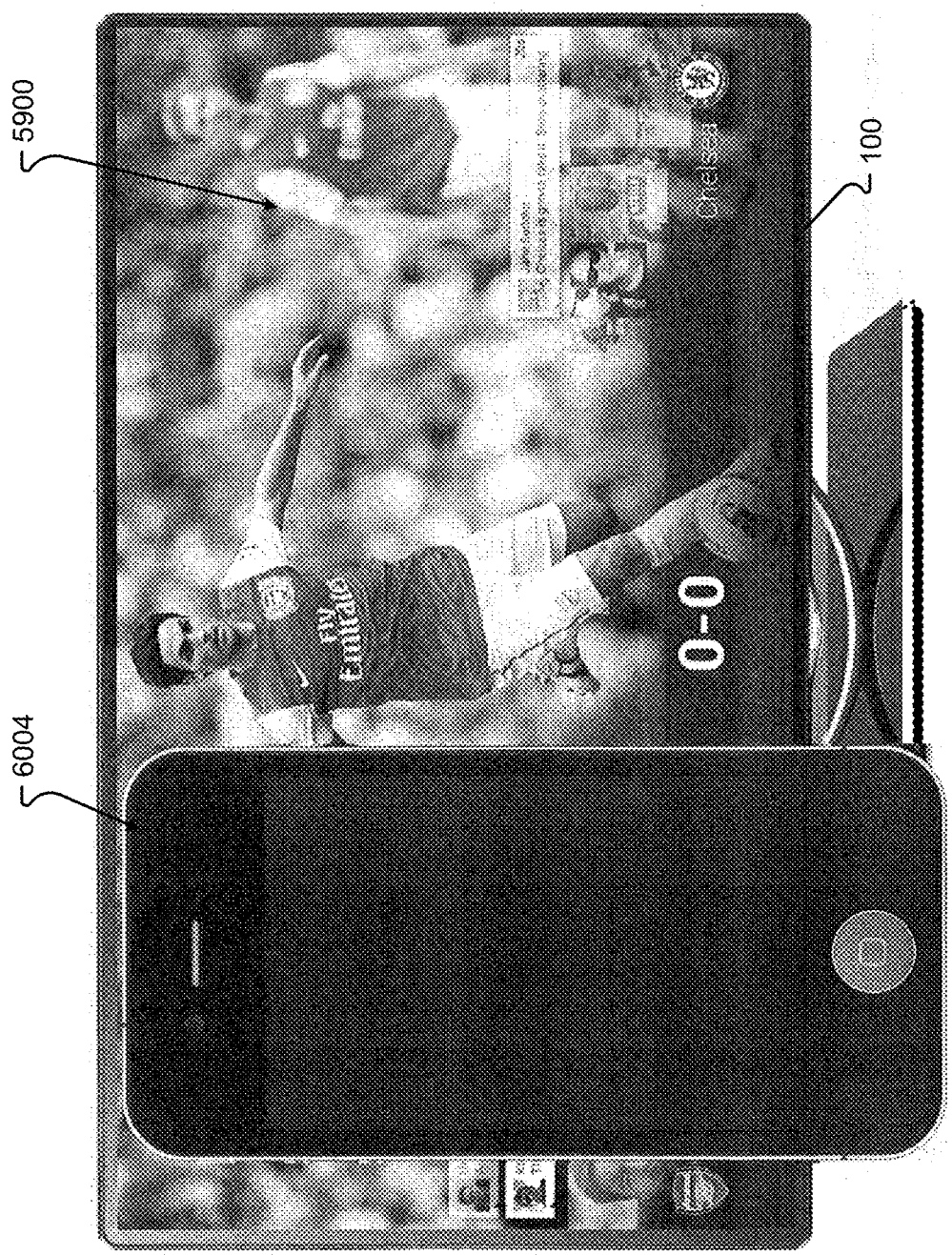
FIG. 60 is a view of an embodiment of a user interface for an Intelligent TV for presenting social media information.
Figure 61:
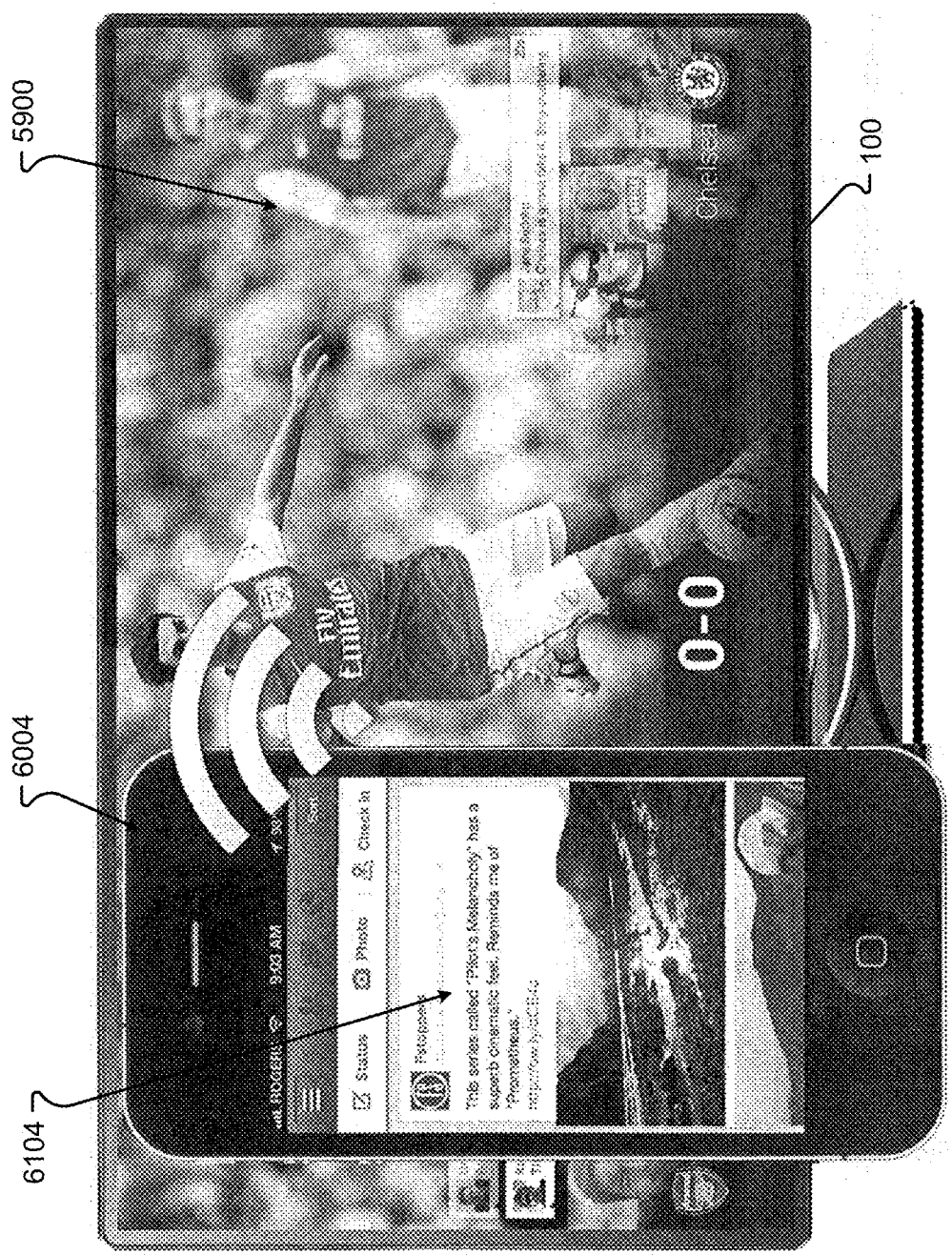
FIG. 61 is a view of an embodiment of a user interface for an Intelligent TV for presenting social media information.

Upon discovering the device 168e, the processor 364 can send an object through the wireless connectivity module 328 to the device 168e to begin an interaction, in step 5820. For example, the Intelligent TV 100 may present a user interface 5900 in FIG. 59. The user interface may include social media rooting sections 5904 and 5908. In other examples, there may be other types of social media provided in user interface 5900. A device 6004 shown in FIG. 60 may then connect to the network 132. The device 6004 may then send a signal to a network 132 while presenting user interface 6104 shown in FIG. 61. The television may discover the device 6004 and send an object to begin an interaction. This object 6204 may be a banner or some other user selectable device as shown in user interface 6104 of the device 6004.

Figure 62:
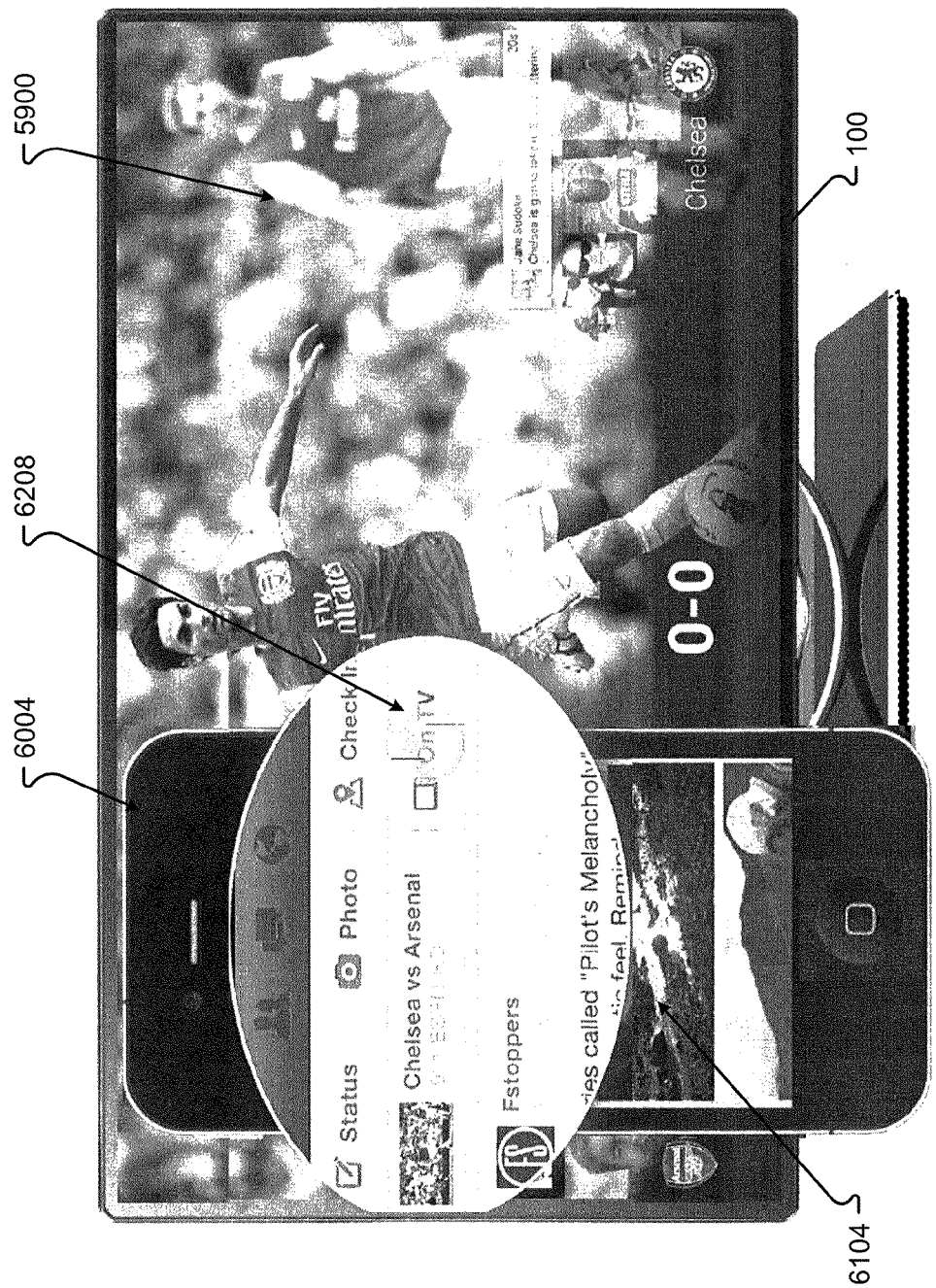
FIG. 62 is a view of an embodiment of a user interface for an Intelligent TV for presenting social media information.

FIG. 62 shows a larger view of the object 6208 provided in user interface 6204. The object 6208 can optionally display the media status of the TV, in step 5824. For example, object 6204 indicates that the user is watching a soccer game, "Chelsea vs. Arsenal," on the Intelligent Television 100. The display of media status may be optional, as the user may be able to select device 6208 without a preview of the status of the Intelligent Television 100. The user may then select device 6208 to connect the device 6004 with the Television 100, in step 5828.

Figure 63:
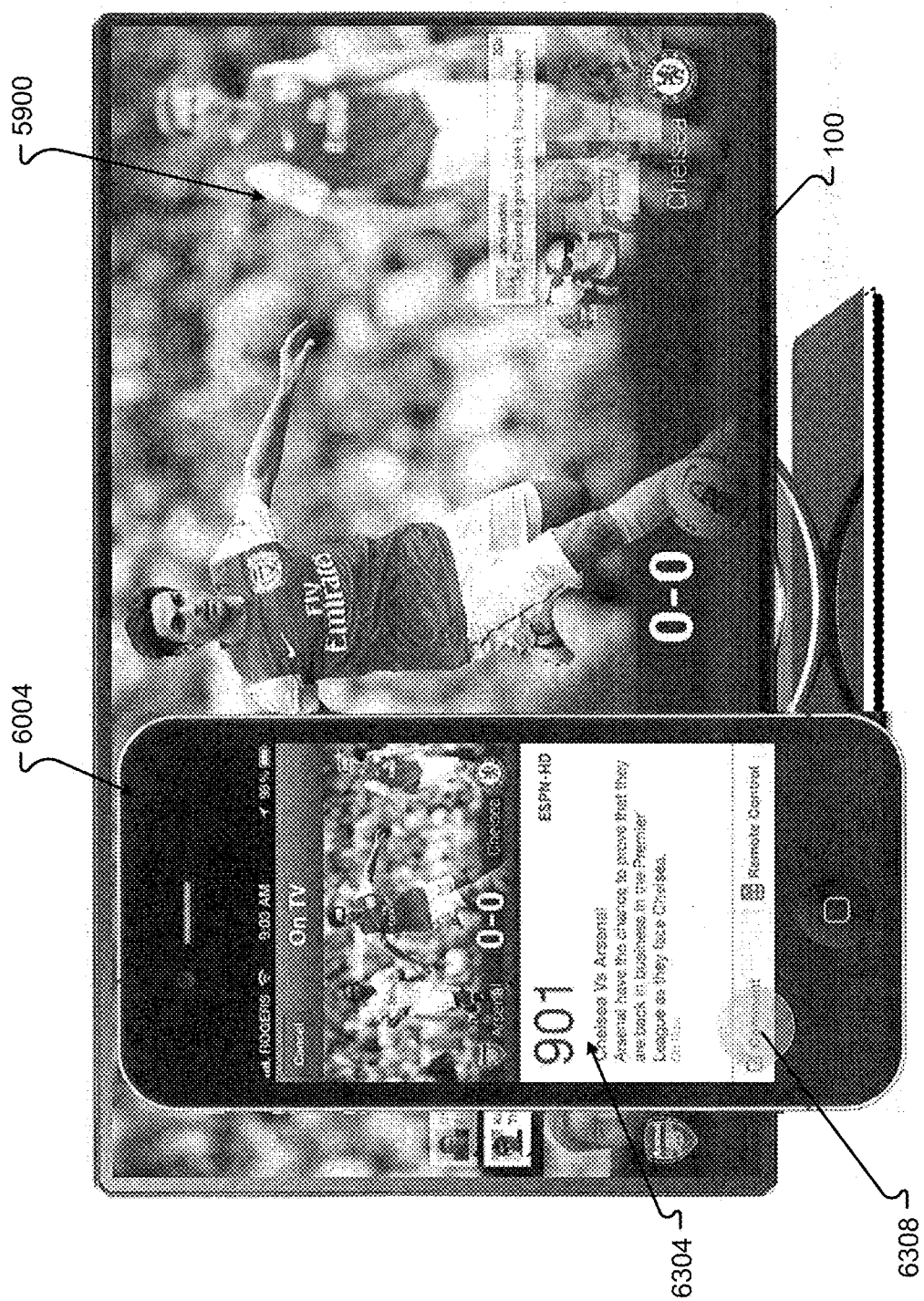
FIG. 63 is a view of an embodiment of a user interface for an Intelligent TV for presenting social media information.
Figure 64:
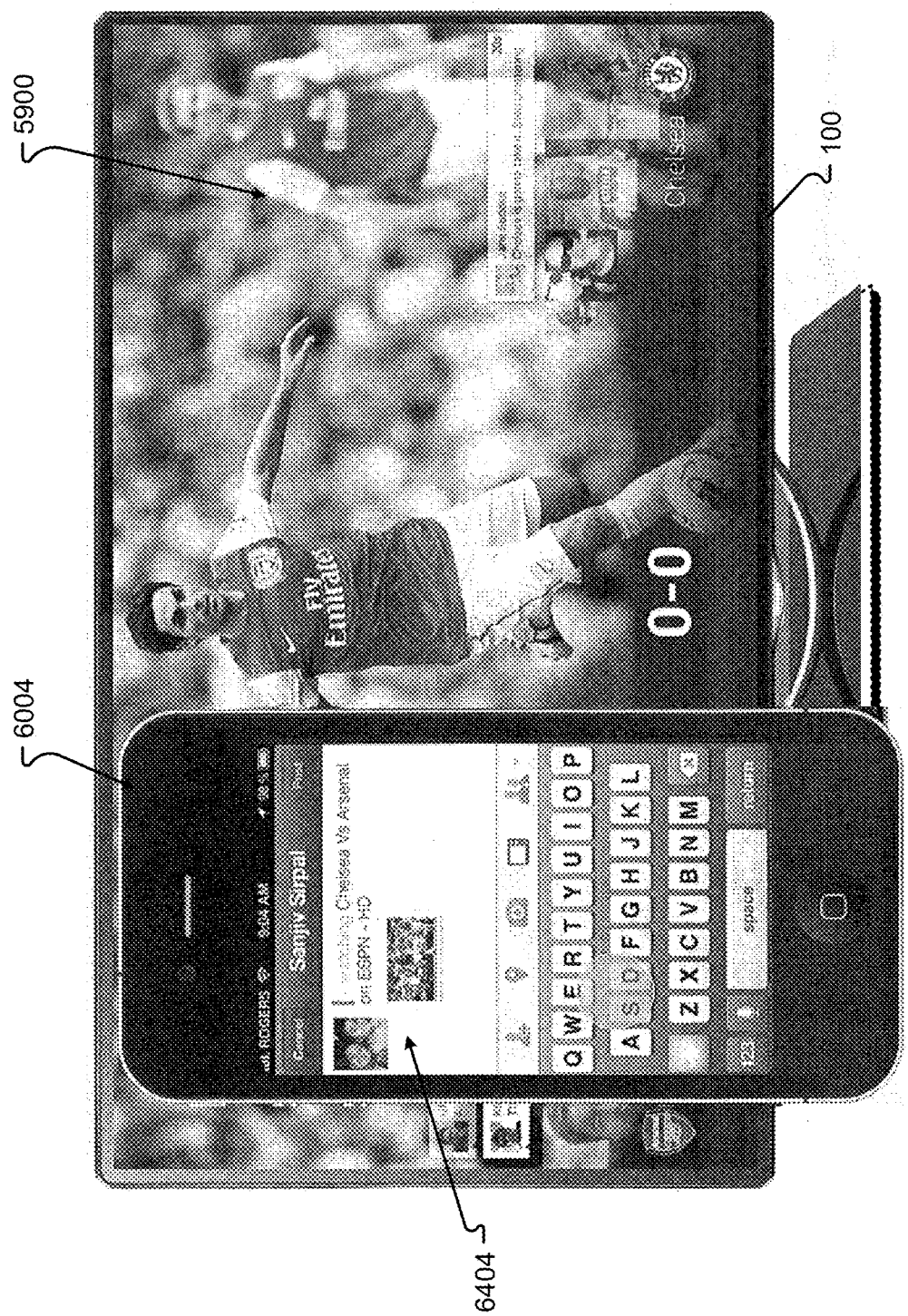
FIG. 64 is a view of an embodiment of a user interface for an Intelligent TV for presenting social media information.
Figure 65:
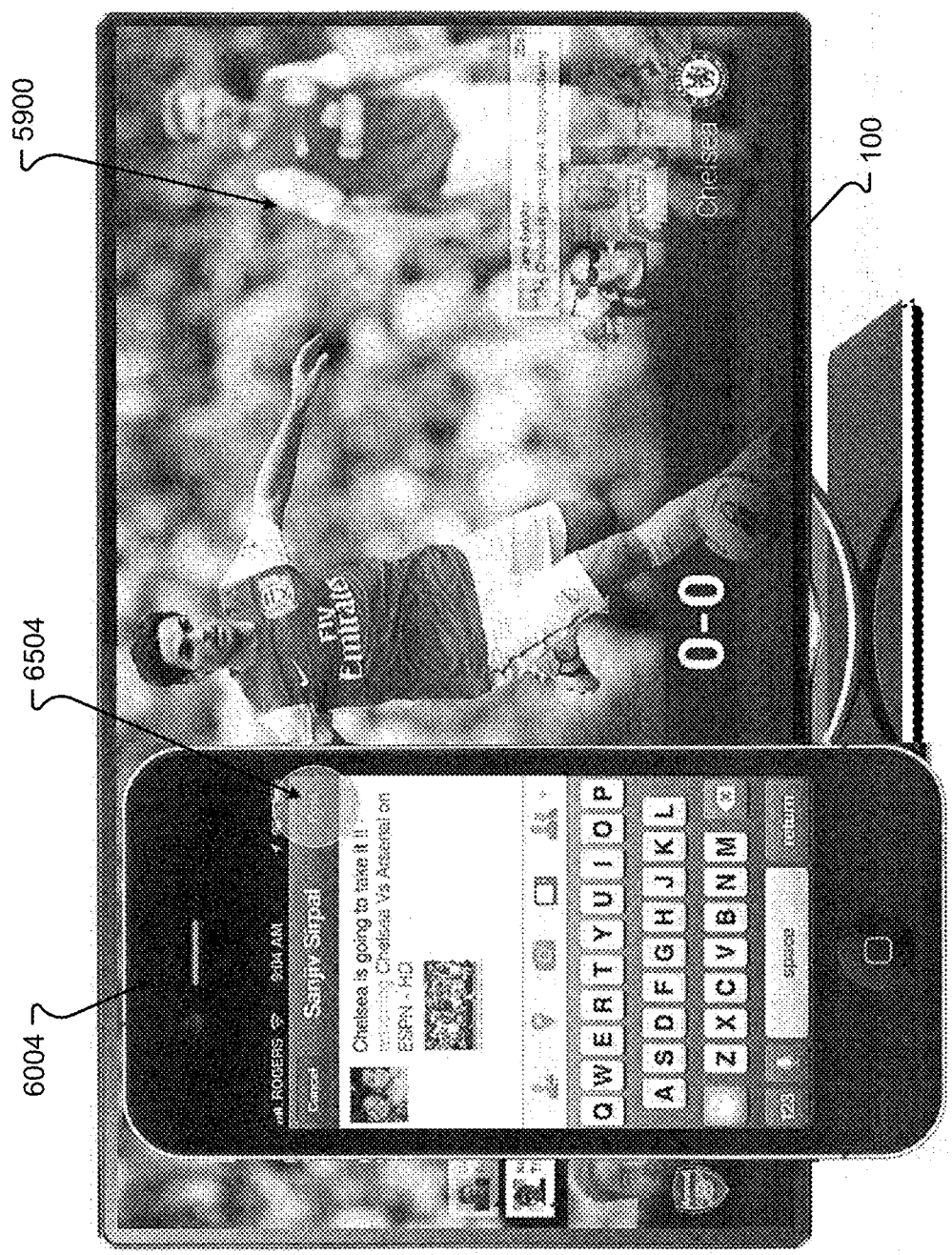
FIG. 65 is a view of an embodiment of a user interface for an Intelligent TV for presenting social media information.

Upon selecting user interface device 6208, the device 6004 may then present a user interface 6304, which allows the user to comment about the content, by selecting device 6308 shown in FIG. 63. The user can then select device 6308. The user then may enter a message 6404, shown in FIG. 64. The user can type in the message and may then select a device 6504, shown in FIG. 65. The device 6504 posts the message and pushes that message from the mobile device 6004 to social media sites, in step 5832.

Figure 66:
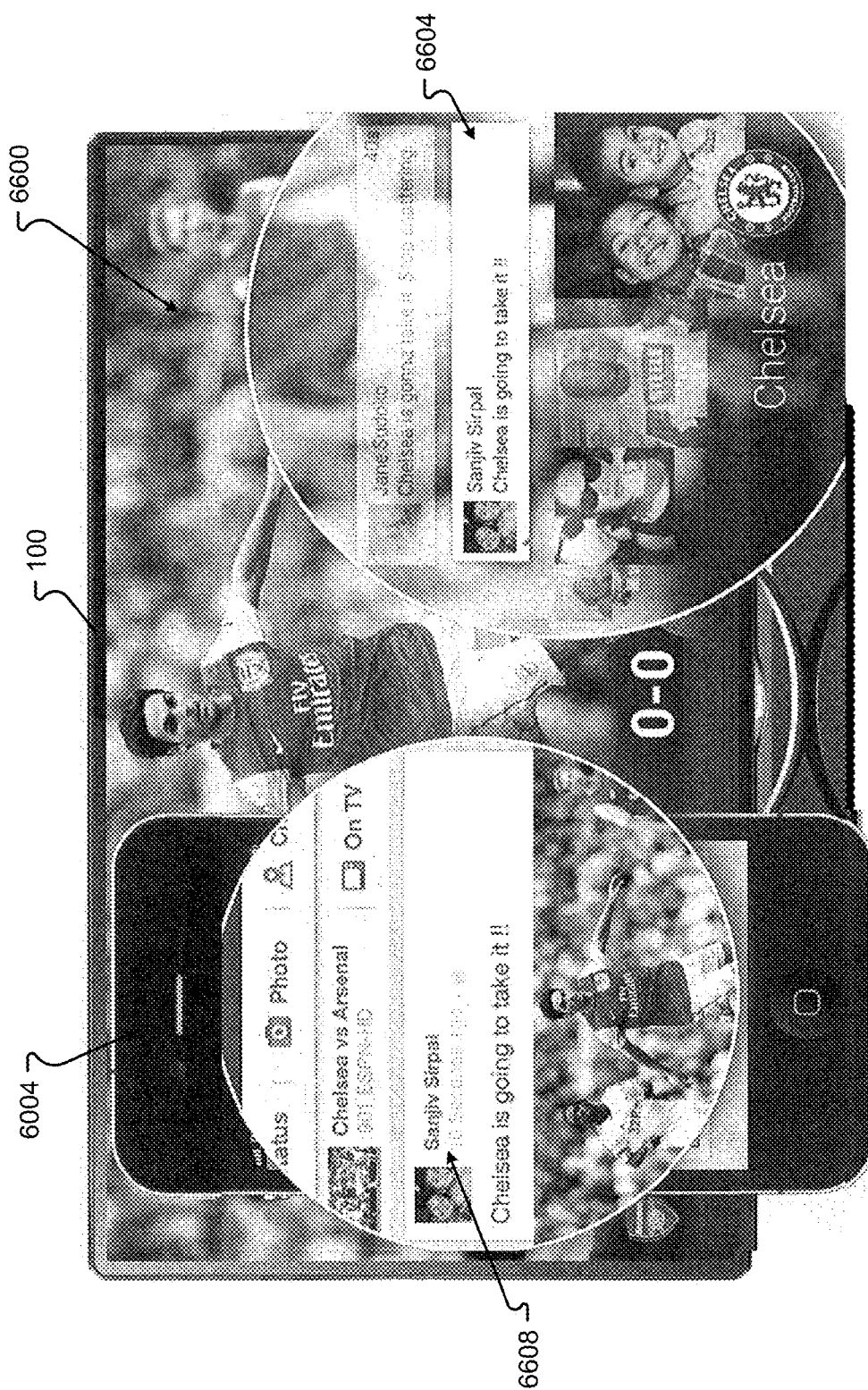
FIG. 66 is a view of an embodiment of a user interface for an Intelligent TV for presenting social media information.

The posting may also be relayed to the TV, in step 5836. The processor 364 can receive the message and send the message to the publisher 1524. The message may be displayed on the device 6004, in user interface 6608, shown in FIG. 66. Further, the presenter module 1520 can present the message, or display the message, on the user interface 6600 of the Intelligent Television 100, as shown in FIG. 66. For example, message 6604 is now presented in the rooting section of user interface 6600. The device 6004 also displays the message 6608, in step 5844.

Figure 67:
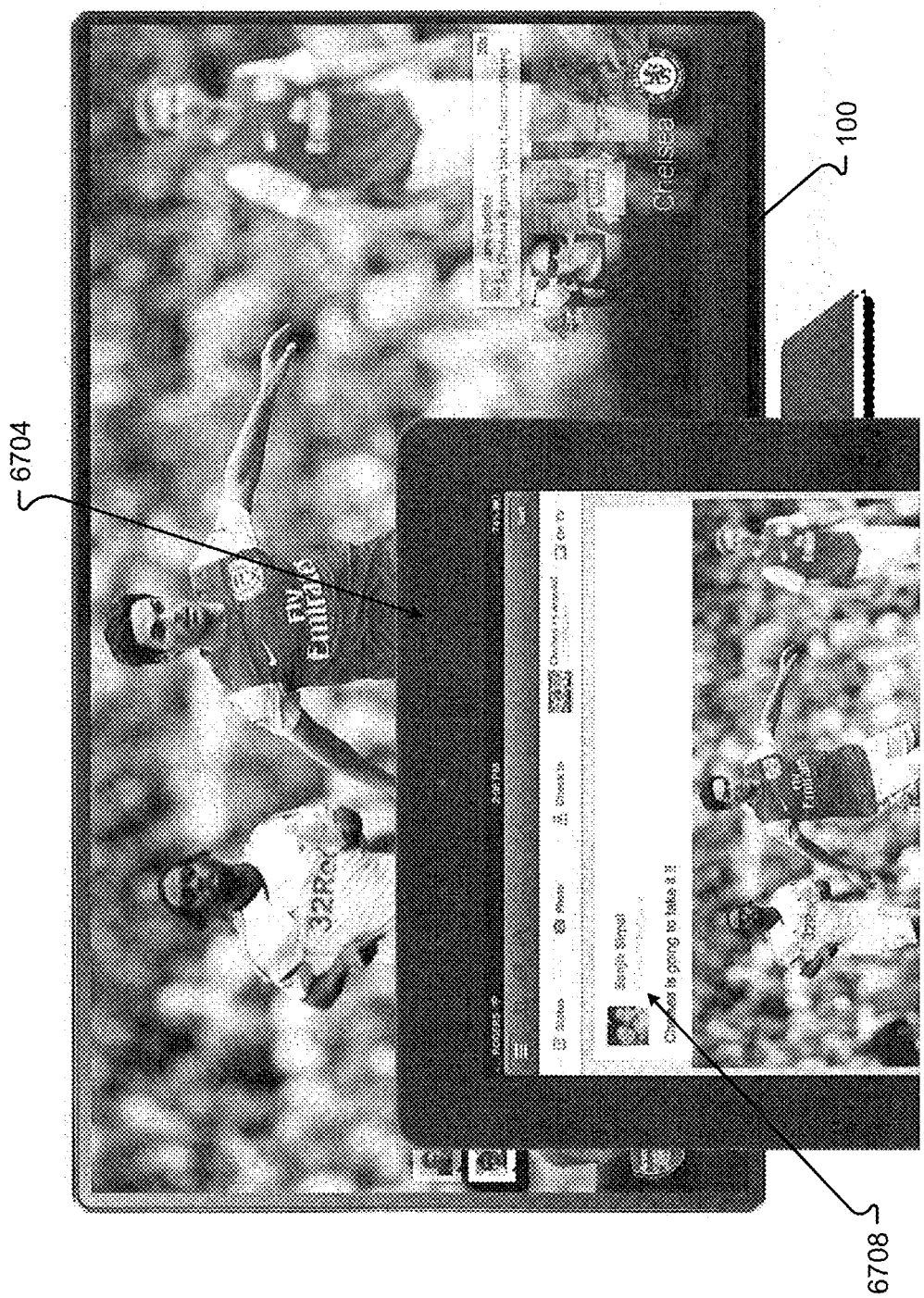
FIG. 67 is a view of an embodiment of a user interface for an Intelligent TV for presenting social media information.
Figure 68:
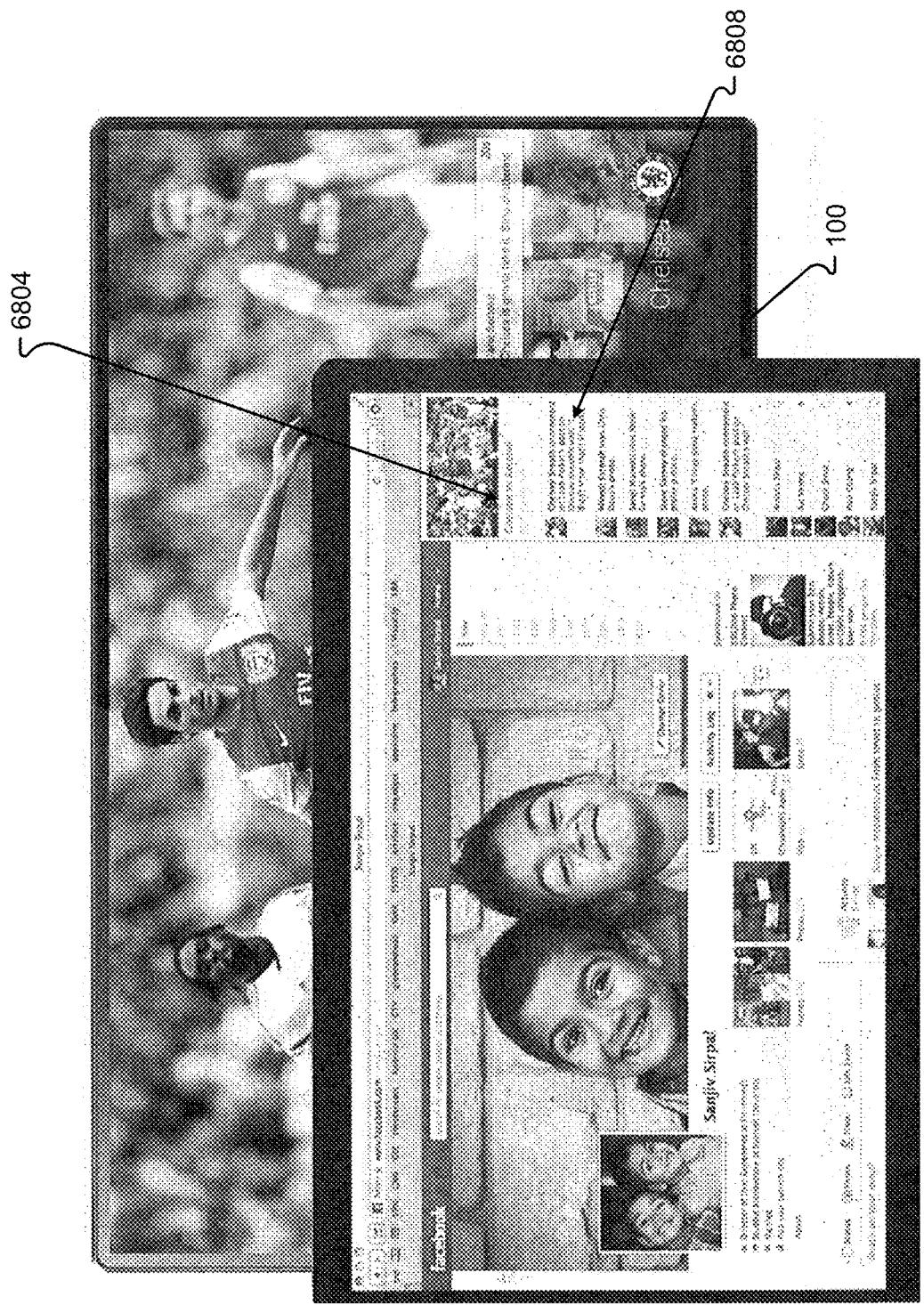
FIG. 68 is a view of an embodiment of a user interface for an Intelligent TV for presenting social media information.

The message may then be posted to a social media site, in step 5848. Thus, the message may be forwarded by the publish module 1524 to another device 6704, connected to the local network 124, as shown in FIG. 67. The message 6708 may also appear on the other device 6704 after posting the message on the first device 6004. Further, the publish module 1524 can publish the message to a social media site, as shown in FIG. 68. For example, the Facebook™ page 6804, associated with the user, shows the messages posted to the game, including the user's message, in section 6808. Thus, the Intelligent Television 100 can work with external devices to publish efficiently and effectively messages to social media sites, which produces an easily interactive system for the Intelligent Television 100.

Figure 69:
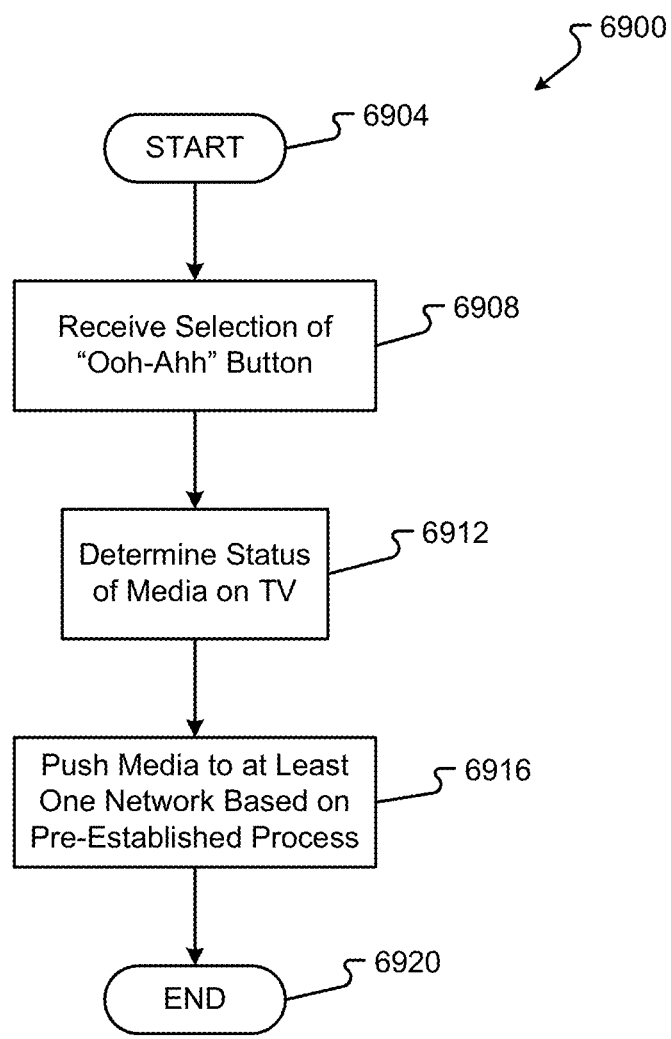
FIG. 69 is a flowchart view of an embodiment of a method for presenting and/or publishing social media information.

An embodiment of a method 6900 for one-click publishing of social media content through the Intelligent Television 100 is shown in FIG. 69. While a general order for the steps of the method 6900 is shown in FIG. 69. Generally, the method 6900 starts with a start operation 6904 and ends with an end operation 6920. The method 6900 can include more or fewer steps or can arrange the order of the steps differently than those shown in FIG. 69. The method 6900 can be executed as a set of computer-executable instructions, executed by a computer system, and encoded or stored on a computer readable medium. Further, the method 6900 can be executed by a gate or other hardware device or component in an Application Specific Integrated Circuit, a Field Programmable Gate Array, or other type of hardware device. Hereinafter, the method 6900 shall be explained with reference to the systems, components, modules, software, data structures, user interfaces, etc. described herein.

Here, the user may have use of a remote control 1800. The remote control 1800 may include an ooh-aah button 1804. The ooh-aah button 1804 may be a one-click social media posting selection. Thus, if the user selects button 1804, the remote control 1800 sends a signal to the Intelligent Television 100 through a process similar to step 2108 of FIG. 21. The Intelligent Television 100 can receive the selection of the ooh-aah button 1804, in step 6908. As discussed previously herein, the processor 364 can send the signal associated with the selection of the ooh-aah button 1804 to the publish module 1524 to indicate that media or content currently being viewed on the Intelligent Television 100 should be posted or published to a social media site.

The publish module 1524 may then determine the status of media or content on the Intelligent Television 100, in step 6912. Thus, the publish module 1524 can determine if there is a focus or selection of media or content currently in the user interface of the Intelligent Television 100. The selection of media may then indicate that the user desires to publish the selected media to one or more social media sites 1404 associated with the user. In other embodiments, the user may select another posting from a different user or may enter a comment into a user interface on the Intelligent Television 100. Upon selecting that comment and pushing the ooh-aah button 1804, the user can indicate a desire to publish that posting, comment, or media to a social media site.

The publish module 1524 may then push the media or selection to at least one social media site based on a pre-established process, in step 6916. Thus, the publish module 1524 may then access information in database 1600. This information may include any indication of social media accounts 1624 that are associated with the user. These social media sites 1404 may also include a social media ID 1628 and social media password 1632. Further, any kind of information about the user, and how the user desires to have information published, may be stored in data structure 1604. These predetermined processes may indicate, when the ooh-aah button 1804 is selected, what, to how many, or how the publish module 1524 should post to social media sites 1404. The access module 1512 may gain access to the social media sites 1404 for the publish module 1524.

Upon accessing the social media sites 1404, the publish module 1524 may copy the media posting, comment, and/or other information indicated by the user and automatically send that information to the social media site. The publish module 1524 can act as a proxy for the user to post that information to the social media site. Thus, the publish module 1524 may store or access methods known by the user to conduct the process of publishing the information. During the process, the publish module 1524 can copy the selected information to the correct user interface, select a current user interface device on the social media site(s) to publish the social media information, etc. These predetermined processes may be learned from past postings or may be taught and then automated by the publish module 1524. The publish module 1524 may give an indication to the user that the information that was selected by the user was published to social media sites 1404. In this way, the publish module 1524 provides a one-click method for the user to post information to social media sites 1404.

The exemplary systems and methods of this disclosure have been described in relation to an Intelligent Television. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

In another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for providing social media on an intelligent television, the method comprising:
   receiving one or more social media postings at a processor of the intelligent television through a port interface from a social media server;
   receiving a selection of a control device on a remote control associated with the intelligent television, wherein the control device receives a first type of the selection based on the control device being moved in a first direction and a second type of the selection based on the control device being moved in a second direction;
   in response to the selection, sending a signal from the remote control to the intelligent television;
   receiving, by a processor of the intelligent television through an IR/RF module or I/O module, the signal associated with the selection;

determining whether the selection, received at the remote control, is the first type or the second type;
when the selection is a first type, providing a first user interface at the bottom of a display of the intelligent television, wherein the first user interface provides at least one visual representation of at least one of the social media posting;
when the selection is a second type, providing a second user interface at the top of the display of the intelligent television, wherein the second user interface provides information associated with content being presented in the display of the intelligent television;
providing an ooh-ahh device;
receiving selection of the ooh-ahh device by a remote control; and
in response to the selection of the ooh-ahh device, automatically posting information about the content being presented in the display of the intelligent television to the social media site.

2. The method as defined in claim 1, wherein the control device is a joystick on a back of the remote control.

3. The method as defined in claim 2, wherein the first type of selection is a peek up selection caused by moving the joystick up.

4. The method as defined in claim 3, wherein the second type of selection is a peek down selection caused by moving the joystick down.

5. The method as defined in claim 4, wherein the first user interface is a footer in the display having two or more social media posting listed across the footer in time sequence.

6. The method as defined in claim 5, wherein the second user interface is a banner in the display having at least one user-selectable control to change the presentation of content in the display.

7. The method as defined in claim 6, wherein the banner includes the ooh-ahh device to post automatically information about the content to the social media server.

8. The method as defined in claim 7, wherein the first user interface is hidden by moving the joystick down to a neutral position.

9. The method as defined in claim 8, wherein the second user interface is hidden by moving the joystick up to a neutral position.

10. The method as defined in claim 9, wherein the joystick is moved left or right to affect other user interface interactions.

11. An intelligent television system comprising:
a remote control comprising:
a control device that receives a selection, wherein the control device receives at least two types of selection;
a controller in communication with the control device that receives the selection from the control device, wherein the control device receives a first type of the selection based on the control device being moved in a first direction and a second type of the selection based on the control device being moved in a second direction;
an wireless transceiver in communication with the controller that sends a signal associated with the selection to an intelligent television in response to commands from the controller;
the intelligent television comprising:
a display;
a port interface that receives social media data from a social media server;
a memory that stores the social media data;
an IR/RF module or I/O module to receive the signal from the remote control;
a processor in communication with the port interface, the display, the memory, and the IR/RF module or I/O module, wherein the processor:
executes a social media application operable to receive one or more social media postings in the social media data;
executes a user interface application in communication with the social media application, wherein the user interface application:
receives a selection, wherein the selection is of a control device on a remote control associated with the intelligent television;
determines whether the selection is a first type or a second type;
if the selection is a first type, provides a first user interface at the bottom of the display of the intelligent television, wherein the first user interface provides at least one visual representation of at least one of the social media posting; and
if the selection is a second type, provides a second user interface at the top of the display of the intelligent television, wherein the second user interface provides information associated with content being presented in the display of the intelligent television.

12. The intelligent television system as defined in claim 11, wherein the control device is a joystick on a back of the remote control, wherein the first type of selection is a peek up selection caused by moving the joystick up, and wherein the second type of selection is a peek down selection caused by moving the joystick down.

13. The intelligent television system as defined in claim 12, wherein the first user interface is a footer in the display having two or more social media posting listed across the footer in time sequence, and wherein the second user interface is a banner in the display having at least one user-selectable control to change the presentation of content in the display.

14. The intelligent television system as defined in claim 13, wherein the banner includes an "ooh-ahh" device to post automatically information about the content to one or more social media sites.

15. The intelligent television system as defined in claim 14, wherein the first user interface is hidden by moving the joystick down to a neutral position, and wherein the first user interface is hidden by moving the joystick up to a neutral position.

16. A non-transitory computer readable medium having stored thereon processor executable instructions that cause a computing system to execute a method, the instructions comprising:
instructions to receive one or more social media postings at a processor of a intelligent television through a port interface from a social media server;
instructions to receive a selection of a control device on a control device on a remote control associated with an intelligent television, wherein the control device receives at least two types of selection;
in response to the selection, instructions to send a signal from the remote control to the intelligent television:
instructions to receive, by the processor of the intelligent television through an IR/RF module or I/O module, the signal associated with the selection;

instructions to determine whether the selection, received at the remote control, is a first type or a second type;

if the selection is a first type, instructions to provide a first user interface at the bottom of a display of the intelligent television, wherein the first user interface provides at least one visual representation of at least one of the social media posting;

if the selection is a second type, instructions to provide a second user interface at the top of the display of the intelligent television, wherein the second user interface provides information associated with content being presented in the display of the intelligent television;

instructions to provide an ooh-ahh device;

instructions to receive selection of the ooh-ahh device by a remote control; and in response to the selection of the ooh-ahh device, instructions to post automatically information about the content being presented in the display of the intelligent television to the social media site.

17. The non-transitory computer readable medium as defined in claim 16, wherein the control device is a joystick on a back of the remote control, wherein the first type of selection is a peek up selection caused by moving the joystick up, and wherein the second type of selection is a peek down selection caused by moving the joystick down.

18. The non-transitory computer readable medium as defined in claim 17, wherein the first user interface is a footer in the display having two or more social media postings listed across the footer in time sequence, and wherein the second user interface is a banner in the display having at least one user-selectable control to change the presentation of content in the display.

19. The non-transitory computer readable medium as defined in claim 18, wherein the banner includes an ooh-ahh device to post automatically information about the content to one or more social media sites.

20. The non-transitory computer readable medium as defined in claim 19, wherein the first user interface is hidden by moving the joystick down to a neutral position, and wherein the first user interface is hidden by moving the joystick up to a neutral position.

* * * * *